(12) United States Patent
Smith et al.

(10) Patent No.: US 12,353,520 B2
(45) Date of Patent: Jul. 8, 2025

(54) GRAPHICS SECURITY WITH SYNERGISTIC ENCRYPTION, CONTENT-BASED AND RESOURCE MANAGEMENT TECHNOLOGY

(71) Applicant: Intel Corporation, Santa Clara, CA (US)

(72) Inventors: Ned M. Smith, Beaverton, OR (US); Gaurav Kumar, Folsom, CA (US); Alex Nayshtut, Gan Yavne (IL); Reshma Lal, Hillsboro, OR (US); Prashant Dewan, Portland, OR (US); Pradeep Pappachan, Tualatin, OR (US); Rajesh Poornachandran, Portland, OR (US); Omer Ben-Shalom, Rishon Le-Tzion (IL)

(73) Assignee: Intel Corporation, Santa Clara, CA (US)

( * ) Notice: Subject to any disclaimer, the term of this patent is extended or adjusted under 35 U.S.C. 154(b) by 937 days.

(21) Appl. No.: 17/133,367

(22) Filed: Dec. 23, 2020

(65) Prior Publication Data

US 2022/0141026 A1    May 5, 2022

Related U.S. Application Data

(60) Provisional application No. 63/108,691, filed on Nov. 2, 2020.

(51) Int. Cl.
*G06F 21/00* (2013.01)
*G06F 8/65* (2018.01)
(Continued)

(52) U.S. Cl.
CPC ............. *G06F 21/105* (2013.01); *G06F 8/65* (2013.01); *G06F 9/45558* (2013.01);
(Continued)

(58) Field of Classification Search
CPC ............. G06F 8/65; G06F 2009/45587; G06F 21/105; G06N 5/04; H04L 9/085
See application file for complete search history.

(56) References Cited

U.S. PATENT DOCUMENTS

| 8,245,307 | B1 | 8/2012 | Pharris et al. |
| 10,542,046 | B2 | 1/2020 | Katragadda et al. |
| (Continued) | | | |

FOREIGN PATENT DOCUMENTS

| CN | 105393263 B | 1/2018 |
| CN | 108958768 A | 12/2018 |
| (Continued) | | |

OTHER PUBLICATIONS

Search Report for Netherlands Patent Application 2029296, mailed on Jun. 21, 2022, 10 pages including 3 pages of English translation.
(Continued)

*Primary Examiner* — Rodman Alexander Mahmoudi
(74) *Attorney, Agent, or Firm* — Nicholson De Vos Webster & Elliott LLP

(57) ABSTRACT

Methods, apparatuses and system provide for technology that interleaves a plurality of verification commands with a plurality of copy commands in a command buffer, wherein each copy command includes a message authentication code (MAC) derived from a master session key, wherein one or more of the plurality of verification commands corresponds to a copy command in the plurality of copy commands, and wherein a verification command at an end of the command buffer corresponds to contents of the command buffer. The technology may also add a MAC generation command to the command buffer, wherein the MAC generation command references an address of a compute result.

18 Claims, 61 Drawing Sheets

730

732 — Partition a neural network inference model into a plurality of slices

734 — Allocate different sets of resources to the plurality of slices based on one or more of a performance condition or a security condition 736 — Coordinate, via a shared key, an execution of the plurality of slices by the different sets of resources

(51) Int. Cl.
| | |
|---|---|
| *G06F 9/455* | (2018.01) |
| *G06F 9/50* | (2006.01) |
| *G06F 21/10* | (2013.01) |
| *G06F 21/60* | (2013.01) |
| *G06N 3/04* | (2023.01) |
| *G06N 3/08* | (2023.01) |
| *G06T 1/20* | (2006.01) |
| *G06T 1/60* | (2006.01) |
| *H04L 9/08* | (2006.01) |
| *H04L 9/32* | (2006.01) |
| *H04L 9/40* | (2022.01) |
| *H04L 29/06* | (2006.01) |

(52) U.S. Cl.
CPC .......... *G06F 9/5027* (2013.01); *G06F 21/602* (2013.01); *G06N 3/04* (2013.01); *G06N 3/08* (2013.01); *G06T 1/20* (2013.01); *G06T 1/60* (2013.01); *H04L 9/085* (2013.01); *H04L 9/0891* (2013.01); *H04L 9/3242* (2013.01); *H04L 63/061* (2013.01); *G06F 2009/45587* (2013.01)

(56) References Cited

U.S. PATENT DOCUMENTS

| | | |
|---|---|---|
| 2008/0055321 A1 | 3/2008 | Koduri |
| 2016/0352511 A1 | 12/2016 | Bashyam et al. |
| 2017/0235961 A1 | 8/2017 | August et al. |
| 2018/0218069 A1 | 8/2018 | Rege et al. |
| 2019/0042476 A1 | 2/2019 | Chhabra et al. |
| 2019/0042750 A1 | 2/2019 | August et al. |
| 2019/0087354 A1 | 3/2019 | Chhabra et al. |
| 2019/0318127 A1 | 10/2019 | Pan |
| 2020/0145416 A1 | 5/2020 | Mitzimberg |
| 2020/0366698 A1 | 11/2020 | Sampaio et al. |
| 2020/0372301 A1 | 11/2020 | Kearney et al. |
| 2021/0374518 A1* | 12/2021 | Zhu ........................ G06T 7/10 |

FOREIGN PATENT DOCUMENTS

| | | |
|---|---|---|
| CN | 111597790 A | 8/2020 |
| KR | 20080043215 B1 | 3/2010 |
| WO | 2015054086 A1 | 4/2015 |
| WO | 2020139509 A1 | 7/2020 |
| WO | 2020190776 A1 | 9/2020 |

OTHER PUBLICATIONS

Shi et al., "A Digital Rights Enabled Graphics Processing System," 2006, 10 pages.
Trusted Computing Group, "Hardware Requirements for a Device Identifier Composition Engine," <trustedcomputinggroup.org/wp-content/uploads/Hardware-Requirements-for-Device-Identifier-Composition-Engine-r78_For-Publication.pdf>, Mar. 22, 2018, 12 pages.
A. Regenscheid, "Platform Firmware Resiliency Guidelines," <nvlpubs.nist.gov/nistpubs/SpecialPublications/NIST.SP.800-193.pdf>, May 2018, 45 pages.
E. Toreini et al., "Technologies for Trustworthy Machine Learning: A Survey in a Socio-Technical Context," <arxiv.org/pdf/2007.08911.pdf>, Jul. 17, 2020, 32 pages.
International Search Report and Written Opinion for PCT Patent Application No. PCT/US2021/052087, mailed Jan. 19, 2022, 6 pages.
International Preliminary Report on Patentability, for International Application No. PCT/US2021/052087, Issued May 2, 2023, 5 pages.
Extended European Search Report, EP Application No. 21887147.3, dated Oct. 9, 2024, 6 pages.

* cited by examiner

660

662 — Generate a master session key during an authentication key exchange between a graphics processor and a client application

664 — Interleave a plurality of verification commands with a plurality of copy commands in a command buffer, wherein each copy command references one or more modifiable addresses, wherein each verification command includes a MAC derived from the master session key, wherein one or more of the plurality of verification commands corresponds to a copy command in the plurality of copy commands, and wherein a verification command at an end of the command buffer corresponds to contents of the command buffer

666 — Add a MAC generation command to the command buffer, wherein the MAC generation command references an address of a compute result

672 — Sequentially execute, by a command streamer, commands in the command buffer

674 — Maintain a running digest of the commands executed by the command streamer

676 — Copy the modifiable address(es) to a protected memory

678 — Track the modifiable address(es) and corresponding modified addresses in a relocation dictionary

680 — Conduct inline verifications of the modifiable address(es) based on the verification commands

682 — Conduct a buffer verification of the contents of the command buffer based on the running digest and the relocation dictionary

684
Determine a first sequence number from a first set of sequence numbers associated with host-to-graphics processor transfers 686
Compute a reference MAC for a buffer graph node corresponding to the command buffer based on the first sequence number

690
Determine a second sequence number from a second set of sequence numbers associated with graphics processor-to-host transfers 692
Compute a reference MAC for a buffer graph node corresponding to the compute result based on the second sequence number

832 — Obtain, by an update manager, current state information from a state log in response to a request to perform a firmware update in a compute engine, wherein the compute engine has an established trust context with a tenant application 834 — Automatically pre-rotate, by the update manager, keys for a new trust context

842 — Increment, by the compute engine, a state change counter

844 — Conduct, by the compute engine, the firmware update

846 — Migrate, by an engine manager containing the update manager, the established trust context to the new trust context based on the pre-rotated keys 848 — Update, by the compute engine, the state log based on the new trust context

FIG. 8C

GRAPHICS PROCESSOR INSTRUCTION
FORMATS
2000

128-BIT INSTRUCTION
2010

| OPCODE 2012 | CONTROL 2014 | EXEC-SIZE 2016 | DEST 2018 | SRC0 2020 | SRC1 2022 | SRC2 2024 | ACCESS/ADDRESS MODE 2026 |

64-BIT COMPACT
INSTRUCTION
2030

| OPCODE 2012 | INDEX 2013 | CONTROL 2014 | DEST 2018 | SRC0 2020 | SRC1 2022 |

OPCODE DECODE
2040 opcode=000xxxxxb ◄—— Move/Logic - 2042 opcode=0010xxxxb ◄—— Miscellaneous - 2046 opcode=0011xxxxb ◄—— opcode=0100xxxxb ◄—— Parallel Math - 2048 opcode=0101xxxxb ◄—— Vector Math - 2050

FIG. 18A   GRAPHICS PROCESSOR COMMAND FORMAT 2200
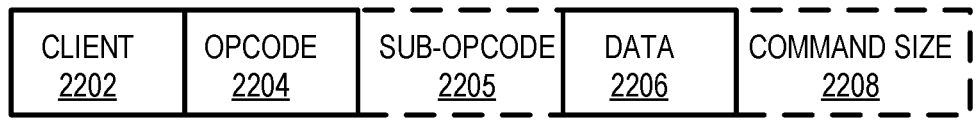
FIG. 18B   GRAPHICS PROCESSOR COMMAND SEQUENCE 2210
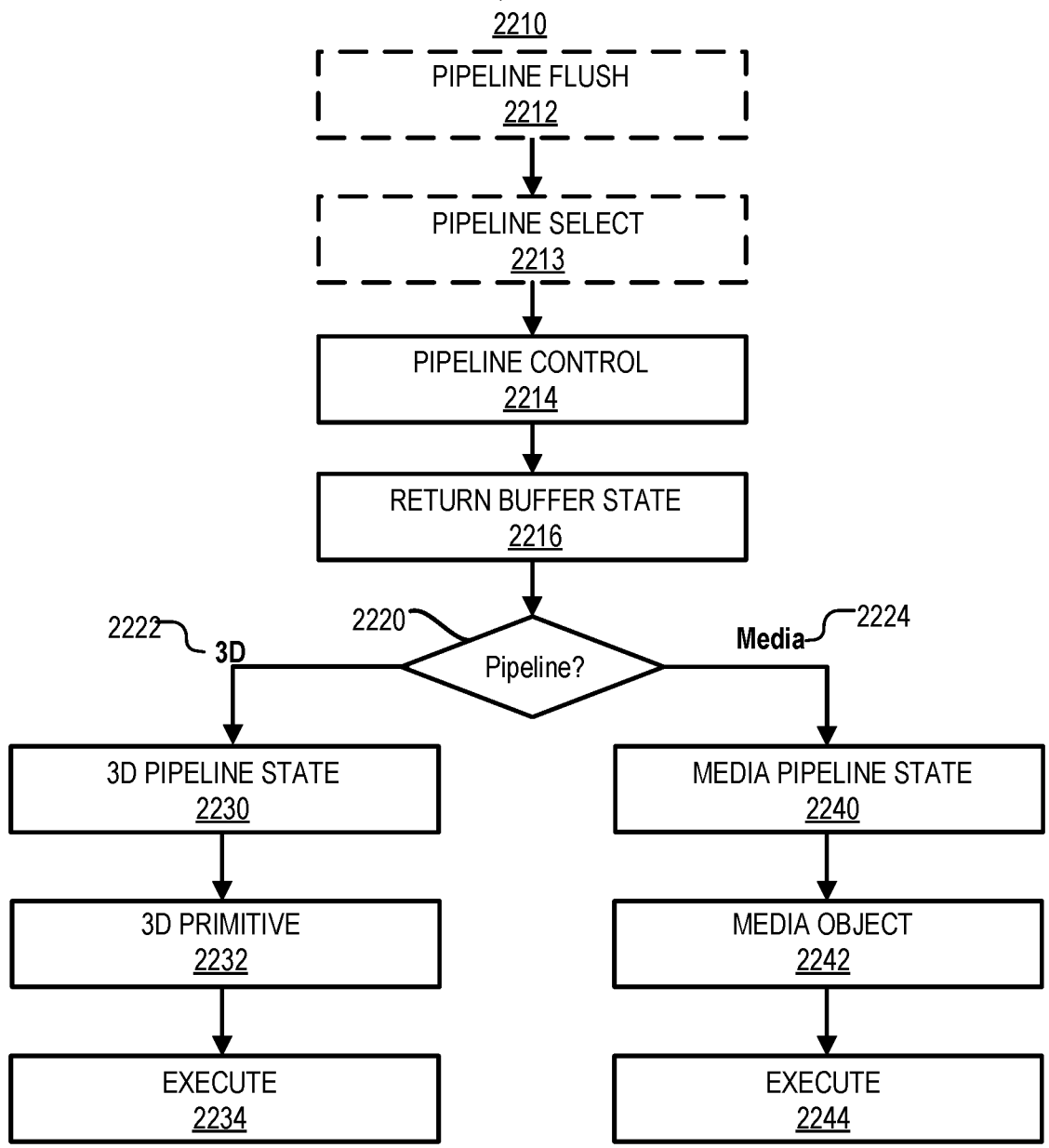

GRAPHICS SECURITY WITH SYNERGISTIC ENCRYPTION, CONTENT-BASED AND RESOURCE MANAGEMENT TECHNOLOGY

CROSS-REFERENCE TO RELATED APPLICATIONS

This application claims the benefit of priority to U.S. Provisional Patent Application No. 63/108,691 filed on Nov. 2, 2020.

TECHNICAL FIELD

This disclosure relates generally to data processing and more particularly to data processing via a general-purpose graphics processing unit (GPU).

BACKGROUND

Current parallel graphics data processing includes systems and methods developed to perform specific operations on graphics data such as, for example, linear interpolation, tessellation, rasterization, texture mapping, depth testing, etc. Traditionally, graphics processors used fixed function computational units to process graphics data; however, more recently, portions of graphics processors have been made programmable, enabling such processors to support a wider variety of operations for processing vertex and fragment data.

To further increase performance, graphics processors typically implement processing techniques such as pipelining that attempt to process, in parallel, as much graphics data as possible throughout the different parts of the graphics pipeline. Parallel graphics processors with single instruction, multiple thread (SIMT) architectures are designed to maximize the amount of parallel processing in the graphics pipeline. In an SIMT architecture, groups of parallel threads attempt to execute program instructions synchronously together as often as possible to increase processing efficiency. A general overview of software and hardware for SIMT architectures can be found in Shane Cook, CUDA Programming Chapter 3, pages 37-51 (2013).

BRIEF DESCRIPTION OF THE DRAWINGS

The various advantages of the embodiments will become apparent to one skilled in the art by reading the following specification and appended claims, and by referencing the following drawings, in which:

FIG. 6E is a flowchart of an example of a method of providing integrity protection for command buffers according to an embodiment;

FIG. 6F is a flowchart of an example of a method of providing integrity protection for relocatable command structures according to an embodiment;

FIGS. 6G-6H are flowcharts of examples of methods of providing integrity protection for chained command buffers according to an embodiment;

FIGS. 8B-8C are flowcharts of examples of methods of operating a performance-enhanced computing system to perform graphics firmware updates according to an embodiment;

FIG. 18A is a block diagram illustrating an example of a graphics processor command format according to an embodiment;

FIG. 18B is a block diagram illustrating an example of a graphics processor command sequence according to an embodiment;

DESCRIPTION OF EMBODIMENTS

A graphics processing unit (GPU) is communicatively coupled to host/processor cores to accelerate, for example, graphics operations, machine-learning operations, pattern analysis operations, and/or various general-purpose GPU (GPGPU) functions. The GPU may be communicatively coupled to the host processor/cores over a bus or another interconnect (e.g., a high-speed interconnect such as PCIe or NVLink). Alternatively, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

System Overview

Figure 1:
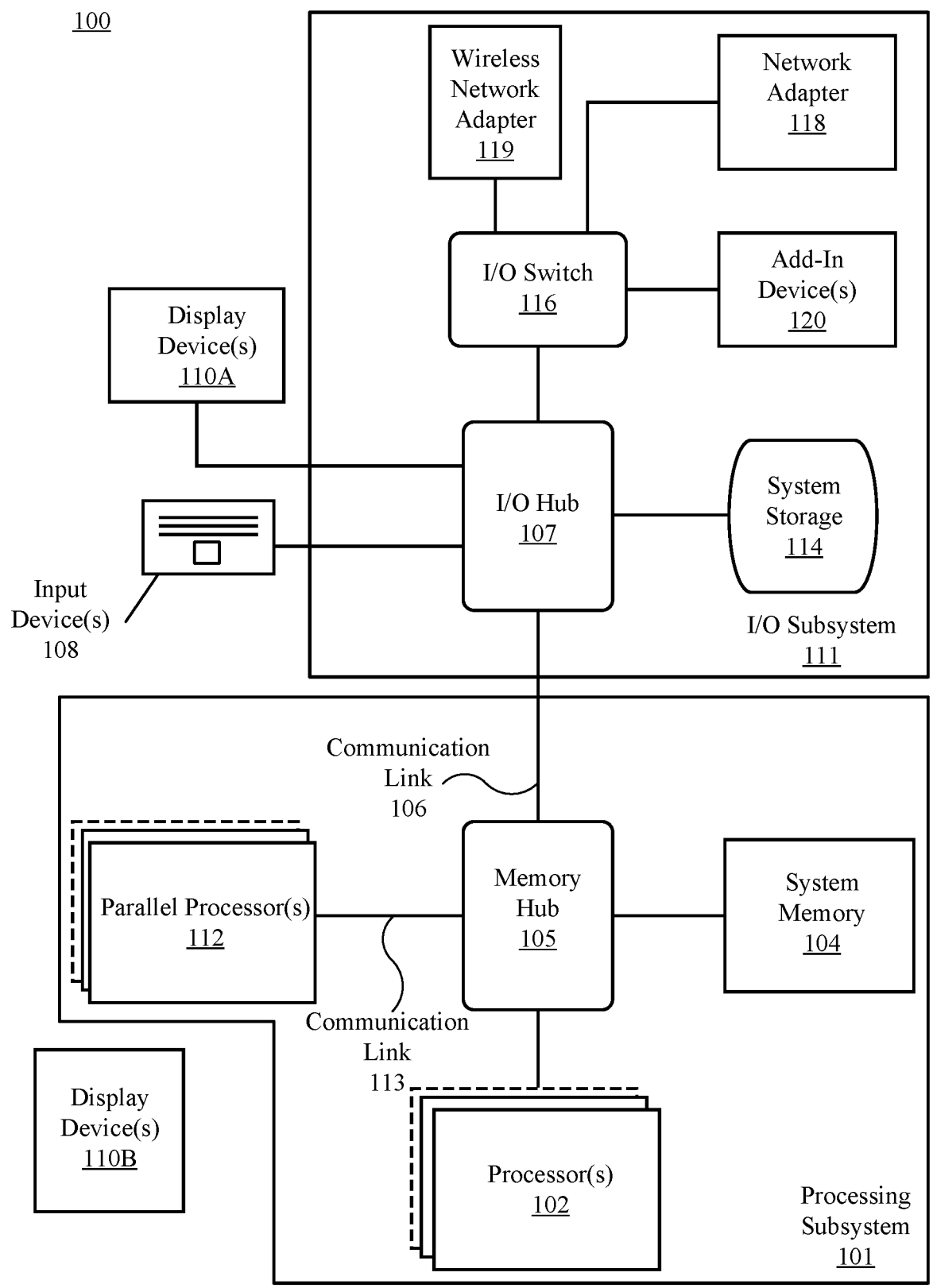
FIG. 1 is a block diagram illustrating a computer system configured to implement one or more aspects of the embodiments described herein.

FIG. 1 is a block diagram illustrating a computing system 100 configured to implement one or more aspects of the embodiments described herein. The computing system 100 includes a processing subsystem 101 having one or more processor(s) 102 and a system memory 104 communicating via an interconnection path that may include a memory hub 105. The memory hub 105 may be a separate component within a chipset component or may be integrated within the one or more processor(s) 102. The memory hub 105 couples with an I/O subsystem 111 via a communication link 106. The I/O subsystem 111 includes an I/O hub 107 that can enable the computing system 100 to receive input from one or more input device(s) 108. Additionally, the I/O hub 107 can enable a display controller, which may be included in the one or more processor(s) 102, to provide outputs to one or more display device(s) 110A. In one embodiment the one or more display device(s) 110A coupled with the I/O hub 107 can include a local, internal, or embedded display device.

The processing subsystem 101, for example, includes one or more parallel processor(s) 112 coupled to memory hub 105 via a bus or other communication link 113. The communication link 113 may be one of any number of standards-based communication link technologies or protocols, such as, but not limited to PCI Express, or may be a vendor specific communications interface or communications fabric. The one or more parallel processor(s) 112 may form a computationally focused parallel or vector processing system that can include a large number of processing cores and/or processing clusters, such as a many integrated core (MIC) processor. For example, the one or more parallel processor(s) 112 form a graphics processing subsystem that can output pixels to one of the one or more display device(s) 110A coupled via the I/O Hub 107. The one or more parallel processor(s) 112 can also include a display controller and display interface (not shown) to enable a direct connection to one or more display device(s) 110B.

Within the I/O subsystem 111, a system storage unit 114 can connect to the I/O hub 107 to provide a storage mechanism for the computing system 100. An I/O switch 116 can be used to provide an interface mechanism to enable connections between the I/O hub 107 and other components, such as a network adapter 118 and/or wireless network adapter 119 that may be integrated into the platform, and various other devices that can be added via one or more add-in device(s) 120. The add-in device(s) 120 may also include, for example, one or more external graphics processor devices and/or compute accelerators. The network adapter 118 can be an Ethernet adapter or another wired network adapter. The wireless network adapter 119 can include one or more of a Wi-Fi, Bluetooth, near field communication (NFC), or other network device that includes one or more wireless radios.

The computing system 100 can include other components not explicitly shown, including USB or other port connections, optical storage drives, video capture devices, and the like, may also be connected to the I/O hub 107. Communication paths interconnecting the various components in FIG. 1 may be implemented using any suitable protocols, such as PCI (Peripheral Component Interconnect) based protocols (e.g., PCI-Express), or any other bus or point-to-point communication interfaces and/or protocol(s), such as the NVLink high-speed interconnect, or interconnect protocols known in the art.

The one or more parallel processor(s) 112 may incorporate circuitry optimized for graphics and video processing, including, for example, video output circuitry, and constitutes a graphics processing unit (GPU). Alternatively or additionally, the one or more parallel processor(s) 112 can incorporate circuitry optimized for general purpose processing, while preserving the underlying computational architecture, described in greater detail herein. Components of the computing system 100 may be integrated with one or more other system elements on a single integrated circuit. For example, the one or more parallel processor(s) 112, memory hub 105, processor(s) 102, and I/O hub 107 can be integrated into a system on chip (SoC) integrated circuit. Alternatively, the components of the computing system 100 can be integrated into a single package to form a system in package (SIP) configuration. In one embodiment at least a portion of the components of the computing system 100 can be integrated into a multi-chip module (MCM), which can be interconnected with other multi-chip modules into a modular computing system.

It will be appreciated that the computing system 100 shown herein is illustrative and that variations and modifications are possible. The connection topology, including the number and arrangement of bridges, the number of processor(s) 102, and the number of parallel processor(s) 112, may be modified as desired. For instance, system memory 104 can be connected to the processor(s) 102 directly rather than through a bridge, while other devices communicate with system memory 104 via the memory hub 105 and the processor(s) 102. In other alternative topologies, the parallel processor(s) 112 are connected to the I/O hub 107 or directly to one of the one or more processor(s) 102, rather than to the memory hub 105. In other embodiments, the I/O hub 107 and memory hub 105 may be integrated into a single chip. It is also possible that two or more sets of processor(s) 102 are attached via multiple sockets, which can couple with two or more instances of the parallel processor(s) 112.

Some of the particular components shown herein are optional and may not be included in all implementations of the computing system 100. For example, any number of add-in cards or peripherals may be supported, or some components may be eliminated. Furthermore, some architectures may use different terminology for components similar to those illustrated in FIG. 1. For example, the memory hub 105 may be referred to as a Northbridge in some architectures, while the I/O hub 107 may be referred to as a Southbridge.

Figure 2A:
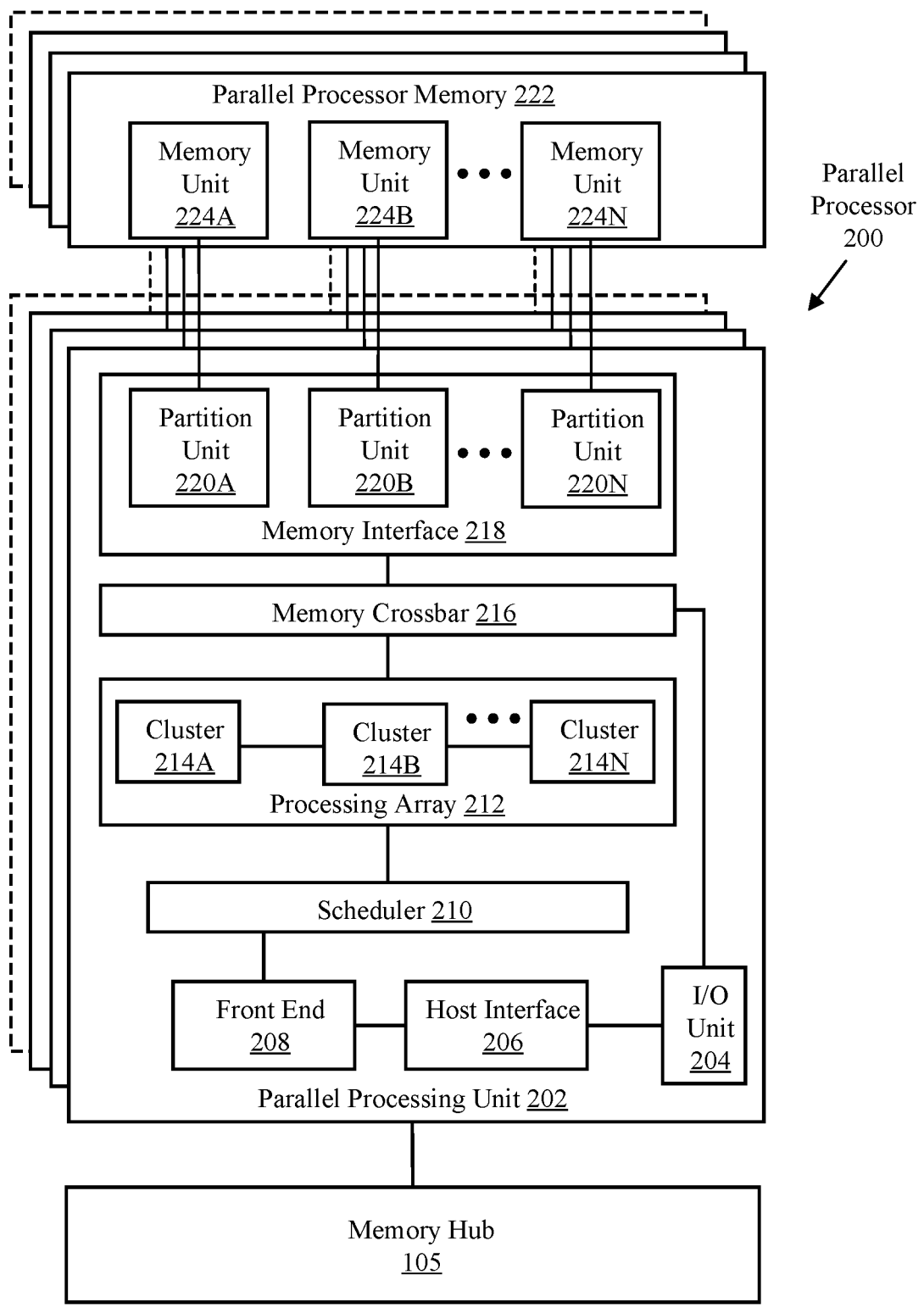
FIGS. 2A-2D illustrate parallel processor components.

FIG. 2A illustrates a parallel processor 200. The parallel processor 200 may be a GPU, GPGPU or the like as described herein. The various components of the parallel processor 200 may be implemented using one or more integrated circuit devices, such as programmable processors, application specific integrated circuits (ASICs), or field programmable gate arrays (FPGA). The illustrated parallel processor 200 may be the, or one of the parallel processor(s) 112 shown in FIG. 1.

The parallel processor 200 includes a parallel processing unit 202. The parallel processing unit includes an I/O unit 204 that enables communication with other devices, including other instances of the parallel processing unit 202. The I/O unit 204 may be directly connected to other devices. For instance, the I/O unit 204 connects with other devices via the use of a hub or switch interface, such as memory hub 105. The connections between the memory hub 105 and the I/O unit 204 form a communication link 113. Within the parallel processing unit 202, the I/O unit 204 connects with a host interface 206 and a memory crossbar 216, where the host interface 206 receives commands directed to performing processing operations and the memory crossbar 216 receives commands directed to performing memory operations.

When the host interface 206 receives a command buffer via the I/O unit 204, the host interface 206 can direct work operations to perform those commands to a front end 208. In one embodiment the front end 208 couples with a scheduler 210, which is configured to distribute commands or other work items to a processing cluster array 212. The scheduler 210 ensures that the processing cluster array 212 is properly configured and in a valid state before tasks are distributed to the processing clusters of the processing cluster array 212. The scheduler 210 may be implemented via firmware logic executing on a microcontroller. The microcontroller implemented scheduler 210 is configurable to perform complex scheduling and work distribution operations at coarse and fine granularity, enabling rapid preemption and context switching of threads executing on the processing array 212. Preferably, the host software can prove workloads for scheduling on the processing array 212 via one of multiple graphics processing doorbells. The workloads can then be automatically distributed across the processing array 212 by the scheduler 210 logic within the scheduler microcontroller.

The processing cluster array 212 can include up to "N" processing clusters (e.g., cluster 214A, cluster 214B, through cluster 214N). Each cluster 214A-214N of the processing cluster array 212 can execute a large number of concurrent threads. The scheduler 210 can allocate work to the clusters 214A-214N of the processing cluster array 212 using various scheduling and/or work distribution algorithms, which may vary depending on the workload arising for each type of program or computation. The scheduling can be handled dynamically by the scheduler 210, or can be assisted in part by compiler logic during compilation of program logic configured for execution by the processing cluster array 212. Optionally, different clusters 214A-214N of the processing cluster array 212 can be allocated for processing different types of programs or for performing different types of computations.

The processing cluster array 212 can be configured to perform various types of parallel processing operations. For example, the cluster array 212 is configured to perform general-purpose parallel compute operations. For example, the processing cluster array 212 can include logic to execute processing tasks including filtering of video and/or audio data, performing modeling operations, including physics operations, and performing data transformations.

The processing cluster array 212 is configured to perform parallel graphics processing operations. In such embodiments in which the parallel processor 200 is configured to perform graphics processing operations, the processing cluster array 212 can include additional logic to support the execution of such graphics processing operations, including, but not limited to texture sampling logic to perform texture operations, as well as tessellation logic and other vertex processing logic. Additionally, the processing cluster array 212 can be configured to execute graphics processing related shader programs such as, but not limited to vertex shaders, tessellation shaders, geometry shaders, and pixel shaders. The parallel processing unit 202 can transfer data from system memory via the I/O unit 204 for processing. During processing the transferred data can be stored to on-chip memory (e.g., parallel processor memory 222) during processing, then written back to system memory.

In embodiments in which the parallel processing unit 202 is used to perform graphics processing, the scheduler 210 may be configured to divide the processing workload into approximately equal sized tasks, to better enable distribution of the graphics processing operations to multiple clusters 214A-214N of the processing cluster array 212. In some of these embodiments, portions of the processing cluster array 212 can be configured to perform different types of processing. For example a first portion may be configured to perform vertex shading and topology generation, a second portion may be configured to perform tessellation and geometry shading, and a third portion may be configured to perform pixel shading or other screen space operations, to produce a rendered image for display. Intermediate data produced by one or more of the clusters 214A-214N may be stored in buffers to allow the intermediate data to be transmitted between clusters 214A-214N for further processing.

During operation, the processing cluster array 212 can receive processing tasks to be executed via the scheduler 210, which receives commands defining processing tasks from front end 208. For graphics processing operations, processing tasks can include indices of data to be processed, e.g., surface (patch) data, primitive data, vertex data, and/or pixel data, as well as state parameters and commands defining how the data is to be processed (e.g., what program is to be executed). The scheduler 210 may be configured to fetch the indices corresponding to the tasks or may receive the indices from the front end 208. The front end 208 can be configured to ensure the processing cluster array 212 is configured to a valid state before the workload specified by incoming command buffers (e.g., batch-buffers, push buffers, etc.) is initiated.

Each of the one or more instances of the parallel processing unit 202 can couple with parallel processor memory 222. The parallel processor memory 222 can be accessed via the memory crossbar 216, which can receive memory requests from the processing cluster array 212 as well as the I/O unit 204. The memory crossbar 216 can access the parallel processor memory 222 via a memory interface 218. The memory interface 218 can include multiple partition units (e.g., partition unit 220A, partition unit 220B, through partition unit 220N) that can each couple to a portion (e.g., memory unit) of parallel processor memory 222. The number of partition units 220A-220N may be configured to be equal to the number of memory units, such that a first partition unit 220A has a corresponding first memory unit 224A, a second partition unit 220B has a corresponding memory unit 224B, and an Nth partition unit 220N has a corresponding Nth memory unit 224N. In other embodiments, the number of partition units 220A-220N may not be equal to the number of memory devices.

The memory units 224A-224N can include various types of memory devices, including dynamic random-access memory (DRAM) or graphics random access memory, such as synchronous graphics random access memory (SGRAM), including graphics double data rate (GDDR) memory. Optionally, the memory units 224A-224N may also include 3D stacked memory, including but not limited to high bandwidth memory (HBM). Persons skilled in the art will appreciate that the specific implementation of the memory units 224A-224N can vary, and can be selected from one of various conventional designs. Render targets, such as frame buffers or texture maps may be stored across the memory units 224A-224N, allowing partition units 220A-220N to write portions of each render target in parallel to efficiently use the available bandwidth of parallel processor memory 222. In some embodiments, a local instance of the parallel processor memory 222 may be excluded in favor of a unified memory design that utilizes system memory in conjunction with local cache memory.

Optionally, any one of the clusters 214A-214N of the processing cluster array 212 has the ability to process data that will be written to any of the memory units 224A-224N within parallel processor memory 222. The memory crossbar 216 can be configured to transfer the output of each cluster 214A-214N to any partition unit 220A-220N or to another cluster 214A-214N, which can perform additional processing operations on the output. Each cluster 214A-214N can communicate with the memory interface 218 through the memory crossbar 216 to read from or write to various external memory devices. In one of the embodiments with the memory crossbar 216 the memory crossbar 216 has a connection to the memory interface 218 to communicate with the I/O unit 204, as well as a connection to a local instance of the parallel processor memory 222, enabling the processing units within the different processing clusters 214A-214N to communicate with system memory or other memory that is not local to the parallel processing unit 202. Generally, the memory crossbar 216 may, for example, be able to use virtual channels to separate traffic streams between the clusters 214A-214N and the partition units 220A-220N.

While a single instance of the parallel processing unit 202 is illustrated within the parallel processor 200, any number of instances of the parallel processing unit 202 can be included. For example, multiple instances of the parallel processing unit 202 can be provided on a single add-in card, or multiple add-in cards can be interconnected. The different instances of the parallel processing unit 202 can be configured to inter-operate even if the different instances have different numbers of processing cores, different amounts of local parallel processor memory, and/or other configuration differences. Optionally, some instances of the parallel processing unit 202 can include higher precision floating point units relative to other instances. Systems incorporating one or more instances of the parallel processing unit 202 or the parallel processor 200 can be implemented in a variety of configurations and form factors, including but not limited to desktop, laptop, or handheld personal computers, servers, workstations, game consoles, and/or embedded systems.

Figure 2B:
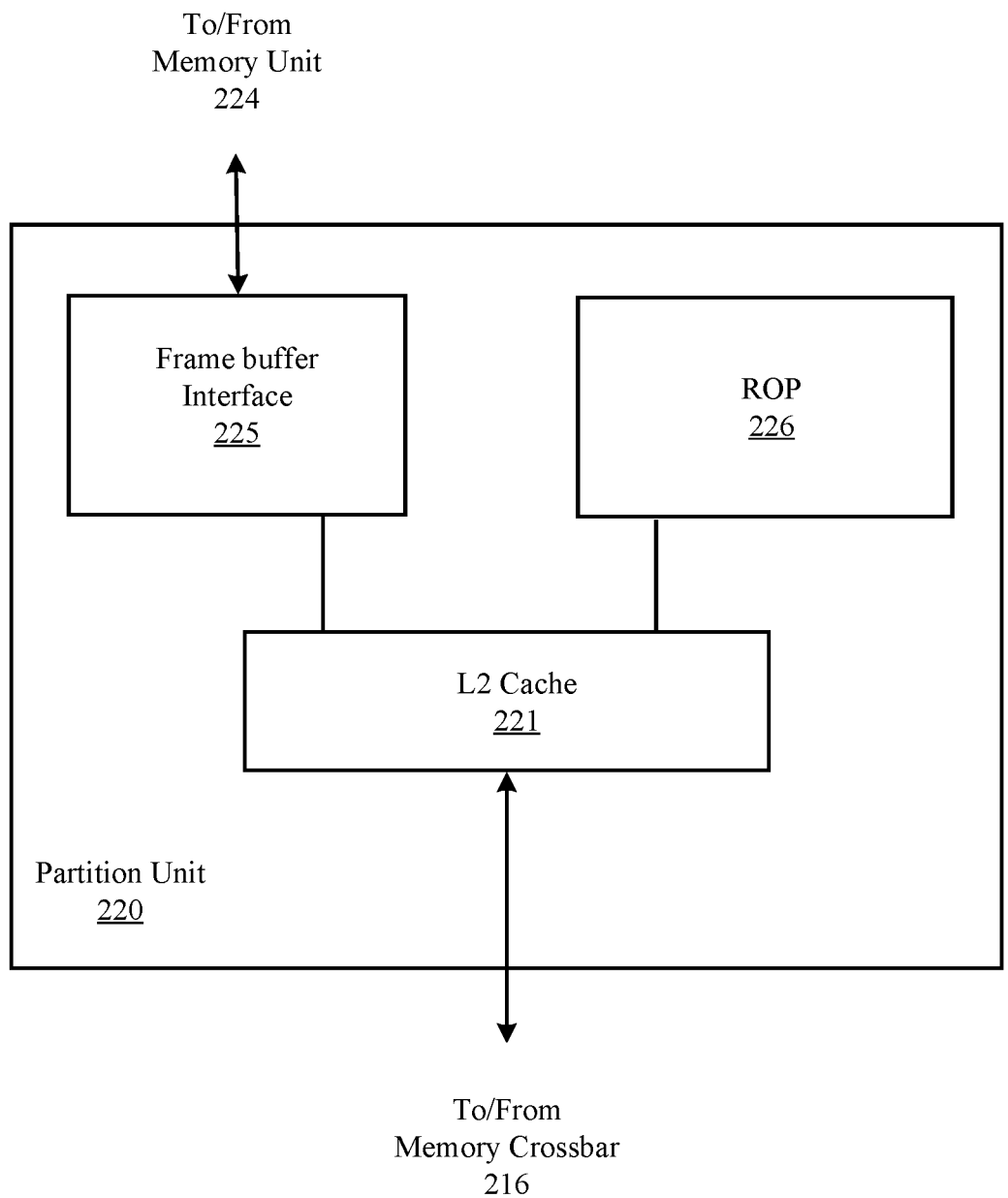

FIG. 2B is a block diagram of a partition unit 220. The partition unit 220 may be an instance of one of the partition units 220A-220N of FIG. 2A. As illustrated, the partition unit 220 includes an L2 cache 221, a frame buffer interface 225, and a ROP 226 (raster operations unit). The L2 cache 221 is a read/write cache that is configured to perform load and store operations received from the memory crossbar 216 and ROP 226. Read misses and urgent write-back requests are output by L2 cache 221 to frame buffer interface 225 for processing. Updates can also be sent to the frame buffer via the frame buffer interface 225 for processing. In one embodiment the frame buffer interface 225 interfaces with one of the memory units in parallel processor memory, such as the memory units 224A-224N of FIG. 2A (e.g., within parallel processor memory 222). The partition unit 220 may additionally or alternatively also interface with one of the memory units in parallel processor memory via a memory controller (not shown).

In graphics applications, the ROP 226 is a processing unit that performs raster operations such as stencil, z test, blending, and the like. The ROP 226 then outputs processed graphics data that is stored in graphics memory. In some embodiments the ROP 226 includes compression logic to compress depth or color data that is written to memory and decompress depth or color data that is read from memory. The compression logic can be lossless compression logic that makes use of one or more of multiple compression algorithms. The type of compression that is performed by the ROP 226 can vary based on the statistical characteristics of the data to be compressed. For example, in one embodiment, delta color compression is performed on depth and color data on a per-tile basis.

The ROP 226 may be included within each processing cluster (e.g., cluster 214A-214N of FIG. 2A) instead of within the partition unit 220. In such embodiment, read and write requests for pixel data are transmitted over the memory crossbar 216 instead of pixel fragment data. The processed graphics data may be displayed on a display device, such as one of the one or more display device(s) 110 of FIG. 1, routed for further processing by the processor(s) 102, or routed for further processing by one of the processing entities within the parallel processor 200 of FIG. 2A.

Figure 2C:
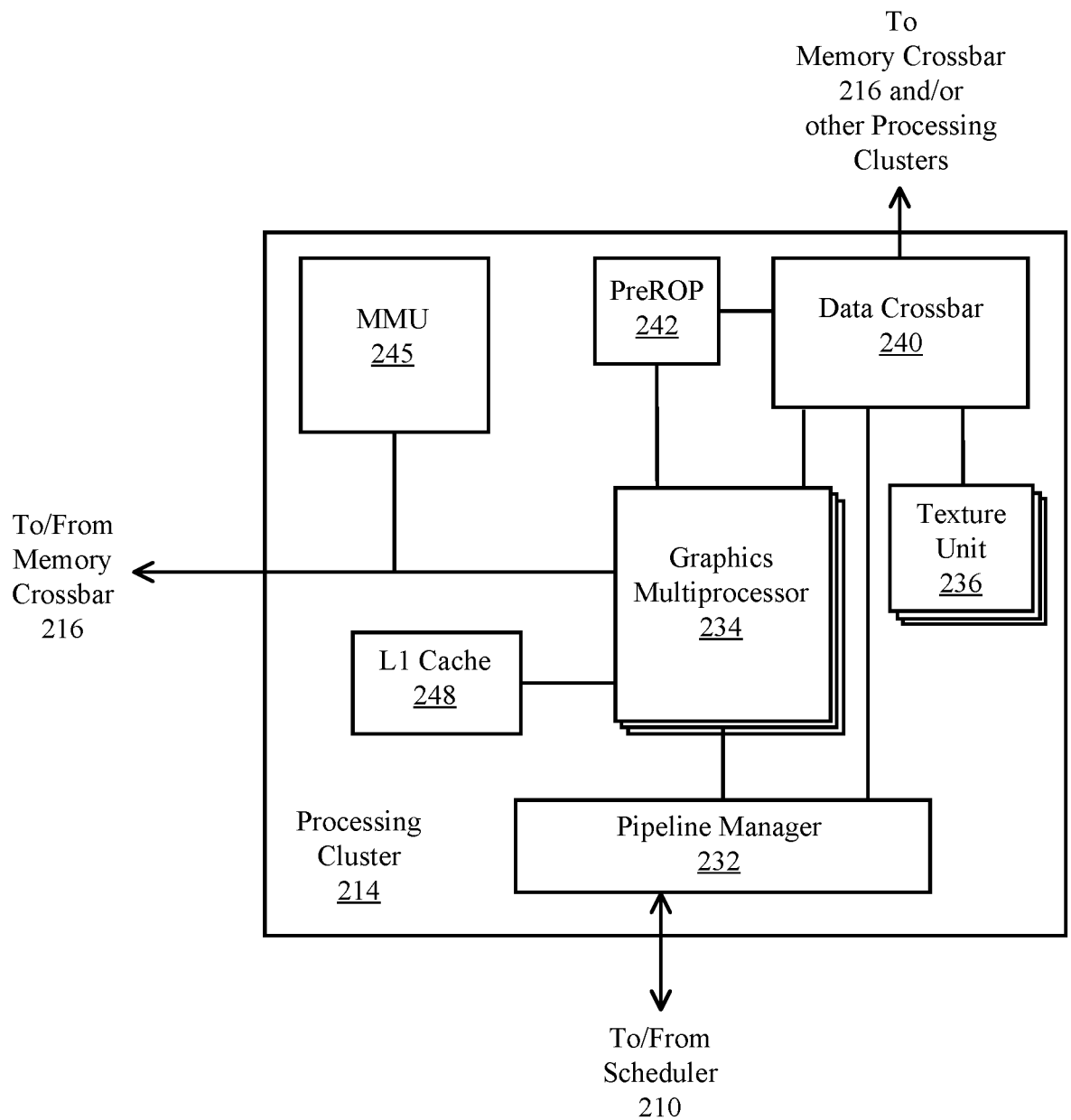

FIG. 2C is a block diagram of a processing cluster 214 within a parallel processing unit. For example, the processing cluster is an instance of one of the processing clusters 214A-214N of FIG. 2A. The processing cluster 214 can be configured to execute many threads in parallel, where the term "thread" refers to an instance of a particular program executing on a particular set of input data. Optionally, single-instruction, multiple-data (SIND) instruction issue techniques may be used to support parallel execution of a large number of threads without providing multiple independent instruction units. Alternatively, single-instruction, multiple-thread (SIMT) techniques may be used to support parallel execution of a large number of generally synchronized threads, using a common instruction unit configured to issue instructions to a set of processing engines within each one of the processing clusters. Unlike a SIND execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of the processing cluster 214 can be controlled via a pipeline manager 232 that distributes processing tasks to SIMT parallel processors. The pipeline manager 232 receives instructions from the scheduler 210 of FIG. 2A and manages execution of those instructions via a graphics multiprocessor 234 and/or a texture unit 236. The illustrated graphics multiprocessor 234 is an exemplary instance of a SIMT parallel processor. However, various types of SIMT parallel processors of differing architectures may be included within the processing cluster 214. One or more instances of the graphics multiprocessor 234 can be included within a processing cluster 214. The graphics multiprocessor 234 can process data and a data crossbar 240 can be used to distribute the processed data to one of multiple possible destinations, including other shader units. The pipeline manager 232 can facilitate the distribution of processed data by specifying destinations for processed data to be distributed via the data crossbar 240.

Each graphics multiprocessor 234 within the processing cluster 214 can include an identical set of functional execution logic (e.g., arithmetic logic units, load-store units, etc.). The functional execution logic can be configured in a pipelined manner in which new instructions can be issued before previous instructions are complete. The functional execution logic supports a variety of operations including integer and floating-point arithmetic, comparison operations, Boolean operations, bit-shifting, and computation of various algebraic functions. The same functional-unit hardware could be leveraged to perform different operations and any combination of functional units may be present.

The instructions transmitted to the processing cluster 214 constitutes a thread. A set of threads executing across the set of parallel processing engines is a thread group. A thread group executes the same program on different input data. Each thread within a thread group can be assigned to a different processing engine within a graphics multiprocessor 234. A thread group may include fewer threads than the number of processing engines within the graphics multiprocessor 234. When a thread group includes fewer threads than the number of processing engines, one or more of the processing engines may be idle during cycles in which that thread group is being processed. A thread group may also include more threads than the number of processing engines within the graphics multiprocessor 234. When the thread group includes more threads than the number of processing engines within the graphics multiprocessor 234, processing can be performed over consecutive clock cycles. Optionally, multiple thread groups can be executed concurrently on the graphics multiprocessor 234.

The graphics multiprocessor 234 may include an internal cache memory to perform load and store operations. Optionally, the graphics multiprocessor 234 can forego an internal cache and use a cache memory (e.g., L1 cache 248) within the processing cluster 214. Each graphics multiprocessor 234 also has access to L2 caches within the partition units (e.g., partition units 220A-220N of FIG. 2A) that are shared among all processing clusters 214 and may be used to transfer data between threads. The graphics multiprocessor 234 may also access off-chip global memory, which can include one or more of local parallel processor memory and/or system memory. Any memory external to the parallel processing unit 202 may be used as global memory. Embodiments in which the processing cluster 214 includes multiple instances of the graphics multiprocessor 234 can share common instructions and data, which may be stored in the L1 cache 248.

Each processing cluster 214 may include an MMU 245 (memory management unit) that is configured to map virtual addresses into physical addresses. In other embodiments, one or more instances of the MMU 245 may reside within the memory interface 218 of FIG. 2A. The MMU 245 includes a set of page table entries (PTEs) used to map a virtual address to a physical address of a tile and optionally a cache line index. The MMU 245 may include address translation lookaside buffers (TLB) or caches that may reside within the graphics multiprocessor 234 or the L1 cache or processing cluster 214. The physical address is processed to distribute surface data access locality to allow efficient request interleaving among partition units. The cache line index may be used to determine whether a request for a cache line is a hit or miss.

In graphics and computing applications, a processing cluster 214 may be configured such that each graphics multiprocessor 234 is coupled to a texture unit 236 for performing texture mapping operations, e.g., determining texture sample positions, reading texture data, and filtering the texture data. Texture data is read from an internal texture L1 cache (not shown) or in some embodiments from the L1 cache within graphics multiprocessor 234 and is fetched from an L2 cache, local parallel processor memory, or system memory, as needed. Each graphics multiprocessor 234 outputs processed tasks to the data crossbar 240 to provide the processed task to another processing cluster 214 for further processing or to store the processed task in an L2 cache, local parallel processor memory, or system memory via the memory crossbar 216. A preROP 242 (pre-raster operations unit) is configured to receive data from graphics multiprocessor 234, direct data to ROP units, which may be located with partition units as described herein (e.g., partition units 220A-220N of FIG. 2A). The preROP 242 unit can perform optimizations for color blending, organize pixel color data, and perform address translations.

It will be appreciated that the core architecture described herein is illustrative and that variations and modifications are possible. Any number of processing units, e.g., graphics multiprocessor 234, texture units 236, preROPs 242, etc., may be included within a processing cluster 214. Further, while only one processing cluster 214 is shown, a parallel processing unit as described herein may include any number of instances of the processing cluster 214. Optionally, each processing cluster 214 can be configured to operate independently of other processing clusters 214 using separate and distinct processing units, L1 caches, etc.

Figure 2D:
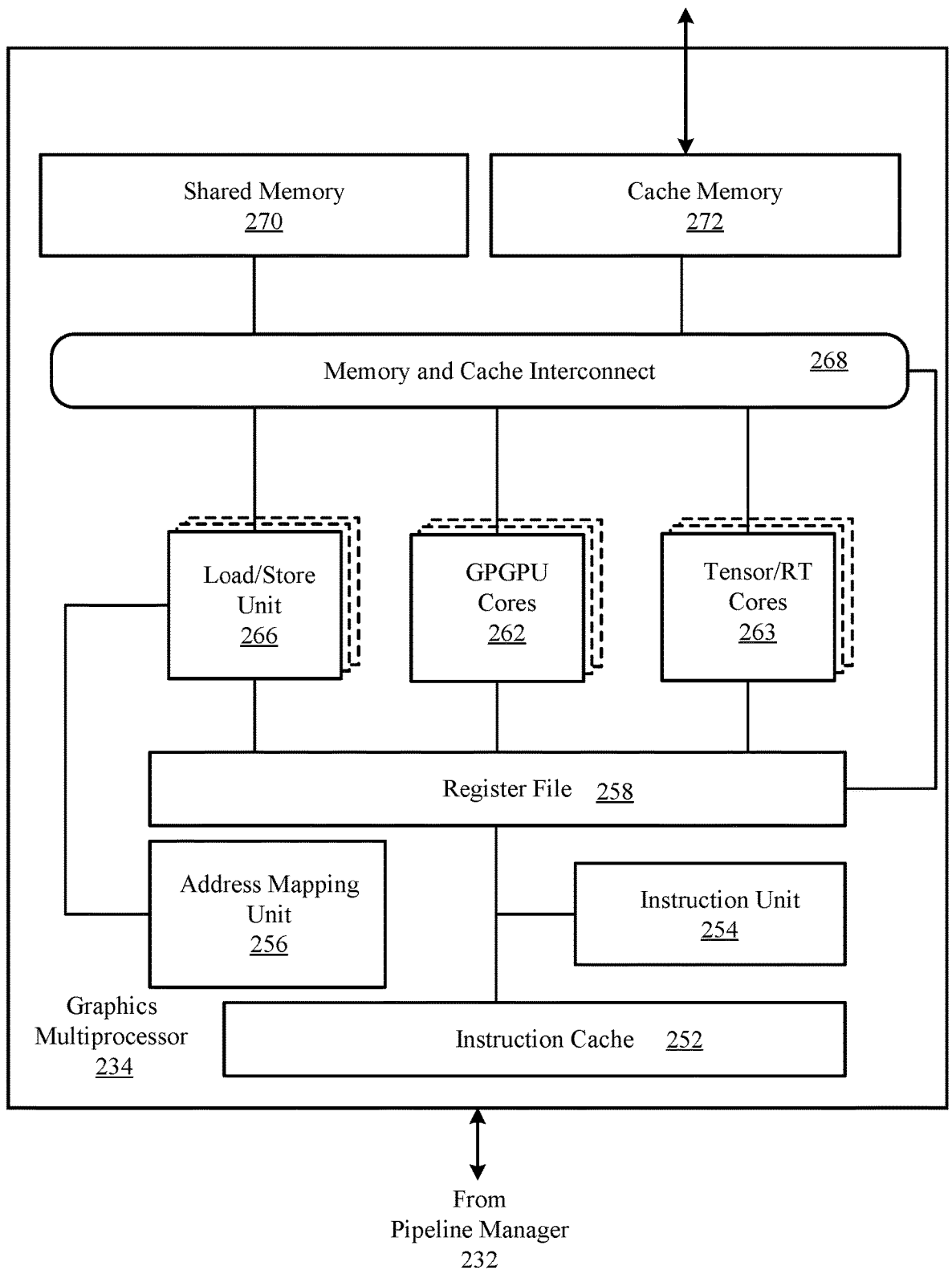

FIG. 2D shows an example of the graphics multiprocessor 234 in which the graphics multiprocessor 234 couples with the pipeline manager 232 of the processing cluster 214. The graphics multiprocessor 234 has an execution pipeline including but not limited to an instruction cache 252, an instruction unit 254, an address mapping unit 256, a register file 258, one or more general purpose graphics processing unit (GPGPU) cores 262, and one or more load/store units 266. The GPGPU cores 262 and load/store units 266 are coupled with cache memory 272 and shared memory 270 via a memory and cache interconnect 268. The graphics multiprocessor 234 may additionally include tensor and/or ray-tracing cores 263 that include hardware logic to accelerate matrix and/or ray-tracing operations.

The instruction cache 252 may receive a stream of instructions to execute from the pipeline manager 232. The instructions are cached in the instruction cache 252 and dispatched for execution by the instruction unit 254. The instruction unit 254 can dispatch instructions as thread groups (e.g., warps), with each thread of the thread group assigned to a different execution unit within GPGPU core 262. An instruction can access any of a local, shared, or global address space by specifying an address within a unified address space. The address mapping unit 256 can be used to translate addresses in the unified address space into a distinct memory address that can be accessed by the load/store units 266.

The register file 258 provides a set of registers for the functional units of the graphics multiprocessor 234. The register file 258 provides temporary storage for operands connected to the data paths of the functional units (e.g., GPGPU cores 262, load/store units 266) of the graphics multiprocessor 234. The register file 258 may be divided between each of the functional units such that each functional unit is allocated a dedicated portion of the register file 258. For example, the register file 258 may be divided between the different warps being executed by the graphics multiprocessor 234.

The GPGPU cores 262 can each include floating point units (FPUs) and/or integer arithmetic logic units (ALUs) that are used to execute instructions of the graphics multiprocessor 234. In some implementations, the GPGPU cores 262 can include hardware logic that may otherwise reside within the tensor and/or ray-tracing cores 263. The GPGPU cores 262 can be similar in architecture or can differ in architecture. For example and in one embodiment, a first portion of the GPGPU cores 262 include a single precision FPU and an integer ALU while a second portion of the GPGPU cores include a double precision FPU. Optionally, the FPUs can implement the IEEE 754-2008 standard for floating point arithmetic or enable variable precision floating point arithmetic. The graphics multiprocessor 234 can additionally include one or more fixed function or special function units to perform specific functions such as copy rectangle or pixel blending operations. One or more of the GPGPU cores can also include fixed or special function logic.

The GPGPU cores 262 may include SIMD logic capable of performing a single instruction on multiple sets of data. Optionally, GPGPU cores 262 can physically execute SIMD8, and SIMD16 instructions and logically execute SIMD1, SIMD2, and SIMD32 instructions. The SIMD instructions for the GPGPU cores can be generated at compile time by a shader compiler or automatically generated when executing programs written and compiled for single program multiple data (SPMD) or SIMT architectures. Multiple threads of a program configured for the SIMT execution model can be executed via a single SIMD instruction. For example, and in one embodiment, eight SIMT threads that perform the same or similar operations can be executed in parallel via a single SIMD8 logic unit.

The memory and cache interconnect 268 is an interconnect network that connects each of the functional units of the graphics multiprocessor 234 to the register file 258 and to the shared memory 270. For example, the memory and cache interconnect 268 is a crossbar interconnect that allows the load/store unit 266 to implement load and store operations between the shared memory 270 and the register file 258. The register file 258 can operate at the same frequency as the GPGPU cores 262, thus data transfer between the GPGPU cores 262 and the register file 258 is very low latency. The shared memory 270 can be used to enable communication between threads that execute on the functional units within the graphics multiprocessor 234. The cache memory 272 can be used as a data cache for example, to cache texture data communicated between the functional units and the texture unit 236. The shared memory 270 can also be used as a program managed cached. Threads executing on the GPGPU cores 262 can programmatically store data within the shared memory in addition to the automatically cached data that is stored within the cache memory 272.

Figure 3A:
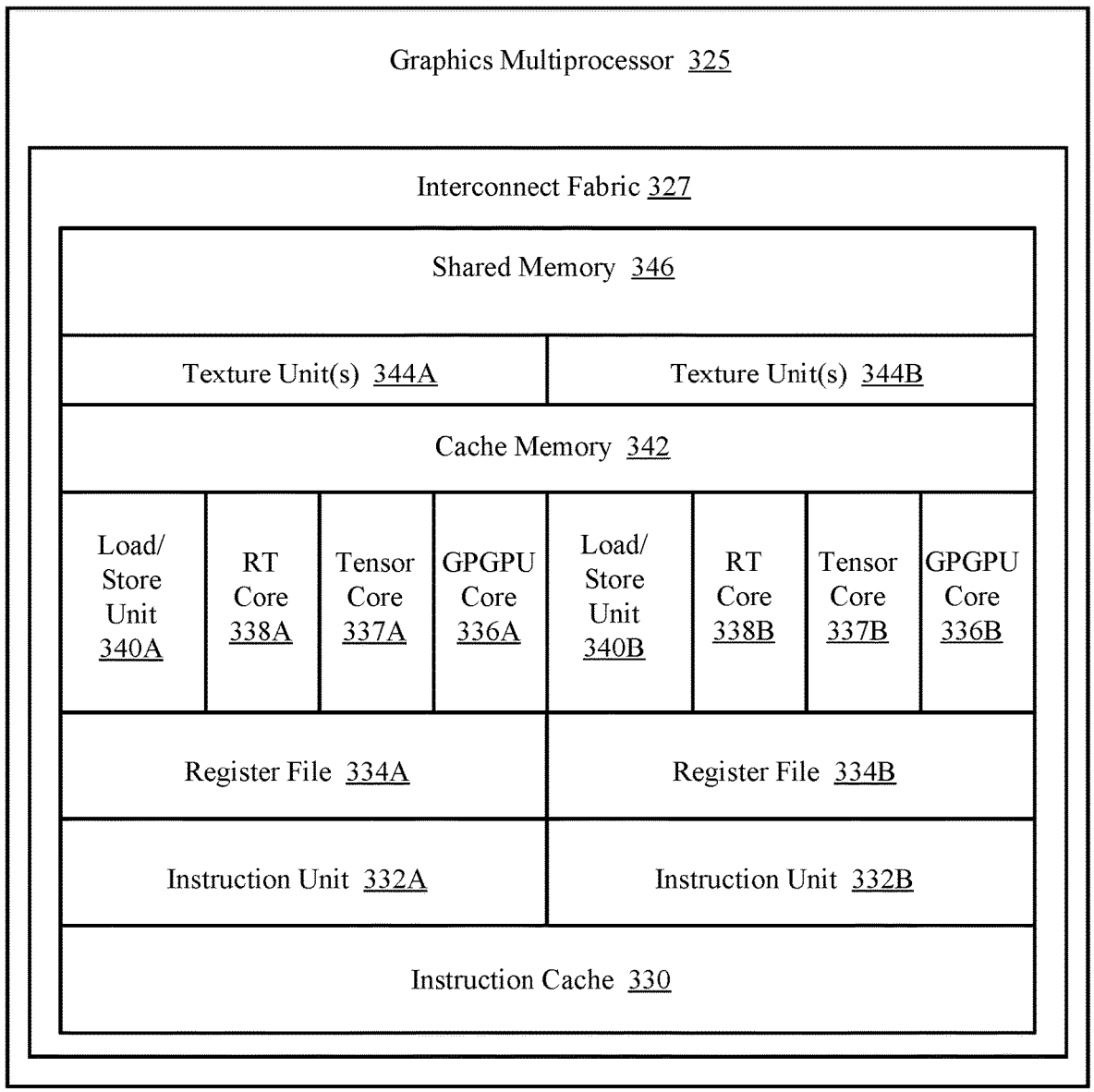
FIGS. 3A-3C are block diagrams of graphics multiprocessors and multiprocessor-based GPUs.
Figure 3B:
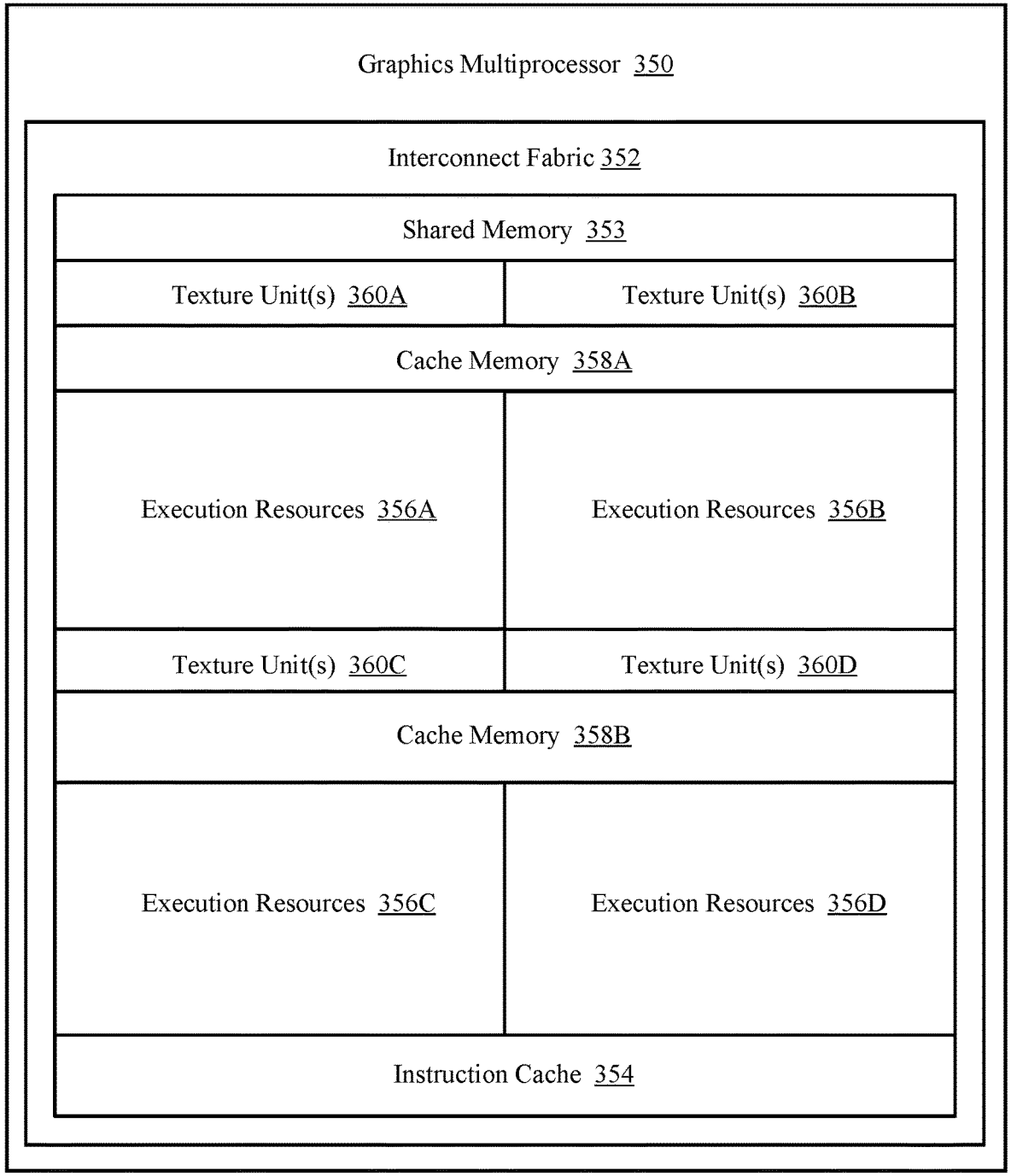
Figure 3C:
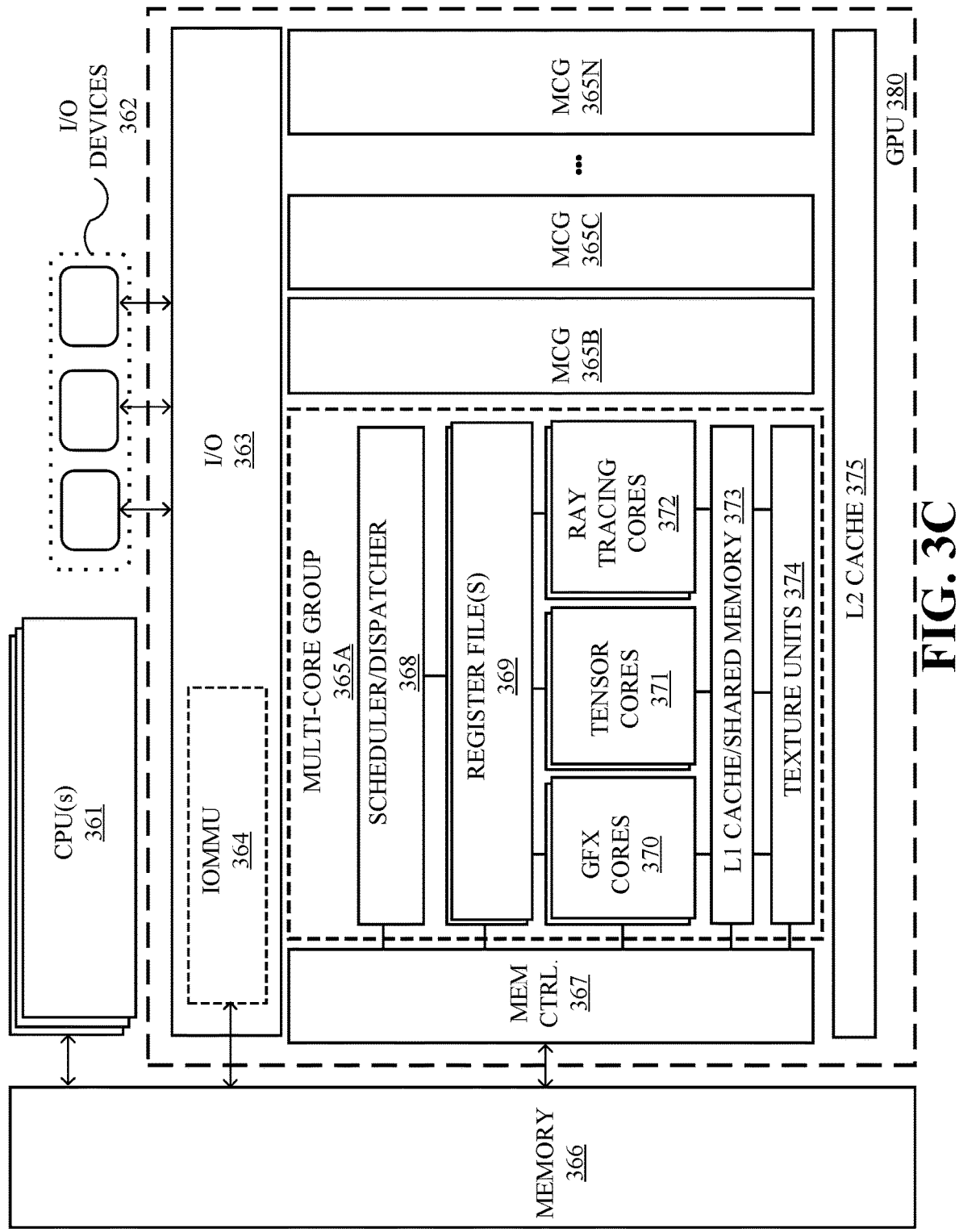

FIG. 3A-3C illustrate additional graphics multiprocessors, according to embodiments. FIG. 3A-3B illustrate graphics multiprocessors 325, 350, which are related to the graphics multiprocessor 234 of FIG. 2C and may be used in place of one of those. Therefore, the disclosure of any features in combination with the graphics multiprocessor 234 herein also discloses a corresponding combination with the graphics multiprocessor(s) 325, 350, but is not limited to such. FIG. 3C illustrates a graphics processing unit (GPU) 380 which includes dedicated sets of graphics processing resources arranged into multi-core groups 365A-365N, which correspond to the graphics multiprocessors 325, 350. The illustrated graphics multiprocessors 325, 350 and the multi-core groups 365A-365N can be streaming multiprocessors (SM) capable of simultaneous execution of a large number of execution threads.

The graphics multiprocessor 325 of FIG. 3A includes multiple additional instances of execution resource units relative to the graphics multiprocessor 234 of FIG. 2D. For example, the graphics multiprocessor 325 can include multiple instances of the instruction unit 332A-332B, register file 334A-334B, and texture unit(s) 344A-344B. The graphics multiprocessor 325 also includes multiple sets of graphics or compute execution units (e.g., GPGPU core 336A-336B, tensor core 337A-337B, ray-tracing core 338A-338B) and multiple sets of load/store units 340A-340B. The execution resource units have a common instruction cache 330, texture and/or data cache memory 342, and shared memory 346.

The various components can communicate via an interconnect fabric 327. The interconnect fabric 327 may include one or more crossbar switches to enable communication between the various components of the graphics multiprocessor 325. The interconnect fabric 327 may be a separate, high-speed network fabric layer upon which each component of the graphics multiprocessor 325 is stacked. The components of the graphics multiprocessor 325 communicate with remote components via the interconnect fabric 327. For example, the GPGPU cores 336A-336B, 337A-337B, and 3378A-338B can each communicate with shared memory 346 via the interconnect fabric 327. The interconnect fabric 327 can arbitrate communication within the graphics multiprocessor 325 to ensure a fair bandwidth allocation between components.

The graphics multiprocessor 350 of FIG. 3B includes multiple sets of execution resources 356A-356D, where each set of execution resource includes multiple instruction units, register files, GPGPU cores, and load store units, as illustrated in FIG. 2D and FIG. 3A. The execution resources 356A-356D can work in concert with texture unit(s) 360A-360D for texture operations, while sharing an instruction cache 354, and shared memory 353. For example, the execution resources 356A-356D can share an instruction cache 354 and shared memory 353, as well as multiple instances of a texture and/or data cache memory 358A-358B. The various components can communicate via an interconnect fabric 352 similar to the interconnect fabric 327 of FIG. 3A.

Persons skilled in the art will understand that the architecture described in FIG. 1, 2A-2D, and 3A-3B are descriptive and not limiting as to the scope of the present embodiments. Thus, the techniques described herein may be implemented on any properly configured processing unit, including, without limitation, one or more mobile application processors, one or more desktop or server central processing units (CPUs) including multi-core CPUs, one or more parallel processing units, such as the parallel processing unit 202 of FIG. 2A, as well as one or more graphics processors or special purpose processing units, without departure from the scope of the embodiments described herein.

The parallel processor or GPGPU as described herein may be communicatively coupled to host/processor cores to accelerate graphics operations, machine-learning operations, pattern analysis operations, and various general-purpose GPU (GPGPU) functions. The GPU may be communicatively coupled to the host processor/cores over a bus or other interconnect (e.g., a high-speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

FIG. 3C illustrates a graphics processing unit (GPU) 380 which includes dedicated sets of graphics processing resources arranged into multi-core groups 365A-365N. While the details of only a single multi-core group 365A are provided, it will be appreciated that the other multi-core groups 365B-365N may be equipped with the same or similar sets of graphics processing resources. Details described with respect to the multi-core groups 365A-365N may also apply to any graphics multiprocessor 234, 325, 350 described herein.

As illustrated, a multi-core group 365A may include a set of graphics cores 370, a set of tensor cores 371, and a set of ray tracing cores 372. A scheduler/dispatcher 368 schedules and dispatches the graphics threads for execution on the various cores 370, 371, 372. A set of register files 369 store operand values used by the cores 370, 371, 372 when executing the graphics threads. These may include, for example, integer registers for storing integer values, floating point registers for storing floating point values, vector registers for storing packed data elements (integer and/or floating-point data elements) and tile registers for storing tensor/matrix values. The tile registers may be implemented as combined sets of vector registers.

One or more combined level 1 (L1) caches and shared memory units 373 store graphics data such as texture data, vertex data, pixel data, ray data, bounding volume data, etc., locally within each multi-core group 365A. One or more texture units 374 can also be used to perform texturing operations, such as texture mapping and sampling. A Level 2 (L2) cache 375 shared by all or a subset of the multi-core groups 365A-365N stores graphics data and/or instructions for multiple concurrent graphics threads. As illustrated, the L2 cache 375 may be shared across a plurality of multi-core groups 365A-365N. One or more memory controllers 367 couple the GPU 380 to a memory 366 which may be a system memory (e.g., DRAM) and/or a dedicated graphics memory (e.g., GDDR6 memory).

Input/output (I/O) circuitry 363 couples the GPU 380 to one or more I/O devices 362 such as digital signal processors (DSPs), network controllers, or user input devices. An on-chip interconnect may be used to couple the I/O devices 362 to the GPU 380 and memory 366. One or more I/O memory management units (IOMMUs) 364 of the I/O circuitry 363 couple the I/O devices 362 directly to the system memory 366. Optionally, the IOMMU 364 manages multiple sets of page tables to map virtual addresses to physical addresses in system memory 366. The I/O devices 362, CPU(s) 361, and GPU(s) 380 may then share the same virtual address space.

In one implementation of the IOMMU 364, the IOMMU 364 supports virtualization. In this case, it may manage a first set of page tables to map guest/graphics virtual addresses to guest/graphics physical addresses and a second set of page tables to map the guest/graphics physical addresses to system/host physical addresses (e.g., within system memory 366). The base addresses of each of the first and second sets of page tables may be stored in control registers and swapped out on a context switch (e.g., so that the new context is provided with access to the relevant set of page tables). While not illustrated in FIG. 3C, each of the cores 370, 371, 372 and/or multi-core groups 365A-365N may include translation lookaside buffers (TLBs) to cache guest virtual to guest physical translations, guest physical to host physical translations, and guest virtual to host physical translations.

The CPUs 361, GPUs 380, and I/O devices 362 may be integrated on a single semiconductor chip and/or chip package. The illustrated memory 366 may be integrated on the same chip or may be coupled to the memory controllers 367 via an off-chip interface. In one implementation, the memory 366 comprises GDDR6 memory which shares the same virtual address space as other physical system-level memories, although the underlying principles described herein are not limited to this specific implementation.

The tensor cores 371 may include a plurality of execution units specifically designed to perform matrix operations, which are the fundamental compute operation used to perform deep learning operations. For example, simultaneous matrix multiplication operations may be used for neural network training and inferencing. The tensor cores 371 may perform matrix processing using a variety of operand precisions including single precision floating-point (e.g., 32 bits), half-precision floating point (e.g., 16 bits), integer words (16 bits), bytes (8 bits), and half-bytes (4 bits). For example, a neural network implementation extracts features of each rendered scene, potentially combining details from multiple frames, to construct a high-quality final image.

In deep learning implementations, parallel matrix multiplication work may be scheduled for execution on the tensor cores 371. The training of neural networks, in particular, requires a significant number matrix dot product operations. In order to process an inner-product formulation of an N×N×N matrix multiply, the tensor cores 371 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 371 to ensure that the most efficient precision is used for different workloads (e.g., such as inferencing workloads which can tolerate quantization to bytes and half-bytes).

The ray tracing cores 372 may accelerate ray tracing operations for both real-time ray tracing and non-real-time ray tracing implementations. In particular, the ray tracing cores 372 may include ray traversal/intersection circuitry for performing ray traversal using bounding volume hierarchies (BVHs) and identifying intersections between rays and primitives enclosed within the BVH volumes. The ray tracing cores 372 may also include circuitry for performing depth testing and culling (e.g., using a Z buffer or similar arrangement). In one implementation, the ray tracing cores 372 perform traversal and intersection operations in concert with the image denoising techniques described herein, at least a portion of which may be executed on the tensor cores 371. For example, the tensor cores 371 may implement a deep learning neural network to perform denoising of frames generated by the ray tracing cores 372. However, the CPU(s) 361, graphics cores 370, and/or ray tracing cores 372 may also implement all or a portion of the denoising and/or deep learning algorithms.

In addition, as described above, a distributed approach to denoising may be employed in which the GPU 380 is in a computing device coupled to other computing devices over a network or high-speed interconnect. In this distributed approach, the interconnected computing devices may share neural network learning/training data to improve the speed with which the overall system learns to perform denoising for different types of image frames and/or different graphics applications.

The ray tracing cores 372 may process all BVH traversal and/or ray-primitive intersections, saving the graphics cores 370 from being overloaded with thousands of instructions per ray. For example, each ray tracing core 372 includes a first set of specialized circuitry for performing bounding box tests (e.g., for traversal operations) and/or a second set of specialized circuitry for performing the ray-triangle intersection tests (e.g., intersecting rays which have been traversed). Thus, for example, the multi-core group 365A can simply launch a ray probe, and the ray tracing cores 372 independently perform ray traversal and intersection and return hit data (e.g., a hit, no hit, multiple hits, etc.) to the thread context. The other cores 370, 371 are freed to perform other graphics or compute work while the ray tracing cores 372 perform the traversal and intersection operations.

Optionally, each ray tracing core 372 may include a traversal unit to perform BVH testing operations and/or an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 370 and tensor cores 371) are freed to perform other forms of graphics work.

In one optional embodiment described below, a hybrid rasterization/ray tracing approach is used in which work is distributed between the graphics cores 370 and ray tracing cores 372.

The ray tracing cores 372 (and/or other cores 370, 371) may include hardware support for a ray tracing instruction set such as Microsoft's DirectX Ray Tracing (DXR) which includes a DispatchRays command, as well as ray-generation, closest-hit, any-hit, and miss shaders, which enable the assignment of unique sets of shaders and textures for each object. Another ray tracing platform which may be supported by the ray tracing cores 372, graphics cores 370 and tensor cores 371 is Vulkan 1.1.85. Note, however, that the underlying principles described herein are not limited to any particular ray tracing ISA.

In general, the various cores 372, 371, 370 may support a ray tracing instruction set that includes instructions/functions for one or more of ray generation, closest hit, any hit, ray-primitive intersection, per-primitive and hierarchical bounding box construction, miss, visit, and exceptions. More specifically, a preferred embodiment includes ray tracing instructions to perform one or more of the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the children volumes a ray will traverse.

Exceptions—Includes various types of exception handlers (e.g., invoked for various error conditions).

Techniques for GPU to Host Processor Interconnection

Figure 4A:
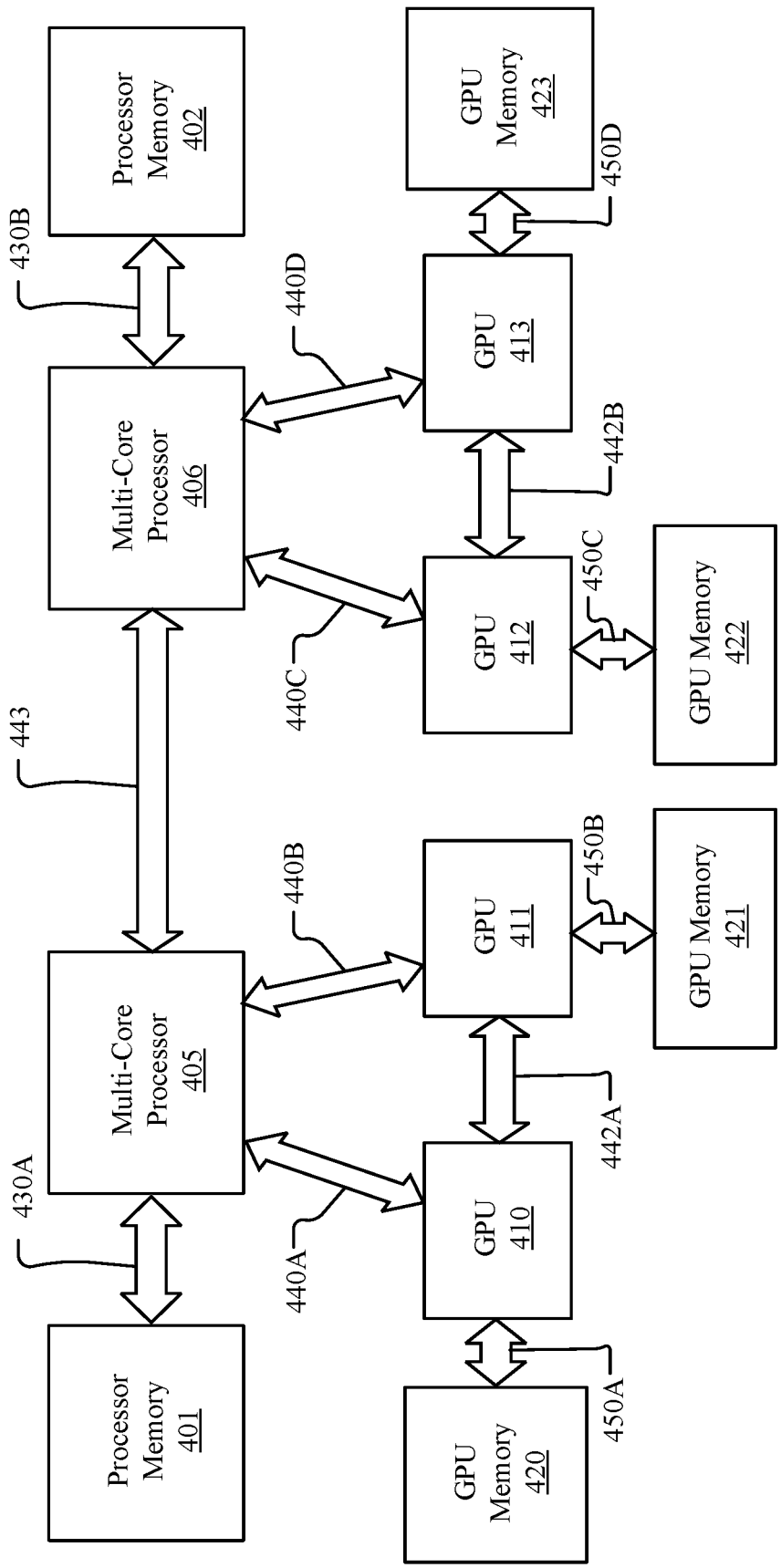
FIGS. 4A-4F illustrate an exemplary architecture in which a plurality of GPUs is communicatively coupled to a plurality of multi-core processors.

FIG. 4A illustrates an exemplary architecture in which a plurality of GPUs 410-413, e.g., such as the parallel processors 200 shown in FIG. 2A, are communicatively coupled to a plurality of multi-core processors 405-406 over high-speed links 440A-440D (e.g., buses, point-to-point interconnects, etc.). The high-speed links 440A-440D may support a communication throughput of 4 GB/s, 30 GB/s, 80 GB/s or higher, depending on the implementation. Various interconnect protocols may be used including, but not limited to, PCIe 4.0 or 5.0 and NVLink 2.0. However, the underlying principles described herein are not limited to any particular communication protocol or throughput.

Two or more of the GPUs 410-413 may be interconnected over high-speed links 442A-442B, which may be implemented using the same or different protocols/links than those used for high-speed links 440A-440D. Similarly, two or more of the multi-core processors 405-406 may be connected over high speed link 443 which may be symmetric multi-processor (SMP) buses operating at 20 GB/s, 30 GB/s, 120 GB/s or higher. Alternatively, all communication between the various system components shown in FIG. 4A may be accomplished using the same protocols/links (e.g., over a common interconnection fabric). As mentioned, however, the underlying principles described herein are not limited to any particular type of interconnect technology.

Each multi-core processor 405-406 may be communicatively coupled to a processor memory 401-402, via memory interconnects 430A-430B, respectively, and each GPU 410-413 is communicatively coupled to GPU memory 420-423 over GPU memory interconnects 450A-450D, respectively. The memory interconnects 430A-430B and 450A-450D may utilize the same or different memory access technologies. By way of example, and not limitation, the processor memories 401-402 and GPU memories 420-423 may be volatile memories such as dynamic random-access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint/Optane or Nano-Ram. For example, some portion of the memories may be volatile memory and another portion may be non-volatile memory (e.g., using a two-level memory (2LM) hierarchy).

As described below, although the various processors 405-406 and GPUs 410-413 may be physically coupled to a particular memory 401-402, 420-423, respectively, a unified memory architecture may be implemented in which the same virtual system address space (also referred to as the "effective address" space) is distributed among all of the various physical memories. For example, processor memories 401-402 may each comprise 64 GB of the system memory address space and GPU memories 420-423 may each comprise 32 GB of the system memory address space (resulting in a total of 256 GB addressable memory in this example).

Figure 4B:
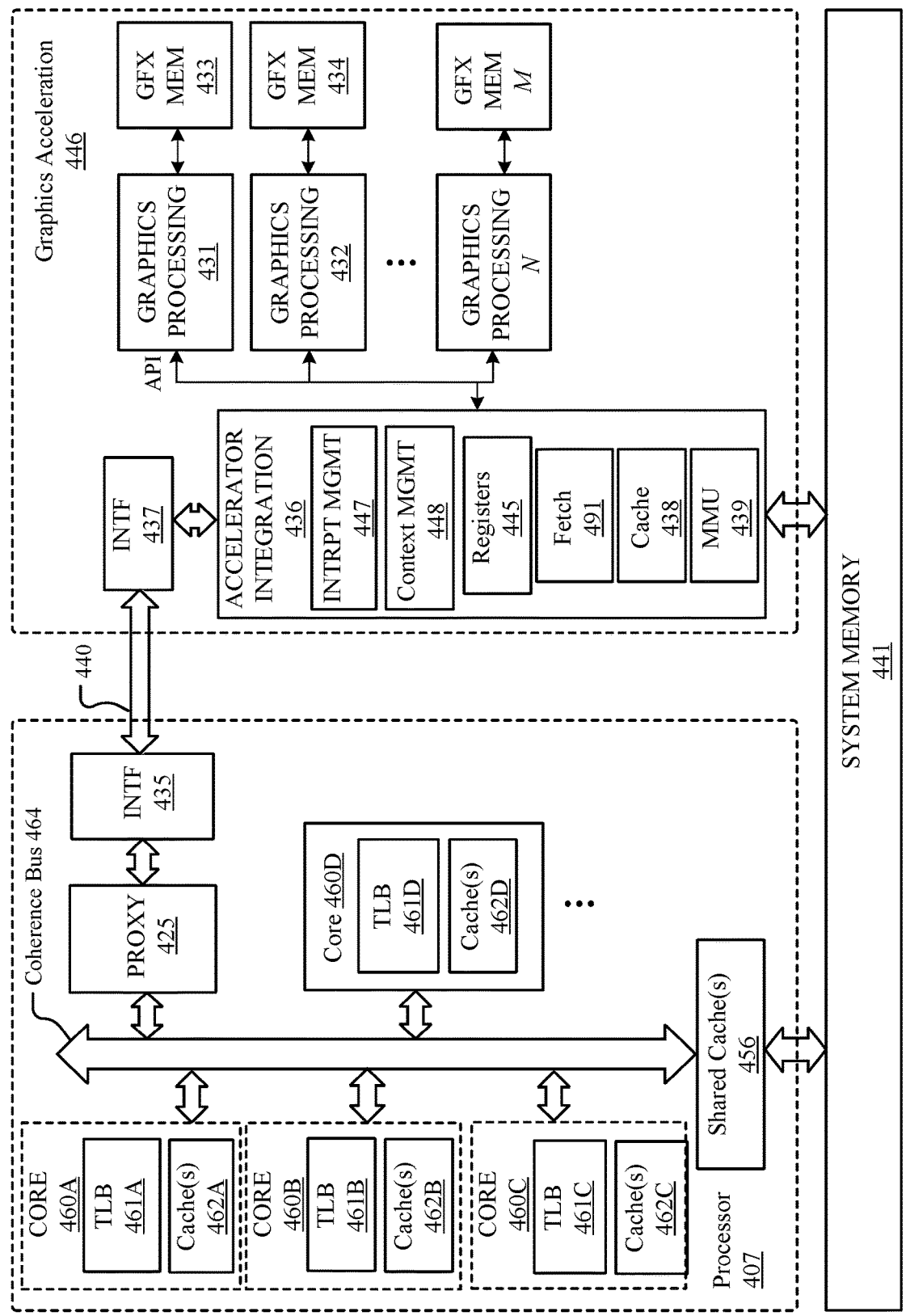

FIG. 4B illustrates additional optional details for an interconnection between a multi-core processor 407 and a graphics acceleration module 446. The graphics acceleration module 446 may include one or more GPU chips integrated on a line card which is coupled to the processor 407 via the high-speed link 440. Alternatively, the graphics acceleration module 446 may be integrated on the same package or chip as the processor 407.

The illustrated processor 407 includes a plurality of cores 460A-460D, each with a translation lookaside buffer 461A-461D and one or more caches 462A-462D. The cores may include various other components for executing instructions and processing data which are not illustrated to avoid obscuring the underlying principles of the components described herein (e.g., instruction fetch units, branch prediction units, decoders, execution units, reorder buffers, etc.). The caches 462A-462D may comprise level 1 (L1) and level 2 (L2) caches. In addition, one or more shared caches 456 may be included in the caching hierarchy and shared by sets of the cores 460A-460D. For example, one embodiment of the processor 407 includes 24 cores, each with its own L1 cache, twelve shared L2 caches, and twelve shared L3 caches. In this embodiment, one of the L2 and L3 caches are shared by two adjacent cores. The processor 407 and the graphics accelerator integration module 446 connect with system memory 441, which may include processor memories 401-402.

Coherency is maintained for data and instructions stored in the various caches 462A-462D, 456 and system memory 441 via inter-core communication over a coherence bus 464. For example, each cache may have cache coherency logic/circuitry associated therewith to communicate to over the coherence bus 464 in response to detected reads or writes to particular cache lines. In one implementation, a cache snooping protocol is implemented over the coherence bus 464 to snoop cache accesses. Cache snooping/coherency techniques are well understood by those of skill in the art and will not be described in detail here to avoid obscuring the underlying principles described herein.

A proxy circuit 425 may be provided that communicatively couples the graphics acceleration module 446 to the coherence bus 464, allowing the graphics acceleration module 446 to participate in the cache coherence protocol as a peer of the cores. In particular, an interface 435 provides connectivity to the proxy circuit 425 over high-speed link 440 (e.g., a PCIe bus, NVLink, etc.) and an interface 437 connects the graphics acceleration module 446 to the high-speed link 440.

In one implementation, an accelerator integration circuit 436 provides cache management, memory access, context management, and interrupt management services on behalf of a plurality of graphics processing engines 431, 432, N of the graphics acceleration module 446. The graphics processing engines 431, 432, N may each comprise a separate graphics processing unit (GPU). Alternatively, the graphics processing engines 431, 432, N may comprise different types of graphics processing engines within a GPU such as graphics execution units, media processing engines (e.g., video encoders/decoders), samplers, and blit engines. In other words, the graphics acceleration module may be a GPU with a plurality of graphics processing engines 431-432, N or the graphics processing engines 431-432, N may be individual GPUs integrated on a common package, line card, or chip.

The accelerator integration circuit 436 may include a memory management unit (MMU) 439 for performing various memory management functions such as virtual-to-physical memory translations (also referred to as effective-to-real memory translations) and memory access protocols for accessing system memory 441. The MMU 439 may also include a translation lookaside buffer (TLB) (not shown) for caching the virtual/effective to physical/real address translations. In one implementation, a cache 438 stores commands and data for efficient access by the graphics processing engines 431-432, N. The data stored in cache 438 and graphics memories 433-434, M may be kept coherent with the core caches 462A-462D, 456 and system memory 411. As mentioned, this may be accomplished via proxy circuit 425 which takes part in the cache coherency mechanism on behalf of cache 438 and memories 433-434, M (e.g., sending updates to the cache 438 related to modifications/accesses of cache lines on processor caches 462A-462D, 456 and receiving updates from the cache 438).

A set of registers 445 store context data for threads executed by the graphics processing engines 431-432, N and a context management circuit 448 manages the thread contexts. For example, the context management circuit 448 may perform save and restore operations to save and restore contexts of the various threads during contexts switches (e.g., where a first thread is saved and a second thread is stored so that the second thread can be execute by a graphics processing engine). For example, on a context switch, the context management circuit 448 may store current register values to a designated region in memory (e.g., identified by a context pointer). It may then restore the register values when returning to the context. An interrupt management circuit 447, for example, may receive and processes interrupts received from system devices.

In one implementation, virtual/effective addresses from a graphics processing engine 431 are translated to real/physical addresses in system memory 411 by the MMU 439. Optionally, the accelerator integration circuit 436 supports multiple (e.g., 4, 8, 16) graphics accelerator modules 446 and/or other accelerator devices. The graphics accelerator module 446 may be dedicated to a single application executed on the processor 407 or may be shared between multiple applications. Optionally, a virtualized graphics execution environment is provided in which the resources of the graphics processing engines 431-432, N are shared with multiple applications or virtual machines (VMs). The resources may be subdivided into "slices" which are allocated to different VMs and/or applications based on the processing requirements and priorities associated with the VMs and/or applications.

Thus, the accelerator integration circuit 436 acts as a bridge to the system for the graphics acceleration module 446 and provides address translation and system memory cache services. In one embodiment, to facilitate the bridging functionality, the accelerator integration circuit 436 may also include shared I/O 497 (e.g., PCIe, USB) and hardware to enable system control of voltage, clocking, performance, thermals, and security. The shared I/O 497 may utilize separate physical connections or may traverse the high-speed link 440. In addition, the accelerator integration circuit 436 may provide virtualization facilities for the host processor to manage virtualization of the graphics processing engines, interrupts, and memory management.

Because hardware resources of the graphics processing engines 431-432, N are mapped explicitly to the real address space seen by the host processor 407, any host processor can address these resources directly using an effective address value. One optional function of the accelerator integration circuit 436 is the physical separation of the graphics processing engines 431-432, N so that they appear to the system as independent units.

One or more graphics memories 433-434, M may be coupled to each of the graphics processing engines 431-432, N, respectively. The graphics memories 433-434, M store instructions and data being processed by each of the graphics processing engines 431-432, N. The graphics memories 433-434, M may be volatile memories such as DRAMs (including stacked DRAMs), GDDR memory (e.g., GDDR5, GDDR6), or HBM, and/or may be non-volatile memories such as 3D XPoint/Optane or Nano-Ram.

To reduce data traffic over the high-speed link 440, biasing techniques may be used to ensure that the data stored in graphics memories 433-434, M is data which will be used most frequently by the graphics processing engines 431-432, N and preferably not used by the cores 460A-460D (at least not frequently). Similarly, the biasing mechanism attempts to keep data needed by the cores (and preferably not the graphics processing engines 431-432, N) within the caches 462A-462D, 456 of the cores and system memory 411.

Figure 4C:
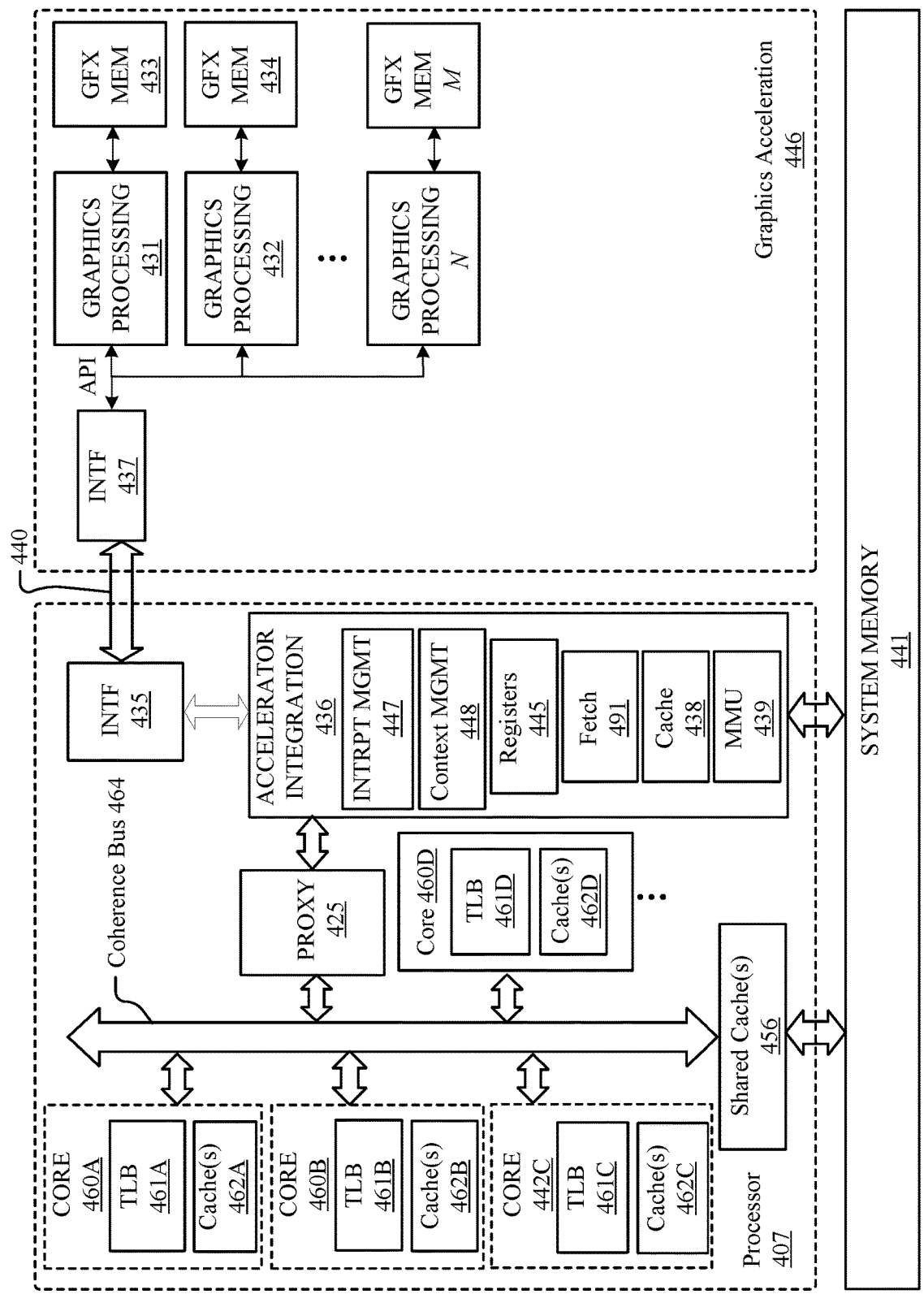

According to a variant shown in FIG. 4C the accelerator integration circuit 436 is integrated within the processor 407. The graphics processing engines 431-432, N communicate directly over the high-speed link 440 to the accelerator integration circuit 436 via interface 437 and interface 435 (which, again, may be utilize any form of bus or interface protocol). The accelerator integration circuit 436 may perform the same operations as those described with respect to FIG. 4B, but potentially at a higher throughput given its close proximity to the coherency bus 464 and caches 462A-462D, 456.

The embodiments described may support different programming models including a dedicated-process programming model (no graphics acceleration module virtualization) and shared programming models (with virtualization). The latter may include programming models which are controlled by the accelerator integration circuit 436 and programming models which are controlled by the graphics acceleration module 446.

In the embodiments of the dedicated process model, graphics processing engines 431-432, N may be dedicated to a single application or process under a single operating system. The single application can funnel other application requests to the graphics engines 431-432, N, providing virtualization within a VM/partition.

In the dedicated-process programming models, the graphics processing engines 431-432, N, may be shared by multiple VM/application partitions. The shared models require a system hypervisor to virtualize the graphics processing engines 431-432, N to allow access by each operating system. For single-partition systems without a hypervisor, the graphics processing engines 431-432, N are owned by the operating system. In both cases, the operating system can virtualize the graphics processing engines 431-432, N to provide access to each process or application.

For the shared programming model, the graphics acceleration module 446 or an individual graphics processing engine 431-432, N selects a process element using a process handle. The process elements may be stored in system memory 411 and be addressable using the effective address to real address translation techniques described herein. The process handle may be an implementation-specific value provided to the host process when registering its context with the graphics processing engine 431-432, N (that is, calling system software to add the process element to the process element linked list). The lower 16-bits of the process handle may be the offset of the process element within the process element linked list.

Figure 4D:
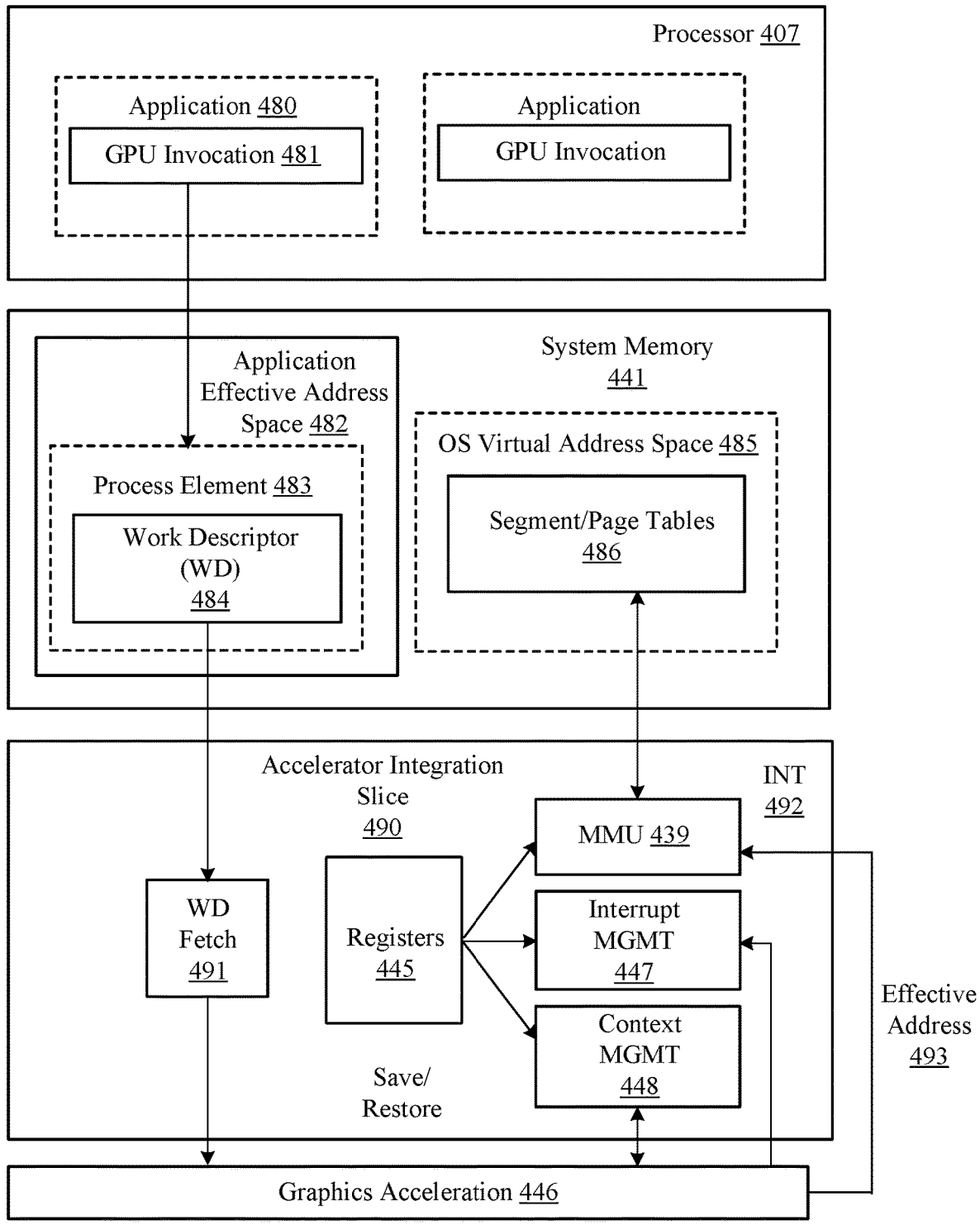

FIG. 4D illustrates an exemplary accelerator integration slice 490. As used herein, a "slice" comprises a specified portion of the processing resources of the accelerator integration circuit 436. Application effective address space 482 within system memory 411 stores process elements 483. The process elements 483 may be stored in response to GPU invocations 481 from applications 480 executed on the processor 407. A process element 483 contains the process state for the corresponding application 480. A work descriptor (WD) 484 contained in the process element 483 can be a single job requested by an application or may contain a pointer to a queue of jobs. In the latter case, the WD 484 is a pointer to the job request queue in the application's address space 482.

The graphics acceleration module 446 and/or the individual graphics processing engines 431-432, N can be shared by all or a subset of the processes in the system. For example, the technologies described herein may include an infrastructure for setting up the process state and sending a WD 484 to a graphics acceleration module 446 to start a job in a virtualized environment.

In one implementation, the dedicated-process programming model is implementation-specific. In this model, a single process owns the graphics acceleration module 446 or an individual graphics processing engine 431. Because the graphics acceleration module 446 is owned by a single process, the hypervisor initializes the accelerator integration circuit 436 for the owning partition and the operating system initializes the accelerator integration circuit 436 for the owning process at the time when the graphics acceleration module 446 is assigned.

In operation, a WD fetch unit 491 in the accelerator integration slice 490 fetches the next WD 484 which includes an indication of the work to be done by one of the graphics processing engines of the graphics acceleration module 446. Data from the WD 484 may be stored in registers 445 and used by the MMU 439, interrupt management circuit 447 and/or context management circuit 448 as illustrated. For example, the MMU 439 may include segment/page walk circuitry for accessing segment/page tables 486 within the OS virtual address space 485. The interrupt management circuit 447 may process interrupt events 492 received from the graphics acceleration module 446. When performing graphics operations, an effective address 493 generated by a graphics processing engine 431-432, N is translated to a real address by the MMU 439.

The same set of registers 445 may be duplicated for each graphics processing engine 431-432, N and/or graphics acceleration module 446 and may be initialized by the hypervisor or operating system. Each of these duplicated registers may be included in an accelerator integration slice 490. Exemplary registers that may be initialized by the hypervisor are shown in Table 1.

TABLE 1

Hypervisor Initialized Registers

1  Slice Control Register
2  Real Address (RA) Scheduled Processes Area Pointer
3  Authority Mask Override Register
4  Interrupt Vector Table Entry Offset
5  Interrupt Vector Table Entry Limit
6  State Register
7  Logical Partition ID
8  Real address (RA) Hypervisor Accelerator Utilization Record Pointer
9  Storage Description Register Exemplary registers that may be initialized by the operating system are shown in Table 2.

TABLE 2

Operating System Initialized Registers

1  Process and Thread Identification
2  Effective Address (EA) Context Save/Restore Pointer
3  Virtual Address (VA) Accelerator Utilization Record Pointer TABLE 2-continued Operating System Initialized Registers 4  Virtual Address (VA) Storage Segment Table Pointer
5  Authority Mask
6  Work descriptor Each WD 484 may be specific to a particular graphics acceleration module 446 and/or graphics processing engine 431-432, N. It contains all the information a graphics processing engine 431-432, N requires to do its work or it can be a pointer to a memory location where the application has set up a command queue of work to be completed.

Figure 4E:
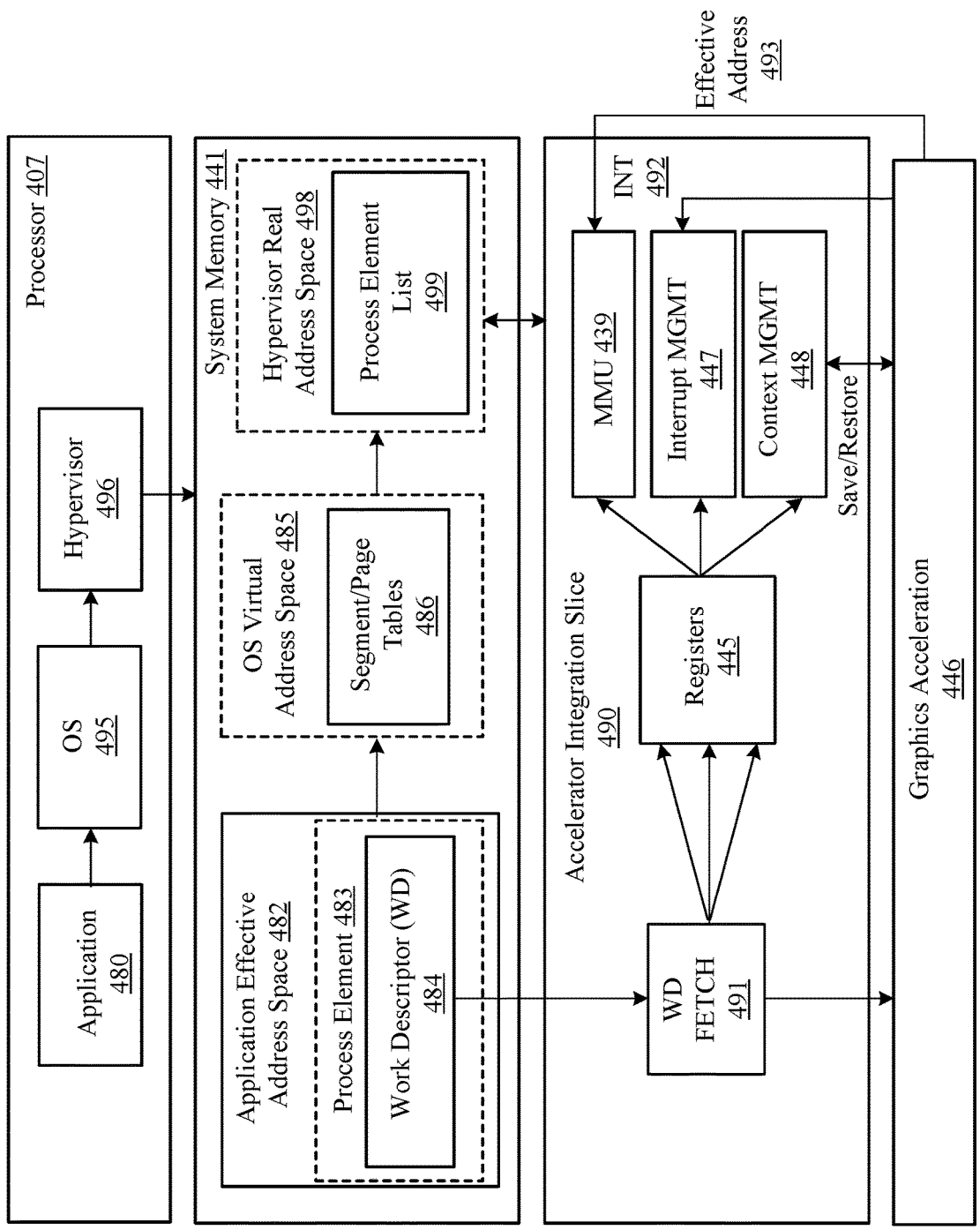

FIG. 4E illustrates additional optional details of a shared model. It includes a hypervisor real address space 498 in which a process element list 499 is stored. The hypervisor real address space 498 is accessible via a hypervisor 496 which virtualizes the graphics acceleration module engines for the operating system 495.

The shared programming models allow for all or a subset of processes from all or a subset of partitions in the system to use a graphics acceleration module 446. There are two programming models where the graphics acceleration module 446 is shared by multiple processes and partitions: time-sliced shared and graphics directed shared.

In this model, the system hypervisor 496 owns the graphics acceleration module 446 and makes its function available to all operating systems 495. For a graphics acceleration module 446 to support virtualization by the system hypervisor 496, the graphics acceleration module 446 may adhere to the following requirements: 1) An application's job request must be autonomous (that is, the state does not need to be maintained between jobs), or the graphics acceleration module 446 must provide a context save and restore mechanism. 2) An application's job request is guaranteed by the graphics acceleration module 446 to complete in a specified amount of time, including any translation faults, or the graphics acceleration module 446 provides the ability to preempt the processing of the job. 3) The graphics acceleration module 446 must be guaranteed fairness between processes when operating in the directed shared programming model.

For the shared model, the application 480 may be required to make an operating system 495 system call with a graphics acceleration module 446 type, a work descriptor (WD), an authority mask register (AMR) value, and a context save/restore area pointer (CSRP). The graphics acceleration module 446 type describes the targeted acceleration function for the system call. The graphics acceleration module 446 type may be a system-specific value. The WD is formatted specifically for the graphics acceleration module 446 and can be in the form of a graphics acceleration module 446 command, an effective address pointer to a user-defined structure, an effective address pointer to a queue of commands, or any other data structure to describe the work to be done by the graphics acceleration module 446. In one embodiment, the AMR value is the AMR state to use for the current process. The value passed to the operating system is similar to an application setting the AMR. If the accelerator integration circuit 436 and graphics acceleration module 446 implementations do not support a User Authority Mask Override Register (UAMOR), the operating system may apply the current UAMOR value to the AMR value before passing the AMR in the hypervisor call. The hypervisor 496 may optionally apply the current Authority Mask Override Register (AMOR) value before placing the AMR into the process element 483. The CSRP may be one of the registers 445 containing the effective address of an area in the application's address space 482 for the graphics acceleration module 446 to save and restore the context state. This pointer is optional if no state is required to be saved between jobs or when a job is preempted. The context save/restore area may be pinned system memory.

Upon receiving the system call, the operating system 495 may verify that the application 480 has registered and been given the authority to use the graphics acceleration module 446. The operating system 495 then calls the hypervisor 496 with the information shown in Table 3.

TABLE 3

OS to Hypervisor Call Parameters

| | |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | The virtual address of the storage segment table pointer (SSTP) |
| 7 | A logical interrupt service number (LISN) |

Upon receiving the hypervisor call, the hypervisor 496 verifies that the operating system 495 has registered and been given the authority to use the graphics acceleration module 446. The hypervisor 496 then puts the process element 483 into the process element linked list for the corresponding graphics acceleration module 446 type. The process element may include the information shown in Table 4.

TABLE 4

Process Element Information

| | |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | The virtual address of the storage segment table pointer (SSTP) |
| 7 | A logical interrupt service number (LISN) |
| 8 | Interrupt vector table, derived from the hypervisor call parameters. |
| 9 | A state register (SR) value |
| 10 | A logical partition ID (LPID) |
| 11 | A real address (RA) hypervisor accelerator utilization record pointer |
| 12 | The Storage Descriptor Register (SDR) |

The hypervisor may initialize a plurality of accelerator integration slice 490 registers 445.

Figure 4F:
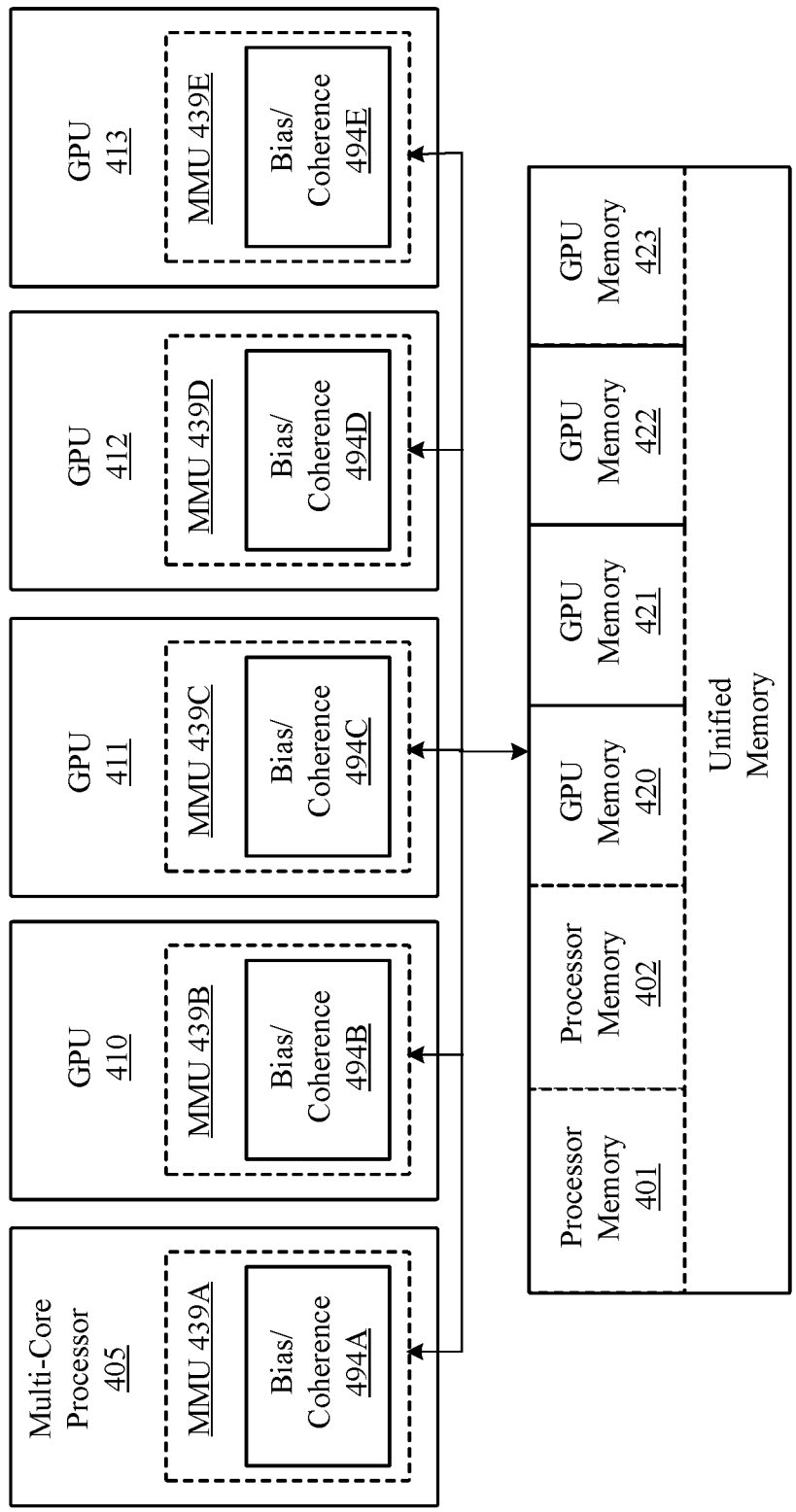

As illustrated in FIG. 4F, in one optional implementation a unified memory addressable via a common virtual memory address space used to access the physical processor memories 401-402 and GPU memories 420-423 is employed. In this implementation, operations executed on the GPUs 410-413 utilize the same virtual/effective memory address space to access the processors memories 401-402 and vice versa, thereby simplifying programmability. A first portion of the virtual/effective address space may be allocated to the processor memory 401, a second portion to the second processor memory 402, a third portion to the GPU memory 420, and so on. The entire virtual/effective memory space (sometimes referred to as the effective address space) may thereby be distributed across each of the processor memories 401-402 and GPU memories 420-423, allowing any processor or GPU to access any physical memory with a virtual address mapped to that memory.

Bias/coherence management circuitry 494A-494E within one or more of the MMUs 439A-439E may be provided that ensures cache coherence between the caches of the host processors (e.g., 405) and the GPUs 410-413 and implements biasing techniques indicating the physical memories in which certain types of data should be stored. While multiple instances of bias/coherence management circuitry 494A-494E are illustrated in FIG. 4F, the bias/coherence circuitry may be implemented within the MMU of one or more host processors 405 and/or within the accelerator integration circuit 436.

The GPU-attached memory 420-423 may be mapped as part of system memory, and accessed using shared virtual memory (SVM) technology, but without suffering the typical performance drawbacks associated with full system cache coherence. The ability to GPU-attached memory 420-423 to be accessed as system memory without onerous cache coherence overhead provides a beneficial operating environment for GPU offload. This arrangement allows the host processor 405 software to setup operands and access computation results, without the overhead of tradition I/O DMA data copies. Such traditional copies involve driver calls, interrupts and memory mapped I/O (MMIO) accesses that are all inefficient relative to simple memory accesses. At the same time, the ability to access GPU attached memory 420-423 without cache coherence overheads can be critical to the execution time of an offloaded computation. In cases with substantial streaming write memory traffic, for example, cache coherence overhead can significantly reduce the effective write bandwidth seen by a GPU 410-413. The efficiency of operand setup, the efficiency of results access, and the efficiency of GPU computation all play a role in determining the effectiveness of GPU offload.

A selection of between GPU bias and host processor bias may be driven by a bias tracker data structure. A bias table may be used, for example, which may be a page-granular structure (i.e., controlled at the granularity of a memory page) that includes 1 or 2 bits per GPU-attached memory page. The bias table may be implemented in a stolen memory range of one or more GPU-attached memories 420-423, with or without a bias cache in the GPU 410-413 (e.g., to cache frequently/recently used entries of the bias table). Alternatively, the entire bias table may be maintained within the GPU.

In one implementation, the bias table entry associated with each access to the GPU-attached memory 420-423 is accessed prior the actual access to the GPU memory, causing the following operations. First, local requests from the GPU 410-413 that find their page in GPU bias are forwarded directly to a corresponding GPU memory 420-423. Local requests from the GPU that find their page in host bias are forwarded to the processor 405 (e.g., over a high-speed link as discussed above). Optionally, requests from the processor 405 that find the requested page in host processor bias complete the request like a normal memory read. Alternatively, requests directed to a GPU-biased page may be forwarded to the GPU 410-413. The GPU may then transition the page to a host processor bias if it is not currently using the page.

The bias state of a page can be changed either by a software-based mechanism, a hardware-assisted software-based mechanism, or, for a limited set of cases, a purely hardware-based mechanism.

One mechanism for changing the bias state employs an API call (e.g., OpenCL), which, in turn, calls the GPU's device driver which, in turn, sends a message (or enqueues a command descriptor) to the GPU directing it to change the bias state and, for some transitions, perform a cache flushing operation in the host. The cache flushing operation is required for a transition from host processor 405 bias to GPU bias, but is not required for the opposite transition.

Cache coherency may be maintained by temporarily rendering GPU-biased pages uncacheable by the host processor 405. To access these pages, the processor 405 may request access from the GPU 410 which may or may not grant access right away, depending on the implementation. Thus, to reduce communication between the host processor 405 and GPU 410 it is beneficial to ensure that GPU-biased pages are those which are required by the GPU but not the host processor 405 and vice versa.

Graphics Processing Pipeline

Figure 5:
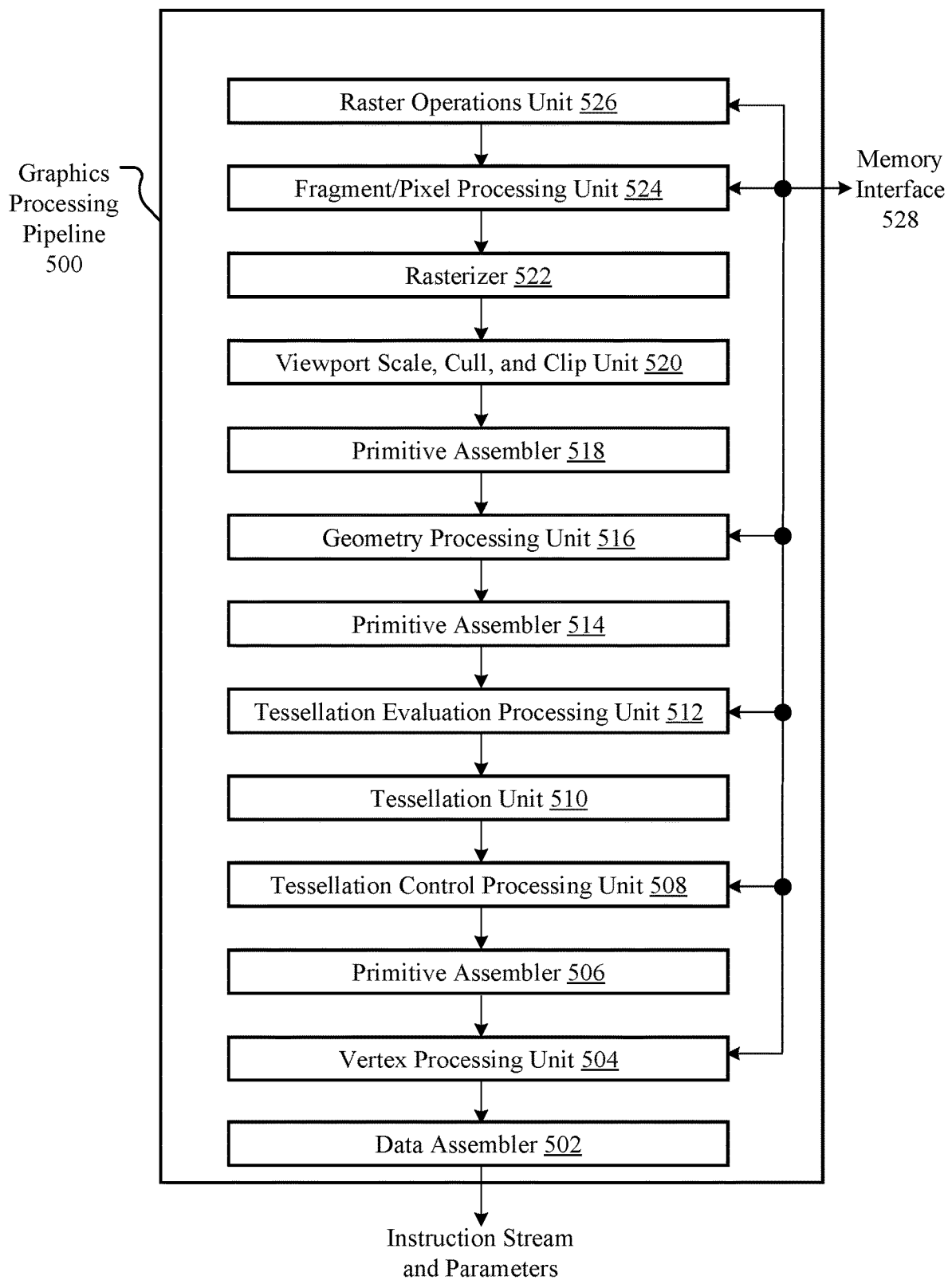
FIG. 5 illustrates a graphics processing pipeline.

FIG. 5 illustrates a graphics processing pipeline 500. A graphics multiprocessor, such as graphics multiprocessor 234 as in FIG. 2D, graphics multiprocessor 325 of FIG. 3A, graphics multiprocessor 350 of FIG. 3B can implement the illustrated graphics processing pipeline 500. The graphics multiprocessor can be included within the parallel processing subsystems as described herein, such as the parallel processor 200 of FIG. 2A, which may be related to the parallel processor(s) 112 of FIG. 1 and may be used in place of one of those. The various parallel processing systems can implement the graphics processing pipeline 500 via one or more instances of the parallel processing unit (e.g., parallel processing unit 202 of FIG. 2A) as described herein. For example, a shader unit (e.g., graphics multiprocessor 234 of FIG. 2C) may be configured to perform the functions of one or more of a vertex processing unit 504, a tessellation control processing unit 508, a tessellation evaluation processing unit 512, a geometry processing unit 516, and a fragment/pixel processing unit 524. The functions of data assembler 502, primitive assemblers 506, 514, 518, tessellation unit 510, rasterizer 522, and raster operations unit 526 may also be performed by other processing engines within a processing cluster (e.g., processing cluster 214 of FIG. 2A) and a corresponding partition unit (e.g., partition unit 220A-220N of FIG. 2A). The graphics processing pipeline 500 may also be implemented using dedicated processing units for one or more functions. It is also possible that one or more portions of the graphics processing pipeline 500 are performed by parallel processing logic within a general-purpose processor (e.g., CPU). Optionally, one or more portions of the graphics processing pipeline 500 can access on-chip memory (e.g., parallel processor memory 222 as in FIG. 2A) via a memory interface 528, which may be an instance of the memory interface 218 of FIG. 2A. The graphics processor pipeline 500 may also be implemented via a multi-core group 365A as in FIG. 3C.

The data assembler 502 is a processing unit that may collect vertex data for surfaces and primitives. The data assembler 502 then outputs the vertex data, including the vertex attributes, to the vertex processing unit 504. The vertex processing unit 504 is a programmable execution unit that executes vertex shader programs, lighting and transforming vertex data as specified by the vertex shader programs. The vertex processing unit 504 reads data that is stored in cache, local or system memory for use in processing the vertex data and may be programmed to transform the vertex data from an object-based coordinate representation to a world space coordinate space or a normalized device coordinate space.

A first instance of a primitive assembler 506 receives vertex attributes from the vertex processing unit 504. The primitive assembler 506 readings stored vertex attributes as needed and constructs graphics primitives for processing by tessellation control processing unit 508. The graphics primitives include triangles, line segments, points, patches, and so forth, as supported by various graphics processing application programming interfaces (APIs).

The tessellation control processing unit 508 treats the input vertices as control points for a geometric patch. The control points are transformed from an input representation from the patch (e.g., the patch's bases) to a representation that is suitable for use in surface evaluation by the tessellation evaluation processing unit 512. The tessellation control processing unit 508 can also compute tessellation factors for edges of geometric patches. A tessellation factor applies to a single edge and quantifies a view-dependent level of detail associated with the edge. A tessellation unit 510 is configured to receive the tessellation factors for edges of a patch and to tessellate the patch into multiple geometric primitives such as line, triangle, or quadrilateral primitives, which are transmitted to a tessellation evaluation processing unit 512. The tessellation evaluation processing unit 512 operates on parameterized coordinates of the subdivided patch to generate a surface representation and vertex attributes for each vertex associated with the geometric primitives.

A second instance of a primitive assembler 514 receives vertex attributes from the tessellation evaluation processing unit 512, reading stored vertex attributes as needed, and constructs graphics primitives for processing by the geometry processing unit 516. The geometry processing unit 516 is a programmable execution unit that executes geometry shader programs to transform graphics primitives received from primitive assembler 514 as specified by the geometry shader programs. The geometry processing unit 516 may be programmed to subdivide the graphics primitives into one or more new graphics primitives and calculate parameters used to rasterize the new graphics primitives.

The geometry processing unit 516 may be able to add or delete elements in the geometry stream. The geometry processing unit 516 outputs the parameters and vertices specifying new graphics primitives to primitive assembler 518. The primitive assembler 518 receives the parameters and vertices from the geometry processing unit 516 and constructs graphics primitives for processing by a viewport scale, cull, and clip unit 520. The geometry processing unit 516 reads data that is stored in parallel processor memory or system memory for use in processing the geometry data. The viewport scale, cull, and clip unit 520 performs clipping, culling, and viewport scaling and outputs processed graphics primitives to a rasterizer 522.

The rasterizer 522 can perform depth culling and other depth-based optimizations. The rasterizer 522 also performs scan conversion on the new graphics primitives to generate fragments and output those fragments and associated coverage data to the fragment/pixel processing unit 524. The fragment/pixel processing unit 524 is a programmable execution unit that is configured to execute fragment shader programs or pixel shader programs. The fragment/pixel processing unit 524 transforming fragments or pixels received from rasterizer 522, as specified by the fragment or pixel shader programs. For example, the fragment/pixel processing unit 524 may be programmed to perform operations included but not limited to texture mapping, shading, blending, texture correction and perspective correction to produce shaded fragments or pixels that are output to a raster operations unit 526. The fragment/pixel processing unit 524 can read data that is stored in either the parallel processor memory or the system memory for use when processing the fragment data. Fragment or pixel shader programs may be configured to shade at sample, pixel, tile, or other granularities depending on the sampling rate configured for the processing units.

The raster operations unit 526 is a processing unit that performs raster operations including, but not limited to stencil, z-test, blending, and the like, and outputs pixel data as processed graphics data to be stored in graphics memory (e.g., parallel processor memory 222 as in FIG. 2A, and/or system memory 104 as in FIG. 1), to be displayed on the one or more display device(s) 110 or for further processing by one of the one or more processor(s) 102 or parallel processor(s) 112. The raster operations unit 526 may be configured to compress z or color data that is written to memory and decompress z or color data that is read from memory.

Figure 6A:
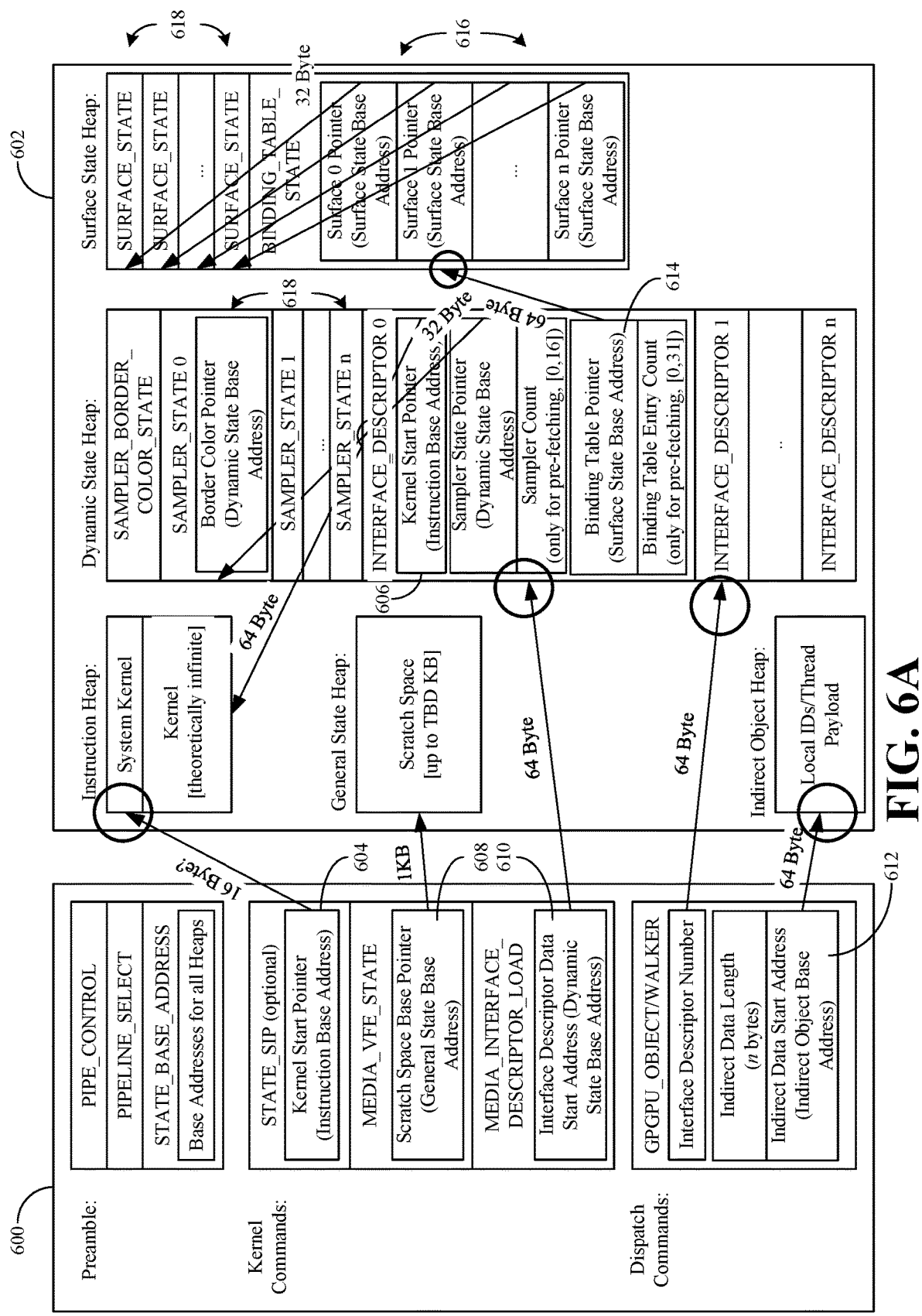
FIGS. 6A-6B are block diagrams of examples of command buffer and heap structures according to embodiments.

Resource Management Technology
Integrity and Replay Protection of Data and Command Buffers (FIGS. 6A-6H):

Turning now to FIG. 6A, command buffer structure 600 includes a preamble, kernel commands, and dispatch commands that include addresses and/or pointers into a heap structure 602. In the illustrated example, the heap structure 602 includes an instruction heap, a dynamic state heap, a surface state heap, a general state heap, and an indirect object heap. In an embodiment, the command buffer structure 600 and the heap structure 602 are complex (e.g., graphs) and are processed incrementally, making integrity verification difficult. Moreover, addresses in integrity-protected command structures might need to be modified (e.g., "patched") for different reasons:

The addresses might reference oversubscribed memory resources that are being used by another client and therefore needs to be modified;

The addresses might be produced and consumed in different address spaces as in some GPU remoting architectures.

For example, the kernel commands may include a kernel start pointer 604 (e.g., instruction base address) to the instruction heap that is relocatable (e.g., as indicated by the circle) and may be patched to minimize STATE_BASE_ADDRESS changes. Similarly, an interface descriptor ("INTERFACE_DESCRIPTOR 0") in the dynamic state heap may include a kernel start pointer 606 that is also patched to minimize STATE_BASE_ADDRESS changes.

In an embodiment, the kernel commands include a scratch space base pointer 608 (e.g., general state base address) to the general state heap and a relocatable interface descriptor data start address 610 (e.g., dynamic state base address) to an interface descriptor in the dynamic state heap, wherein both the scratch base pointer 608 and the relocatable interface descriptor data start address 610 may be patched. Other heap pointers may include a relocatable indirect data start address 612 (e.g., indirect object base address) in the dispatch commands, wherein the indirect data start address 612 points to the indirect object heap and may be patched. Indeed, a relocatable binding table pointer 614 in the dynamic state heap may point to a binding table state ("BINDING_TABLE_STATE") in the surface state heap. In an embodiment, a plurality of relocatable surface pointers 616 may also be patched. Moreover, commands and/or state data 618 in the dynamic state heap and the surface state heap may be patched using a patch list.

As will be described in greater detail, embodiments provide for new graphics processor (e.g., GPU) commands to verify the integrity of data and meta data and a procedure for interleaving the verification and execution of commands.

Embodiments may also use a relocation dictionary to flag addresses that are to be patched so that the modifications can be validated, while still being able to verify the integrity of the original commands. Thus, embodiments provide a new approach for integrity-protection of graphics processor data and commands and handling modifications to command buffers after message authentication code (MAC, e.g., tag) generation. In general, a MAC is a short piece of information used to authenticate a message (e.g., confirm that the message came from the stated sender and has not been changed). The MAC value protects the data integrity of the message, as well as the authenticity of the message, by enabling verifiers who possess a secret key to detect any changes to the message content. Embodiments may be detectable via the software stack, software development kits (SDKs), application programming interfaces (APIs) and/or product literature.

Figure 6B:
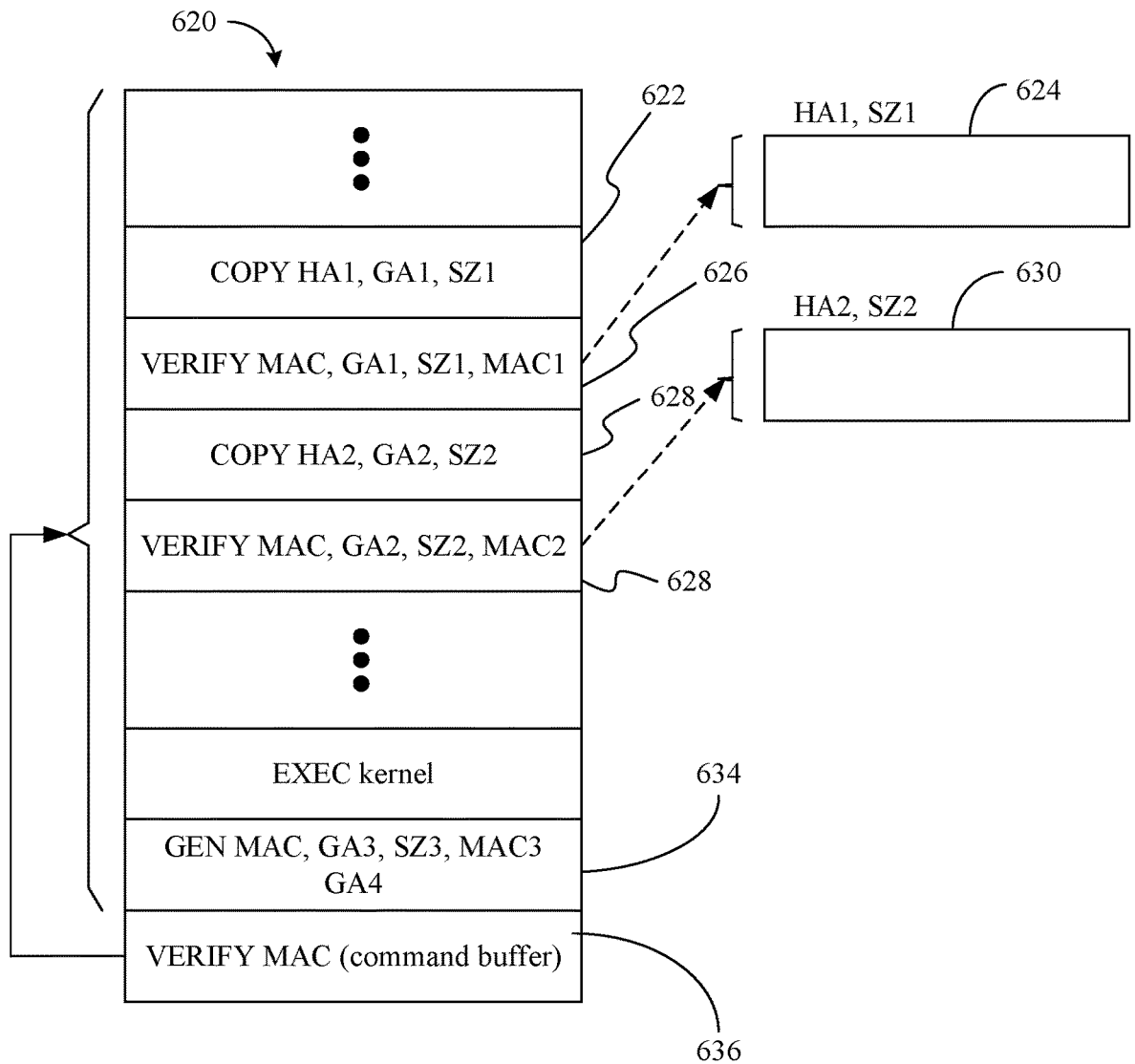

FIG. 6B shows an integrity protection of a command buffer 620 in which MACs are used to verify the integrity of data structures. In general, the command buffer 620 may be submitted from a host processor ("host", e.g., central processing unit/CPU) to a graphics processor, with the graphics processor returning a computation result to the host processor. In an embodiment, a key used to verify the MACs is derived from a master session key generated during an authenticated key exchange between GPU and the client application.

New commands for verifying (e.g., "VERIFY" command) and generating (e.g., "GEN" command) MACs are introduced. VERIFY MAC commands have the reference MAC inside the command (e.g., computed inside an application trusted execution environment/TEE). The GPU may compute the MAC independently and compare the computed MAC against a reference MAC. Every command buffer may also have one VERIFY MAC command to verify the entire contents (e.g., not including memory buffers referenced through addresses in the commands). Every memory buffer referenced from a command in the command buffer (e.g., descriptors, state heaps) has a separate/dedicated VERIFY MAC command to verify the integrity of the memory buffer in the corresponding command buffer.

For example, a first copy command 622 may retrieve data from a first heap region 624 starting at host address "HA1" to a graphics address "GA1", wherein the first heap region 624 has a size of "SZ1". In such a case, a corresponding verification command 626 (e.g., command to verify the integrity of data copied from HA1 to GA1) may be added to the command buffer 620 (e.g., in an interleaving fashion), wherein the verification command 626 includes the graphics address GA1, the size SZ1, and a MAC ("MAC1"). Similarly, a second copy command 628 may retrieve data from a second heap region 630 starting at host address "HA2" to a graphics address "GA2", wherein the second heap region 630 has a size of "SZ2". A corresponding verification command 631 (e.g., command to verify the integrity of data copied from HA2 to GA2) may be added to the command buffer 620 (e.g., in an interleaving fashion), wherein the verification command 631 includes the graphics address GA2, the size SZ2, and a MAC ("MAC2"). The illustrated sequence may be repeated for a plurality of copy commands and corresponding plurality of verification commands. In one example, the command buffer 620 also includes an execution ("EXEC") kernel that is used to generate the compute result.

Data generated by the GPU (e.g., compute results) may also be integrity protected. More particularly, a MAC generation command 634 ("GEN MAC" command) in the command buffer 620 may instruct the GPU to generate a MAC over the compute results, wherein the MAC is verified by an application TEE. The illustrated MAC generation command 634 therefore includes an instruction to generate a MAC over a compute result having a size of "SZ3" starting at graphics address "GA3", a MAC ("MAC3"), and a destination graphics address "GA4". In an embodiment, a verification command 636 at the end of the command buffer 620 corresponds to the contents of the command buffer 620. Thus, the verification command 636 may be used to verify the integrity of the command buffer 620.

The integrity verification procedure may involve a GPU command streamer (CS) executing the commands in the command buffer 620 sequentially until the end of the buffer 620 is reached or until a new command buffer is invoked (e.g., in a chaining architecture). To verify the MAC of the command buffer 620, the CS maintains a running digest of the commands encountered so far. The MAC is only verified when the end of the command buffer 620 is reached during execution. In an embodiment, verification of the MAC of the memory heap regions 624, 630 pointed to by commands in the command buffer is done as the data is copied into GPU local memory by the CS (e.g., inline verification when the VERIFY MAC is encountered). In one example, all integrity-protected memory regions are copied into GPU protected memory before the MAC is verified.

Figure 6C:
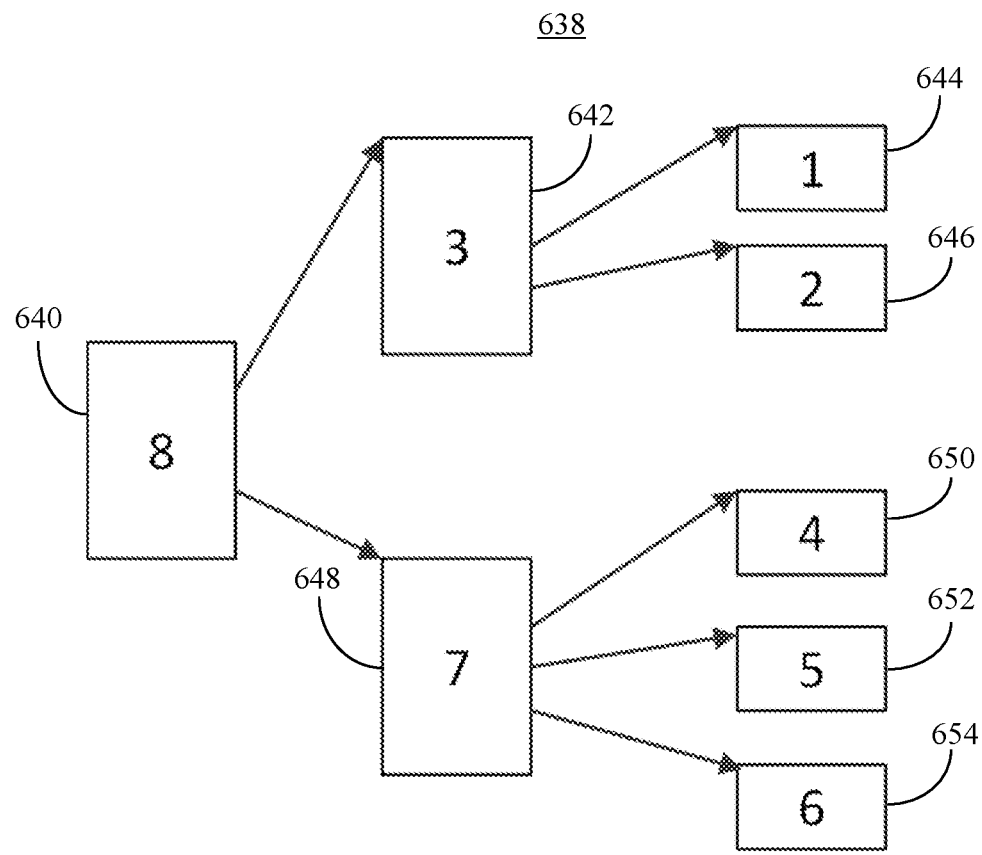
FIG. 6C is a block diagram of an example of a buffer graph according to an embodiment.

FIG. 6C shows a buffer graph 638 in which the integrity of chained command buffers is verified. To preserve the integrity of a sequence of command buffers and prevent replay, embodiments include a sequence number for each node in the graph. Embodiments may also use a separate set of sequence numbers for host-to-graphics processor ("Host-to-GPU", e.g., command buffer) data transfers and graphics processor-to-host ("GPU-to-Host", e.g., compute result) data transfers Additionally, MACs for nodes in the graph 638 of command buffers, data buffers, and descriptors are calculated inside the client TEE in the order in which they are processed by the CS. In the illustrated example, the number in a node of the graph is indicative of the order in which the GPU verifies the integrity of that node during execution.

For example, while processing a first buffer node 640 corresponding to a first command buffer, the CS may encounter a reference to a second buffer node 642 corresponding to a second command buffer. The reference to the second buffer node 642 may therefore cause the CS to switch to processing the second command buffer.

While processing the second command buffer, the CS may encounter a command to copy (and corresponding verification command) data from a first host memory region corresponding to a first memory node 644. In an embodiment, a host-to-GPU sequence number of "1" has been previously added (e.g., by a driver and/or patcher) to the first memory node 644 to indicate to the CS that the verification command corresponding to the first memory node 644 is to be executed first.

Also while processing the second command buffer, the CS may encounter a command to copy (and corresponding verification command) data from a second host memory region corresponding to a second memory node 646. In an embodiment, a host-to-GPU sequence number of "2" has previously been added to the second memory node 646 to indicate to the CS that the verification command corresponding to the second memory node 646 is to be executed second.

In one example, a host-to-GPU sequence number of "3" is added to the second buffer node 642 to indicate to the CS that upon completing the second buffer node 642, the verification command corresponding to the second buffer node 642 is to be executed third. The CS may then return to the first buffer node 640 and encounter a reference to a third buffer node 648 corresponding to a third command buffer. The reference to the third buffer node 648 may therefore cause the CS to switch to processing the third command buffer.

While processing the third command buffer, the CS may encounter a command to copy data (and corresponding verification command) from a third memory region corresponding to a third memory node 650. In an embodiment, a host-to-GPU sequence number of "4" has been previously added to the fourth memory node 650 to indicate to the CS that the verification command corresponding to the third memory node is to be executed fourth.

Also while processing the third command buffer, the CS may encounter a command to copy (and corresponding verification command) data from a fourth host memory region corresponding to a fourth memory node 652. In an embodiment, a host-to-GPU sequence number of "5" has previously been added to the fourth memory node 652 to indicate to the CS that the verification command corresponding to the fourth memory node 652 is to be executed fifth.

Also while processing the third command buffer, the CS may encounter a command to copy (and corresponding verification command) data from a fifth host memory region corresponding to a fifth memory node 654. In an embodiment, a host-to-GPU sequence number of "6" has previously been added to the fifth memory node 654 to indicate to the CS that the verification command corresponding to the fifth memory node 654 is to be executed sixth.

In one example, a host-to-GPU sequence number of "7" is added to the third buffer node 648 to indicate to the CS that upon completing the third buffer node 648, the verification command corresponding to the third buffer node 648 is to be executed seventh. Additionally, a host-to-GPU sequence number of "8" may be added to the first buffer node 640 to indicate to the CS that upon return to the first buffer node 640, the verification command corresponding to the first buffer node 640 is to be executed eighth. Similar GPU-to-host sequence numbers may be used for compute results to control the order in which integrity is verified.

Figure 6D:
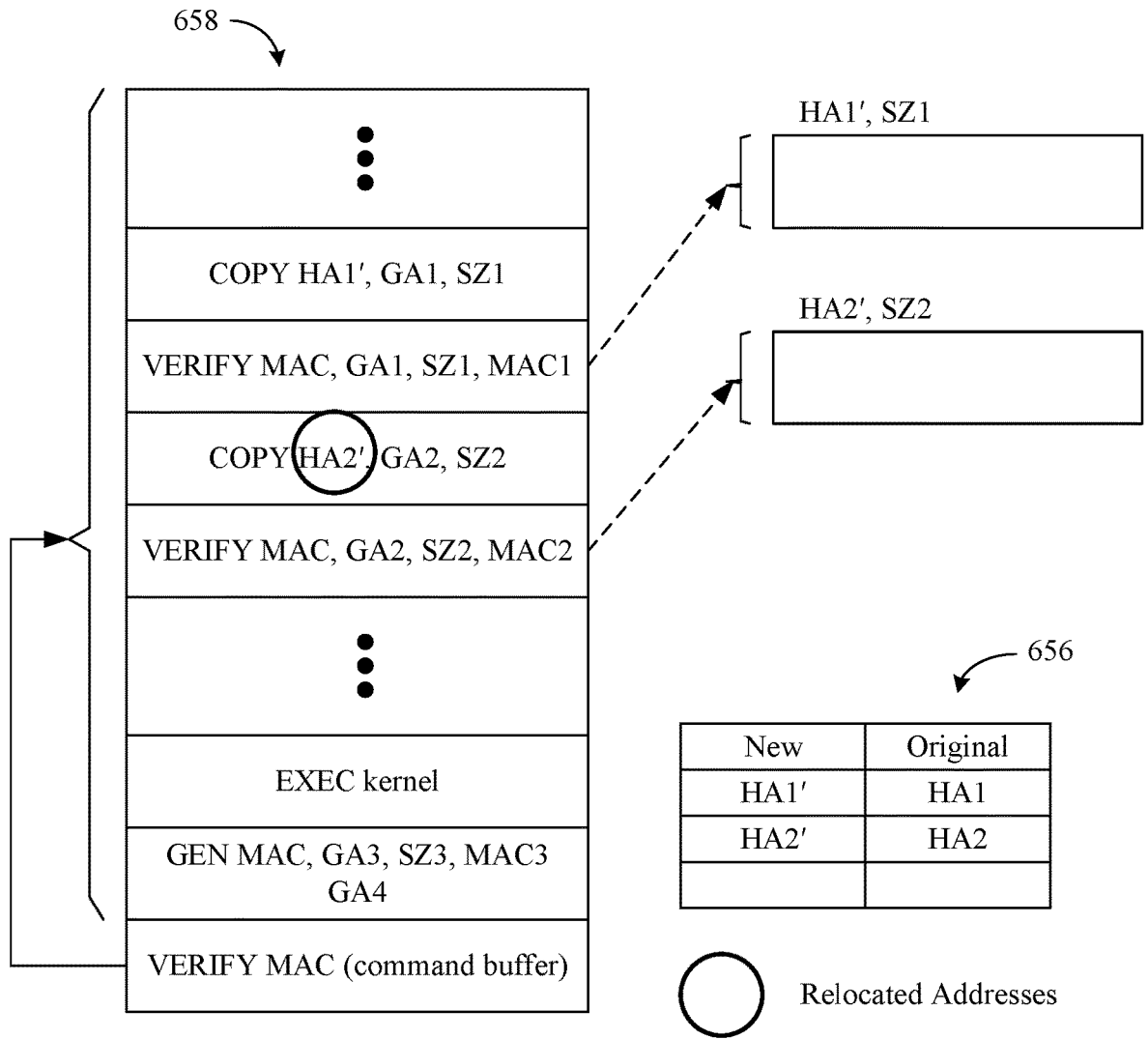
FIG. 6D is a block diagram of an example of a relocation dictionary according to an embodiment.

FIG. 6D shows a relocation dictionary (RD) 656, which is a data structure that contains one entry for each relocatable memory address in a command buffer 658. There are two fields for each entry 1) Original: the original address, and 2) New: the new address after relocation (e.g., determined by the patcher/driver).

To prepare the command buffer 658, the MAC for the command buffer 658 is computed as usual inside the application TEE with the original addresses of the buffers (e.g., "HA1", "HA2", which might be relocated) and every original relocatable address is added to an entry in the RD 656 (e.g., under an "Original" field). In patching, a driver may complete the RD 656 entries by adding the target relocation address (e.g., "HA1'", "HA2'", under "New" field).

For integrity verification, both the command buffer 658 and the RD 656 are given to the GPU. As the GPU computes the digest of the command buffer 658 for integrity verification, when a command with a relocatable address is encountered, the GPU uses the original address in the command buffer for the purpose of the digest. After use of the original address for the digest, the GPU replaces the old address with the new address in the RD 656 entry before the CS executes the command.

FIG. 6E shows a method 660 of operating a performance-enhanced computing system in which integrity protection is provided for command buffers. The method 660 may generally be implemented in a driver and/or patcher as described herein. More particularly, the method 660 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 660 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 662 provides for generating a master session key during an authentication key exchange between a graphics processor and a client application. In an embodiment, block 664 interleaves a plurality of verification commands with a plurality of copy commands in a command buffer. In one example, each copy command references one or more modifiable addresses. Additionally, each verification command may include a MAC derived from the master session key. Moreover, one or more of the plurality of verification commands may correspond to a copy command in the plurality of copy commands. In the illustrated example, a verification command at an end of the command buffer corresponds to contents of the command buffer (e.g., the entirety of the command buffer). In an embodiment, block 666 adds a MAC generation command to the command buffer, wherein the MAC generation command references an address of a compute result.

The illustrated method 660 therefore enhances performance and/or security at least to the extent that interleaving verification commands with copy commands facilitates integrity verification of data passed from the client application to the graphics processor. Additionally, using a verification command at the end of the command buffer to verify the integrity of the command buffer itself and using the MAC generation command to verify the integrity of results passed from the graphics processor further enhances performance.

FIG. 6F shows a method 670 of operating a performance-enhanced computing system in which integrity protection is provided for relocatable command structures. The method 670 may generally be implemented in a command streamer as described herein. More particularly, the method 670 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 672 provides for sequentially executing, by the command streamer, commands in a command buffer. In an embodiment, block 674 maintains a running digest of the commands executed by the command streamer, where block 676 copies the one or more modifiable addresses to a protected memory. Additionally, block 678 may track the modifiable address(es) and corresponding modified addresses in a relocation dictionary. In one example, block 680 conducts inline verifications of the modifiable address(es) based on the verification commands. Moreover, block 682 conducts a buffer verification of the contents of the command buffer based on the running digest and the relocation dictionary. The method 670 further enhances performance and/or security by maintaining the running digest, copying modifiable addresses to protected memory, and conducting inline verifications.

FIG. 6G shows a method 683 of operating a performance-enhanced computing system in which integrity protection is provided for chained command buffers. The method 683 may generally be implemented in a driver and/or patcher with respect to a buffer graph such as, for example, the buffer graph 638 (FIG. 6C), already discussed. More particularly, the method 683 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 684 provides for determining a first sequence number from a first set of sequence numbers associated with host-to-graphics processor transfers. Block 686 computes a reference MAC for a buffer graph node corresponding to the command buffer based on the first sequence number. In an embodiment, the reference MAC is included in the corresponding VERIFY MAC commands. When the command streamer executes the VERIFY MAC commands, the command streamer uses increasing sequence numbers (1, 2, 3, . . . ), implicitly, as processes successive buffers are processed. If the buffers were not executed in the correct order (e.g., because of an attacker manipulating the buffers in memory), the MAC computed by the Command Streamer will not match the reference MACs included in the VERIFY MAC because of mismatch between the sequence numbers.

FIG. 6G shows a method 688 of operating a performance-enhanced computing system in which integrity protection is provided for compute results. The method 688 may generally be implemented in a driver and/or patcher with respect to a buffer graph such as, for example, the buffer graph 638 (FIG. 6C), already discussed. More particularly, the method 683 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 690 provides for determining a second sequence number from a second set of sequence numbers associated with graphics processor-to-host transfers. Block 692 computes a reference MAC for a buffer graph node corresponding to the compute result based on the second sequence number.

CPU/GPU Multi-Party Compute for ML (FIGS. 7A-7D):

In doing calculations for ML (machine learning, e.g., deep neural networks/DNNs), it may often be beneficial to not permit a single tenant to have complete visibility to the entire neural network inference model (e.g., for confidentiality). Moreover, each compute engine may have better performance for some operations (e.g., linear layers in GPU, activation functions in CPU). Separation of compute between GPU and CPU may be done in various ways. For example, in one embodiment linear layers (e.g., matrix operations) are conducted in GPU hardware and non-linear (e.g., activation functions) are conducted in CPU hardware. Other partitioning approaches, however, may be used.

Figure 7A:
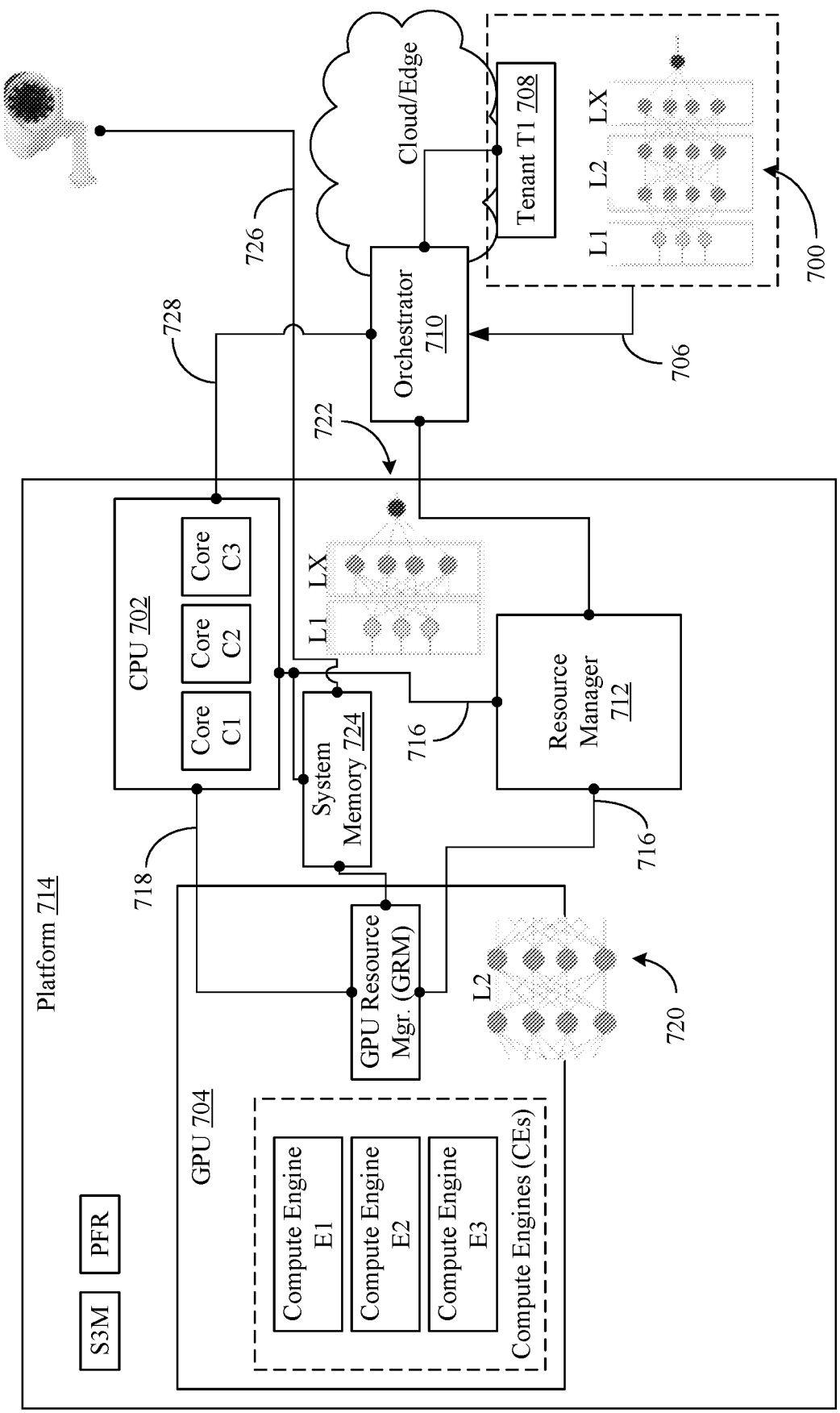
FIG. 7A is a block diagram of an example of a platform that supports multi-party compute for machine learning workloads according to an embodiment.

FIG. 7A shows a practical implementation in which secure multi-party computation involves the definition of the following primitives:

Partitioning an inference model 700 into sets of layers (e.g., "slices") for secure execution on separate compute units ("XPUs", which may be GPUs or CPUs);

Establishing trust between cores of a CPU 702 and compute engines of a GPU 704 (e.g., compute units) via mutual attestation and shared key provisioning;

Provisioning the layers/operations between the CPU 702 and the GPU 704; and Communicating data between the compute units using shared-protected memory (e.g., shared keys and multi-key total memory encryption/MK-TME).

In one example, the inference model 700 is compiled and a corresponding execution plan 706 is handed from a cloud and/or edge component associated with a tenant 708 ("Tenant T1") to an orchestrator 710 in accordance with one or more service level agreements (SLAs). The orchestrator 710 may instruct a resource manager 712 of a platform 714 to allocate resources and create slices for the resources such as, for example, compute engine "E1", compute engine "E2", core "C2", core "C3", etc. In an embodiment, the resource manager 712 allocates resources, creates slices, generates and provisions a shared key and issues messages 716 to inform each of the CPU 702, the GPU 704 and/or other resources (e.g., smart network interface card/SmartNIC, not shown) of the identity of the other.

The resources having assigned slices may perform a mutual attestation 718 based on the shared key, wherein inference starts based on an inference input 726 (e.g., image data from a camera) with respect to defined workloads. In the illustrated example, multiple compute engines of the GPU 704 are allocated to a first slice 720 (e.g., layer L2) and multiple cores of the CPU 702 are allocated to a second slice 722 (e.g., layers L1, Lx). Thus, inference may start with the CPU 702 (e.g., Component 1) until the execution plan 706 calls for a hand-off to another set of resources. To facilitate the hand-off, the CPU 702 may place temporary values (e.g., data values, control values) into a system memory 724 (e.g., shared memory), which is protected by the shared key. The CPU 702 may then trigger the GPU 704 (e.g., Component 2) to execute, with the hand-offs being repeated until the execution plan 706 is complete. The set of resources that was the last in execution plan 706 (e.g., Component X) may return an inference result 728 to the orchestrator 710. In an embodiment, the platform 714 also includes a Secure Systems Startup Module (S3M) and a Platform Firmware Resistance (PFR) module to further enhance security.

Figure 7B:
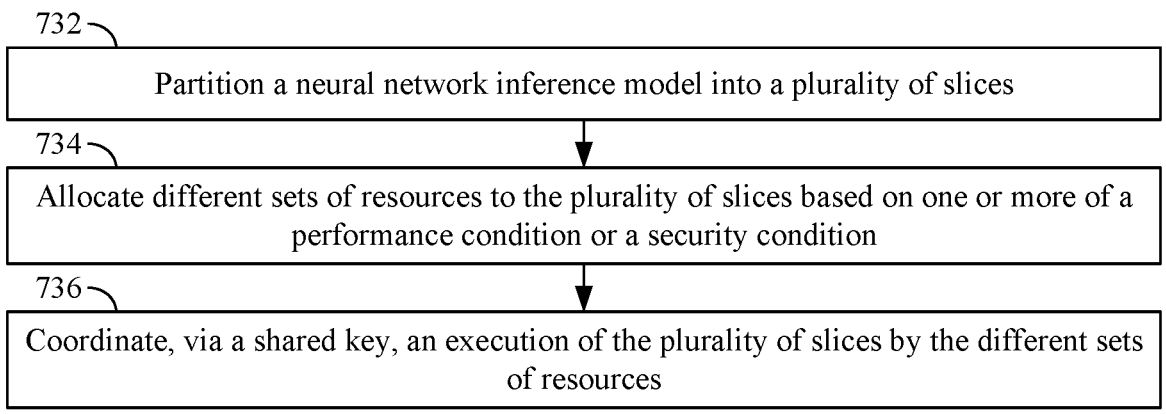
FIG. 7B is a flowchart of an example of a method of operating a performance-enhanced platform that supports multi-party compute for machine learning workloads according to an embodiment.

FIG. 7B shows a method 730 of operating a performance-enhanced computing system in which multi-party compute is enabled for ML workloads. The method 730 may generally be implemented in a platform resource manager such as, for example, the resource manager 712 (FIG. 7A), already discussed. More particularly, the method 730 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 732 provides for partitioning a neural network inference model into a plurality of slices. For example, the plurality of slices might include a first slice (e.g., first set of neural network layers), a second slice (e.g., second set of neural network layers), and so forth. While two slices are used to facilitate discussion, the number of slices may be greater than two depending on the circumstances. In an embodiment, block 732 partitions the inference model based on one or more of a performance condition or a security condition. For example, the performance condition may take into consideration whether the inference model contains linear layers or activation functions, which have different performance characteristics. Thus, the first slice might contain linear layers, with the second slice containing activation functions. Additionally, the security condition may take into consideration whether confidentiality concerns prevent a single tenant from having complete visibility to the entire inference model. In such a case, the first slice might contain non-confidential (e.g., less sensitive) layers, with the second slice containing confidential layers.

Block 734 allocates different sets of resources to the plurality of slices based on one or more of the performance condition or the security condition, where illustrated block 736 coordinates, via a shared key, an execution of the plurality of slices by the different sets of resources. The method 730 therefore enhances performance and/or security at least to the extent that different portions of the neural network inference model may be directed to different sets of resources based on performance and/or security constraints/conditions. Moreover, the use of a shared key to coordinate execution of the slices provides an additional level of protection.

Figure 7C:
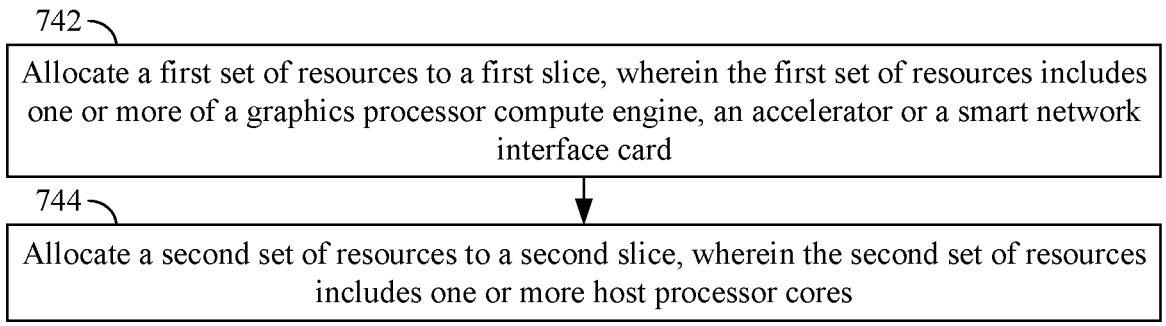
FIG. 7C is a flowchart of an example of a method of allocating different sets of resources to a plurality of slices according to an embodiment.

FIG. 7C shows a method 740 of allocating different sets of resources to a plurality of slices. The method 740 may generally be incorporated into block 734 (FIG. 7B), already discussed. More particularly, the method 740 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 742 provides for allocating a first set of resources to a first slice, wherein the first set of resources includes one or more of a graphics processor compute engine, an accelerator (e.g., FPGA) or a SmartNIC. In an embodiment, block 744 allocates a second set of resources to a second slice, wherein the second set of resources includes one or more host processor cores. As already noted, the allocations may be based on performance conditions and/or security conditions.

For example, if the first slice contains linear layers, the allocation of graphics processor, accelerator and/or Smart- NIC resources to the first slice might provide performance benefits. Similarly, if the second slice contains activation functions, the allocation of host processor resources to the second slice may be advantageous from a performance perspective. Additionally, if the first slice contains non-confidential layers, allocation of graphics processor, accelerator and/or SmartNIC resources to the first slice may be suitable from a security perspective. If the second slice contains confidential layers, allocating host processor resources to the second slice may enable enhanced security. Other security concerns such as different tenant ownership may also be taken into consideration when allocating platform resources.

Figure 7D:
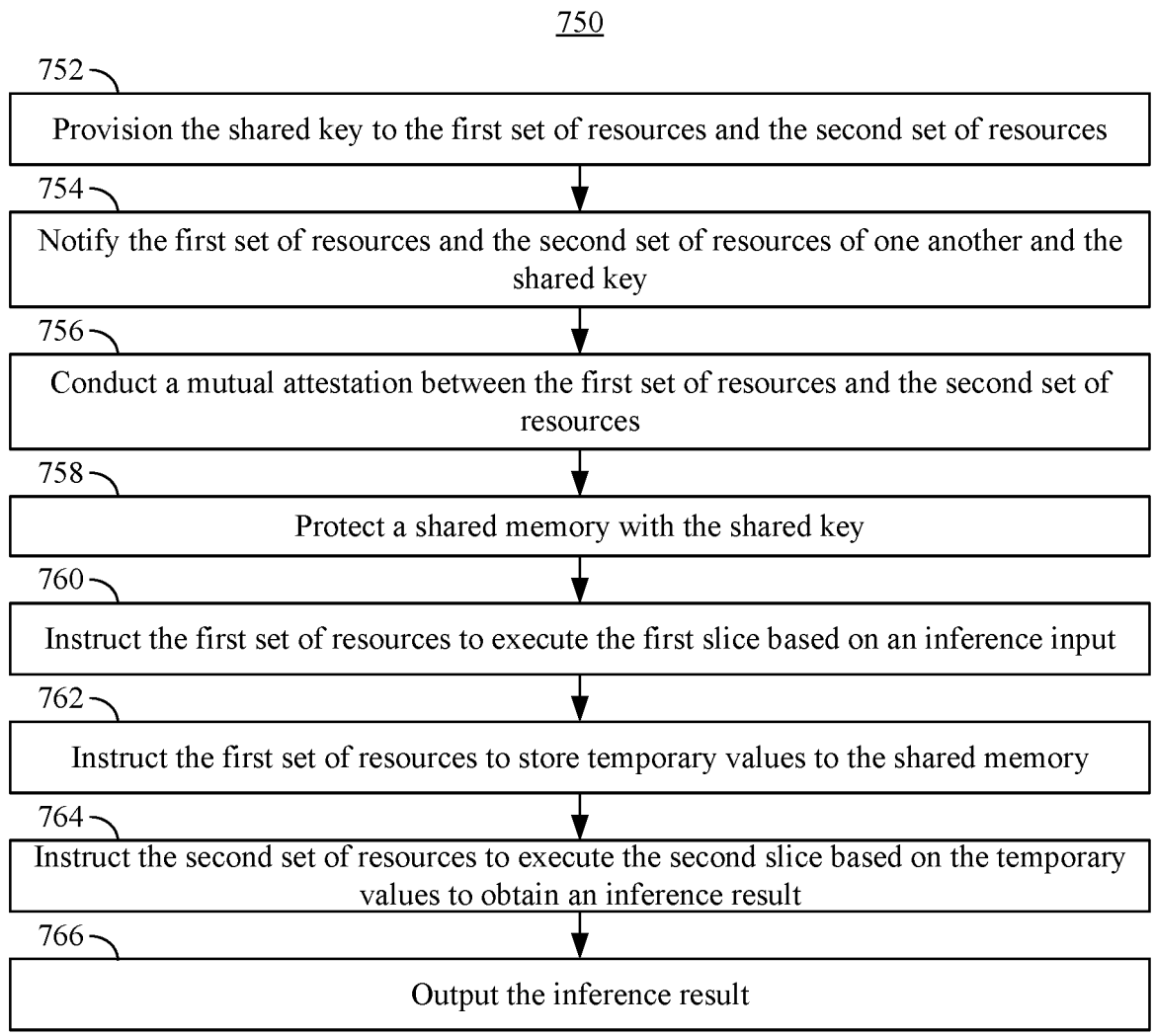
FIG. 7D is a flowchart of an example of a method of coordinating an execution of a plurality of slices according to an embodiment.

FIG. 7D shows a method 750 of coordinating the execution of a plurality of slices by different sets of resources. The method 750 may generally be incorporated into block 736 (FIG. 7B), already discussed. More particularly, the method 750 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 752 provisions a shared key to a first set of resources and a second set of resources, wherein block 754 notifies the first set of resources and the second set of resources of one another and the shared key. In an embodiment, block 756 conducts (e.g., as requested and/or instructed by the platform resource manager) a mutual attestation between the first set of resources and the second set of resources. In one example, block 758 protects a shared memory with the shared key. Additionally, block 760 may instruct the first set of resources to execute the first slice based on an inference input, wherein block 762 instructs the first set of resources to store temporary values (e.g., data and/or control values) to the shared memory. Block 764 may instruct the second set of resources to execute the second slice based on the temporary values. In one example, block 764 generates an inference result. In another example, block 764 may be repeated for multiple hand-offs between different sets of resources and corresponding slices until an inference result is obtained. Illustrated block 766 outputs the inference result (e.g., via a network controller, user interface device, etc.). The method 750 therefore further enhances performance and/or security via mutual attestation, protected memory and/or iterative hand-offs between different sets of resources (e.g., having different performance and/or security characteristics).

GPU FW Update Counters (Secured Telemetry) (FIGS. 8A-8C):

GPU Compute Engines (CEs) may include complex firmware (FW), software (SW), bitstreams and system software (SW) that is updated after deployment. Updates are controlled to ensure that established trust states remain valid across an update event.

In an embodiment, CEs have access to FW state-change counters (FSCs) in hardware that track FW, SW and/or subversion (SVN) update activity. The FSC state may be included in attestation reports to manageability consoles, orchestrators, and peers as a way for those entities to detect when a trust-relevant state becomes stale. CEs may also ensure that an established tenant-CE context can be migrated to an updated state.

In one example, FW updates comply with National Institute of Standards and Technology (NIST) requirements according to, for example, NIST SP800-193, Platform Firmware Resiliency Guidelines, May 2018, and related documents. Embodiments may incorporate compliance requirements with analytics engines that have the capability of auditing and recording state changes for compliance and third-party review purposes.

Figure 8A:
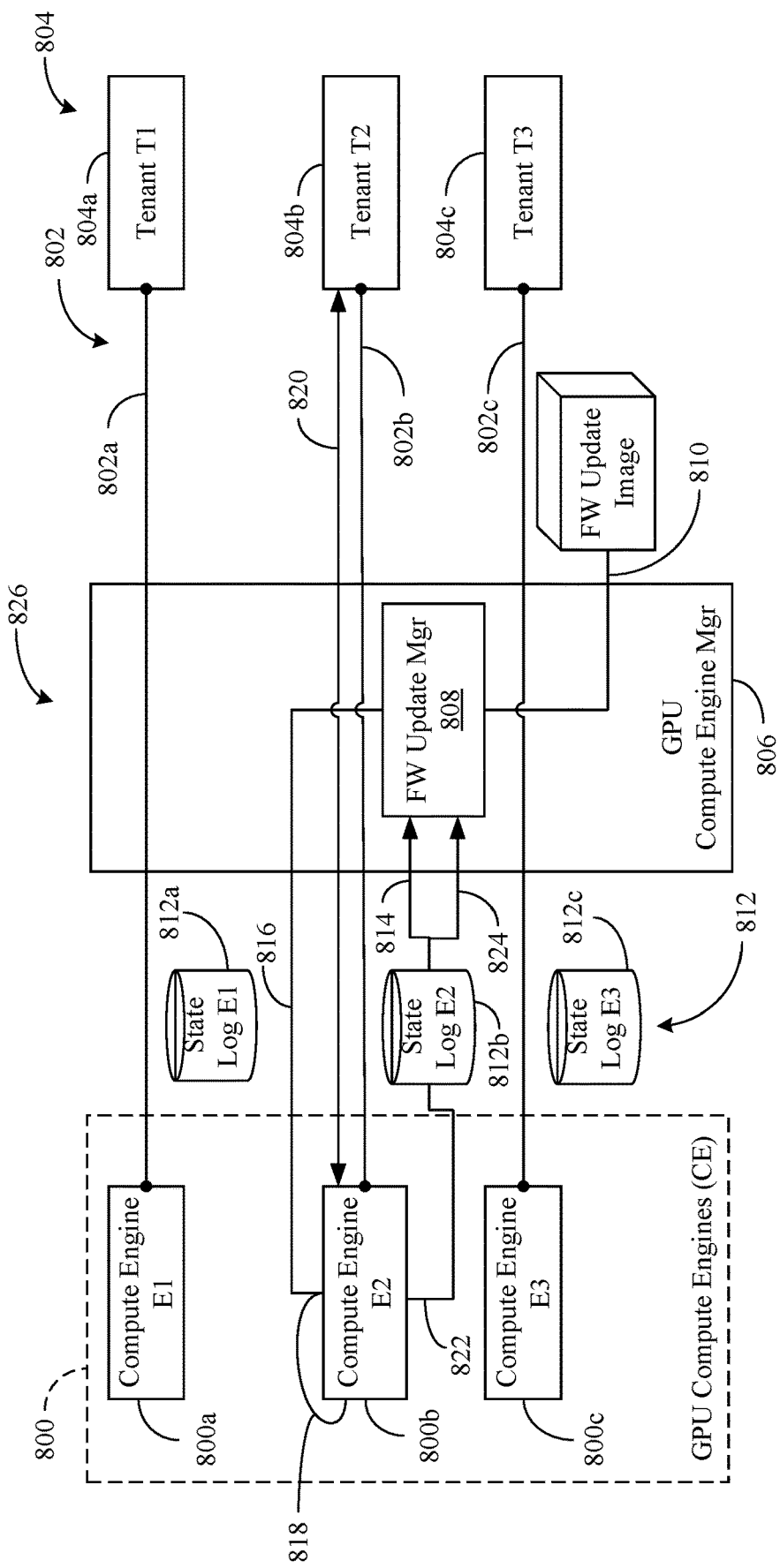
FIG. 8A is a block diagram of an example of a graphics processor architecture that supports firmware updates according to an embodiment.

As shown in FIG. 8A, compute engines (CEs) 800 (800a-800c) of a graphics processor 826 may have established (e.g., attested) trust contexts 802 (802a-802c, e.g., contexts C1, C2, C3) with tenants 804 (804a-804c) when a FW update event occurs (e.g., monthly "push"). In an embodiment, a compute engine manager 806 includes a GPU FW update manager (GFUM) 808 that receives a notification 810 of the FW update event/image and coordinates the update while maintaining the tenant context. In one example, the CEs 800 need not enter a reset state but if so, the CEs 800 can recover to a known trust state using a state log 812 (812a-812c). The tenants 804 and CEs 800 have existing session keys and context that can be updated (e.g., rotated) to reflect the FW update impact. For example, if the session keys are derived from a CDI (compound device identity) value, then a new CDI may be generated that includes a measurement of the updated FW. The session keys may also contain the anticipated new FSC value.

For example, the FW update notification 810 may trigger the GFUM 808 to initiate the state change procedure, where there is an established trust context 802b between a CE 800b ("E2") and a tenant 804b ("T2"). In an embodiment, session, attestation and identity keys are tied to an established trust context 802b.

In one example, the GFUM 808 obtains state information 814 about the current CE state (S1) from a state log 812b. The current state-change counter (FSC) may also be available via the state log 812b or via an interface to root of trust (RoT) HW. In an embodiment, the GFUM 808 updates key generation seeds, keys and attestation information that were inputs to the state S1.

Pre-rotated CE keys 816 may be generated according to procedures such as, for example, DICE (Device Identifier Composition Engine) layering. In one example, an update to the GFUM 808 or other component deeper in the graphics processor 826 cascades changes to seed values and key generations such that if the tenant 804b maintains a trust context for the deeper components, key rotation of the deeper components also occurs.

In an update operation 818, the CE 800b may write volatile data and context to non-volatile memory, log the state transition event, request an atomic "bump" (e.g., increment) of the FSC, and install the FW update. In an embodiment, the installation is a binary patch that does not involve a reset of the CE 800b.

Upon successful completion of the update and key pre-rotation events, the existing keys/session is used to conduct a migration 820 of the tenant trust state to the new environment and keys. For example, another attestation event may be processed, with session keys being re-generated (e.g., Transport Layer Security/TLS request-client-helo command).

The CE 800b and FSC RoT may issue an update message 822 to the state log 812b reflecting the switch to a new state "S2". In an embodiment, the GFUM 808 receives a notification 824 of the state change to S2.

FIG. 8B shows a method 830 of operating a performance-enhanced computing system. The method 830 may generally be implemented in a graphics processor such as, for example, the graphics processor 826 (FIG. 8A), already discussed. More particularly, the method 830 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 832 provides for obtaining, by an update manager, current state information from a state log in response to a request to perform a firmware update in a compute engine. In the illustrated example, the compute engine has an established trust context with a tenant application. In an embodiment, block 834 automatically pre-rotates, by the update manager, keys for a new trust context. The keys may include a session key, an attestation key and/or an identity key. The illustrated method 830 therefore enhances performance at least to the extent that pre-rotating the keys ensures that the established trust state will remain valid across the update event.

FIG. 8C shows another method 840 of operating a performance-enhanced computing system. The method 840 may generally be implemented in a graphics processor such as, for example, the graphics processor 826 (FIG. 8A), already discussed. More particularly, the method 840 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 842 provides for incrementing, by the compute engine, a state change counter. In an embodiment, the state change counter is located in a hardware root of trust. Block 844 may conduct, by the compute engine, the firmware update. In one example, the firmware update includes a write of volatile data and the new trust context to a non-volatile (NV) memory and a creation of a new transition entry in the state log. Illustrated block 846 may migrate, by an engine manager containing the update manager, the established trust context to the new trust context based on the pre-rotated keys. Additionally, block 848 may update, by the compute engine, the state log based on the new trust context. In an embodiment, block 848 also notifies a compliance component of the new trust context. The method 840 therefore further enhances performance at least to the extent that the firmware update is controlled to ensure that the established trust state remains valid across the update event.

Cloud/Edge SLA Tenant Context Integrated into GPU Engines (FIGS. 8D-8F):

GPU Compute Engines (CEs) may operate on multi-tenant workloads that involve the assignment of CE resources to tenant contexts. CEs may also require isolation of both execution code, data and control signals. Additionally, edge/cloud orchestrators may use SLA context to control tenant workload scheduling and to establish isolated execution contexts that are provisioned/deprovisioned as part of tenant-specific workload scheduling.

In an embodiment, GPUs are constructed with CE-specific HW latch structures that gate access to resources allocated to a CE. The latch controls tenant occupation state. An orchestrator may interact with platform Resource Director Technology (RDT), which in turn interfaces with a GPU Resource Manager (GRM) that manages latch resources. In one example, these three entities coordinate tenant workload scheduling to ensure that tenants leave no trace upon workload completion and only enter tenant-specific execution environments once it is safe to enter. The platform RDT may provide node and cluster level SLAs that coordinate CPU environments (e.g., Software Guard Extensions/SGX TEE) with GPU CEs for improved workload pipelining, etc. In this situation, the HW latch may be shared between CPU and GPU to ensure that a tenant resource context switch occurs reliably and safely.

Figure 8D:
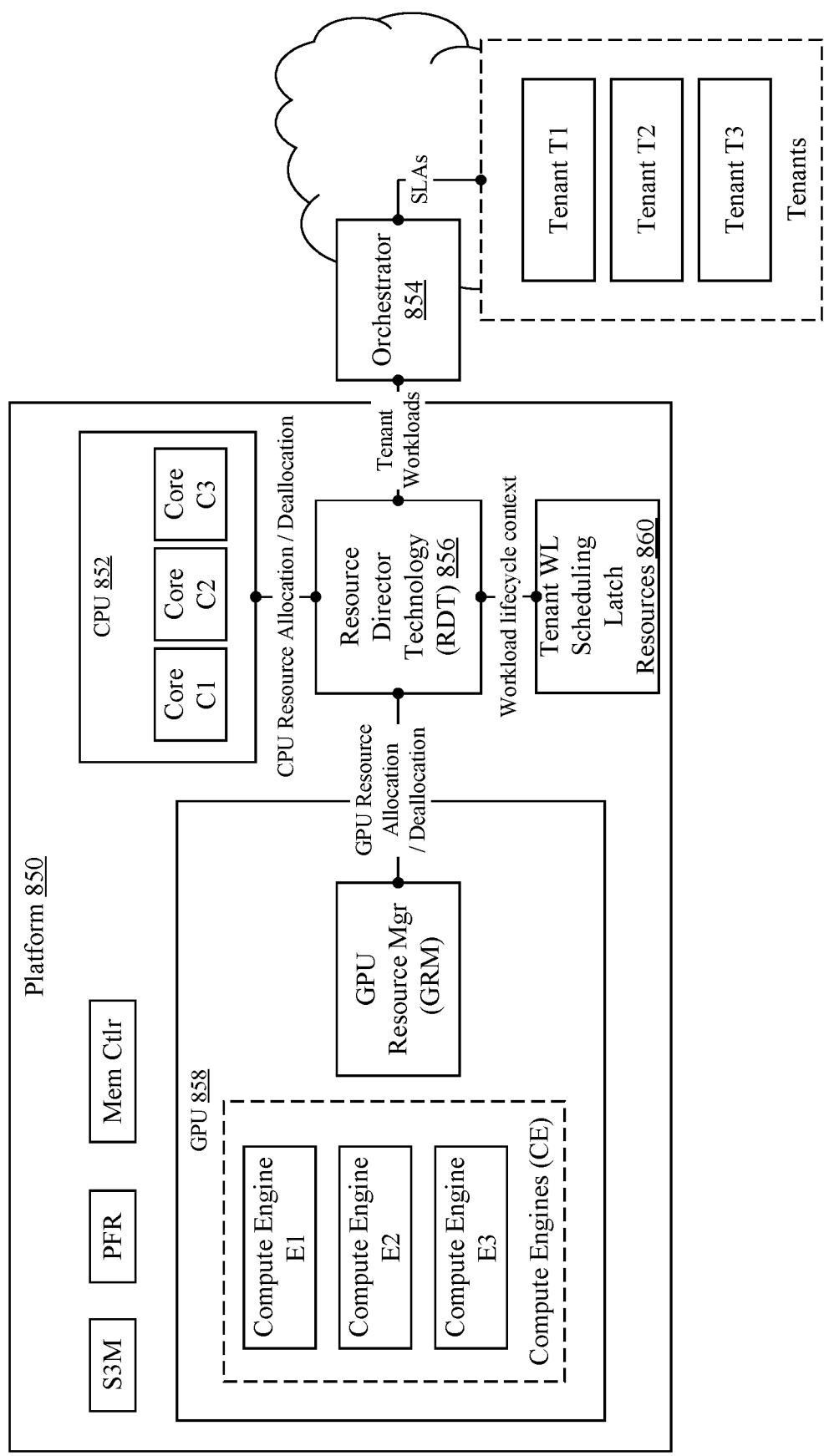
FIG. 8D is a block diagram of an example of a performance-enhanced computing system that supports latch-based context switches according to an embodiment.

As shown in FIG. 8D, a platform 850 may include a cloud/edge workload scheduler service (WSS) running on one or more cores of a CPU 852 that interacts with an orchestrator 854 to schedule tenant workloads. In an embodiment, the WSS uses resource director technology (RDT) 856 (e.g., including logic instructions, configurable logic, fixed-functionality hardware logic, etc., or any combination thereof) to manage the allocation/deallocation of execution resources including CPU 852 cores, GPU 858 compute engines, memory, storage, etc. The RDT 856 may also manage workload lifecycle consistency using HW latch resources 860 (see, e.g., NIST Special Publication (SP) 800-193) that maintain state information about tenant workload tasks and the platform resources assigned to each tenant.

When the GPU 858 and other platform accelerators (e.g., FPGAs), processors and controllers are in the process of allocating tenant-specific resources, a latch resource indicates the pending state. When resource allocation is finalized, the latch state changes to indicate that the tenant workload (WL) is ready. The RDT 856 may authorize attestation of all platform resources allocated to the tenant as a pre-condition of scheduling. Alternatively, the RDT 856 may allocate and provision the WL, and then allow attestation to report the post-provisioned state. The latch state may additionally be included in the attestation report to ensure that the expected safety and reliability properties specified by tenant SLA are in force.

Figure 8E:
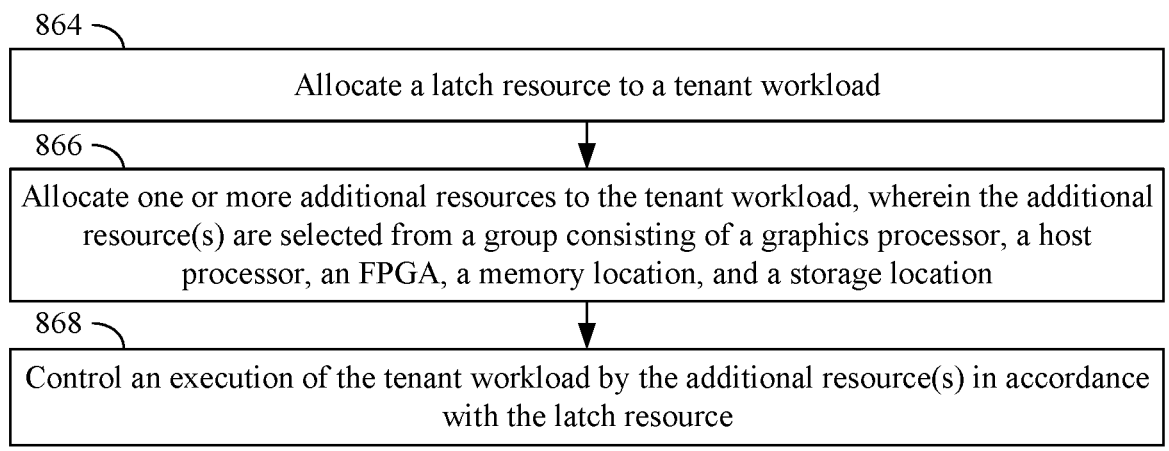
FIG. 8E is a flowchart of an example of a method of operating a performance-enhanced computing system to conduct latch-based context switches according to an embodiment.

FIG. 8E shows a method 862 of operating a performance-enhanced computing system. The method 862 may generally be implemented in a platform such as, for example, the platform 850 (FIG. 8D), already discussed. More particularly, the method 862 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 864 provides for allocating a latch resource to a tenant workload. In an embodiment, block 864 includes determining a resource requirement for the tenant workload based on an SLA, querying a WSS for available resources, initiating, by the WSS, a resource allocation based on the resource requirement and the available resources, and selecting the latch resource from a hierarchical set of latch resources. Additionally, the resource allocation may be initiated via RDT.

Block 866 may allocate one or more additional resources to the tenant workload, wherein the additional resource(s) are selected from a group consisting of a graphics processor, a host processor, an FPGA, a memory location, and a storage location. Additionally, block 868 controls an execution of the tenant workload by the additional resource(s) in accordance with the latch resource. The method 862 enhances performance at least to the extent that the latch resource ensures that tenant resource context switches occur reliably and safely.

Figure 8F:
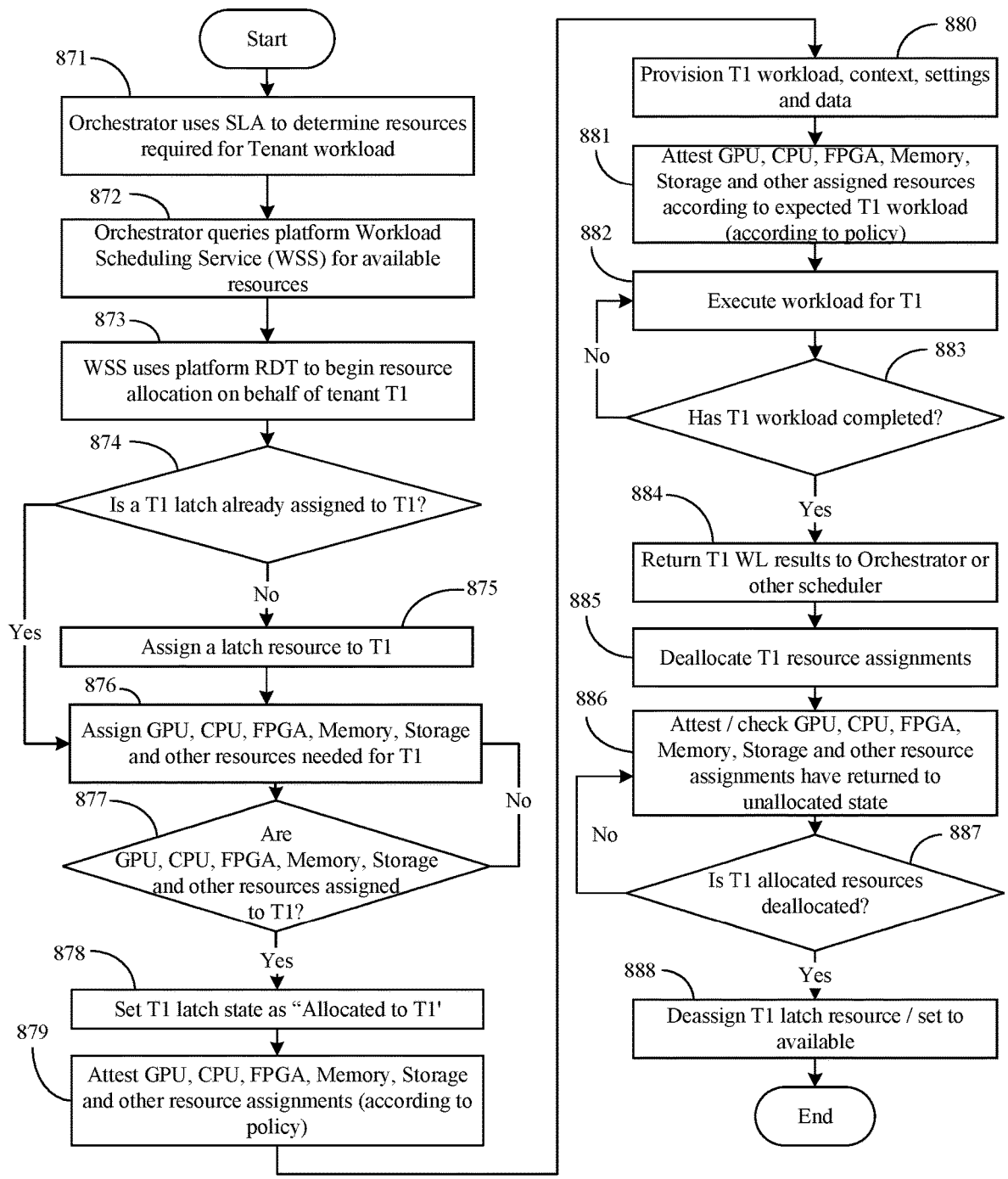
FIG. 8F is a more detailed flowchart of an example of a method of operating a performance-enhanced computing system to conduct latch-based context switches according to an embodiment.

FIG. 8F shows a more detailed method 870 of operating a performance-enhanced computing system. The method 870 may generally be implemented in a platform such as, for example, the platform 850 (FIG. 8D), already discussed. More particularly, the method 870 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 871 provides for the use of an SLA by an orchestrator to determine resources required for a tenant workload. Additionally, the orchestrator may query a WSS for available resources at block 872. In an embodiment, the WSS uses a platform RDT at block 873 to begin resource allocation on behalf of tenant workload "T1". In one example, a determination is made at block 874 as to whether a T1 latch is already assigned to T1. If not, block 875 assigns a latch resource to T1. If it is determined at block 874 that a T1 latch is already assigned to T1, the method 870 bypasses block 875 and assigns GPU (e.g., graphics processor), CPU (e.g., host processor), FPGA (e.g., accelerator), memory, storage and other resources needed for T1 at block 876.

Additionally, a determination may be made at block 877 as to whether the GPU, CPU, FPGA, memory, storage and other resources have been assigned/allocated to T1. If not, the method 870 returns to block 876. Otherwise, block 878 sets the T1 latch state as "Allocated to T1". In an embodiment, block 879 attests to the GPU, CPU, FPGA, memory, storage and other resource assignments in accordance with a security policy. In one example, block 880 provisions the T1 tenant workload with context information, settings and data. Additionally, block 881 attests to the GPU, CPU, FPGA, memory, storage and other assigned resources according to the expected T1 workload in accordance with the security policy.

Illustrated block 882 executes the T1 tenant workload, where a determination is made at block 883 as to whether the execution has completed. If not, the method 870 returns to block 882. Otherwise, block 884 may return the T1 tenant workload results to the orchestrator or other scheduler. In an embodiment, the T1 resource assignments are deallocated at block 885. Additionally, block 886 may attest/check that the GPU, CPU, FPGA, memory, storage and other resource assignments have returned to the unallocated state. Block 887 determines whether the T1 allocated resources have been deallocated. If not, the method 870 returns to block 886. Otherwise, block 888 de-assigns the T1 latch resource and sets the latch resource as available.

Accordingly, the method 870 demonstrates that the GPU resource manager (GRM) may apply another layer of latch control as GPU compute engines and other GPU resources may be substantial and the SLA requires high assurance of correct operation. Additionally, the RDT and GRM may share access to latch resources and a hierarchy of latch resources may be used to ensure acyclic allocation/deallocation.

Figure 9A:
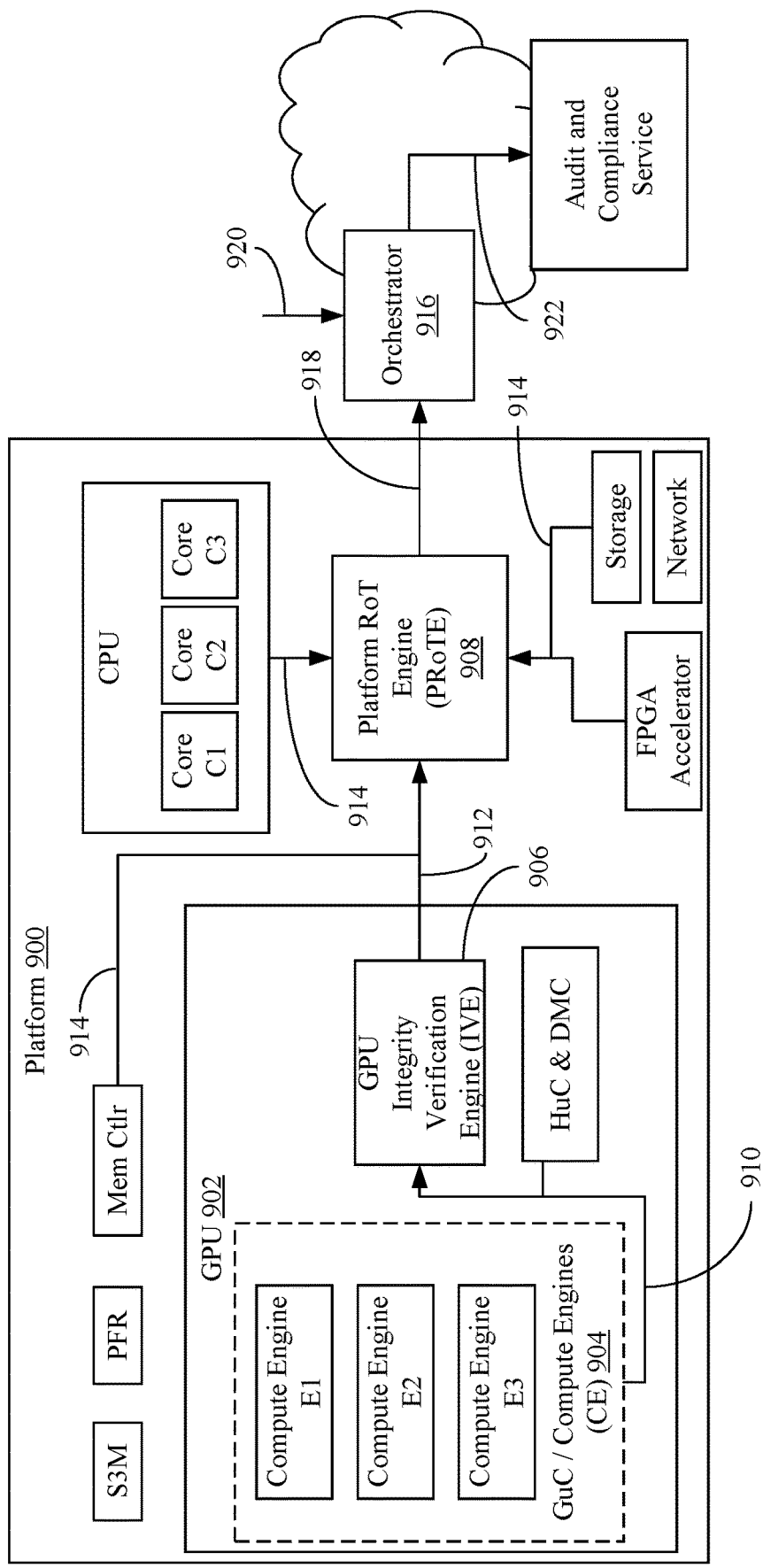
FIG. 9A is a block diagram of an example of a performance-enhanced computing system that includes a GPU integrity verification engine (WE) according to an embodiment.

GPU Integrity Verification Engine (FIGS. 9A-9C):

Turning now to FIG. 9A, a platform 900 includes a GPU 902 that controls a set resources including compute engines 904, memory, memory encryption engines, AI acceleration engines, FPGAs, etc., where the resources controlled by the GPU 902 may have complex boot and operational states. Improper operation can result in security concerns, safety concerns and unreliable operation.

In an embodiment, a GPU integrity verification engine (IVE) 906 is used to asynchronously monitor the operational and boot states of various GPU resources and operating environments (graphics microcontroller/GuC, host microcontroller/HuC, display, etc.). The monitoring may include attestation, telemetry and other ways to detect unexpected/unauthorized modification of GPU resources and execution environments. In one example, the WE 906 analyzes boot and operational states to identify unexpected operational states or transitions between states. The IVE 906 may also interact with a Platform Root-of-trust Engine (PRoTE) 908 that queries an attestation status of the GPU 902 compute environment and/or resources that may be reported to an external integrity verifier such as a cloud or edge orchestrator 916, a user agent or an audit and compliance service. Thus, the illustrated WE 906 determines compute engine (CE) attestation and telemetry information 910 and reports GPU attestation and telemetry information 912 to the PRoTE 908.

The PRoTE 908 may also query other platform resources with respect to compute integrity (e.g., CPU, FPGA, baseboard management controller/BMC, SGX etc.). Thus, the illustrated WE 906 also determines additional attestation and telemetry information 914 and reports platform attestation and telemetry information 918 to the orchestrator 916. In an embodiment, a gradient of service SLAs 920 featuring composite secure boot and operational states may be used to create an audit and compliance report 922 for platform-level audit and compliance assessments. Because the GPU WE 906 may collect attestation and telemetry independently from tenant workloads, platform-level trust assessments, monitoring and lifecycle management may be achieved.

Figure 9B:
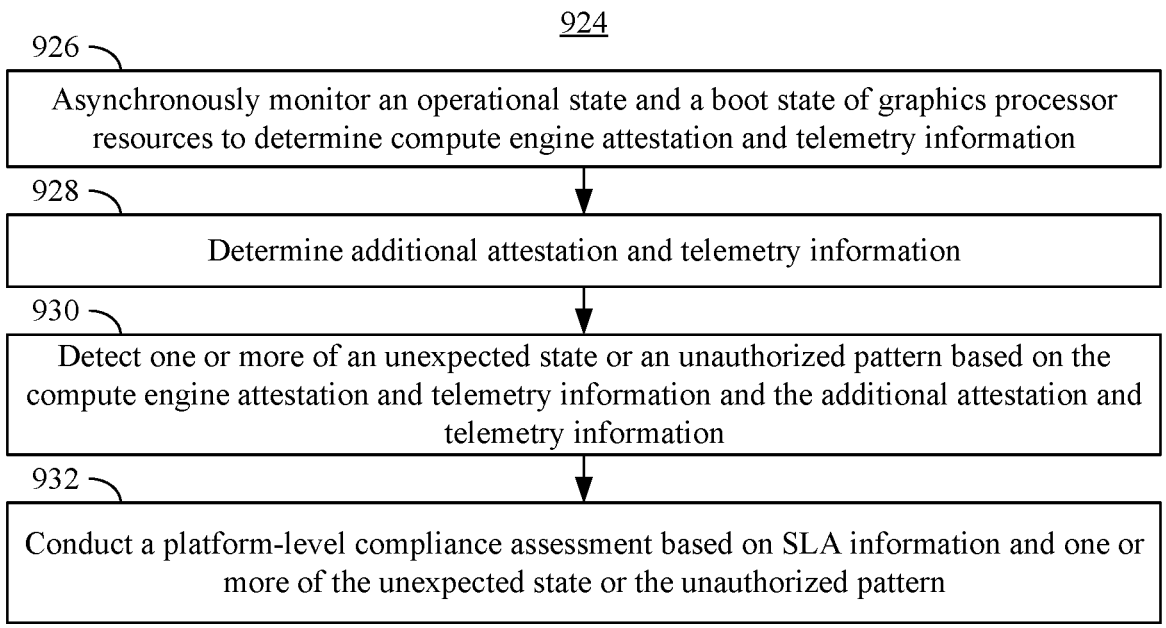
FIG. 9B is a flowchart of an example of a method of operating a performance-enhanced computing system to achieve service level agreement security compliance according to an embodiment.

FIG. 9B shows a method 924 of operating a performance-enhanced computing system. The method 924 may generally be implemented in a platform such as, for example, the platform 900 (FIG. 9A), already discussed. More particularly, the method 924 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 926 asynchronously monitors an operational state and a boot state of graphics processor resources to determine compute engine attestation and telemetry (e.g., power and/or bandwidth measurement) information. In one example, the compute engine and telemetry information is determined independently from one or more tenant workloads (e.g., the monitoring may continue as tenant workloads are activated and deactivated). In an embodiment, block 928 determines additional attestation and telemetry information. The additional attestation and telemetry information may be associated with one or more of a host processor, a memory controller, an accelerator, or a storage device. Block 930 detects one or more of an unexpected state or an unauthorized pattern of behavior based on the compute engine attestation and telemetry information and the additional attestation and telemetry information. Illustrated block 932 conducts a platform-level compliance assessment based on SLA information and one or more of the unexpected state or the unauthorized pattern.

The method 924 therefore enhances performance at least to the extent that complex boot and operational states may be used to automatically detect security concerns, safety concerns and/or unreliable operation.

Figure 9C:
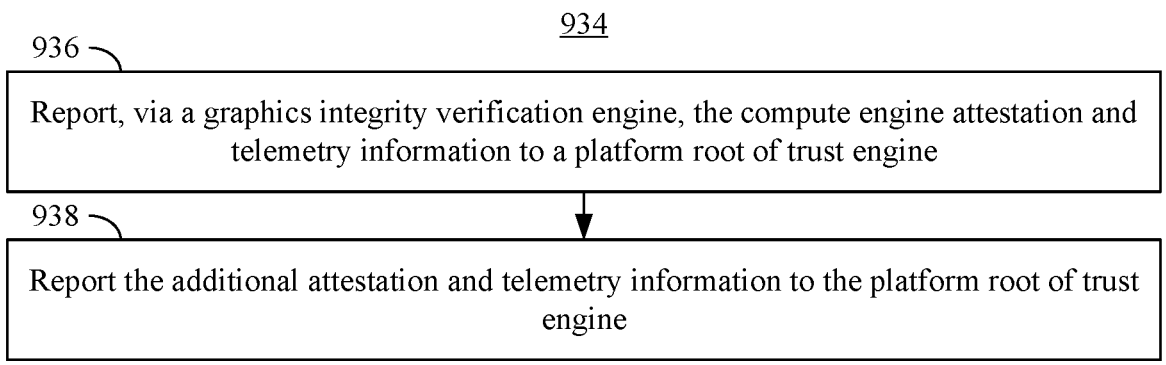
FIG. 9C is a flowchart of an example of a method of reporting attestation and telemetry information according to an embodiment.

FIG. 9C shows a method 934 of operating a performance-enhanced computing system to report attestation and telemetry information. The method 934 may generally be implemented in a platform such as, for example, the platform 900 (FIG. 9A), already discussed. More particularly, the method 934 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 936 provides for reporting, via a graphics integrity verification engine, compute engine attestation and telemetry information to a platform root of trust engine. Additionally, block 938 may report additional attestation and telemetry information to the platform root of trust engine. The method 934 therefore further enhances performance and/or security by involving the platform root of trust engine in the reporting of attestation and telemetry information.

Supply Chain Tracking of GPU Engines Using Manufacturer Embedded Identity (FIGS. 9D-9G):

Platforms containing discrete GPUs and CPUs with integrated GPUs may be sourced by multiple suppliers. Additionally, suppliers may provide grey market parts that are low-quality or even malicious. Device ID technology such as manufacturing certifications, DICE (device identifier composition engine) and others enable end customers to verify that an original equipment manufacturer (OEM) originated a platform. The trusted OEM is unable, however, to track suppliers of GPUs and GPU internal componentry at a finer granularity.

In an embodiment, GPU components are manufactured with a Supplier Device Identity (SDevID) that becomes active when a component leaves a supplier and arrives at an OEM, original component manufacturer (OCM), etc. Thus, the SDevID and supplier-community may electronically track parts in the supply chain. Use of distributed ledger technology (DLT) may also be used to democratize the supply chain and improve scalability. In one example, the SDevID is connected to a wireless credential exchange (WCE) capability using a radio frequency identifier (RFID) that enables each component to be tracked even without powering the device. Moreover, RFID enables enforcement of geo-specific policies, which may be imposed by governments or supply chain consortia. Other components such as CPUs, micro-controller, accelerators, FPGAs, security co-processors and converged security and management engines (CSMEs), etc., may also be tracked at different stages of the supply chain as discrete components, IP (intellectual property, e.g., functional) blocks, synthesized designs or chiplets.

The SDevID may also function while GPU parts are operational within a specific client device, edge networking device or data center. Such an approach enables attestation by a user or management provider interested in verifying supply chain provenance with a current deployment. Additionally, the SDevID may differ from more traditional IDevID (see, 802.1AR-2018 IEEE Standard for Local and Metropolitan Area Networks—Secure Device Identity) in that a platform may have many SDevIDs, with each attesting to a different aspect of supply chain.

Use of physically unclonable function (PUF) technology may ensure that the SDevID cannot be changed even with physical access/tampering. With regard to privacy, "blinding" of sensitive tracking information may be applied to platform component data/metadata to prevent unauthorized disclosure of privacy or time sensitive information while progressing through a supply chain. Additionally, "un-blinding" may be applied for authorized entities using access tokens. The supply chain blinding service (SCBS) may be used to issue blinding tokens that supplies a blinding value and a corresponding unblinding value to authorized entities. Blinded values may be contributed to a DLT (which is generally public but can be permissioned or semi-permissioned) that may track the component reliably without reliance on a central entity that may be a central point of failure or central point of attack.

Figure 9D:
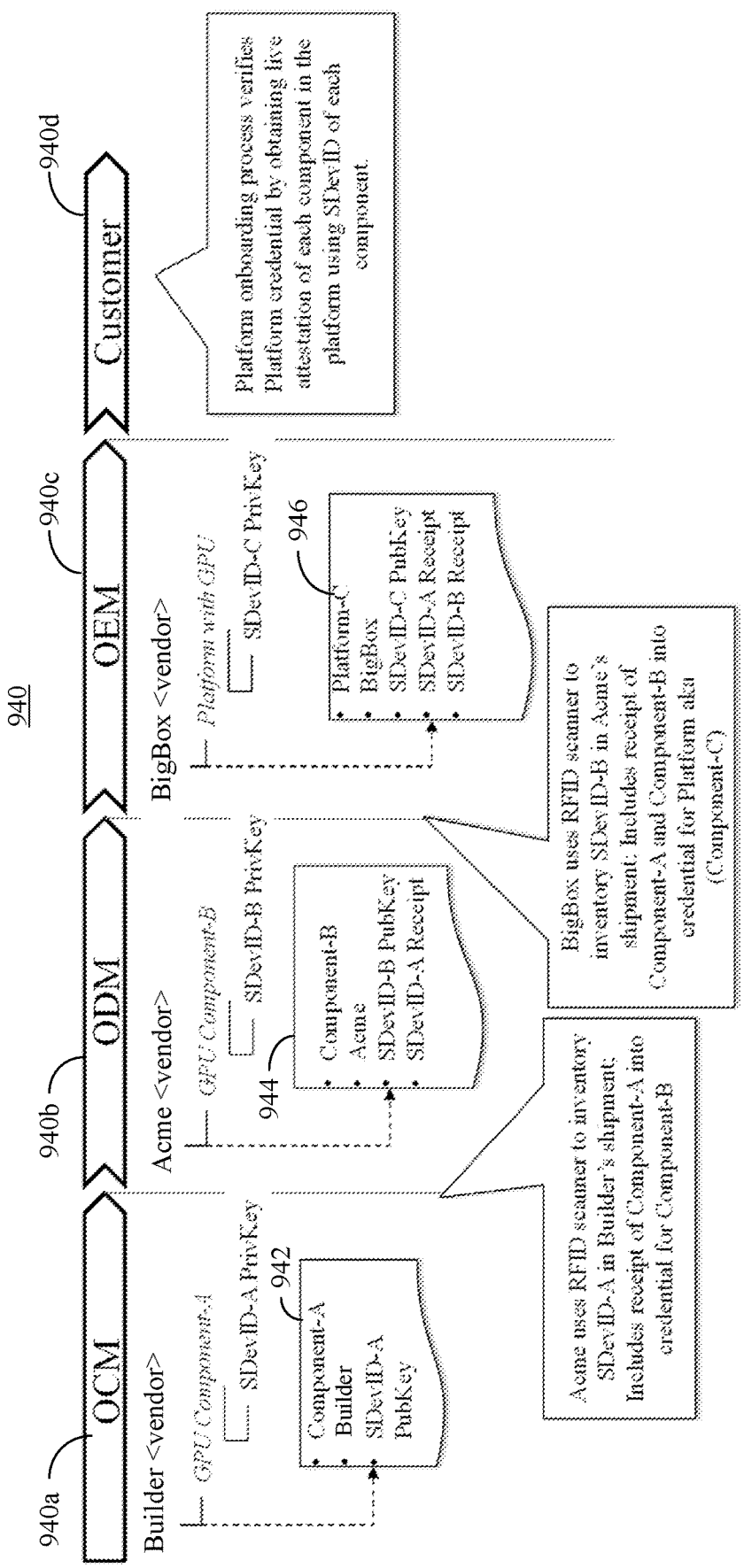
FIG. 9D is an illustration of an example of a graphics processor component supply chain according to an embodiment.

Turning now to FIG. 9D, a supply chain 940 (940a-940d) is shown for a platform containing graphics processor components. In general, the supply chain 940 includes an OCM stage 940a, an original device manufacturer (ODM) stage 940b, an OEM stage 940c, and a customer stage 940d. At the OCM stage 940a, a first entity ("Builder") creates first graphics processor component ("GPU Component-A"), which contains a first private key ("SDevID-A PrivKey") in a hardware root of trust (RoT) of the first graphics processor component. In an embodiment, the first entity generates a first RFID 942 (e.g., tag mounted to the first graphics processor component and/or packaging of the first graphics processor component) that includes a first public key ("SDevID-A PubKey", corresponding to the first private key), a first component identifier ("Component-A"), and a first manufacturer identifier ("Builder"). In the illustrated example, the first entity ships the first graphics processor component to a second entity ("Acme").

At the ODM stage 940b, the second entity creates a second graphics processor component ("GPU Component-B"), which contains a second private key ("SDevID-B PrivKey") in a hardware ROT of the second graphics processor component. In an embodiment, the second entity uses an RFID scanner to inventory the first RFID 942 via a WCE. Upon detecting the first public key, the first component identifier, and the first manufacturer identifier, the second entity may embed a first receipt ("SDevID-A Receipt", e.g., manifest) in a second RFID 944 (e.g., tag mounted to the second graphics processor component and/or packaging of the second graphics processor component). As will be discussed in greater detail, the second entity may conduct an authentication of the first graphics processor component prior to embedding the first receipt in the second RFID 944. In the illustrated example, the second entity also embeds a second public key ("SDevID-B PubKey"), a second component identifier ("Component-B"), and a second manufacturer identifier ("Acme") in the second RFID 944. The second entity may ship the second graphics processor component and the first graphics processor component to a third entity ("BigBox").

At the OEM stage 940c, the third entity creates a third graphics processor component ("Platform with GPU"), which contains a third private key ("SDevID-C PrivKey") in a hardware ROT of the third graphics processor component. In an embodiment, the third entity uses an RFID scanner to inventory the second RFID 944 via a WCE. Upon detecting the second public key, the second component identifier, and second first manufacturer identifier, the third entity may embed a second receipt ("SDevID-B") receipt and the first receipt in a third RFID 946 (e.g., tag mounted to the third graphics processor component and/or packaging of the third graphics processor component). As will be discussed in greater detail, the third entity may conduct an authentication of the second graphics processor component prior to embedding the second receipt in the third RFID 946. In the illustrated example, the third entity also embeds a third public key ("SDevID-C PubKey"), a third component identifier ("Platform-C"), and a second manufacturer identifier ("BigBox") in the third RFID 946. The third entity may ship the third graphics processor component, which includes the second graphics processor component and the first graphics processor component to a third entity ("Customer").

The SDevID may be implemented using HW RoTs such as DICE. A separate DICE seed may be used for SDevID vs. IDevID, which is used for platform asset management. To address privacy considerations, the use of the SDevID may be limited to supply chain tracking and management services.

Figure 9E:
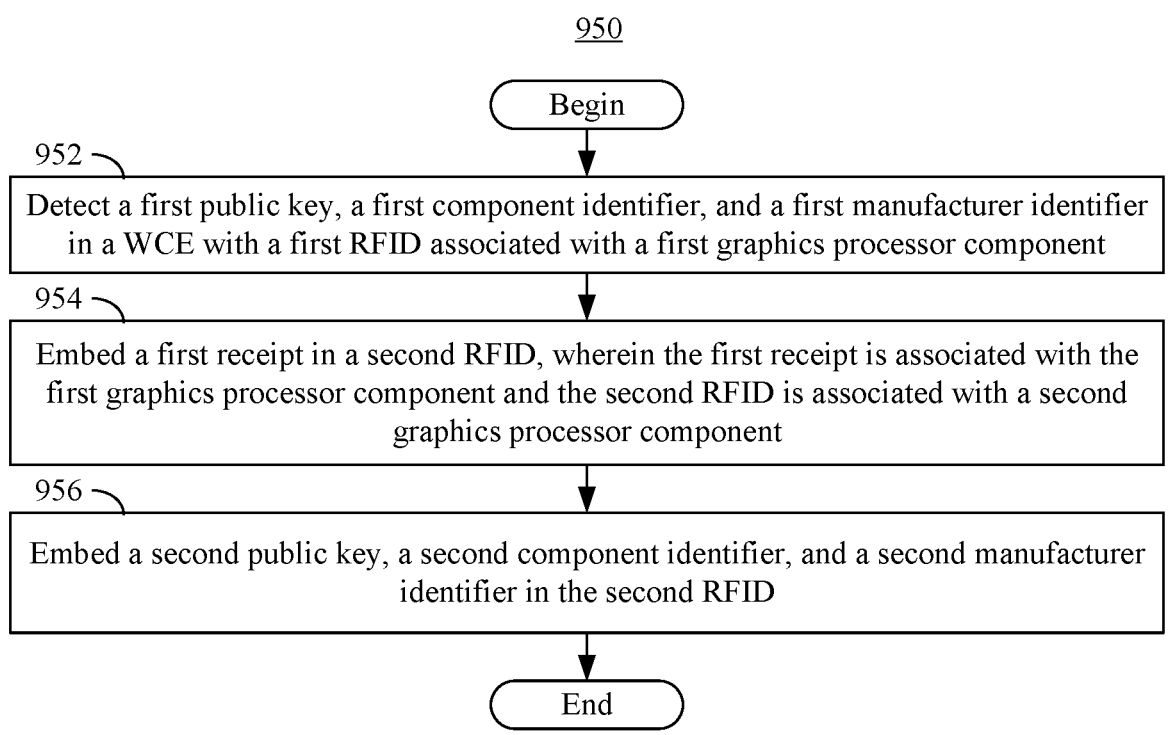
FIGS. 9E-9F are flowcharts of examples of methods of operating a performance-enhanced computing system to track graphics processor components in a supply chain according to embodiments.

FIG. 9E shows a method 950 of operating a performance-enhanced computing system to track graphics processor components. The method 950 may generally be implemented in a platform during an ODM stage such as, for example, the ODM stage 940*b* (FIG. 9D), while a graphics processor component is powered off. More particularly, the method 950 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 952 detects a first public key, a first component identifier, and a first manufacturer identifier in a WCE with a first RFID associated with a first graphics component. In an embodiment, block 954 embeds a first receipt in a second RFID, wherein the first receipt is associated with the first graphics processor component and the second RFID is associated with a second graphics processor component. The first receipt may also include one or more identity keys associated with the second manufacturer. Block 956 may embed a second public key, a second component identifier, and a second manufacturer identifier in the second RFID. The method 950 therefore enhances performance at least to the extent that the illustrated use of keys and receipts facilitates more accurate detection of grey market, low quality and/or malicious graphics processor components throughout the supply chain.

Figure 9F:
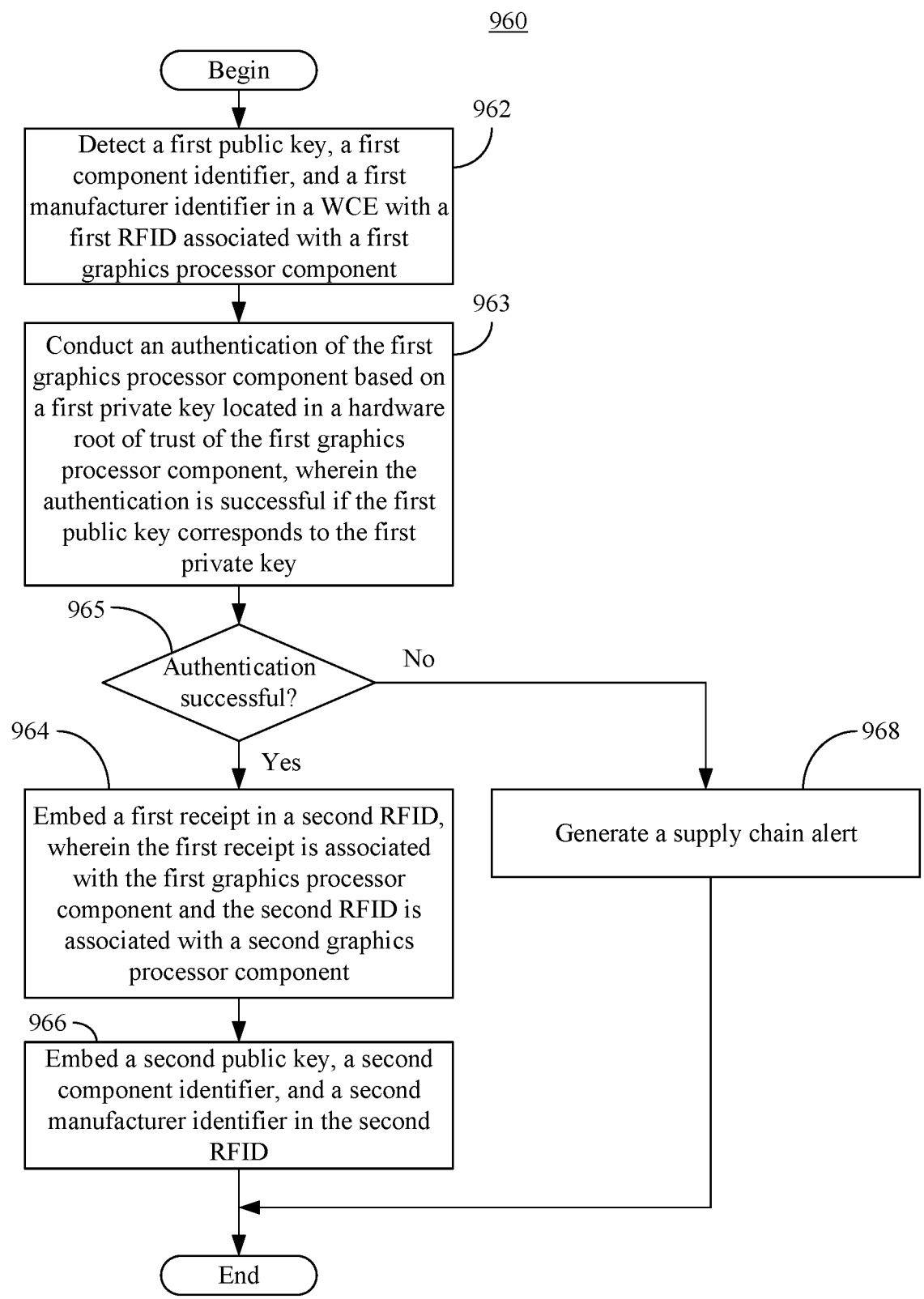

FIG. 9F shows another method 960 of operating a performance-enhanced computing system to track graphics processor components. The method 960 may generally be implemented in a platform during an ODM stage such as, for example, the ODM stage 940*b* (FIG. 9D), while a graphics processor component is powered on. More particularly, the method 960 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 962 detects a first public key, a first component identifier, and a first manufacturer identifier in a WCE with a first RFID associated with a first graphics component. In an embodiment, block 963 conducts an authentication of the first graphics processor component based on a first private key located in a hardware ROT of the first graphics processor component. The hardware ROT may be a DICE. In the illustrated example, the authentication is successful if the first public key corresponds to the first private key. A determination may be made at block 965 as to whether the authentication was successful.

If so, block 964 embeds a first receipt in a second RFID, wherein the first receipt is associated with the first graphics processor component and the second RFID is associated with a second graphics processor component. The first receipt may also include one or more identity keys associated with the second manufacturer. Block 966 may embed a second public key, a second component identifier, and a second manufacturer identifier in the second RFID. If it is determined at block 965 that the authentication was unsuccessful, a supply chain alert is generated at block 968 and the method 960 terminates. The method 960 therefore further enhances performance at least to the extent that the illustrated use of a hardware ROT facilitates even more accurate detection of grey market, low quality and/or malicious graphics processor components throughout the supply chain.

Figure 9G:
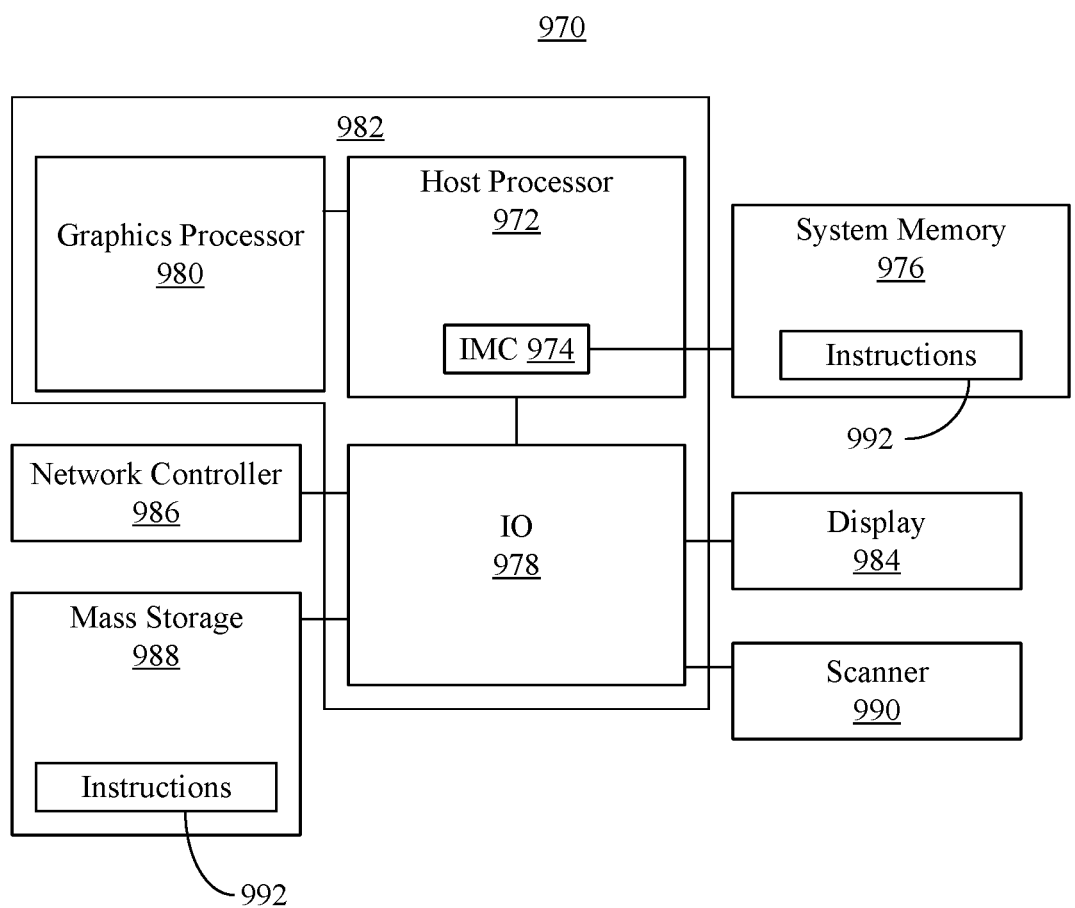
FIG. 9G is a block diagram of an example of a performance-enhanced computing system that tracks graphics processor components in a supply chain according to embodiments.

Turning now to FIG. 9G, a performance-enhanced computing system 970 is shown. The system 970 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof. In the illustrated example, the system 970 includes a host processor 972 (e.g., CPU) having an integrated memory controller (IMC) 974 that is coupled to a system memory 976.

The illustrated system 970 also includes an input output (TO) module 978 implemented together with the host processor 972 and a graphics processor 980 (e.g., GPU) on a semiconductor die 982 as a system on chip (SoC). The illustrated IO module 978 communicates with, for example, a display 984 (e.g., touch screen, liquid crystal display/LCD, light emitting diode/LED display), a network controller 986 (e.g., wired and/or wireless), and mass storage 988 (e.g., hard disk drive/HDD, optical disk, solid state drive/SSD, flash memory). The illustrated computing system 970 also includes a scanner 990 (e.g., RFID scanner capable of conducting WCEs).

In an embodiment, the host processor 972, the graphics processor 980 and/or the IO module 978 execute instructions 992 retrieved from the system memory 976 and/or the mass storage 988 to perform one or more aspects of the method 950 (FIG. 9E) and/or the method 960 (FIG. 9F), already discussed. Thus, the computing system 970 is performance-enhanced at least to the extent that the use of keys, receipts and/or a hardware ROT facilitates more accurate detection of grey market, low quality and/or malicious graphics processor components throughout the supply chain.

IPU Slice Shared Resource Management (FIGS. 9H-9J):

Edge orchestration may manage edge acceleration resources (e.g., GPU and/or image processing unit/IPU compute engines, memory, etc.) at a tenant level of granularity. Tenant workloads have tenant-specific security context information (e.g., data, code, keys) that are migrated to the edge hosting environment. Prior to migration, the edge hosting environment generates suitable keys for securely migrating the tenant context. Hence, edge nodes allow resource partitioning to flexibly allow "fat" and "thin" profiles for tenant usage.

Figure 9H:
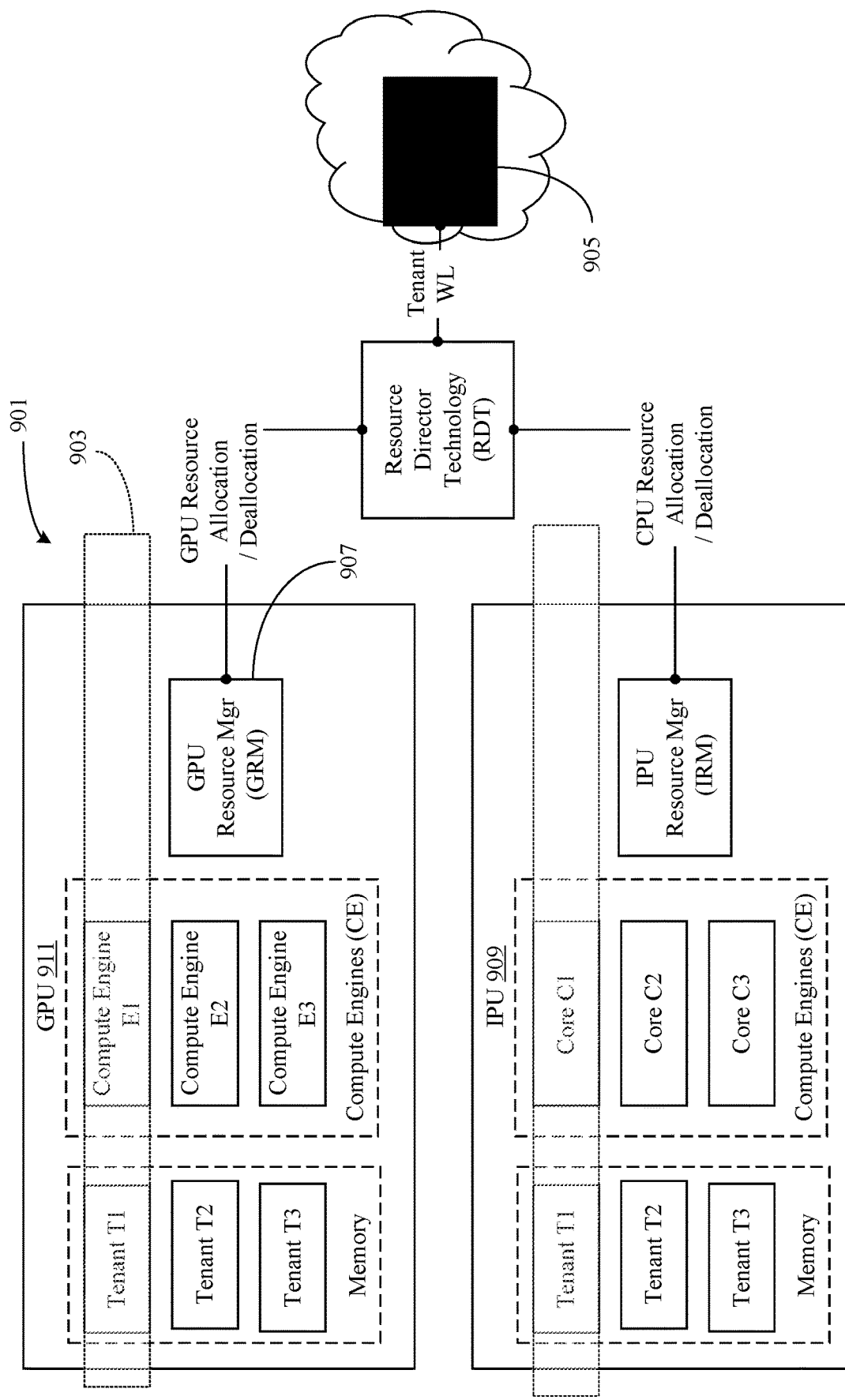
FIG. 9H is a block diagram of an example of an edge node with tenant slices according to an embodiment.

Turning now to FIG. 9H, when a tenant slice 903 (e.g., tenant-specific GPU resource allocation) is defined in an edge node 901, the tenant slice 903 may auto-generate a public/private key pair that is slice specific, but not yet provisioned with tenant-specific data/code. A GPU resource manager (GRM) 907 may register the slice-key(s) with an orchestrator 905 such that tenant data/code can be securely sent to the tenant slice 903. Tenant-specific keys might also be migrated for processing tenant data while the slice resource is allocated to the tenant. Tenant data, code, and keys may be encrypted with the slice-context public key-encryption-key, which is temporal for the duration of the slice allocation. In cases where an image processing unit (IPU) 909 is used in concert with a GPU 911, the IPU 909 may also apply a "slice" approach to resource allocation and may share memory, storage, keys and other context.

Figure 9I:
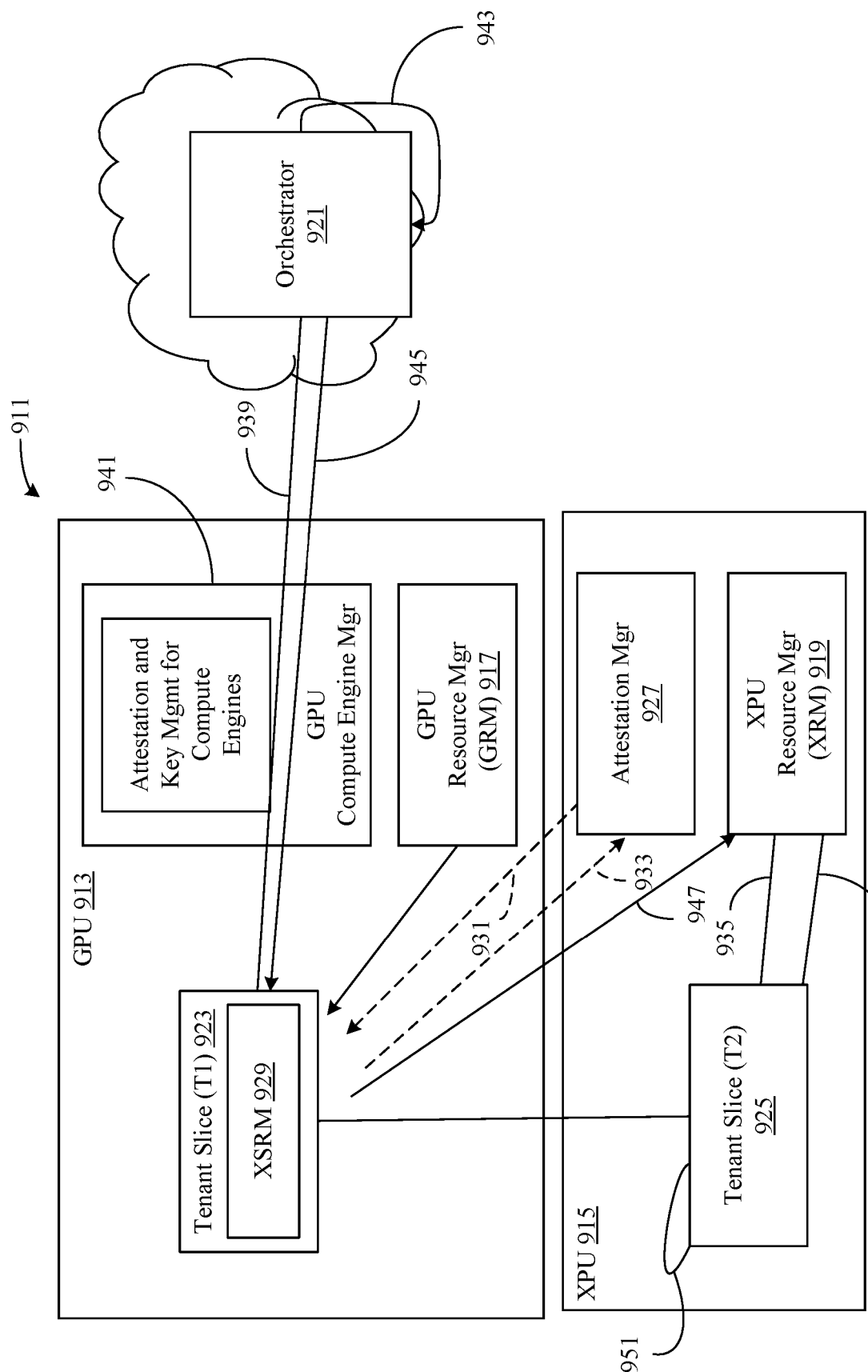
FIG. 9I is a block diagram of an example of an edge node with a tenant slice that has been elected as a platform resource manager according to an embodiment.

FIG. 9I shows an edge node 911 that includes a GPU 913 and an XPU 915 (e.g., where the "X" may be a "C" for CPU, a "G" for GPU, and so forth) with platform resource management functionality using resource descriptor technology (RDT) RDT and GPU/IPU specific resource managers such as, for example, a GRM 917, an XPU resource manager (XRM) 919, etc., to coordinate tenant specific resource allocations (e.g., "tenant slices"). Slice resources include a dedicated allocation of one or more compute engines/cores or may be a virtual thread allocation that is time-sliced. Thus, memory, storage and other resources may be allocated on a per-tenant slice basis. A cloud orchestrator 921 may supply tenant workload and lifecycle context information.

In an embodiment, a first tenant slice 923 ("T1") is elected as a platform resource manager that functions as a proxy for the cloud/edge orchestrator 921 to securely allocate resources for a second tenant slice 925 ("T2"). The first tenant slice 923 may generally handle attestation, creation of a tenant migration key and provisioning of tenant specific context that may include tenant data, code and keys for the second tenant slice 925.

In the illustrated example, an attestation manager 927 issues an attestation message 931 to an XPU slice resource manager (XSRM) 929 in the first tenant slice 923 with respect to hosting resources in the XPU 915. In an embodiment, the attestation message 931 is issued in response to a request from the XSRM 929, which evaluates the attestation message 931 to determine if the tenant workload (WL) will be safe and secure. If so, the XSRM 929 issues a slice allocation request 933 for T2.

The XRM 919 may generate a cryptographic seed for the second tenant slice 925, where the seed may be derived from a DICE RoT with layering such that the seed is a DICE CDI (compound device identity) specific to the expected T2 environment (e.g., compute engine, memory, and so forth). In an embodiment, the XRM 919 also generates a T2 migration key (MKT2, e.g., including a public/private key pair) and provisions the T2 migration key into memory of the second tenant slice 925 via a provision signal 935. The memory provisioned with the key information may be secure storage/enclave assigned.

In one example, the migration public key is returned to the orchestrator 921 via a first migration message 937 from the second tenant slice 925 to the XSRM 929 and a second message 939 from the XSRM 929 to the orchestrator 921. The second message 939 (e.g., including the migration public key) may be sent via a compute engine manager 941 and an existing secure channel between the GPU 913 and the orchestrator 921.

The illustrated orchestrator 921 uses MKT2, which may be an asymmetric key wrapping key (KWK) such as an RSA (Rivest—Shamir—Adleman) key pair, to wrap 943 T2 context information (data, code, keys) or may wrap a symmetric key that in turn encrypts context information. Furthermore, wrapped/encrypted context information can only be used by the second tenant slice 925 on the XPU 915 (as it is the holder of the private portion of the KWK). If multiple XPUs are involved in the tenant workload, then each XPU may supply its own key wrapping key (KEK) and the orchestrator 921 may identify which subset of the tenant workload belongs to which XPU slice.

The orchestrator 921 may provision the T2 context to the XPU 915 slice resources via a first context message 945 to the XSRM 929 and a second context message 947 from the XSRM 929 to the XRM 919. The first context message 945, which includes the context information wrapped with the migration public key, may be sent through the compute engine manager 941. Additionally, the second context message 947, which also includes the context information wrapped with the migration public key, may alternatively be sent directly to the second tenant slice 925 to avoid the generation of a context transfer message 949 from the XRM 919 to the second tenant slice 925.

In an embodiment, the second tenant slice 925 unwraps 951 the T2 context inside of the slice resource, resulting in clear text T2 context. In one example, tenant data, identity and other keys are provisioned to a slice specific TEE (trusted execution environment) or key locker for hardened protection. The T2 workload may then be executed. When the T2 WL completes and second tenant slice 925 is torn down, the T2 context is deleted except for the WL results, which are returned to the orchestrator 921.

Thus, instead of burdening an RDT (not shown) and the GRM 917 with slice resource management across multiple XPUs, one of the XPU slices is elected as a master (e.g., supervisor) for the other XPU slice allocations. The illustrated edge node 911 therefore enhances performance at least to the extent that resource allocation is deterministic and avoids deadlocks. More particularly, the voting process enables one element of the slice to become the resource manager, which controls resource allocation, handles slice keys, and manages attesting to all slice components. One way to allow secure communication directly between tenants is based on platform level group keys (e.g., enhanced privacy identifiers/EPIDs) where the XSRM 929 creates a symmetric group key signed by an XSRM group key (e.g., EPID) that is wrapped by each tenant's key wrapping key (KEK). Each tenant verifies the EPID group and associates the symmetric key with that group. Subsequently, the group symmetric key can be used to broadcast securely to other members of the group.

Figure 9J:
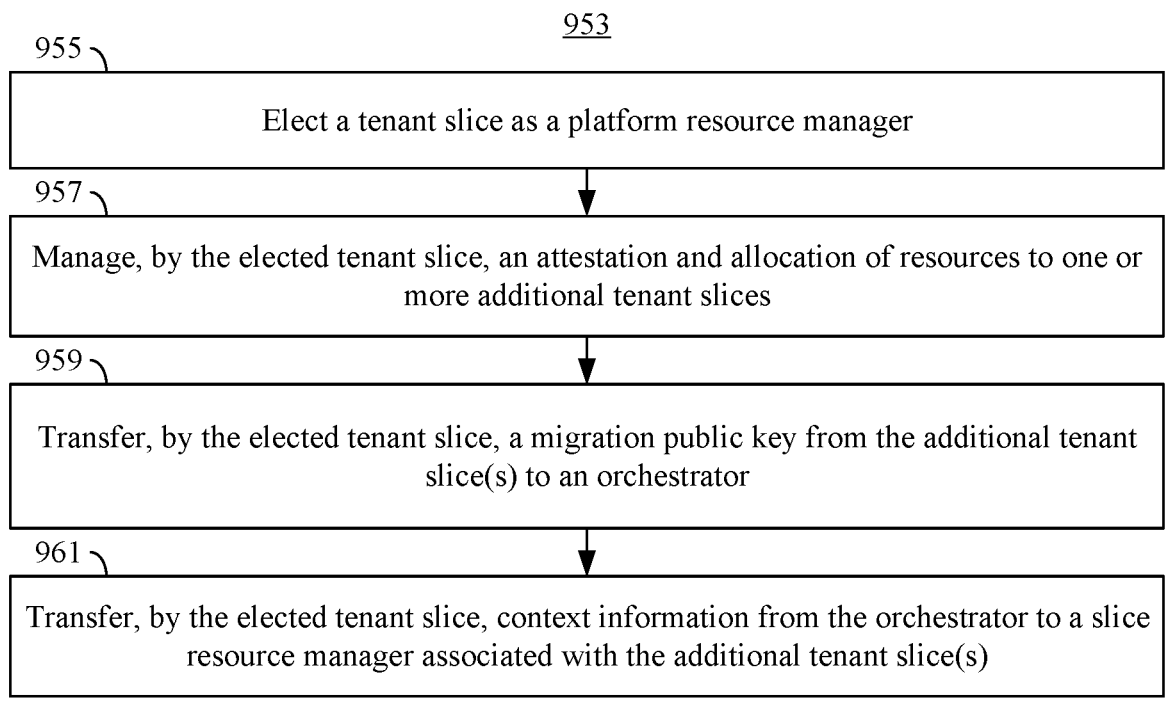
FIG. 9J is a flowchart of an example of a method of operating a performance-enhanced computing system to conduct slice shared resource management according to an embodiment.

FIG. 9J shows a method 953 of operating a performance-enhanced computing system to conduct slice shared resource management. The method 953 may generally be implemented in a shared resource manager such as, for example, the XSRM 929 (FIG. 9I). More particularly, the method 953 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 955 provides for electing a tenant slice as a platform resource manager. Block 955 may take into consideration utilization (e.g., electing the tenant slice with the least utilized resources), timing information (e.g., electing the first available tenant slice), randomization (e.g., round robin election), etc., or any combination thereof. The elected tenant slice may include tenant-specific graphics resources. In an embodiment, block 957 manages, by the elected tenant slice, an attestation and allocation of resources to one or more additional tenant slices. Additionally, block 959 may transfer, by the elected tenant slice, a migration public key from the one or more additional tenant slices to an orchestrator. In one example, block 959 includes sending the migration public key to a compute engine manger. Illustrated block 961 transfers, by the elected tenant slice, context information (e.g., data, code and/or one or more keys) from the orchestrator to a slice resource manager associated with the one or more additional tenant slices. In an embodiment, block 961 includes receiving the context information from the compute engine manager. Additionally, the context information may be wrapped with the migration public key. The illustrated method 953 therefore enhances performance at least to the extent that electing a tenant slice to operate as the platform resource manager in an multi-XPU execution environment makes resource allocation more deterministic and avoids deadlocks between XPUs.

System Overview

Figure 10:
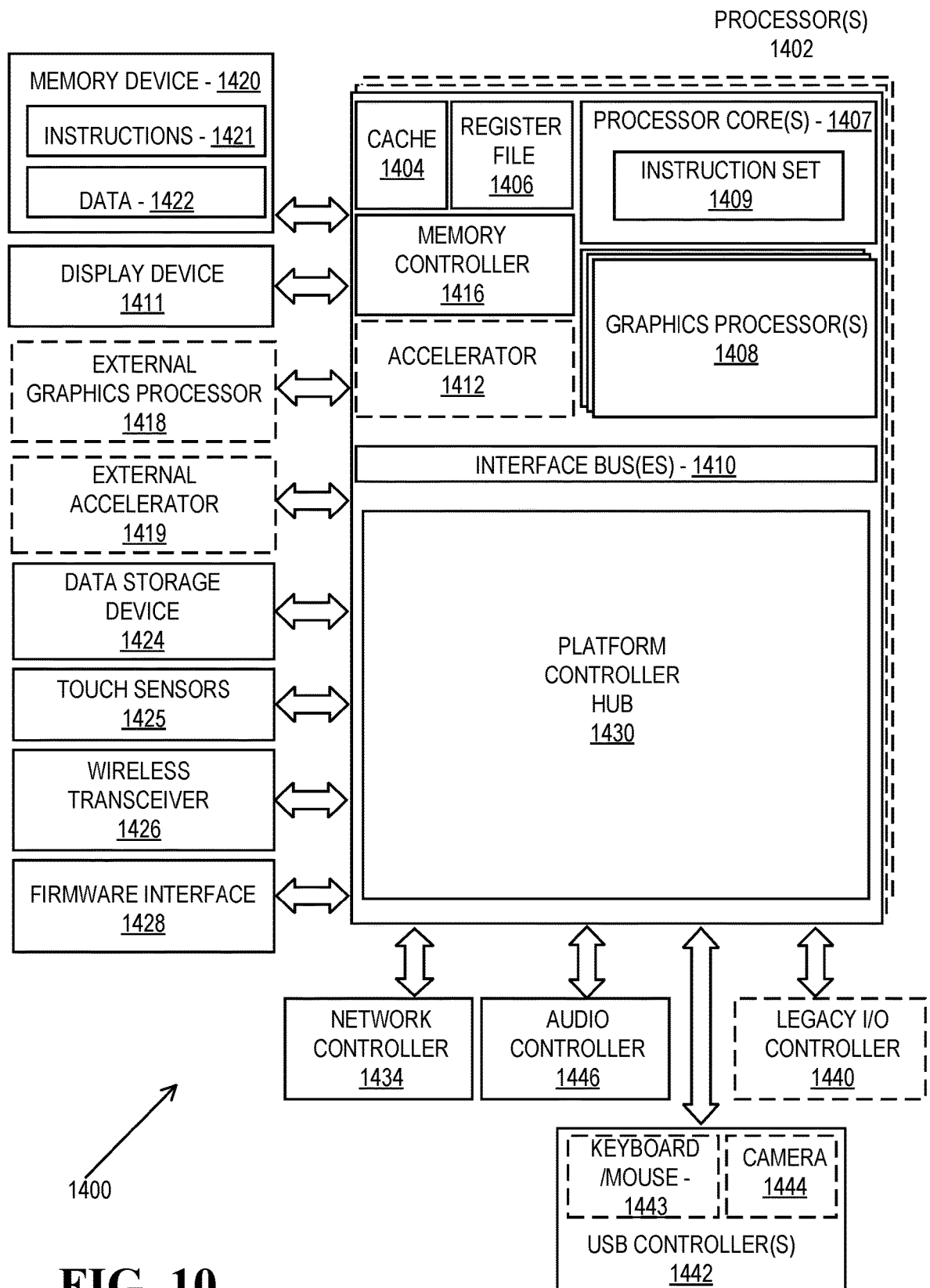
FIG. 10 is a block diagram of an example of a processing system according to an embodiment.

FIG. 10 is a block diagram of a processing system 1400, according to an embodiment. System 1400 may be used in a single processor desktop system, a multiprocessor workstation system, or a server system having a large number of processors 102 or processor cores 107. In one embodiment, the system 1400 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, system 1400 can include, couple with, or be integrated within: a server-based gaming platform; a game console, including a game and media console; a mobile gaming console, a handheld game console, or an online game console. In some embodiments the system 1400 is part of a mobile phone, smart phone, tablet computing device or mobile Internet-connected device such as a laptop with low internal storage capacity. Processing system 1400 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 1400 includes or is part of a television or set top box device. In one embodiment, system 1400 can include, couple with, or be integrated within a self-driving vehicle such as a bus, tractor trailer, car, motor or electric power cycle, plane or glider (or any combination thereof). The self-driving vehicle may use system 1400 to process the environment sensed around the vehicle.

In some embodiments, the one or more processors 1402 each include one or more processor cores 1407 to process instructions which, when executed, perform operations for system or user software. In some embodiments, at least one of the one or more processor cores 1407 is configured to process a specific instruction set 1409. In some embodiments, instruction set 1409 may facilitate Complex Instruction Set Computing (CISC), Reduced Instruction Set Computing (RISC), or computing via a Very Long Instruction Word (VLIW). One or more processor cores 1407 may process a different instruction set 1409, which may include instructions to facilitate the emulation of other instruction sets. Processor core 1407 may also include other processing devices, such as a Digital Signal Processor (DSP).

In some embodiments, the processor 1402 includes cache memory 1404. Depending on the architecture, the processor 1402 can have a single internal cache or multiple levels of internal cache. In some embodiments, the cache memory is shared among various components of the processor 1402. In some embodiments, the processor 1402 also uses an external cache (e.g., a Level-3 (L3) cache or Last Level Cache (LLC)) (not shown), which may be shared among processor cores 1407 using known cache coherency techniques. A register file 1406 can be additionally included in processor 1402 and may include different types of registers for storing different types of data (e.g., integer registers, floating point registers, status registers, and an instruction pointer register). Some registers may be general-purpose registers, while other registers may be specific to the design of the processor 1402.

In some embodiments, one or more processor(s) 1402 are coupled with one or more interface bus(es) 1410 to transmit communication signals such as address, data, or control signals between processor 1402 and other components in the system 1400. The interface bus 1410, in one embodiment, can be a processor bus, such as a version of the Direct Media Interface (DMI) bus. However, processor busses are not limited to the DMI bus, and may include one or more Peripheral Component Interconnect buses (e.g., PCI, PCI express), memory busses, or other types of interface busses. In one embodiment the processor(s) 1402 include an integrated memory controller 1416 and a platform controller hub 1430. The memory controller 1416 facilitates communication between a memory device and other components of the system 1400, while the platform controller hub (PCH) 1430 provides connections to I/O devices via a local I/O bus.

The memory device 1420 can be a dynamic random-access memory (DRAM) device, a static random-access memory (SRAM) device, flash memory device, phase-change memory device, or some other memory device having suitable performance to serve as process memory. In one embodiment the memory device 1420 can operate as system memory for the system 1400, to store data 1422 and instructions 1421 for use when the one or more processors 1402 executes an application or process. Memory controller 1416 also couples with an optional external graphics processor 1418, which may communicate with the one or more graphics processors 1408 in processors 1402 to perform graphics and media operations. In some embodiments, graphics, media, and or compute operations may be assisted by an accelerator 1412 which is a coprocessor that can be configured to perform a specialized set of graphics, media, or compute operations. For example, in one embodiment the accelerator 1412 is a matrix multiplication accelerator used to optimize machine learning or compute operations. In one embodiment the accelerator 1412 is a ray-tracing accelerator that can be used to perform ray-tracing operations in concert with the graphics processor 1408. In one embodiment, an external accelerator 1419 may be used in place of or in concert with the accelerator 1412.

In some embodiments a display device 1411 can connect to the processor(s) 1402. The display device 1411 can be one or more of an internal display device, as in a mobile electronic device or a laptop device or an external display device attached via a display interface (e.g., DisplayPort, etc.). In one embodiment the display device 1411 can be a head mounted display (HMD) such as a stereoscopic display device for use in virtual reality (VR) applications or augmented reality (AR) applications.

In some embodiments the platform controller hub 130 enables peripherals to connect to memory device 1420 and processor 1402 via a high-speed I/O bus. The I/O peripherals include, but are not limited to, an audio controller 1446, a network controller 1434, a firmware interface 1428, a wireless transceiver 1426, touch sensors 1425, a data storage device 1424 (e.g., non-volatile memory, volatile memory, hard disk drive, flash memory, NAND, 3D NAND, 3D XPoint, etc.). The data storage device 1424 can connect via a storage interface (e.g., SATA) or via a peripheral bus, such as a Peripheral Component Interconnect bus (e.g., PCI, PCI express). The touch sensors 1425 can include touch screen sensors, pressure sensors, or fingerprint sensors. The wireless transceiver 1426 can be a Wi-Fi transceiver, a Bluetooth transceiver, or a mobile network transceiver such as a 3G, 4G, 5G, or Long-Term Evolution (LTE) transceiver. The firmware interface 1428 enables communication with system firmware, and can be, for example, a unified extensible firmware interface (UEFI). The network controller 1434 can enable a network connection to a wired network. In some embodiments, a high-performance network controller (not shown) couples with the interface bus 1410. The audio controller 1446, in one embodiment, is a multi-channel high definition audio controller. In one embodiment the system 1400 includes an optional legacy I/O controller 1440 for coupling legacy (e.g., Personal System 2 (PS/2)) devices to the system. The platform controller hub 1430 can also connect to one or more Universal Serial Bus (USB) controllers 1442 connect input devices, such as keyboard and mouse 1443 combinations, a camera 1444, or other USB input devices.

It will be appreciated that the system 1400 shown is exemplary and not limiting, as other types of data processing systems that are differently configured may also be used. For example, an instance of the memory controller 1416 and platform controller hub 1430 may be integrated into a discreet external graphics processor, such as the external graphics processor 1418. In one embodiment the platform controller hub 1430 and/or memory controller 1416 may be external to the one or more processor(s) 1402. For example, the system 1400 can include an external memory controller 1416 and platform controller hub 1430, which may be configured as a memory controller hub and peripheral controller hub within a system chipset that is in communication with the processor(s) 1402.

For example, circuit boards ("sleds") can be used on which components such as CPUs, memory, and other components are placed are designed for increased thermal performance. In some examples, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center may, in use, pool resources, such as memory, accelerators (e.g., GPUs, graphics accelerators, FPGAs, ASICs, neural network and/or artificial intelligence accelerators, etc.), and data storage drives that are physically disaggregated, and provide them to compute resources (e.g., processors) on an as needed basis, enabling the compute resources to access the pooled resources as if they were local.

A power supply or source can provide voltage and/or current to system 1400 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

FIGS. 11A-11D illustrate computing systems and graphics processors provided by embodiments described herein. The elements of FIGS. 11A-11D having the same reference numbers (or names) as the elements of any other figure herein can operate or function in any manner similar to that described elsewhere herein, but are not limited to such.

Figure 11A:
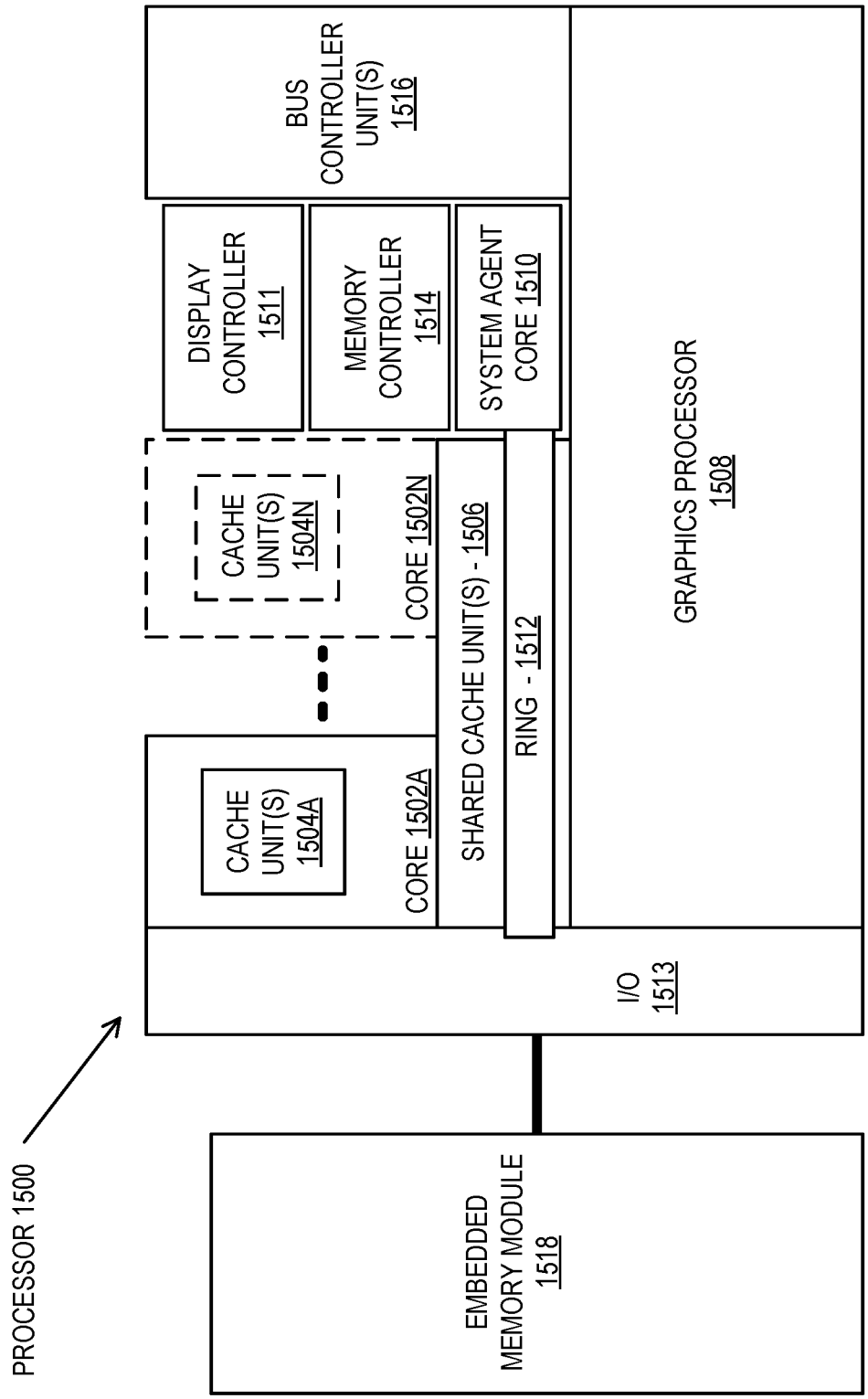
FIGS. 11A-11D are block diagrams of examples of computing systems and graphics processors according to embodiments.

FIG. 11A is a block diagram of an embodiment of a processor 1500 having one or more processor cores 1502A-1502N, an integrated memory controller 1514, and an integrated graphics processor 1508. Processor 1500 can include additional cores up to and including additional core 1502N represented by the dashed lined boxes. Each of processor cores 1502A-1502N includes one or more internal cache units 1504A-1504N. In some embodiments each processor core also has access to one or more shared cache units 1506. The internal cache units 1504A-1504N and shared cache units 1506 represent a cache memory hierarchy within the processor 1500. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 1506 and 1504A-1504N.

In some embodiments, processor 1500 may also include a set of one or more bus controller units 1516 and a system agent core 1510. The one or more bus controller units 1516 manage a set of peripheral buses, such as one or more PCI or PCI express busses. System agent core 1510 provides management functionality for the various processor components. In some embodiments, system agent core 1510 includes one or more integrated memory controllers 1514 to manage access to various external memory devices (not shown).

In some embodiments, one or more of the processor cores 1502A-1502N include support for simultaneous multi-threading. In such embodiment, the system agent core 1510 includes components for coordinating and operating cores 1502A-1502N during multi-threaded processing. System agent core 1510 may additionally include a power control unit (PCU), which includes logic and components to regulate the power state of processor cores 1502A-1502N and graphics processor 1508.

In some embodiments, processor 1500 additionally includes graphics processor 1508 to execute graphics processing operations. In some embodiments, the graphics processor 1508 couples with the set of shared cache units 1506, and the system agent core 1510, including the one or more integrated memory controllers 1514. In some embodiments, the system agent core 1510 also includes a display controller 1511 to drive graphics processor output to one or more coupled displays. In some embodiments, display controller 1511 may also be a separate module coupled with the graphics processor via at least one interconnect, or may be integrated within the graphics processor 1508.

In some embodiments, a ring-based interconnect unit 1512 is used to couple the internal components of the processor 1500. However, an alternative interconnect unit may be used, such as a point-to-point interconnect, a switched interconnect, or other techniques, including techniques well known in the art. In some embodiments, graphics processor 1508 couples with the ring interconnect 1512 via an I/O link 1513.

The exemplary I/O link 1513 represents at least one of multiple varieties of I/O interconnects, including an on package I/O interconnect which facilitates communication between various processor components and a high-performance embedded memory module 1518, such as an eDRAM module. In some embodiments, each of the processor cores 1502A-1502N and graphics processor 1508 can use embedded memory modules 1518 as a shared Last Level Cache.

In some embodiments, processor cores 1502A-1502N are homogenous cores executing the same instruction set architecture. In another embodiment, processor cores 1502A-1502N are heterogeneous in terms of instruction set architecture (ISA), where one or more of processor cores 1502A-1502N execute a first instruction set, while at least one of the other cores executes a subset of the first instruction set or a different instruction set. In one embodiment, processor cores 1502A-1502N are heterogeneous in terms of microarchitecture, where one or more cores having a relatively higher power consumption couple with one or more power cores having a lower power consumption. In one embodiment, processor cores 1502A-1502N are heterogeneous in terms of computational capability. Additionally, processor 1500 can be implemented on one or more chips or as an SoC integrated circuit having the illustrated components, in addition to other components.

Figure 11B:
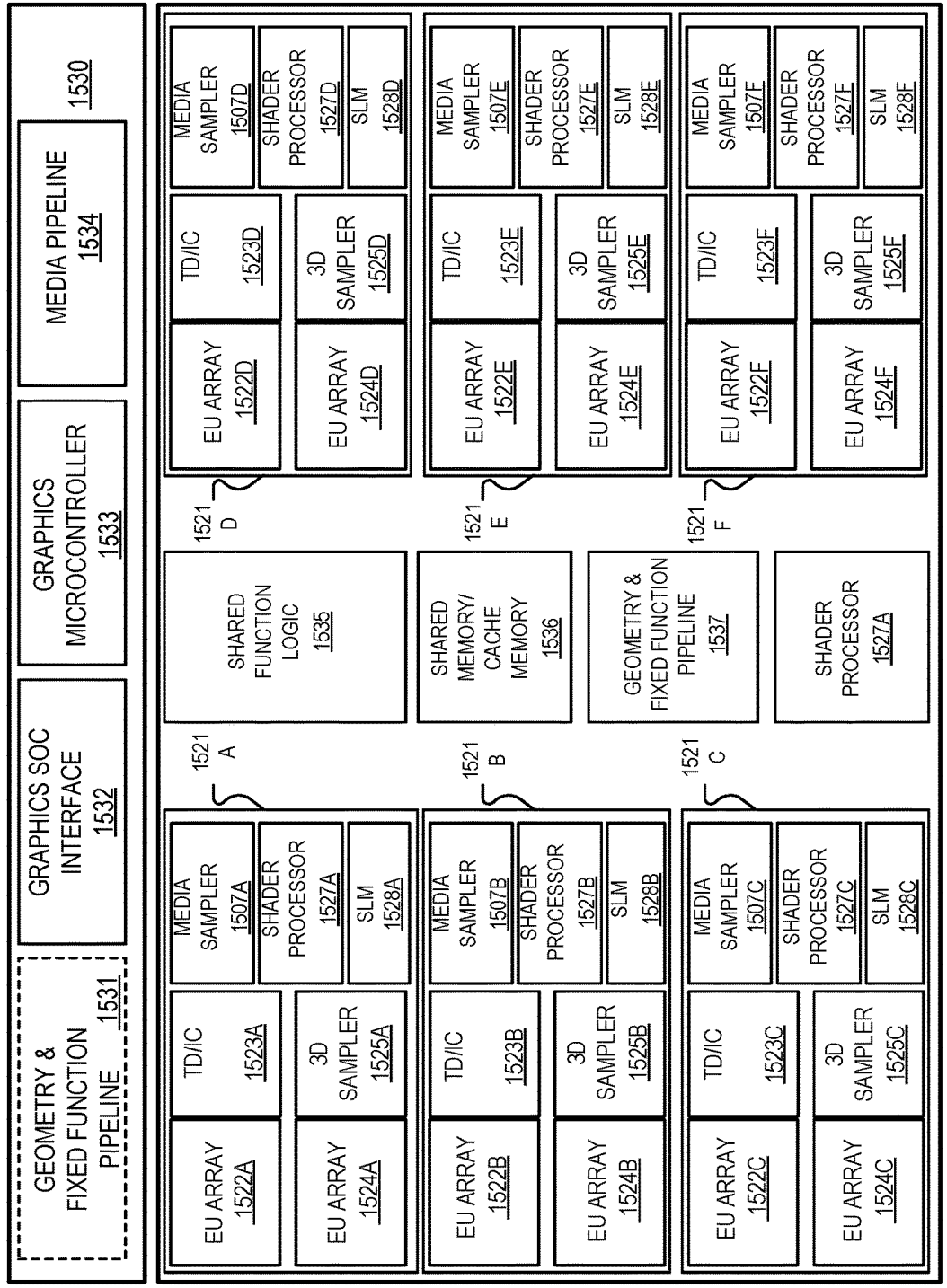

FIG. 11B is a block diagram of hardware logic of a graphics processor core 1519, according to some embodiments described herein. Elements of FIG. 11B having the same reference numbers (or names) as the elements of any other figure herein can operate or function in any manner similar to that described elsewhere herein, but are not limited to such. The graphics processor core 1519, sometimes referred to as a core slice, can be one or multiple graphics cores within a modular graphics processor. The graphics processor core 1519 is exemplary of one graphics core slice, and a graphics processor as described herein may include multiple graphics core slices based on target power and performance envelopes. Each graphics processor core 1519 can include a fixed function block 1530 coupled with multiple sub-cores 1521A-1521F, also referred to as sub-slices, that include modular blocks of general-purpose and fixed function logic.

In some embodiments, the fixed function block 1530 includes a geometry/fixed function pipeline 1531 that can be shared by all sub-cores in the graphics processor core 1519, for example, in lower performance and/or lower power graphics processor implementations. In various embodiments, the geometry/fixed function pipeline 1531 includes a 3D fixed function pipeline (e.g., 3D pipeline 1612 as in FIG. 3 and FIG. 13, described below) a video front-end unit, a thread spawner and thread dispatcher, and a unified return buffer manager, which manages unified return buffers (e.g., unified return buffer 1718 in FIG. 13, as described below).

In one embodiment the fixed function block 1530 also includes a graphics SoC interface 1532, a graphics microcontroller 1533, and a media pipeline 1534. The graphics SoC interface 1532 provides an interface between the graphics processor core 1519 and other processor cores within a system on a chip integrated circuit. The graphics microcontroller 1533 is a programmable sub-processor that is configurable to manage various functions of the graphics processor core 1519, including thread dispatch, scheduling, and pre-emption. The media pipeline 1534 (e.g., media pipeline 1616 of FIG. 12A) includes logic to facilitate the decoding, encoding, pre-processing, and/or post-processing of multimedia data, including image and video data. The media pipeline 1534 implement media operations via requests to compute or sampling logic within the sub-cores 1521-1521F.

In one embodiment the SoC interface 1532 enables the graphics processor core 1519 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 1532 can also enable communication with fixed function devices within the SoC, such as camera imaging pipelines, and enables the use of and/or implements global memory atomics that may be shared between the graphics processor core 1519 and CPUs within the SoC. The SoC interface 1532 can also implement power management controls for the graphics processor core 1519 and enable an interface between a clock domain of the graphic core 1519 and other clock domains within the SoC. In one embodiment the SoC interface 1532 enables receipt of command buffers from a command streamer and global thread dispatcher that are configured to provide commands and instructions to each of one or more graphics cores within a graphics processor. The commands and instructions can be dispatched to the media pipeline 1534, when media operations are to be performed, or a geometry and fixed function pipeline (e.g., geometry and fixed function pipeline 1531, geometry and fixed function pipeline 1537) when graphics processing operations are to be performed.

The graphics microcontroller 1533 can be configured to perform various scheduling and management tasks for the graphics processor core 1519. In one embodiment the graphics microcontroller 1533 can perform graphics and/or compute workload scheduling on the various graphics parallel engines within execution unit (EU) arrays 1522A-1522F, 1524A-1524F within the sub-cores 1521A-1521F. In this scheduling model, host software executing on a CPU core of an SoC including the graphics processor core 1519 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 1533 can also facilitate low-power or idle states for the graphics processor core 1519, providing the graphics processor core 1519 with the ability to save and restore registers within the graphics processor core 1519 across low-power state transitions independently from the operating system and/or graphics driver software on the system.

The graphics processor core 1519 may have greater than or fewer than the illustrated sub-cores 1521A-1521F, up to N modular sub-cores. For each set of N sub-cores, the graphics processor core 1519 can also include shared function logic 1535, shared and/or cache memory 1536, a geometry/fixed function pipeline 1537, as well as additional fixed function logic (not shown) to accelerate various graphics and compute processing operations. The shared function logic 1535 can include logic units associated with the shared function logic 1720 of FIG. 13 (e.g., sampler, math, and/or inter-thread communication logic) that can be shared by each N sub-cores within the graphics processor core 1519. The shared and/or cache memory 1536 can be a last-level cache for the set of N sub-cores 1521A-1521F within the graphics processor core 1519, and can also serve as shared memory that is accessible by multiple sub-cores. The geometry/fixed function pipeline 1537 can be included instead of the geometry/fixed function pipeline 1531 within the fixed function block 1530 and can include the same or similar logic units.

In one embodiment the graphics processor core 1519 includes additional fixed function logic that can include various fixed function acceleration logic for use by the graphics processor core 1519. In one embodiment the additional fixed function logic includes an additional geometry pipeline for use in position only shading. In position-only shading, two geometry pipelines exist, the full geometry pipeline within the geometry/fixed function pipeline 238, 1531, and a cull pipeline, which is an additional geometry pipeline which may be included within the additional fixed function logic 238. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function logic can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic can also include machine-learning acceleration logic, such as fixed function matrix multiplication logic, for implementations including optimizations for machine learning training or inferencing.

Within each graphics sub-core 1521A-1521F includes a set of execution resources that may be used to perform graphics, media, and compute operations in response to requests by graphics pipeline, media pipeline, or shader programs. The graphics sub-cores 1521A-1521F include multiple EU arrays 1522A-1522F, 1524A-1524F, thread dispatch and inter-thread communication (TD/IC) logic 1523A-1523F, a 3D (e.g., texture) sampler 1525A-1525F, a media sampler 1507A-1507F, a shader processor 1527A-1527F, and shared local memory (SLM) 1528A-1528F. The EU arrays 1522A-1522F, 1524A-1524F each include multiple execution units, which are general-purpose graphics processing units capable of performing floating-point and integer/fixed-point logic operations in service of a graphics, media, or compute operation, including graphics, media, or compute shader programs. The TD/IC logic 1523A-1523F performs local thread dispatch and thread control operations for the execution units within a sub-core and facilitate communication between threads executing on the execution units of the sub-core. The 3D sampler 1525A-1525F can read texture or other 3D graphics related data into memory. The 3D sampler can read texture data differently based on a configured sample state and the texture format associated with a given texture. The media sampler 1507A-1507F can perform similar read operations based on the type and format associated with media data. In one embodiment, each graphics sub-core 1521A-1521F can alternately include a unified 3D and media sampler. Threads executing on the execution units within each of the sub-cores 1521A-1521F can make use of shared local memory 1528A-1528F within each sub-core, to enable threads executing within a thread group to execute using a common pool of on-chip memory.

Figure 11C:
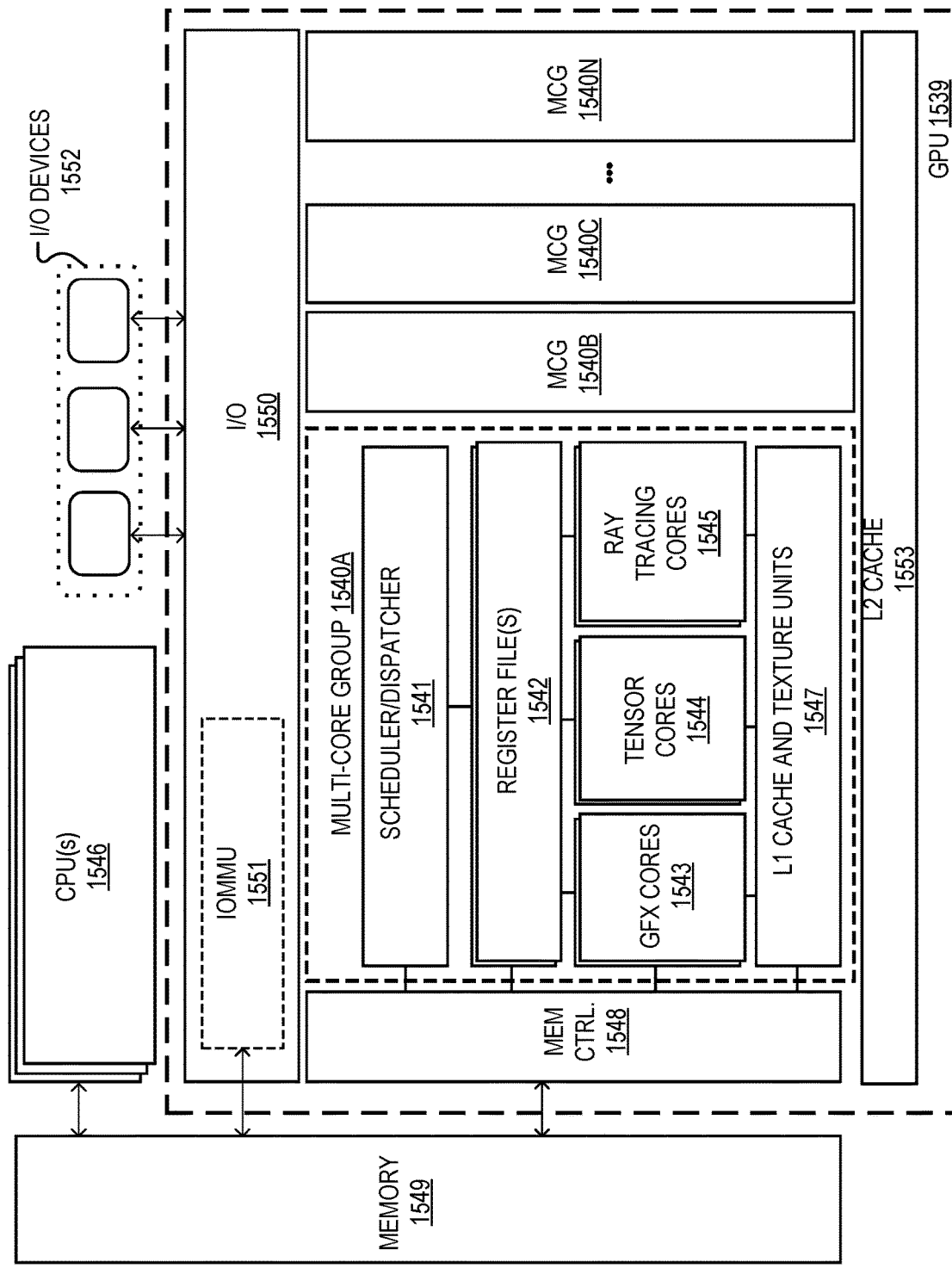

FIG. 11C illustrates a graphics processing unit (GPU) 1539 that includes dedicated sets of graphics processing resources arranged into multi-core groups 1540A-1540N. While the details of only a single multi-core group 1540A are provided, it will be appreciated that the other multi-core groups 1540B-1540N may be equipped with the same or similar sets of graphics processing resources.

As illustrated, a multi-core group 1540A may include a set of graphics cores 1543, a set of tensor cores 1544, and a set of ray tracing cores 1545. A scheduler/dispatcher 1541 schedules and dispatches the graphics threads for execution on the various cores 1543, 1544, 1545. A set of register files 1542 store operand values used by the cores 1543, 1544, 1545 when executing the graphics threads. These may include, for example, integer registers for storing integer values, floating point registers for storing floating point values, vector registers for storing packed data elements (integer and/or floating point data elements) and tile registers for storing tensor/matrix values. In one embodiment, the tile registers are implemented as combined sets of vector registers.

One or more combined level 1 (L1) caches and shared memory units 1547 store graphics data such as texture data, vertex data, pixel data, ray data, bounding volume data, etc., locally within each multi-core group 1540A. One or more texture units 1547 can also be used to perform texturing operations, such as texture mapping and sampling. A Level 2 (L2) cache 1553 shared by all or a subset of the multi-core groups 1540A-1540N stores graphics data and/or instructions for multiple concurrent graphics threads. As illustrated, the L2 cache 1553 may be shared across a plurality of multi-core groups 1540A-1540N. One or more memory controllers 1548 couple the GPU 1539 to a memory 1549 which may be a system memory (e.g., DRAM) and/or a dedicated graphics memory (e.g., GDDR6 memory).

Input/output (I/O) circuitry 1550 couples the GPU 1539 to one or more I/O devices 1552 such as digital signal processors (DSPs), network controllers, or user input devices. An on-chip interconnect may be used to couple the I/O devices 1552 to the GPU 1539 and memory 1549. One or more I/O memory management units (IOMMUs) 1551 of the I/O circuitry 1550 couple the I/O devices 1552 directly to the system memory 1549. In one embodiment, the IOMMU 1551 manages multiple sets of page tables to map virtual addresses to physical addresses in system memory 1549. In this embodiment, the I/O devices 1552, CPU(s) 1546, and GPU(s) 1539 may share the same virtual address space.

In one implementation, the IOM MU 1551 supports virtualization. In this case, it may manage a first set of page tables to map guest/graphics virtual addresses to guest/graphics physical addresses and a second set of page tables to map the guest/graphics physical addresses to system/host physical addresses (e.g., within system memory 1549). The base addresses of each of the first and second sets of page tables may be stored in control registers and swapped out on a context switch (e.g., so that the new context is provided with access to the relevant set of page tables). While not illustrated in FIG. 11C, each of the cores 1543, 1544, 1545 and/or multi-core groups 1540A-1540N may include translation lookaside buffers (TLBs) to cache guest virtual to guest physical translations, guest physical to host physical translations, and guest virtual to host physical translations.

In one embodiment, the CPUs 1546, GPUs 1539, and I/O devices 1552 are integrated on a single semiconductor chip and/or chip package. The illustrated memory 1549 may be integrated on the same chip or may be coupled to the memory controllers 1548 via an off-chip interface. In one implementation, the memory 1549 comprises GDDR6 memory which shares the same virtual address space as other physical system-level memories, although the underlying principles of the invention are not limited to this specific implementation.

In one embodiment, the tensor cores 1544 include a plurality of execution units specifically designed to perform matrix operations, which are the fundamental compute operation used to perform deep learning operations. For example, simultaneous matrix multiplication operations may be used for neural network training and inferencing. The tensor cores 1544 may perform matrix processing using a variety of operand precisions including single precision floating-point (e.g., 32 bits), half-precision floating point (e.g., 16 bits), integer words (16 bits), bytes (8 bits), and half-bytes (4 bits). In one embodiment, a neural network implementation extracts features of each rendered scene, potentially combining details from multiple frames, to construct a high-quality final image.

In deep learning implementations, parallel matrix multiplication work may be scheduled for execution on the tensor cores 1544. The training of neural networks, in particular, requires a significant number matrix dot product operations. In order to process an inner-product formulation of an N×N×N matrix multiply, the tensor cores 1544 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 1544 to ensure that the most efficient precision is used for different workloads (e.g., such as inferencing workloads which can tolerate quantization to bytes and half-bytes).

In one embodiment, the ray tracing cores 1545 accelerate ray tracing operations for both real-time ray tracing and non-real-time ray tracing implementations. In particular, the ray tracing cores 1545 include ray traversal/intersection circuitry for performing ray traversal using bounding volume hierarchies (BVHs) and identifying intersections between rays and primitives enclosed within the BVH volumes. The ray tracing cores 1545 may also include circuitry for performing depth testing and culling (e.g., using a Z buffer or similar arrangement). In one implementation, the ray tracing cores 1545 perform traversal and intersection operations in concert with the image denoising techniques described herein, at least a portion of which may be executed on the tensor cores 1544. For example, in one embodiment, the tensor cores 1544 implement a deep learning neural network to perform denoising of frames generated by the ray tracing cores 1545. However, the CPU(s) 1546, graphics cores 1543, and/or ray tracing cores 1545 may also implement all or a portion of the denoising and/or deep learning algorithms.

In addition, as described above, a distributed approach to denoising may be employed in which the GPU 1539 is in a computing device coupled to other computing devices over a network or high speed interconnect. In this embodiment, the interconnected computing devices share neural network learning/training data to improve the speed with which the overall system learns to perform denoising for different types of image frames and/or different graphics applications.

In one embodiment, the ray tracing cores 1545 process all BVH traversal and ray-primitive intersections, saving the graphics cores 1543 from being overloaded with thousands of instructions per ray. In one embodiment, each ray tracing core 1545 includes a first set of specialized circuitry for performing bounding box tests (e.g., for traversal operations) and a second set of specialized circuitry for performing the ray-triangle intersection tests (e.g., intersecting rays which have been traversed). Thus, in one embodiment, the multi-core group 1540A can simply launch a ray probe, and the ray tracing cores 1545 independently perform ray traversal and intersection and return hit data (e.g., a hit, no hit, multiple hits, etc.) to the thread context. The other cores 1543, 1544 are freed to perform other graphics or compute work while the ray tracing cores 1545 perform the traversal and intersection operations.

In one embodiment, each ray tracing core 1545 includes a traversal unit to perform BVH testing operations and an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 1543 and tensor cores 1544) are freed to perform other forms of graphics work.

In one particular embodiment described below, a hybrid rasterization/ray tracing approach is used in which work is distributed between the graphics cores 1543 and ray tracing cores 1545.

In one embodiment, the ray tracing cores 1545 (and/or other cores 1543, 1544) include hardware support for a ray tracing instruction set such as Microsoft's DirectX Ray Tracing (DXR) which includes a DispatchRays command, as well as ray-generation, closest-hit, any-hit, and miss shaders, which enable the assignment of unique sets of shaders and textures for each object. Another ray tracing platform which may be supported by the ray tracing cores 1545, graphics cores 1543 and tensor cores 1544 is Vulkan 1.1.85. Note, however, that the underlying principles of the invention are not limited to any particular ray tracing ISA.

In general, the various cores 1545, 1544, 1543 may support a ray tracing instruction set that includes instructions/functions for ray generation, closest hit, any hit, ray-primitive intersection, per-primitive and hierarchical bounding box construction, miss, visit, and exceptions. More specifically, one embodiment includes ray tracing instructions to perform the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the children volumes a ray will traverse.

Exceptions—Includes various types of exception handlers (e.g., invoked for various error conditions).

Figure 11D:
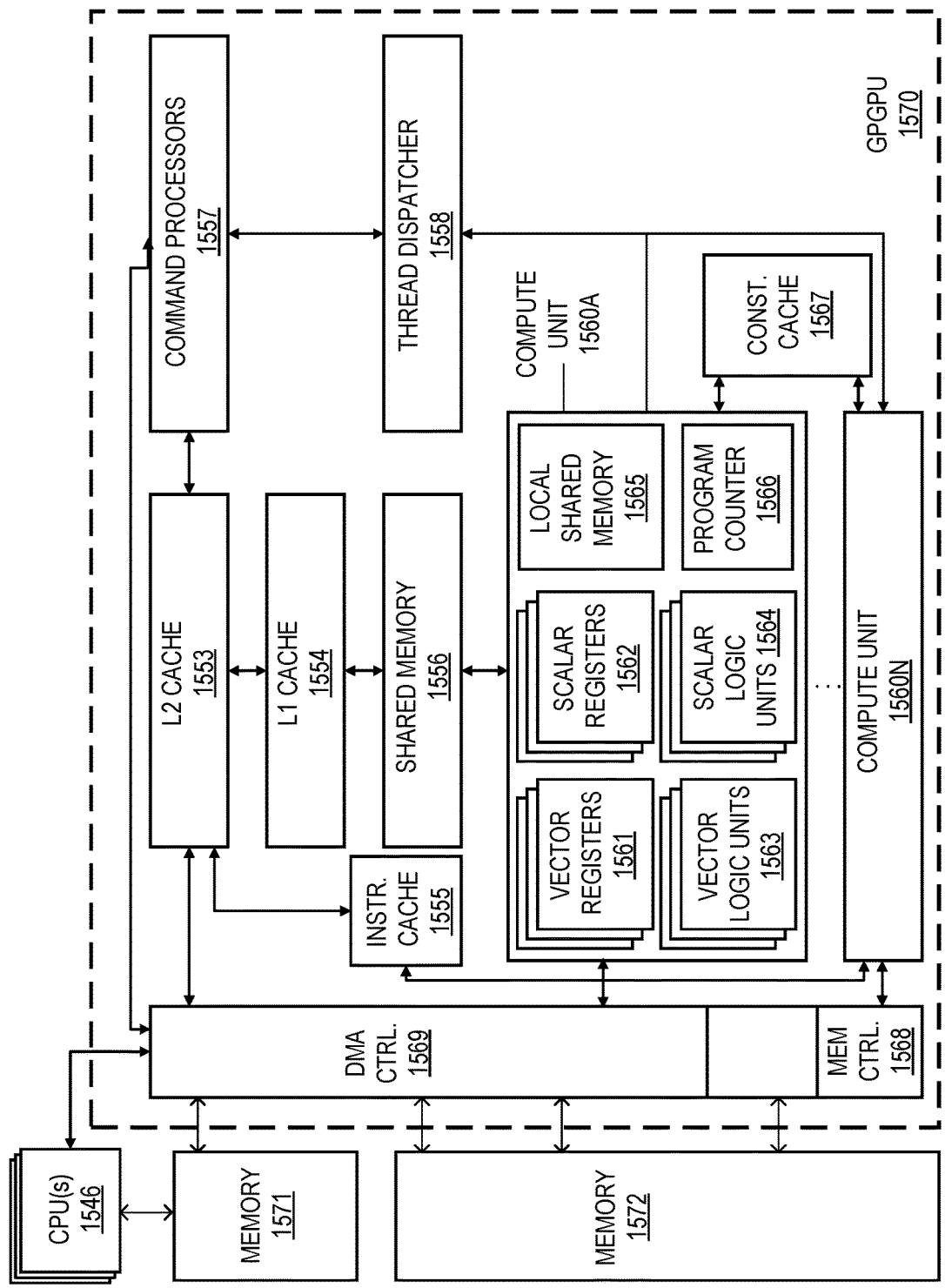

FIG. 11D is a block diagram of general purpose graphics processing unit (GPGPU) 1570 that can be configured as a graphics processor and/or compute accelerator, according to embodiments described herein. The GPGPU 1570 can interconnect with host processors (e.g., one or more CPU(s) 1546) and memory 1571, 1572 via one or more system and/or memory busses. In one embodiment the memory 1571 is system memory that may be shared with the one or more CPU(s) 1546, while memory 1572 is device memory that is dedicated to the GPGPU 1570. In one embodiment, components within the GPGPU 1570 and device memory 1572 may be mapped into memory addresses that are accessible to the one or more CPU(s) 1546. Access to memory 1571 and 1572 may be facilitated via a memory controller 1568. In one embodiment the memory controller 1568 includes an internal direct memory access (DMA) controller 1569 or can include logic to perform operations that would otherwise be performed by a DMA controller.

The GPGPU 1570 includes multiple cache memories, including an L2 cache 1553, L1 cache 1554, an instruction cache 1555, and shared memory 1556, at least a portion of which may also be partitioned as a cache memory. The GPGPU 1570 also includes multiple compute units 1560A-1560N. Each compute unit 1560A-1560N includes a set of vector registers 1561, scalar registers 1562, vector logic units 1563, and scalar logic units 1564. The compute units 1560A-1560N can also include local shared memory 1565 and a program counter 1566. The compute units 1560A-1560N can couple with a constant cache 1567, which can be used to store constant data, which is data that will not change during the run of kernel or shader program that executes on the GPGPU 1570. In one embodiment the constant cache 1567 is a scalar data cache and cached data can be fetched directly into the scalar registers 1562.

During operation, the one or more CPU(s) 1546 can write commands into registers or memory in the GPGPU 1570 that has been mapped into an accessible address space. The command processors 1557 can read the commands from registers or memory and determine how those commands will be processed within the GPGPU 1570. A thread dispatcher 1558 can then be used to dispatch threads to the compute units 1560A-1560N to perform those commands. Each compute unit 1560A-1560N can execute threads independently of the other compute units. Additionally each compute unit 1560A-1560N can be independently configured for conditional computation and can conditionally output the results of computation to memory. The command processors 1557 can interrupt the one or more CPU(s) 1546 when the submitted commands are complete.

Figure 12A:
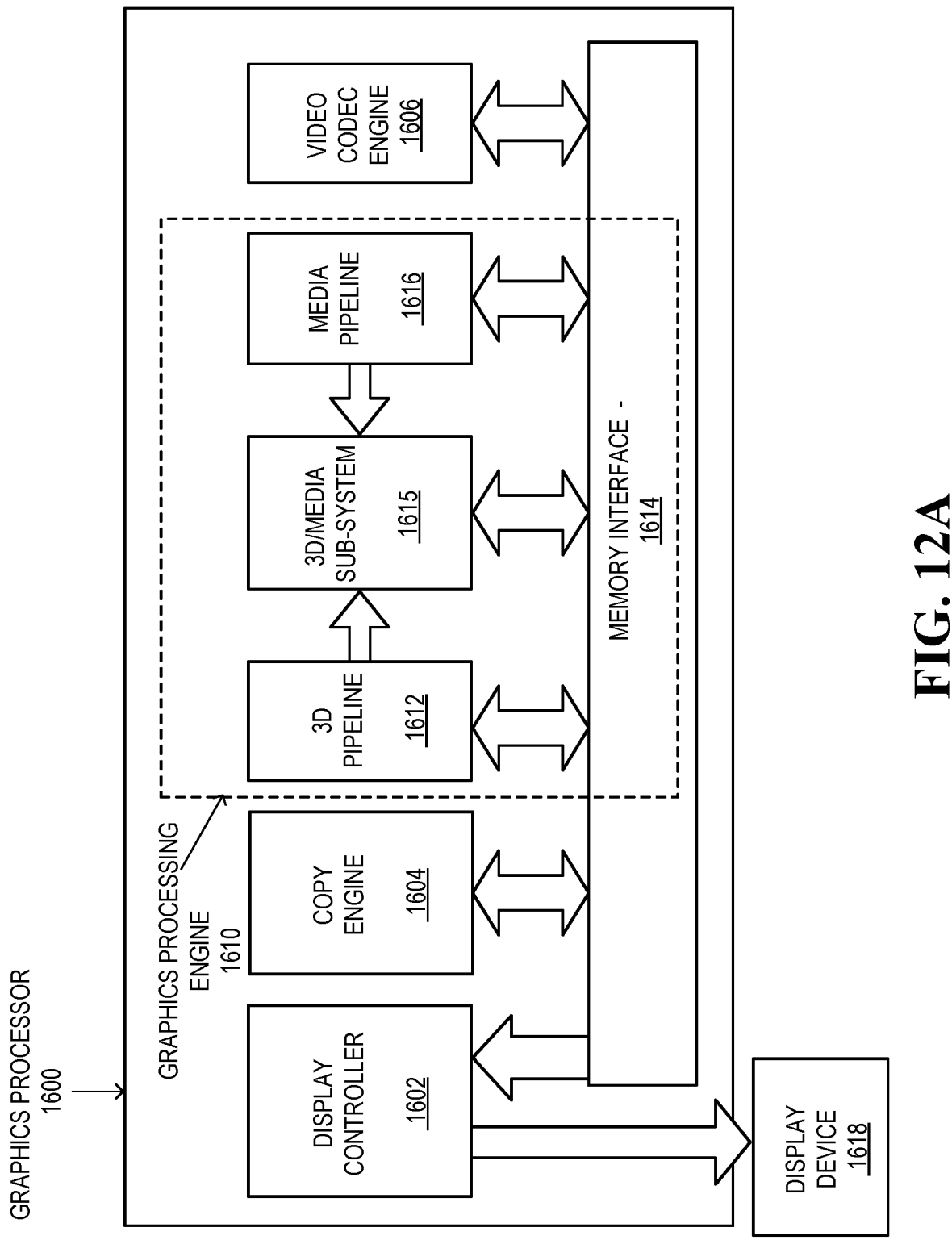
FIGS. 12A-12C are block diagrams of examples of additional graphics processor and compute accelerator architectures according to embodiments.
Figure 12B:
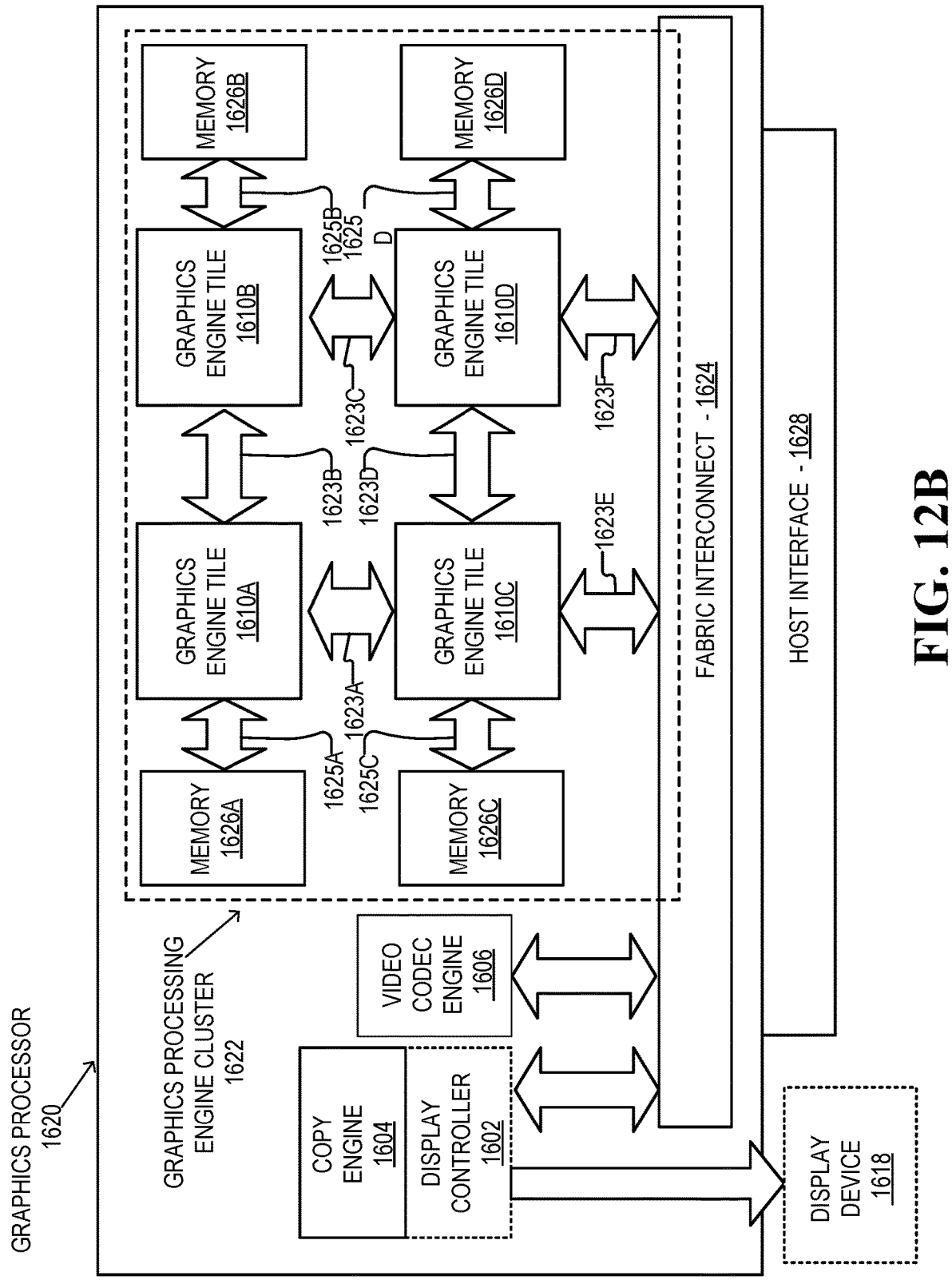

FIGS. 12A-12B illustrate block diagrams of additional graphics processor and compute accelerator architectures provided by embodiments described herein. The elements of FIGS. 12A-12B having the same reference numbers (or names) as the elements of any other figure herein can operate or function in any manner similar to that described elsewhere herein, but are not limited to such.

FIG. 12A is a block diagram of a graphics processor 1600, which may be a discrete graphics processing unit, or may be a graphics processor integrated with a plurality of processing cores, or other semiconductor devices such as, but not limited to, memory devices or network interfaces. In some embodiments, the graphics processor communicates via a memory mapped I/O interface to registers on the graphics processor and with commands placed into the processor memory. In some embodiments, graphics processor 1600 includes a memory interface 1614 to access memory. Memory interface 1614 can be an interface to local memory, one or more internal caches, one or more shared external caches, and/or to system memory.

In some embodiments, graphics processor 1600 also includes a display controller 1602 to drive display output data to a display device 1618. Display controller 1602 includes hardware for one or more overlay planes for the display and composition of multiple layers of video or user interface elements. The display device 1618 can be an internal or external display device. In one embodiment the display device 1618 is a head mounted display device, such as a virtual reality (VR) display device or an augmented reality (AR) display device. In some embodiments, graphics processor 1600 includes a video codec engine 1606 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, H.265/HEVC, Alliance for Open Media (AOMedia) VP8, VP9, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 1600 includes a block image transfer (BLIT) engine 1604 to perform two-dimensional (2D) rasterizer operations including, for example, bit-boundary block transfers. However, in one embodiment, 2D graphics operations are performed using one or more components of graphics processing engine (GPE) 1610. In some embodiments, GPE 1610 is a compute engine for performing graphics operations, including three-dimensional (3D) graphics operations and media operations.

In some embodiments, GPE 1610 includes a 3D pipeline 1612 for performing 3D operations, such as rendering three-dimensional images and scenes using processing functions that act upon 3D primitive shapes (e.g., rectangle, triangle, etc.). The 3D pipeline 1612 includes programmable and fixed function elements that perform various tasks within the element and/or spawn execution threads to a 3D/Media sub-system 1615. While 3D pipeline 1612 can be used to perform media operations, an embodiment of GPE 1610 also includes a media pipeline 1616 that is specifically used to perform media operations, such as video post-processing and image enhancement.

In some embodiments, media pipeline 1616 includes fixed function or programmable logic units to perform one or more specialized media operations, such as video decode acceleration, video de-interlacing, and video encode acceleration in place of, or on behalf of video codec engine 1606. In some embodiments, media pipeline 1616 additionally includes a thread spawning unit to spawn threads for execution on 3D/Media sub-system 1615. The spawned threads perform computations for the media operations on one or more graphics execution units included in 3D/Media sub-system 1615.

In some embodiments, 3D/Media subsystem 1615 includes logic for executing threads spawned by 3D pipeline 1612 and media pipeline 1616. In one embodiment, the pipelines send thread execution requests to 3D/Media sub-system 1615, which includes thread dispatch logic for arbitrating and dispatching the various requests to available thread execution resources. The execution resources include an array of graphics execution units to process the 3D and media threads. In some embodiments, 3D/Media subsystem 1615 includes one or more internal caches for thread instructions and data. In some embodiments, the subsystem also includes shared memory, including registers and addressable memory, to share data between threads and to store output data.

FIG. 12B illustrates a graphics processor 1620 having a tiled architecture, according to embodiments described herein. In one embodiment the graphics processor 1620 includes a graphics processing engine cluster 1622 having multiple instances of the graphics processing engine 1610 of FIG. 12A within a graphics engine tile 1610A-1610D. Each graphics engine tile 1610A-1610D can be interconnected via a set of tile interconnects 1623A-1623F. Each graphics engine tile 1610A-1610D can also be connected to a memory module or memory device 1626A-1626D via memory interconnects 1625A-1625D. The memory devices 1626A-1626D can use any graphics memory technology. For example, the memory devices 1626A-1626D may be graphics double data rate (GDDR) memory. The memory devices 1626A-1626D, in one embodiment, are high-bandwidth memory (HBM) modules that can be on-die with their respective graphics engine tile 1610A-1610D. In one embodiment the memory devices 1626A-1626D are stacked memory devices that can be stacked on top of their respective graphics engine tile 1610A-1610D. In one embodiment, each graphics engine tile 1610A-1610D and associated memory 1626A-1626D reside on separate chiplets, which are bonded to a base die or base substrate, as described on further detail in FIGS. 20B-20D.

The graphics processing engine cluster 1622 can connect with an on-chip or on-package fabric interconnect 1624. The fabric interconnect 1624 can enable communication between graphics engine tiles 1610A-1610D and components such as the video codec 1606 and one or more copy engines 1604. The copy engines 1604 can be used to move data out of, into, and between the memory devices 1626A-1626D and memory that is external to the graphics processor 1620 (e.g., system memory). The fabric interconnect 1624 can also be used to interconnect the graphics engine tiles 1610A-1610D. The graphics processor 1620 may optionally include a display controller 1602 to enable a connection with an external display device 1618. The graphics processor may also be configured as a graphics or compute accelerator. In the accelerator configuration, the display controller 1602 and display device 1618 may be omitted.

The graphics processor 1620 can connect to a host system via a host interface 1628. The host interface 1628 can enable communication between the graphics processor 1620, system memory, and/or other system components. The host interface 1628 can be, for example a PCI express bus or another type of host system interface.

Figure 12C:
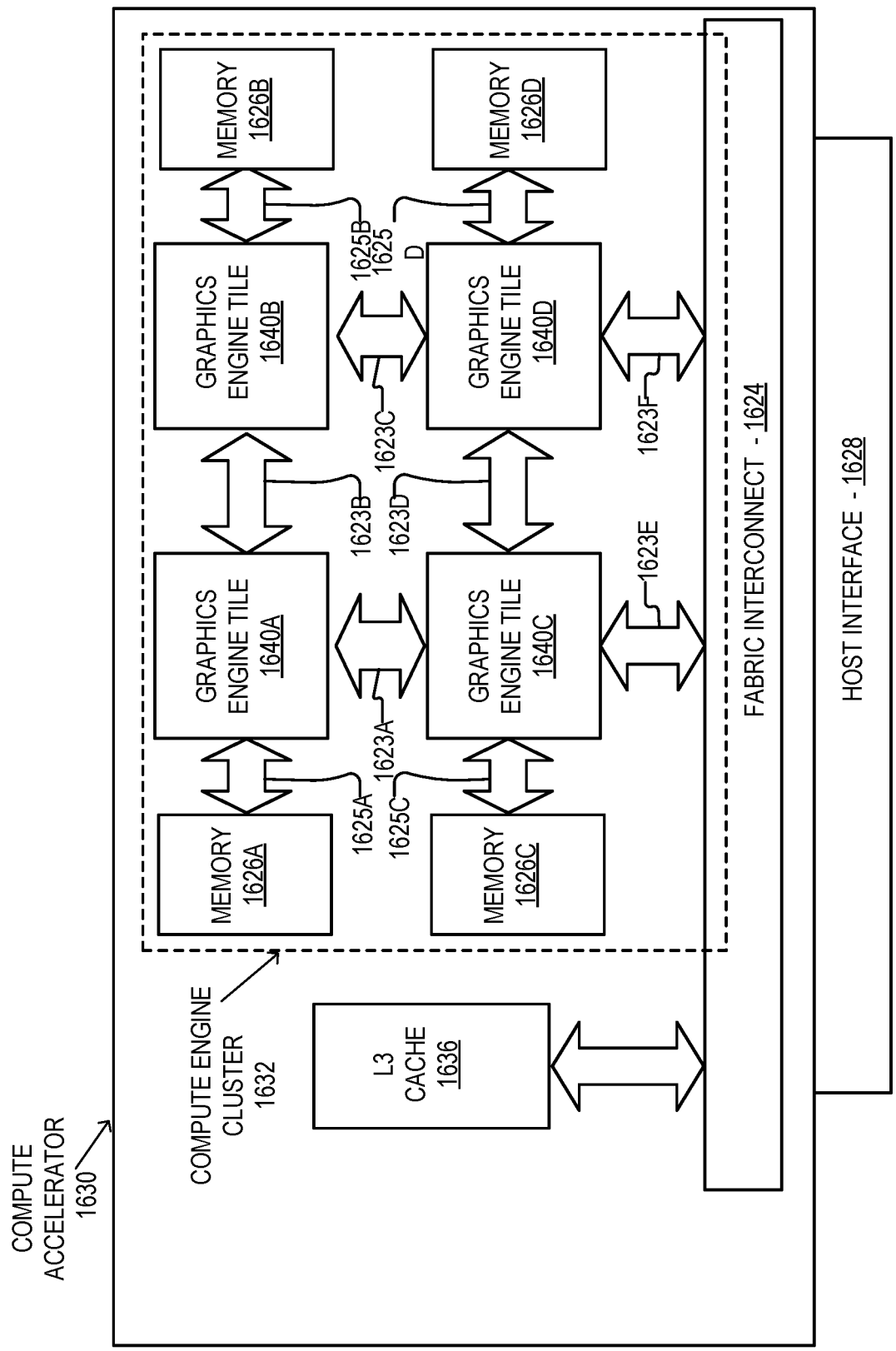

FIG. 12C illustrates a compute accelerator 1630, according to embodiments described herein. The compute accelerator 1630 can include architectural similarities with the graphics processor 1620 of FIG. 12B and is optimized for compute acceleration. A compute engine cluster 1632 can include a set of compute engine tiles 1640A-1640D that include execution logic that is optimized for parallel or vector-based general-purpose compute operations. In some embodiments, the compute engine tiles 1640A-1640D do not include fixed function graphics processing logic, although in one embodiment one or more of the compute engine tiles 1640A-1640D can include logic to perform media acceleration. The compute engine tiles 1640A-1640D can connect to memory 1626A-1626D via memory interconnects 1625A-1625D. The memory 1626A-1626D and memory interconnects 1625A-1625D may be similar technology as in graphics processor 1620, or can be different. The graphics compute engine tiles 1640A-1640D can also be interconnected via a set of tile interconnects 1623A-1623F and may be connected with and/or interconnected by a fabric interconnect 1624. In one embodiment the compute accelerator 1630 includes a large L3 cache 1636 that can be configured as a device-wide cache. The compute accelerator 1630 can also connect to a host processor and memory via a host interface 1628 in a similar manner as the graphics processor 1620 of FIG. 12B.

Graphics Processing Engine

Figure 13:
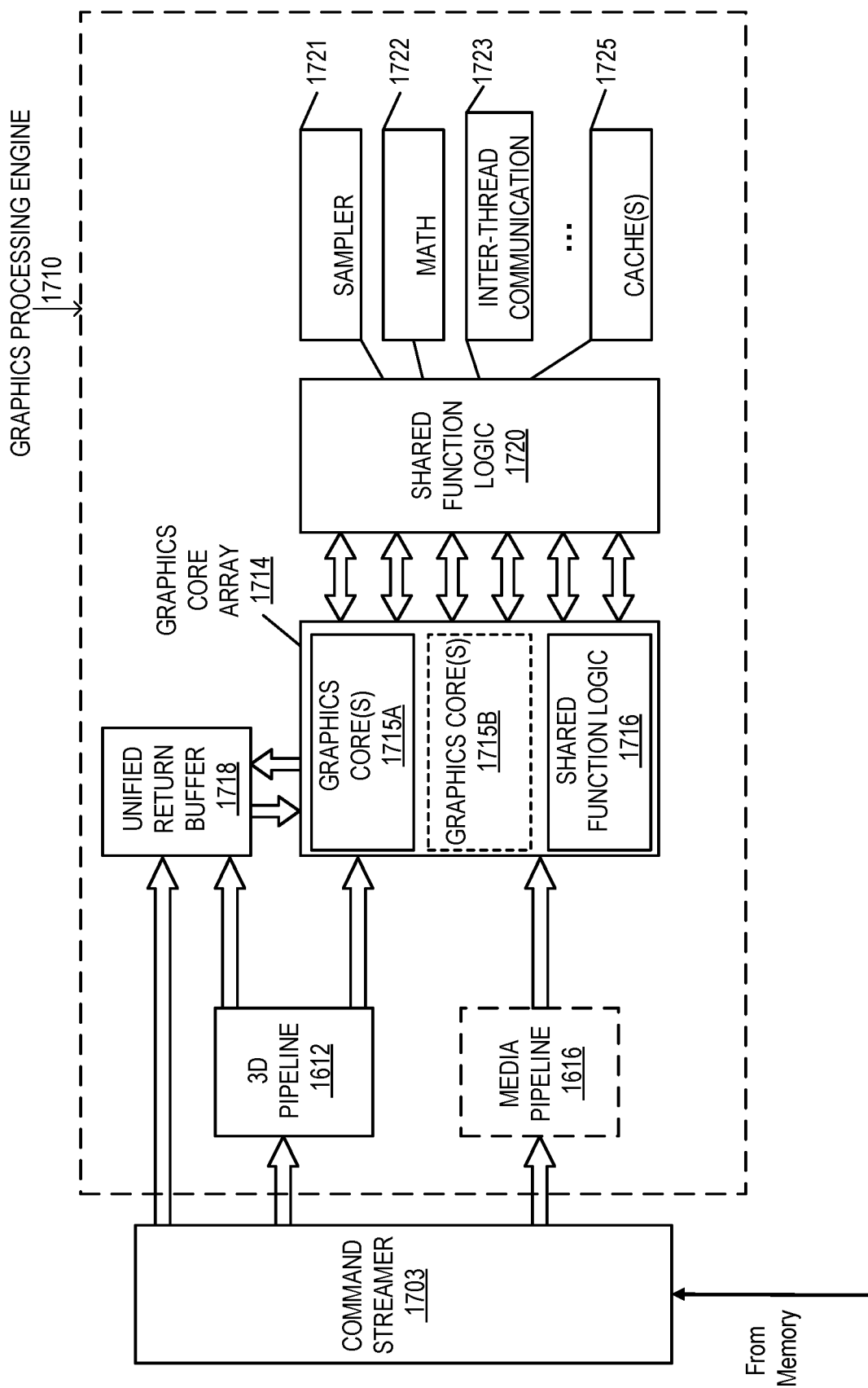
FIG. 13 is a block diagram of an example of a graphics processing engine of a graphics processor according to an embodiment.

FIG. 13 is a block diagram of a graphics processing engine 1710 of a graphics processor in accordance with some embodiments. In one embodiment, the graphics processing engine (GPE) 1710 is a version of the GPE 310 shown in FIG. 12A, and may also represent a graphics engine tile 310A-310D of FIG. 12B. Elements of FIG. 13 having the same reference numbers (or names) as the elements of any other figure herein can operate or function in any manner similar to that described elsewhere herein, but are not limited to such. For example, the 3D pipeline 312 and media pipeline 316 of FIG. 12A are illustrated. The media pipeline 316 is optional in some embodiments of the GPE 1710 and may not be explicitly included within the GPE 1710. For example and in at least one embodiment, a separate media and/or image processor is coupled to the GPE 1710.

In some embodiments, GPE 1710 couples with or includes a command streamer 1703, which provides a command stream to the 3D pipeline 312 and/or media pipelines 316. In some embodiments, command streamer 1703 is coupled with memory, which can be system memory, or one or more of internal cache memory and shared cache memory. In some embodiments, command streamer 1703 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 1714. In one embodiment the graphics core array 1714 include one or more blocks of graphics cores (e.g., graphics core(s) 1715A, graphics core(s) 1715B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic.

In various embodiments the 3D pipeline 312 can include fixed function and programmable logic to process one or more shader programs, such as vertex shaders, geometry shaders, pixel shaders, fragment shaders, compute shaders, or other shader programs, by processing the instructions and dispatching execution threads to the graphics core array 1714. The graphics core array 1714 provides a unified block of execution resources for use in processing these shader programs. Multi-purpose execution logic (e.g., execution units) within the graphics core(s) 1715A-1714B of the graphic core array 1714 includes support for various 3D API shader languages and can execute multiple simultaneous execution threads associated with multiple shaders.

In some embodiments, the graphics core array 1714 includes execution logic to perform media functions, such as video and/or image processing. In one embodiment, the execution units include general-purpose logic that is programmable to perform parallel general-purpose computational operations, in addition to graphics processing operations. The general-purpose logic can perform processing operations in parallel or in conjunction with general-purpose logic within the processor core(s) 1407 of FIG. 10 or core 1502A-1502N as in FIG. 11A.

Output data generated by threads executing on the graphics core array 1714 can output data to memory in a unified return buffer (URB) 1718. The URB 1718 can store data for multiple threads. In some embodiments the URB 1718 may be used to send data between different threads executing on the graphics core array 1714. In some embodiments the URB 1718 may additionally be used for synchronization between threads on the graphics core array and fixed function logic within the shared function logic 1720.

In some embodiments, graphics core array 1714 is scalable, such that the array includes a variable number of graphics cores, each having a variable number of execution units based on the target power and performance level of GPE 1710. In one embodiment the execution resources are dynamically scalable, such that execution resources may be enabled or disabled as needed.

The graphics core array 1714 couples with shared function logic 1720 that includes multiple resources that are shared between the graphics cores in the graphics core array. The shared functions within the shared function logic 1720 are hardware logic units that provide specialized supplemental functionality to the graphics core array 1714. In various embodiments, shared function logic 1720 includes but is not limited to sampler 1721, math 1722, and inter-thread communication (ITC) 1723 logic. Additionally, some embodiments implement one or more cache(s) 1725 within the shared function logic 1720.

A shared function is implemented at least in a case where the demand for a given specialized function is insufficient for inclusion within the graphics core array 1714. Instead a single instantiation of that specialized function is implemented as a stand-alone entity in the shared function logic 1720 and shared among the execution resources within the graphics core array 1714. The precise set of functions that are shared between the graphics core array 1714 and included within the graphics core array 1714 varies across embodiments. In some embodiments, specific shared functions within the shared function logic 1720 that are used extensively by the graphics core array 1714 may be included within shared function logic 1716 within the graphics core array 1714. In various embodiments, the shared function logic 1716 within the graphics core array 1714 can include some or all logic within the shared function logic 1720. In one embodiment, all logic elements within the shared function logic 1720 may be duplicated within the shared function logic 1716 of the graphics core array 1714. In one embodiment the shared function logic 1720 is excluded in favor of the shared function logic 1716 within the graphics core array 1714.

Execution Units

Figure 14A:
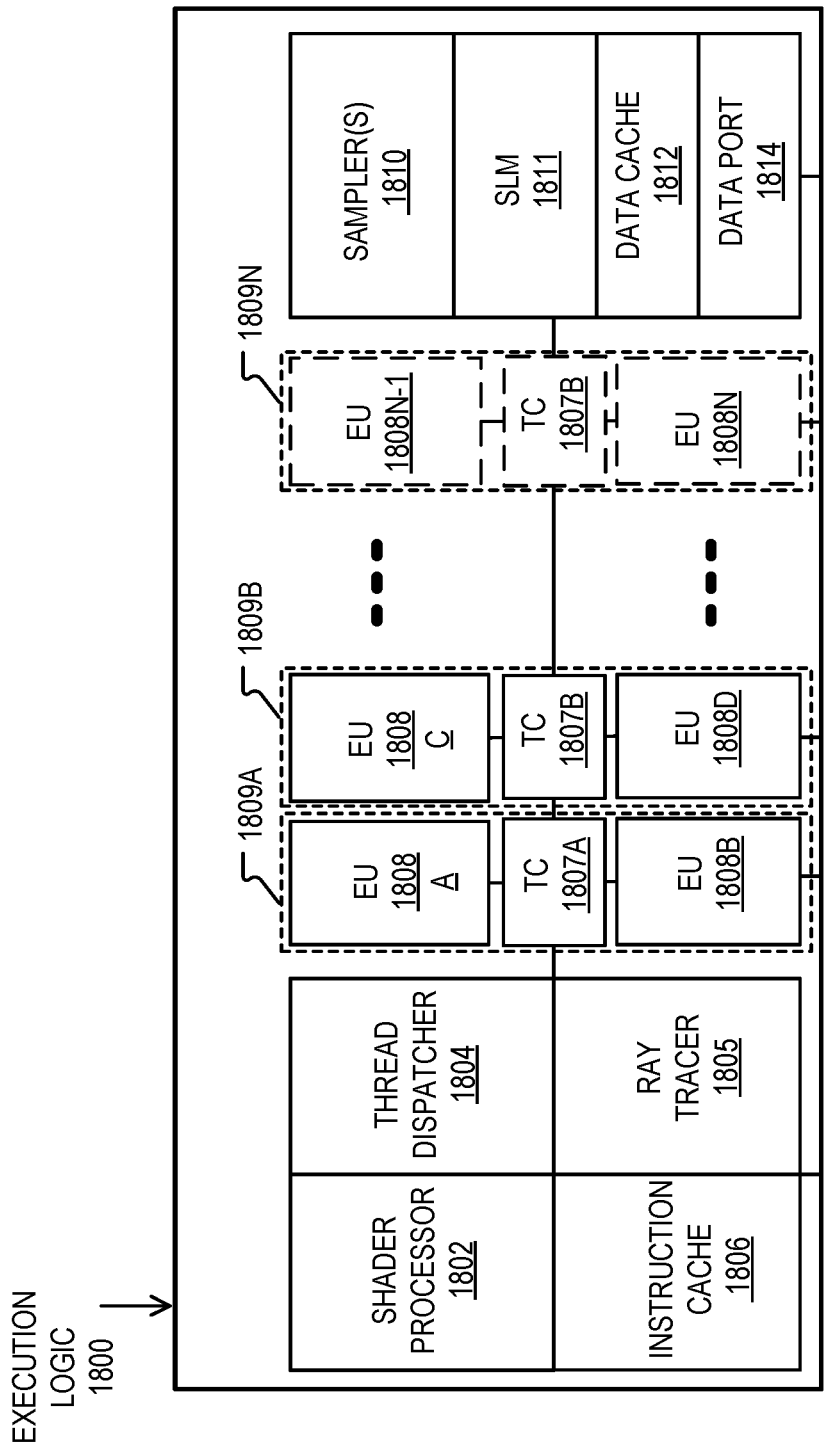
FIGS. 14A-14B is a block diagram of an example of thread execution logic of a graphics processor core according to an embodiment.
Figure 14B:
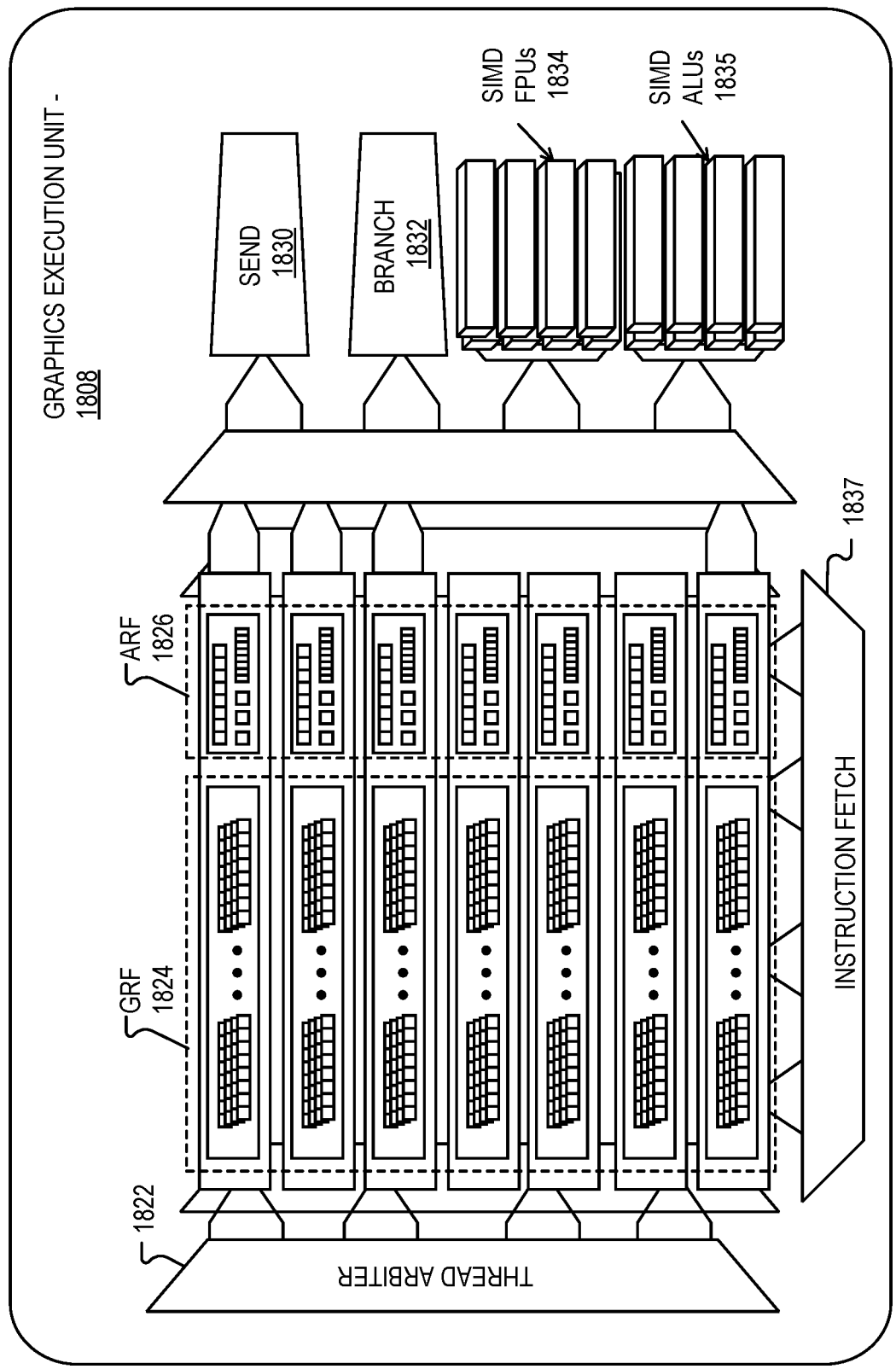

FIGS. 14A-14B illustrate thread execution logic 1800 including an array of processing elements employed in a graphics processor core according to embodiments described herein. Elements of FIGS. 14A-14B having the same reference numbers (or names) as the elements of any other figure herein can operate or function in any manner similar to that described elsewhere herein, but are not limited to such. FIG. 14A-14B illustrates an overview of thread execution logic 1800, which may be representative of hardware logic illustrated with each sub-core 221A-221F of FIG. 11B. FIG. 14A is representative of an execution unit within a general-purpose graphics processor, while FIG. 14B is representative of an execution unit that may be used within a compute accelerator.

As illustrated in FIG. 14A, in some embodiments thread execution logic 1800 includes a shader processor 1802, a thread dispatcher 1804, instruction cache 1806, a scalable execution unit array including a plurality of execution units 1808A-1808N, a sampler 1810, shared local memory 1811, a data cache 1812, and a data port 1814. In one embodiment the scalable execution unit array can dynamically scale by enabling or disabling one or more execution units (e.g., any of execution units 1808A, 1808B, 1808C, 1808D, through 1808N-1 and 1808N) based on the computational requirements of a workload. In one embodiment the included components are interconnected via an interconnect fabric that links to each of the components. In some embodiments, thread execution logic 1800 includes one or more connections to memory, such as system memory or cache memory, through one or more of instruction cache 1806, data port 1814, sampler 1810, and execution units 1808A-1808N. In some embodiments, each execution unit (e.g., 1808A) is a stand-alone programmable general-purpose computational unit that is capable of executing multiple simultaneous hardware threads while processing multiple data elements in parallel for each thread. In various embodiments, the array of execution units 1808A-1808N is scalable to include any number individual execution units.

In some embodiments, the execution units 1808A-1808N are primarily used to execute shader programs. A shader processor 1802 can process the various shader programs and dispatch execution threads associated with the shader programs via a thread dispatcher 1804. In one embodiment the thread dispatcher includes logic to arbitrate thread initiation requests from the graphics and media pipelines and instantiate the requested threads on one or more execution unit in the execution units 1808A-1808N. For example, a geometry pipeline can dispatch vertex, tessellation, or geometry shaders to the thread execution logic for processing. In some embodiments, thread dispatcher 1804 can also process runtime thread spawning requests from the executing shader programs.

In some embodiments, the execution units 1808A-1808N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 1808A-1808N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 1808A-1808N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader. Various embodiments can apply to use execution by use of Single Instruction Multiple Thread (SIMT) as an alternate to use of SIMD or in addition to use of SIMD. Reference to a SIMD core or operation can apply also to SIMT or apply to SIMD in combination with SIMT.

Each execution unit in execution units 1808A-1808N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 1808A-1808N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 54-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused execution unit 1809A-1809N having thread control logic (1807A-1807N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 1809A-1809N includes at least two execution units. For example, fused execution unit 1809A includes a first EU 1808A, second EU 1808B, and thread control logic 1807A that is common to the first EU 1808A and the second EU 1808B. The thread control logic 1807A controls threads executed on the fused graphics execution unit 1809A, allowing each EU within the fused execution units 1809A-1809N to execute using a common instruction pointer register.

One or more internal instruction caches (e.g., 1806) are included in the thread execution logic 1800 to cache thread instructions for the execution units. In some embodiments, one or more data caches (e.g., 1812) are included to cache thread data during thread execution. Threads executing on the execution logic 1800 can also store explicitly managed data in the shared local memory 1811. In some embodiments, a sampler 1810 is included to provide texture sampling for 3D operations and media sampling for media operations. In some embodiments, sampler 1810 includes specialized texture or media sampling functionality to process texture or media data during the sampling process before providing the sampled data to an execution unit.

During execution, the graphics and media pipelines send thread initiation requests to thread execution logic 1800 via thread spawning and dispatch logic. Once a group of geometric objects has been processed and rasterized into pixel data, pixel processor logic (e.g., pixel shader logic, fragment shader logic, etc.) within the shader processor 1802 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 1802 then executes an application programming interface (API)-supplied pixel or fragment shader program. To execute the shader program, the shader processor 1802 dispatches threads to an execution unit (e.g., 1808A) via thread dispatcher 1804. In some embodiments, shader processor 1802 uses texture sampling logic in the sampler 1810 to access texture data in texture maps stored in memory. Arithmetic operations on the texture data and the input geometry data compute pixel color data for each geometric fragment, or discards one or more pixels from further processing.

In some embodiments, the data port 1814 provides a memory access mechanism for the thread execution logic 1800 to output processed data to memory for further processing on a graphics processor output pipeline. In some embodiments, the data port 1814 includes or couples to one or more cache memories (e.g., data cache 1812) to cache data for memory access via the data port.

In one embodiment, the execution logic 1800 can also include a ray tracer 1805 that can provide ray tracing acceleration functionality. The ray tracer 1805 can support a ray tracing instruction set that includes instructions/functions for ray generation. The ray tracing instruction set can be similar to or different from the ray-tracing instruction set supported by the ray tracing cores 245 in FIG. 11C.

FIG. 14B illustrates exemplary internal details of an execution unit 1808, according to embodiments. A graphics execution unit 1808 can include an instruction fetch unit 1837, a general register file array (GRF) 1824, an architectural register file array (ARF) 1826, a thread arbiter 1822, a send unit 1830, a branch unit 1832, a set of SIMD floating point units (FPUs) 1834, and in one embodiment a set of dedicated integer SIMD ALUs 1835. The GRF 1824 and ARF 1826 includes the set of general register files and architecture register files associated with each simultaneous hardware thread that may be active in the graphics execution unit 1808. In one embodiment, per thread architectural state is maintained in the ARF 1826, while data used during thread execution is stored in the GRF 1824. The execution state of each thread, including the instruction pointers for each thread, can be held in thread-specific registers in the ARF 1826.

In one embodiment the graphics execution unit 1808 has an architecture that is a combination of Simultaneous Multi-Threading (SMT) and fine-grained Interleaved Multi-Threading (IMT). The architecture has a modular configuration that can be fine-tuned at design time based on a target number of simultaneous threads and number of registers per execution unit, where execution unit resources are divided across logic used to execute multiple simultaneous threads. The number of logical threads that may be executed by the graphics execution unit 1808 is not limited to the number of hardware threads, and multiple logical threads can be assigned to each hardware thread.

In one embodiment, the graphics execution unit 1808 can co-issue multiple instructions, which may each be different instructions. The thread arbiter 1822 of the graphics execution unit thread 1808 can dispatch the instructions to one of the send unit 1830, branch unit 1832, or SIMD FPU(s) 1834 for execution. Each execution thread can access 128 general-purpose registers within the GRF 1824, where each register can store 32 bytes, accessible as a SIMD 8-element vector of 32-bit data elements. In one embodiment, each execution unit thread has access to 4 Kbytes within the GRF 1824, although embodiments are not so limited, and greater or fewer register resources may be provided in other embodiments. In one embodiment the graphics execution unit 1808 is partitioned into seven hardware threads that can independently perform computational operations, although the number of threads per execution unit can also vary according to embodiments. For example, in one embodiment up to 16 hardware threads are supported. In an embodiment in which seven threads may access 4 Kbytes, the GRF 1824 can store a total of 28 Kbytes. Where 16 threads may access 4 Kbytes, the GRF 1824 can store a total of 64 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 1830. In one embodiment, branch instructions are dispatched to a dedicated branch unit 1832 to facilitate SIMD divergence and eventual convergence.

In one embodiment the graphics execution unit 1808 includes one or more SIMD floating point units (FPU(s)) 1834 to perform floating-point operations. In one embodiment, the FPU(s) 1834 also support integer computation. In one embodiment the FPU(s) 1834 can SIMD execute up to M number of 32-bit floating-point (or integer) operations, or SIMD execute up to 2M 16-bit integer or 16-bit floating-point operations. In one embodiment, at least one of the FPU(s) provides extended math capability to support high-throughput transcendental math functions and double precision 54-bit floating-point. In some embodiments, a set of 8-bit integer SIMD ALUs 1835 are also present, and may be specifically optimized to perform operations associated with machine learning computations.

In one embodiment, arrays of multiple instances of the graphics execution unit 1808 can be instantiated in a graphics sub-core grouping (e.g., a sub-slice). For scalability, product architects can choose the exact number of execution units per sub-core grouping. In one embodiment the execution unit 1808 can execute instructions across a plurality of execution channels. In a further embodiment, each thread executed on the graphics execution unit 1808 is executed on a different channel.

Figure 15:
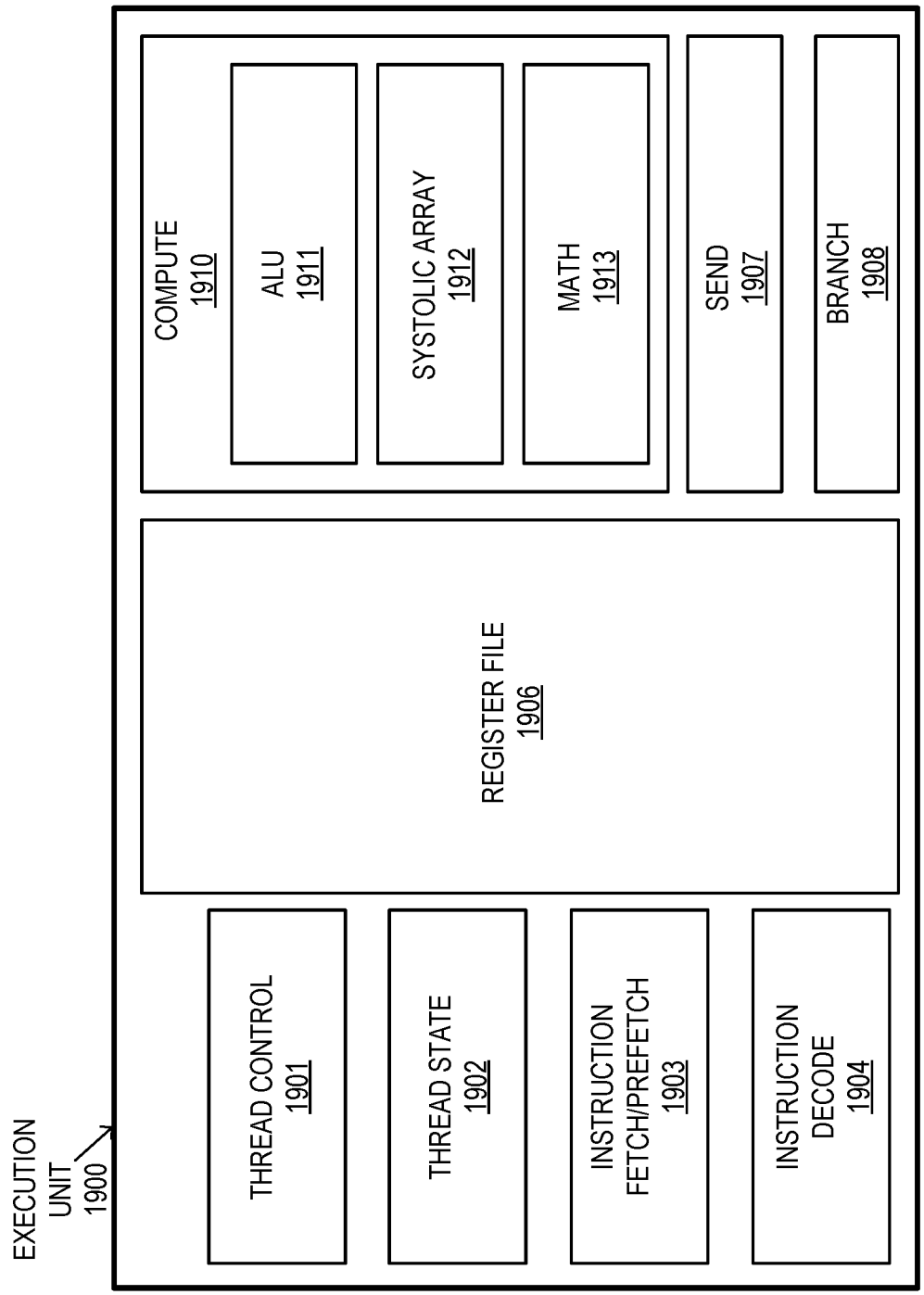
FIG. 15 illustrates an example of an additional execution unit according to an embodiment.

FIG. 15 illustrates an additional execution unit 1900, according to an embodiment. The execution unit 1900 may be a compute-optimized execution unit for use in, for example, a compute engine tile 340A-340D as in FIG. 12C, but is not limited as such. Variants of the execution unit 1900 may also be used in a graphics engine tile 310A-310D as in FIG. 12B. In one embodiment, the execution unit 1900 includes a thread control unit 1901, a thread state unit 1902, an instruction fetch/prefetch unit 1903, and an instruction decode unit 1904. The execution unit 1900 additionally includes a register file 1906 that stores registers that can be assigned to hardware threads within the execution unit. The execution unit 1900 additionally includes a send unit 1907 and a branch unit 1908. In one embodiment, the send unit 1907 and branch unit 1908 can operate similarly as the send unit 1830 and a branch unit 1832 of the graphics execution unit 1808 of FIG. 14B.

The execution unit 1900 also includes a compute unit 1910 that includes multiple different types of functional units. In one embodiment the compute unit 1910 includes an ALU unit 1911 that includes an array of arithmetic logic units. The ALU unit 1911 can be configured to perform 64-bit, 32-bit, and 16-bit integer and floating point operations. Integer and floating point operations may be performed simultaneously. The compute unit 1910 can also include a systolic array 1912, and a math unit 1913. The systolic array 1912 includes a W wide and D deep network of data processing units that can be used to perform vector or other data-parallel operations in a systolic manner. In one embodiment the systolic array 1912 can be configured to perform matrix operations, such as matrix dot product operations. In one embodiment the systolic array 1912 support 16-bit floating point operations, as well as 8-bit and 4-bit integer operations. In one embodiment the systolic array 1912 can be configured to accelerate machine learning operations. In such embodiments, the systolic array 1912 can be configured with support for the bfloat 16-bit floating point format. In one embodiment, a math unit 1913 can be included to perform a specific subset of mathematical operations in an efficient and lower-power manner than then ALU unit 1911. The math unit 1913 can include a variant of math logic that may be found in shared function logic of a graphics processing engine provided by other embodiments (e.g., math logic 422 of the shared function logic 420 of FIG. 13). In one embodiment the math unit 1913 can be configured to perform 32-bit and 64-bit floating point operations.

The thread control unit 1901 includes logic to control the execution of threads within the execution unit. The thread control unit 1901 can include thread arbitration logic to start, stop, and preempt execution of threads within the execution unit 1900. The thread state unit 1902 can be used to store thread state for threads assigned to execute on the execution unit 1900. Storing the thread state within the execution unit 1900 enables the rapid pre-emption of threads when those threads become blocked or idle. The instruction fetch/prefetch unit 1903 can fetch instructions from an instruction cache of higher level execution logic (e.g., instruction cache 1806 as in FIG. 14A). The instruction fetch/prefetch unit 1903 can also issue prefetch requests for instructions to be loaded into the instruction cache based on an analysis of currently executing threads. The instruction decode unit 1904 can be used to decode instructions to be executed by the compute units. In one embodiment, the instruction decode unit 1904 can be used as a secondary decoder to decode complex instructions into constituent micro-operations.

The execution unit 1900 additionally includes a register file 1906 that can be used by hardware threads executing on the execution unit 1900. Registers in the register file 1906 can be divided across the logic used to execute multiple simultaneous threads within the compute unit 1910 of the execution unit 1900. The number of logical threads that may be executed by the graphics execution unit 1900 is not limited to the number of hardware threads, and multiple logical threads can be assigned to each hardware thread. The size of the register file 1906 can vary across embodiments based on the number of supported hardware threads. In one embodiment, register renaming may be used to dynamically allocate registers to hardware threads.

Figure 16:
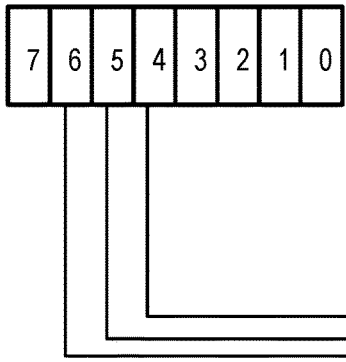
FIG. 16 is a block diagram illustrating an example of a graphics processor instruction formats according to an embodiment.

FIG. 16 is a block diagram illustrating a graphics processor instruction formats 2000 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 2000 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 2010. A 64-bit compacted instruction format 2030 is available for some instructions based on the selected instruction, instruction options, and number of operands. The native 128-bit instruction format 2010 provides access to all instruction options, while some options and operations are restricted in the 64-bit format 2030. The native instructions available in the 64-bit format 2030 vary by embodiment. In some embodiments, the instruction is compacted in part using a set of index values in an index field 2013. The execution unit hardware references a set of compaction tables based on the index values and uses the compaction table outputs to reconstruct a native instruction in the 128-bit instruction format 2010. Other sizes and formats of instruction can be used.

For each format, instruction opcode 2012 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 2014 enables control over certain execution options, such as channels selection (e.g., predication) and data channel order (e.g., swizzle). For instructions in the 128-bit instruction format 2010 an exec-size field 2016 limits the number of data channels that will be executed in parallel. In some embodiments, exec-size field 2016 is not available for use in the 64-bit compact instruction format 2030.

Some execution unit instructions have up to three operands including two source operands, src0 2020, src1 2022, and one destination 2018. In some embodiments, the execution units support dual destination instructions, where one of the destinations is implied. Data manipulation instructions can have a third source operand (e.g., SRC2 2024), where the instruction opcode 2012 determines the number of source operands. An instruction's last source operand can be an immediate (e.g., hard-coded) value passed with the instruction.

In some embodiments, the 128-bit instruction format 2010 includes an access/address mode field 2026 specifying, for example, whether direct register addressing mode or indirect register addressing mode is used. When direct register addressing mode is used, the register address of one or more operands is directly provided by bits in the instruction.

In some embodiments, the 128-bit instruction format 2010 includes an access/address mode field 2026, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 2026 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 2012 bit-fields to simplify Opcode decode 2040. For an 8-bit opcode, bits 4, 5, and 6 allow the execution unit to determine the type of opcode. The precise opcode grouping shown is merely an example. In some embodiments, a move and logic opcode group 2042 includes data movement and logic instructions (e.g., move (mov), compare (cmp)). In some embodiments, move and logic group 2042 shares the five most significant bits (MSB), where move (mov) instructions are in the form of 0000xxxxb and logic instructions are in the form of 0001xxxxb. A flow control instruction group 2044 (e.g., call, jump (jmp)) includes instructions in the form of 0010xxxxb (e.g., 0x20). A miscellaneous instruction group 2046 includes a mix of instructions, including synchronization instructions (e.g., wait, send) in the form of 0011xxxxb (e.g., 0x30). A parallel math instruction group 2048 includes component-wise arithmetic instructions (e.g., add, multiply (mul)) in the form of 0100xxxxb (e.g., 0x40). The parallel math group 2048 performs the arithmetic operations in parallel across data channels. The vector math group 2050 includes arithmetic instructions (e.g., dp4) in the form of 0101xxxxb (e.g., 0x50). The vector math group performs arithmetic such as dot product calculations on vector operands. The illustrated opcode decode 2040, in one embodiment, can be used to determine which portion of an execution unit will be used to execute a decoded instruction. For example, some instructions may be designated as systolic instructions that will be performed by a systolic array. Other instructions, such as ray-tracing instructions (not shown) can be routed to a ray-tracing core or ray-tracing logic within a slice or partition of execution logic.

Graphics Pipeline

Figure 17:
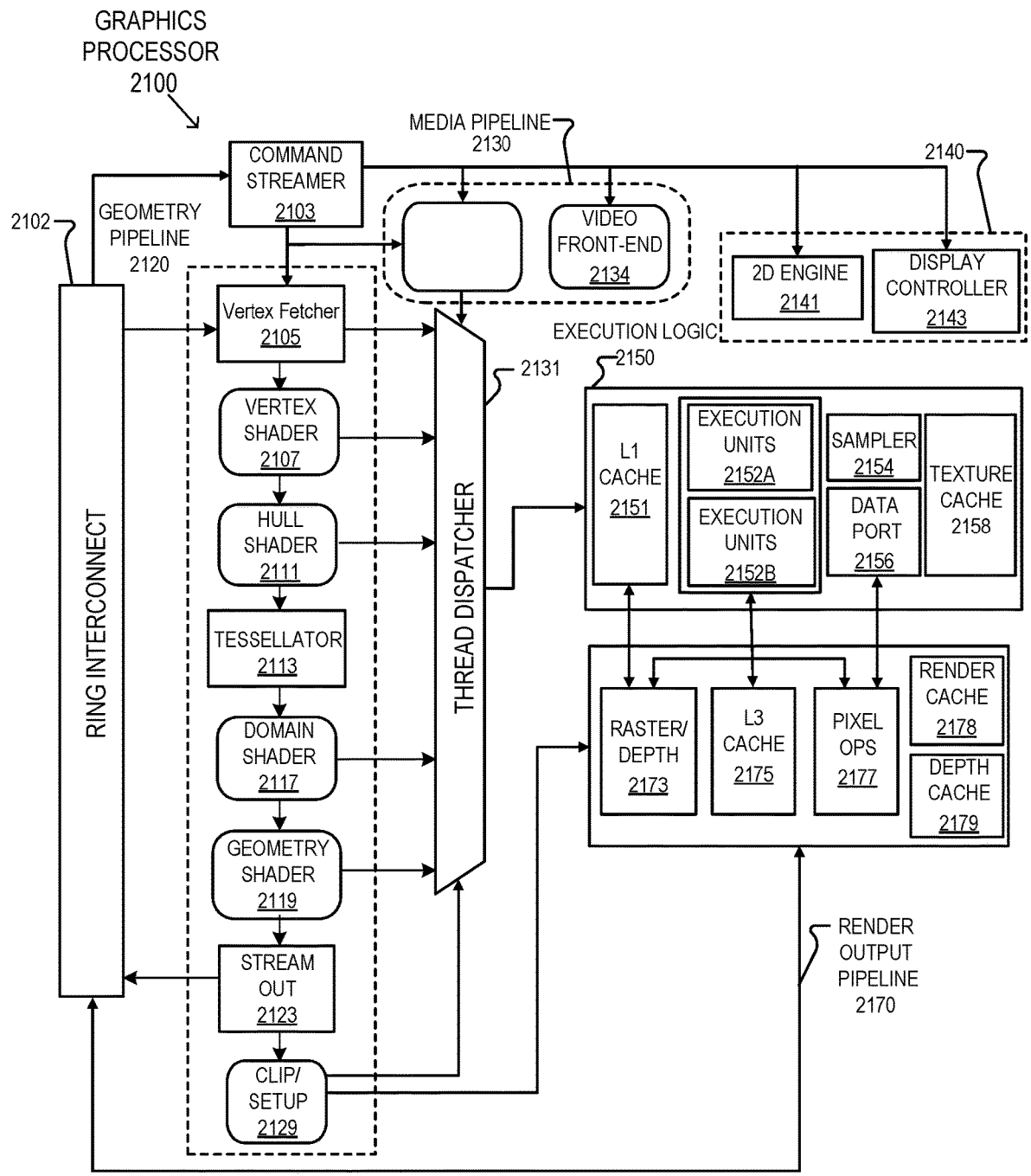
FIG. 17 is a block diagram of another example of a graphics processor according to an embodiment.

FIG. 17 is a block diagram of another embodiment of a graphics processor 2100. Elements of FIG. 17 having the same reference numbers (or names) as the elements of any other figure herein can operate or function in any manner similar to that described elsewhere herein, but are not limited to such.

In some embodiments, graphics processor 2100 includes a geometry pipeline 2120, a media pipeline 2130, a display engine 2140, thread execution logic 2150, and a render output pipeline 2170. In some embodiments, graphics processor 2100 is a graphics processor within a multi-core processing system that includes one or more general-purpose processing cores. The graphics processor is controlled by register writes to one or more control registers (not shown) or via commands issued to graphics processor 2100 via a ring interconnect 2102. In some embodiments, ring interconnect 2102 couples graphics processor 2100 to other processing components, such as other graphics processors or general-purpose processors. Commands from ring interconnect 2102 are interpreted by a command streamer 2103, which supplies instructions to individual components of the geometry pipeline 2120 or the media pipeline 2130.

In some embodiments, command streamer 2103 directs the operation of a vertex fetcher 2105 that reads vertex data from memory and executes vertex-processing commands provided by command streamer 2103. In some embodiments, vertex fetcher 2105 provides vertex data to a vertex shader 2107, which performs coordinate space transformation and lighting operations to each vertex. In some embodiments, vertex fetcher 2105 and vertex shader 2107 execute vertex-processing instructions by dispatching execution threads to execution units 2152A-2152B via a thread dispatcher 2131.

In some embodiments, execution units 2152A-2152B are an array of vector processors having an instruction set for performing graphics and media operations. In some embodiments, execution units 2152A-2152B have an attached L1 cache 2151 that is specific for each array or shared between the arrays. The cache can be configured as a data cache, an instruction cache, or a single cache that is partitioned to contain data and instructions in different partitions.

In some embodiments, geometry pipeline 2120 includes tessellation components to perform hardware-accelerated tessellation of 3D objects. In some embodiments, a programmable hull shader 2111 configures the tessellation operations. A programmable domain shader 2117 provides back-end evaluation of tessellation output. A tessellator 2113 operates at the direction of hull shader 2111 and contains special purpose logic to generate a set of detailed geometric objects based on a coarse geometric model that is provided as input to geometry pipeline 2120. In some embodiments, if tessellation is not used, tessellation components (e.g., hull shader 2111, tessellator 2113, and domain shader 2117) can be bypassed.

In some embodiments, complete geometric objects can be processed by a geometry shader 2119 via one or more threads dispatched to execution units 2152A-2152B, or can proceed directly to the clipper 2129. In some embodiments, the geometry shader operates on entire geometric objects, rather than vertices or patches of vertices as in previous stages of the graphics pipeline. If the tessellation is disabled the geometry shader 2119 receives input from the vertex shader 2107. In some embodiments, geometry shader 2119 is programmable by a geometry shader program to perform geometry tessellation if the tessellation units are disabled.

Before rasterization, a clipper 2129 processes vertex data. The clipper 2129 may be a fixed function clipper or a programmable clipper having clipping and geometry shader functions. In some embodiments, a rasterizer and depth test component 2173 in the render output pipeline 2170 dispatches pixel shaders to convert the geometric objects into per pixel representations. In some embodiments, pixel shader logic is included in thread execution logic 2150. In some embodiments, an application can bypass the rasterizer and depth test component 2173 and access un-rasterized vertex data via a stream out unit 2123.

The graphics processor 2100 has an interconnect bus, interconnect fabric, or some other interconnect mechanism that allows data and message passing amongst the major components of the processor. In some embodiments, execution units 2152A-2152B and associated logic units (e.g., L1 cache 2151, sampler 2154, texture cache 2158, etc.) interconnect via a data port 2156 to perform memory access and communicate with render output pipeline components of the processor. In some embodiments, sampler 2154, caches 2151, 2158 and execution units 2152A-2152B each have separate memory access paths. In one embodiment the texture cache 2158 can also be configured as a sampler cache.

In some embodiments, render output pipeline 2170 contains a rasterizer and depth test component 2173 that converts vertex-based objects into an associated pixel-based representation. In some embodiments, the rasterizer logic includes a windower/masker unit to perform fixed function triangle and line rasterization. An associated render cache 2178 and depth cache 2179 are also available in some embodiments. A pixel operations component 2177 performs pixel-based operations on the data, though in some instances, pixel operations associated with 2D operations (e.g., bit block image transfers with blending) are performed by the 2D engine 2141, or substituted at display time by the display controller 2143 using overlay display planes. In some embodiments, a shared L3 cache 2175 is available to all graphics components, allowing the sharing of data without the use of main system memory.

In some embodiments, graphics processor media pipeline 2130 includes a media engine 2137 and a video front-end 2134. In some embodiments, video front-end 2134 receives pipeline commands from the command streamer 2103. In some embodiments, media pipeline 2130 includes a separate command streamer. In some embodiments, video front-end 2134 processes media commands before sending the command to the media engine 2137. In some embodiments, media engine 2137 includes thread spawning functionality to spawn threads for dispatch to thread execution logic 2150 via thread dispatcher 2131.

In some embodiments, graphics processor 2100 includes a display engine 2140. In some embodiments, display engine 2140 is external to processor 2100 and couples with the graphics processor via the ring interconnect 2102, or some other interconnect bus or fabric. In some embodiments, display engine 2140 includes a 2D engine 2141 and a display controller 2143. In some embodiments, display engine 2140 contains special purpose logic capable of operating independently of the 3D pipeline. In some embodiments, display controller 2143 couples with a display device (not shown), which may be a system integrated display device, as in a laptop computer, or an external display device attached via a display device connector.

In some embodiments, the geometry pipeline 2120 and media pipeline 2130 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 18A is a block diagram illustrating a graphics processor command format 2200 according to some embodiments. FIG. 18B is a block diagram illustrating a graphics processor command sequence 2210 according to an embodiment. The solid lined boxes in FIG. 18A illustrate the components that are generally included in a graphics command while the dashed lines include components that are optional or that are only included in a sub-set of the graphics commands. The exemplary graphics processor command format 2200 of FIG. 18A includes data fields to identify a client 2202, a command operation code (opcode) 2204, and data 2206 for the command. A sub-opcode 2205 and a command size 2208 are also included in some commands.

In some embodiments, client 2202 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 2204 and, if present, sub-opcode 2205 to determine the operation to perform. The client unit performs the command using information in data field 2206. For some commands an explicit command size 2208 is expected to specify the size of the command. In some embodiments, the command parser automatically determines the size of at least some of the commands based on the command opcode. In some embodiments commands are aligned via multiples of a double word. Other command formats can be used.

The flow diagram in FIG. 18B illustrates an exemplary graphics processor command sequence 2210. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 2210 may begin with a pipeline flush command 2212 to cause any active graphics pipeline to complete the currently pending commands for the pipeline. In some embodiments, the 3D pipeline 2222 and the media pipeline 2224 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 2212 can be used for pipeline synchronization or before placing the graphics processor into a low power state.

In some embodiments, a pipeline select command 2213 is used when a command sequence requires the graphics processor to explicitly switch between pipelines. In some embodiments, a pipeline select command 2213 is required only once within an execution context before issuing pipeline commands unless the context is to issue commands for both pipelines. In some embodiments, a pipeline flush command 2212 is required immediately before a pipeline switch via the pipeline select command 2213.

In some embodiments, a pipeline control command 2214 configures a graphics pipeline for operation and is used to program the 3D pipeline 2222 and the media pipeline 2224. In some embodiments, pipeline control command 2214 configures the pipeline state for the active pipeline. In one embodiment, the pipeline control command 2214 is used for pipeline synchronization and to clear data from one or more cache memories within the active pipeline before processing a batch of commands.

In some embodiments, return buffer state commands 2216 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state commands 2216 select the size and number of return buffers to use for a set of pipeline operations.

The remaining commands in the command sequence differ based on the active pipeline for operations. Based on a pipeline determination 2220, the command sequence is tailored to the 3D pipeline 2222 beginning with the 3D pipeline state 2230 or the media pipeline 2224 beginning at the media pipeline state 2240.

The commands to configure the 3D pipeline state 2230 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 2230 commands are also able to selectively disable or bypass certain pipeline elements if those elements will not be used.

In some embodiments, 3D primitive 2232 command is used to submit 3D primitives to be processed by the 3D pipeline. Commands and associated parameters that are passed to the graphics processor via the 3D primitive 2232 command are forwarded to the vertex fetch function in the graphics pipeline. The vertex fetch function uses the 3D primitive 2232 command data to generate vertex data structures. The vertex data structures are stored in one or more return buffers. In some embodiments, 3D primitive 2232 command is used to perform vertex operations on 3D primitives via vertex shaders. To process vertex shaders, 3D pipeline 2222 dispatches shader execution threads to graphics processor execution units.

In some embodiments, 3D pipeline 2222 is triggered via an execute 2234 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 2210 follows the media pipeline 2224 path when performing media operations. In general, the specific use and manner of programming for the media pipeline 2224 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 2224 is configured in a similar manner as the 3D pipeline 2222. A set of commands to configure the media pipeline state 2240 are dispatched or placed into a command queue before the media object commands 2242. In some embodiments, commands for the media pipeline state 2240 include data to configure the media pipeline elements that will be used to process the media objects. This includes data to configure the video decode and video encode logic within the media pipeline, such as encode or decode format. In some embodiments, commands for the media pipeline state 2240 also support the use of one or more pointers to "indirect" state elements that contain a batch of state settings.

In some embodiments, media object commands 2242 supply pointers to media objects for processing by the media pipeline. The media objects include memory buffers containing video data to be processed. In some embodiments, all media pipeline states must be valid before issuing a media object command 2242. Once the pipeline state is configured and media object commands 2242 are queued, the media pipeline 2224 is triggered via an execute command 2244 or an equivalent execute event (e.g., register write). Output from media pipeline 2224 may then be post processed by operations provided by the 3D pipeline 2222 or the media pipeline 2224. In some embodiments, GPGPU operations are configured and executed in a similar manner as media operations.

Graphics Software Architecture

Figure 19:
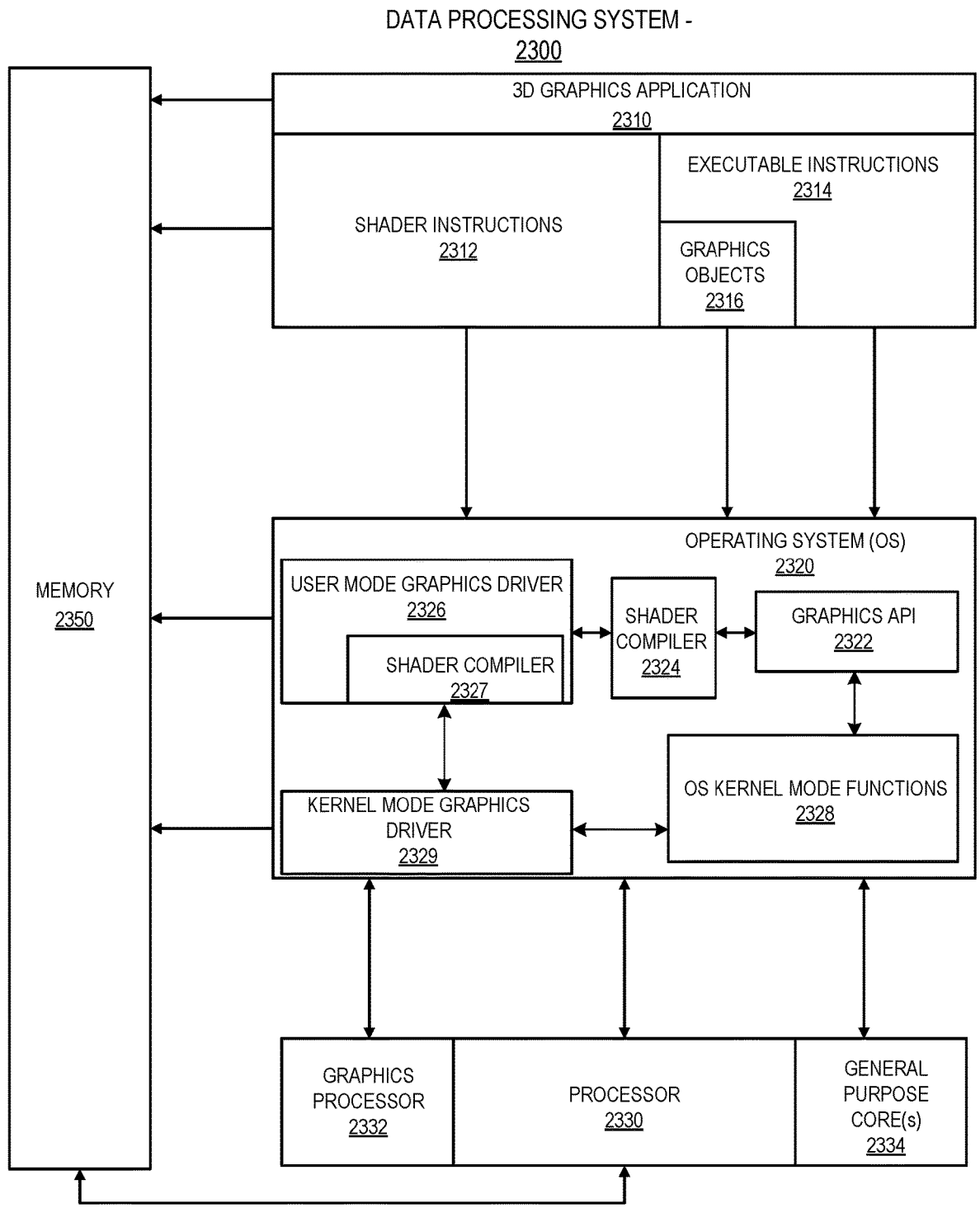
FIG. 19 illustrates an example graphics software architecture for a data processing system according to an embodiment.

FIG. 19 illustrates an exemplary graphics software architecture for a data processing system 2300 according to some embodiments. In some embodiments, software architecture includes a 3D graphics application 2310, an operating system 2320, and at least one processor 2330. In some embodiments, processor 2330 includes a graphics processor 2332 and one or more general-purpose processor core(s) 2334. The graphics application 2310 and operating system 2320 each execute in the system memory 2350 of the data processing system.

In some embodiments, 3D graphics application 2310 contains one or more shader programs including shader instructions 2312. The shader language instructions may be in a high-level shader language, such as the High-Level Shader Language (HLSL) of Direct3D, the OpenGL Shader Language (GLSL), and so forth. The application also includes executable instructions 2314 in a machine language suitable for execution by the general-purpose processor core 2334. The application also includes graphics objects 2316 defined by vertex data.

In some embodiments, operating system 2320 is a Microsoft® Windows® operating system from the Microsoft Corporation, a proprietary UNIX-like operating system, or an open source UNIX-like operating system using a variant of the Linux kernel. The operating system 2320 can support a graphics API 2322 such as the Direct3D API, the OpenGL API, or the Vulkan API. When the Direct3D API is in use, the operating system 2320 uses a front-end shader compiler 2324 to compile any shader instructions 2312 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 2310. In some embodiments, the shader instructions 2312 are provided in an intermediate form, such as a version of the Standard Portable Intermediate Representation (SPIR) used by the Vulkan API.

In some embodiments, user mode graphics driver 2326 contains a back-end shader compiler 2327 to convert the shader instructions 2312 into a hardware specific representation. When the OpenGL API is in use, shader instructions 2312 in the GLSL high-level language are passed to a user mode graphics driver 2326 for compilation. In some embodiments, user mode graphics driver 2326 uses operating system kernel mode functions 2328 to communicate with a kernel mode graphics driver 2329. In some embodiments, kernel mode graphics driver 2329 communicates with graphics processor 2332 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 20A:
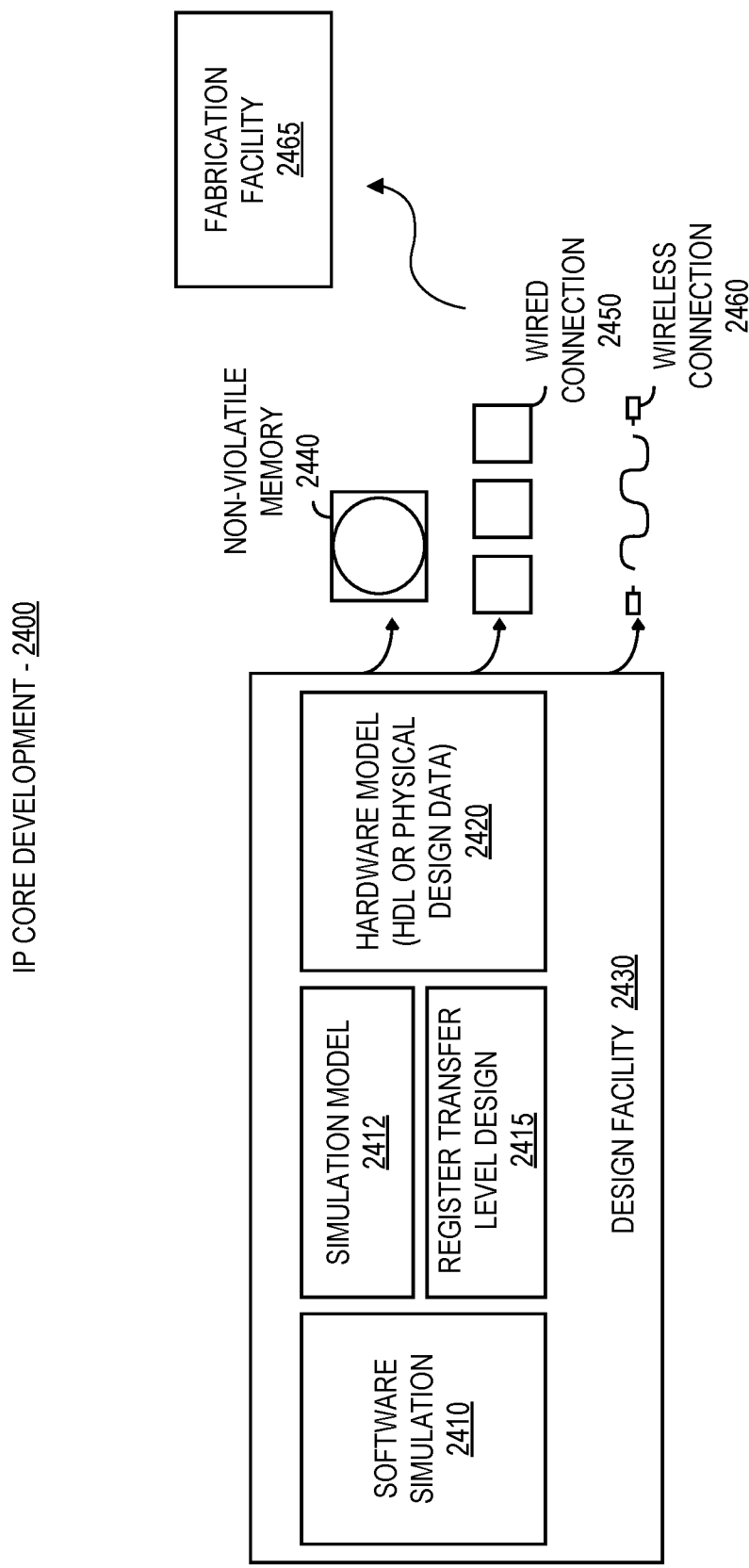
FIG. 20A is a block diagram illustrating an example of an IP core development system according to an embodiment.

FIG. 20A is a block diagram illustrating an IP core development system 2400 that may be used to manufacture an integrated circuit to perform operations according to an embodiment. The IP core development system 2400 may be used to generate modular, re-usable designs that can be incorporated into a larger design or used to construct an entire integrated circuit (e.g., an SOC integrated circuit). A design facility 2430 can generate a software simulation 2410 of an IP core design in a high-level programming language (e.g., C/C++). The software simulation 2410 can be used to design, test, and verify the behavior of the IP core using a simulation model 2412. The simulation model 2412 may include functional, behavioral, and/or timing simulations. A register transfer level (RTL) design 2415 can then be created or synthesized from the simulation model 2412. The RTL design 2415 is an abstraction of the behavior of the integrated circuit that models the flow of digital signals between hardware registers, including the associated logic performed using the modeled digital signals. In addition to an RTL design 2415, lower-level designs at the logic level or transistor level may also be created, designed, or synthesized. Thus, the particular details of the initial design and simulation may vary.

The RTL design 2415 or equivalent may be further synthesized by the design facility into a hardware model 2420, which may be in a hardware description language (HDL), or some other representation of physical design data. The HDL may be further simulated or tested to verify the IP core design. The IP core design can be stored for delivery to a 3rd party fabrication facility 2465 using non-volatile memory 2440 (e.g., hard disk, flash memory, or any non-volatile storage medium). Alternatively, the IP core design may be transmitted (e.g., via the Internet) over a wired connection 2450 or wireless connection 2460. The fabrication facility 2465 may then fabricate an integrated circuit that is based at least in part on the IP core design. The fabricated integrated circuit can be configured to perform operations in accordance with at least one embodiment described herein.

Figure 20B:
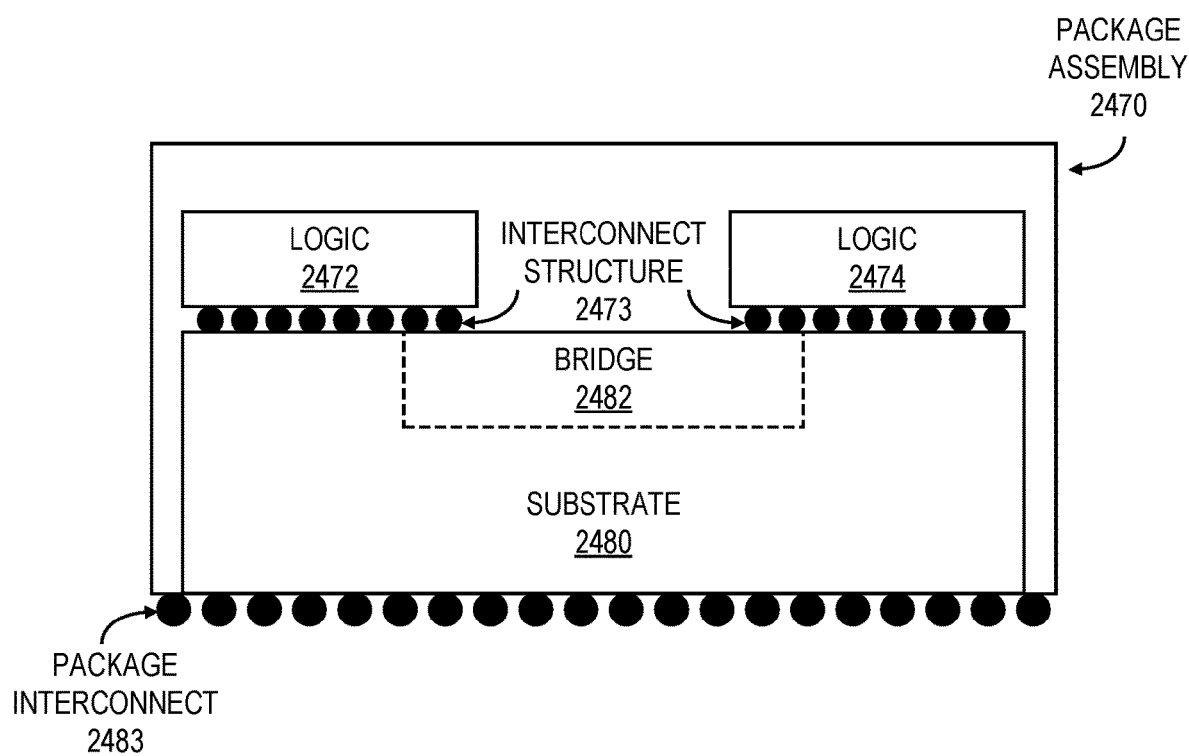
FIG. 20B illustrates an example of a cross-section side view of an integrated circuit package assembly according to an embodiment.

FIG. 20B illustrates a cross-section side view of an integrated circuit package assembly 2470, according to some embodiments described herein. The integrated circuit package assembly 2470 illustrates an implementation of one or more processor or accelerator devices as described herein. The package assembly 2470 includes multiple units of hardware logic 2472, 2474 connected to a substrate 2480. The logic 2472, 2474 may be implemented at least partly in configurable logic or fixed-functionality logic hardware, and can include one or more portions of any of the processor core(s), graphics processor(s), or other accelerator devices described herein. Each unit of logic 2472, 2474 can be implemented within a semiconductor die and coupled with the substrate 2480 via an interconnect structure 2473. The interconnect structure 2473 may be configured to route electrical signals between the logic 2472, 2474 and the substrate 2480, and can include interconnects such as, but not limited to bumps or pillars. In some embodiments, the interconnect structure 2473 may be configured to route electrical signals such as, for example, input/output (I/O) signals and/or power or ground signals associated with the operation of the logic 2472, 2474. In some embodiments, the substrate 2480 is an epoxy-based laminate substrate. The substrate 2480 may include other suitable types of substrates in other embodiments. The package assembly 2470 can be connected to other electrical devices via a package interconnect 2483. The package interconnect 2483 may be coupled to a surface of the substrate 2480 to route electrical signals to other electrical devices, such as a motherboard, other chipset, or multi-chip module.

In some embodiments, the units of logic 2472, 2474 are electrically coupled with a bridge 2482 that is configured to route electrical signals between the logic 2472, 2474. The bridge 2482 may be a dense interconnect structure that provides a route for electrical signals. The bridge 2482 may include a bridge substrate composed of glass or a suitable semiconductor material. Electrical routing features can be formed on the bridge substrate to provide a chip-to-chip connection between the logic 2472, 2474.

Although two units of logic 2472, 2474 and a bridge 2482 are illustrated, embodiments described herein may include more or fewer logic units on one or more dies. The one or more dies may be connected by zero or more bridges, as the bridge 2482 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Figure 20C:
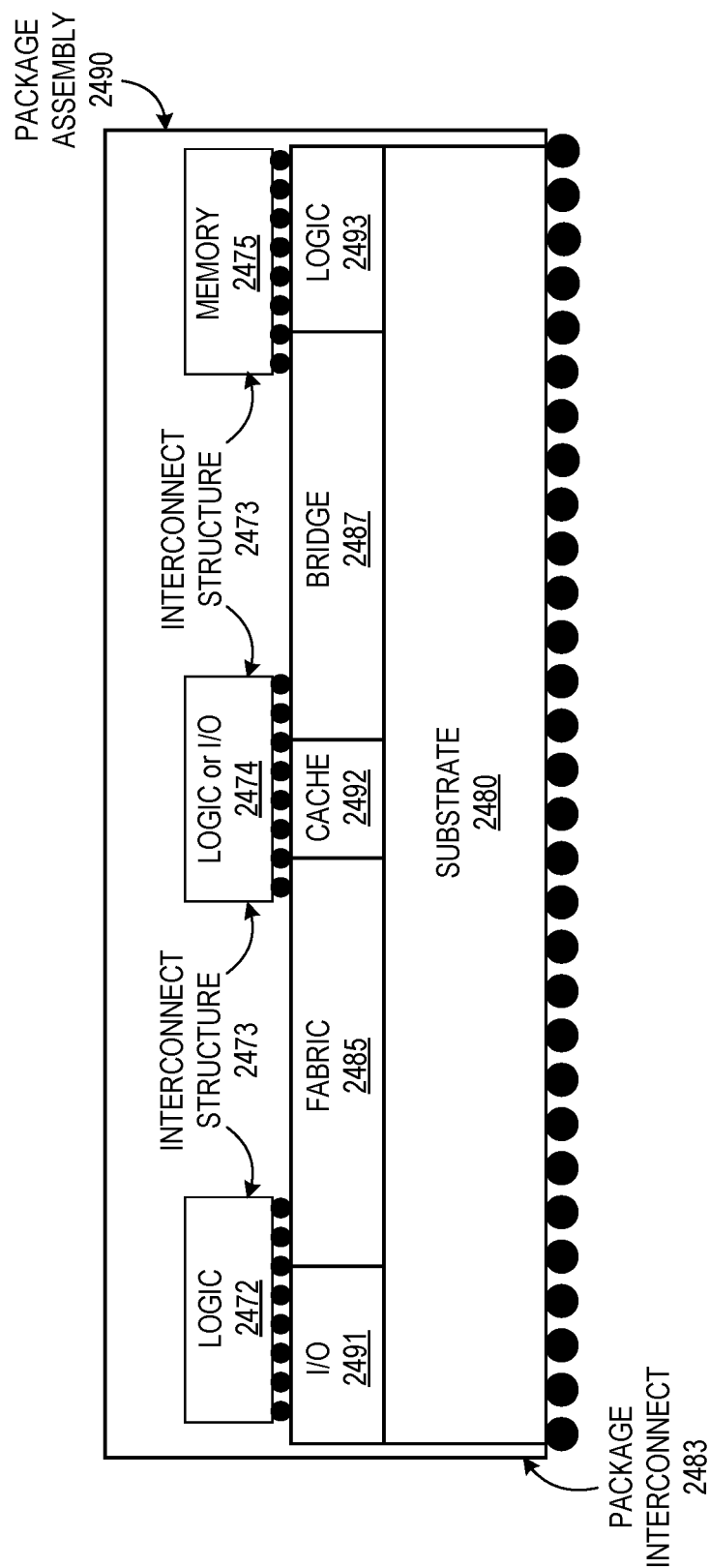
FIGS. 20C-20D illustrates examples of package assemblies according to an embodiment.

FIG. 20C illustrates a package assembly 2490 that includes multiple units of hardware logic chiplets connected to a substrate 2480 (e.g., base die). A graphics processing unit, parallel processor, and/or compute accelerator as described herein can be composed from diverse silicon chiplets that are separately manufactured. In this context, a chiplet is an at least partially packaged integrated circuit that includes distinct units of logic that can be assembled with other chiplets into a larger package. A diverse set of chiplets with different IP core logic can be assembled into a single device. Additionally the chiplets can be integrated into a base die or base chiplet using active interposer technology. The concepts described herein enable the interconnection and communication between the different forms of IP within the GPU. IP cores can be manufactured using different process technologies and composed during manufacturing, which avoids the complexity of converging multiple IPs, especially on a large SoC with several flavors IPs, to the same manufacturing process. Enabling the use of multiple process technologies improves the time to market and provides a cost-effective way to create multiple product SKUs. Additionally, the disaggregated IPs are more amenable to being power gated independently, components that are not in use on a given workload can be powered off, reducing overall power consumption.

The hardware logic chiplets can include special purpose hardware logic chiplets 2472, logic or I/O chiplets 2474, and/or memory chiplets 2475. The hardware logic chiplets 2472 and logic or I/O chiplets 2474 may be implemented at least partly in configurable logic or fixed-functionality logic hardware and can include one or more portions of any of the processor core(s), graphics processor(s), parallel processors, or other accelerator devices described herein. The memory chiplets 2475 can be DRAM (e.g., GDDR, HBM) memory or cache (SRAM) memory.

Each chiplet can be fabricated as separate semiconductor die and coupled with the substrate 2480 via an interconnect structure 2473. The interconnect structure 2473 may be configured to route electrical signals between the various chiplets and logic within the substrate 2480. The interconnect structure 2473 can include interconnects such as, but not limited to bumps or pillars. In some embodiments, the interconnect structure 2473 may be configured to route electrical signals such as, for example, input/output (I/O) signals and/or power or ground signals associated with the operation of the logic, I/O and memory chiplets.

In some embodiments, the substrate 2480 is an epoxy-based laminate substrate. The substrate 2480 may include other suitable types of substrates in other embodiments. The package assembly 2490 can be connected to other electrical devices via a package interconnect 2483. The package interconnect 2483 may be coupled to a surface of the substrate 2480 to route electrical signals to other electrical devices, such as a motherboard, other chipset, or multi-chip module.

In some embodiments, a logic or I/O chiplet 2474 and a memory chiplet 2475 can be electrically coupled via a bridge 2487 that is configured to route electrical signals between the logic or I/O chiplet 2474 and a memory chiplet 2475. The bridge 2487 may be a dense interconnect structure that provides a route for electrical signals. The bridge 2487 may include a bridge substrate composed of glass or a suitable semiconductor material. Electrical routing features can be formed on the bridge substrate to provide a chip-to-chip connection between the logic or I/O chiplet 2474 and a memory chiplet 2475. The bridge 2487 may also be referred to as a silicon bridge or an interconnect bridge. For example, the bridge 2487, in some embodiments, is an Embedded Multi-die Interconnect Bridge (EMIB). In some embodiments, the bridge 2487 may simply be a direct connection from one chiplet to another chiplet.

The substrate 2480 can include hardware components for I/O 2491, cache memory 2492, and other hardware logic 2493. A fabric 2485 can be embedded in the substrate 2480 to enable communication between the various logic chiplets and the logic 2491, 2493 within the substrate 2480. In one embodiment, the I/O 2491, fabric 2485, cache, bridge, and other hardware logic 2493 can be integrated into a base die that is layered on top of the substrate 2480.

In various embodiments a package assembly 2490 can include fewer or greater number of components and chiplets that are interconnected by a fabric 2485 or one or more bridges 2487. The chiplets within the package assembly 2490 may be arranged in a 3D or 2.5D arrangement. In general, bridge structures 2487 may be used to facilitate a point to point interconnect between, for example, logic or I/O chiplets and memory chiplets. The fabric 2485 can be used to interconnect the various logic and/or I/O chiplets (e.g., chiplets 2472, 2474, 2491, 2493). with other logic and/or I/O chiplets. In one embodiment, the cache memory 2492 within the substrate can act as a global cache for the package assembly 2490, part of a distributed global cache, or as a dedicated cache for the fabric 2485.

Figure 20D:
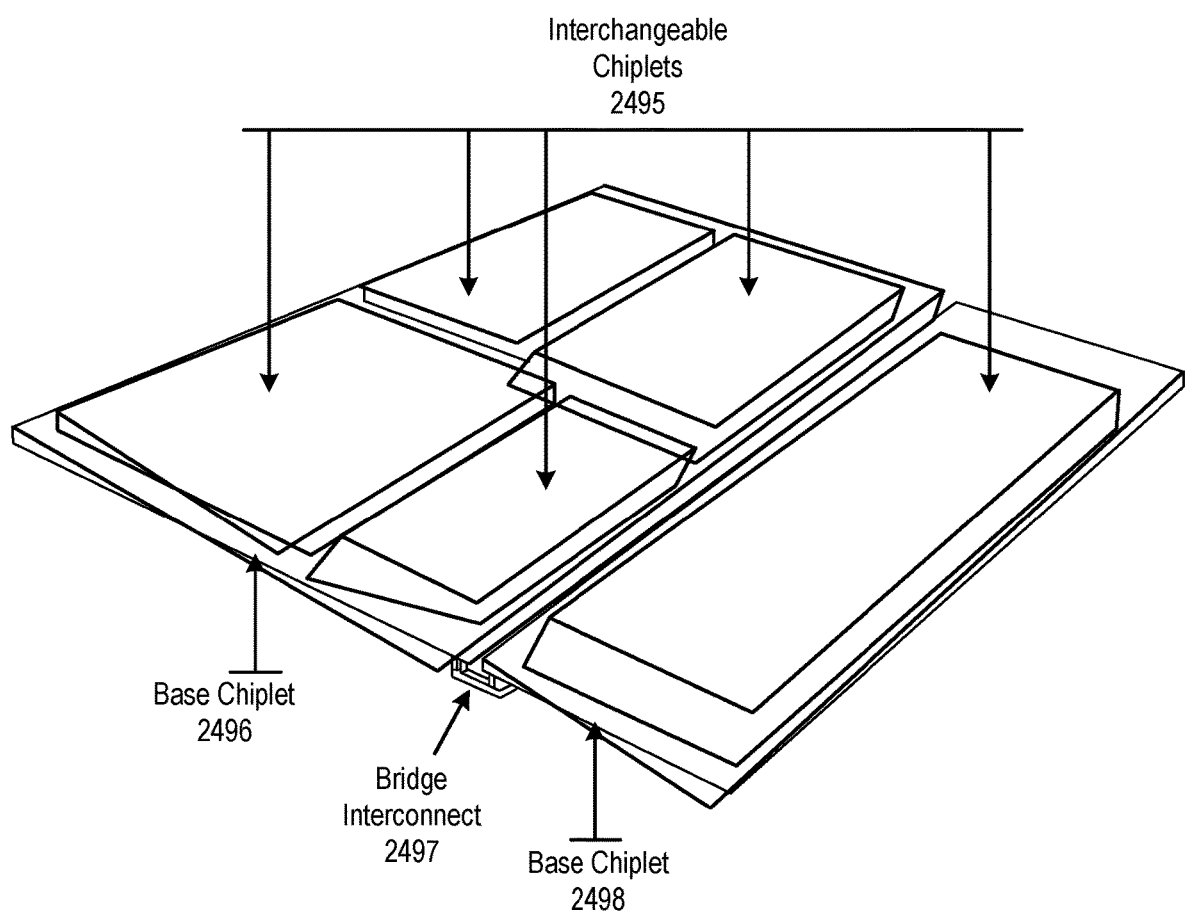

FIG. 20D illustrates a package assembly 2494 including interchangeable chiplets 2495, according to an embodiment. The interchangeable chiplets 2495 can be assembled into standardized slots on one or more base chiplets 2496, 2498. The base chiplets 2496, 2498 can be coupled via a bridge interconnect 2497, which can be similar to the other bridge interconnects described herein and may be, for example, an EMIB. Memory chiplets can also be connected to logic or I/O chiplets via a bridge interconnect. I/O and logic chiplets can communicate via an interconnect fabric. The base chiplets can each support one or more slots in a standardized format for one of logic or I/O or memory/cache.

In one embodiment, SRAM and power delivery circuits can be fabricated into one or more of the base chiplets 2496, 2498, which can be fabricated using a different process technology relative to the interchangeable chiplets 2495 that are stacked on top of the base chiplets. For example, the base chiplets 2496, 2498 can be fabricated using a larger process technology, while the interchangeable chiplets can be manufactured using a smaller process technology. One or more of the interchangeable chiplets 2495 may be memory (e.g., DRAM) chiplets. Different memory densities can be selected for the package assembly 2494 based on the power, and/or performance targeted for the product that uses the package assembly 2494. Additionally, logic chiplets with a different number of type of functional units can be selected at time of assembly based on the power, and/or performance targeted for the product. Additionally, chiplets containing IP logic cores of differing types can be inserted into the interchangeable chiplet slots, enabling hybrid processor designs that can mix and match different technology IP blocks.

Exemplary System on a Chip Integrated Circuit

Figure 21:
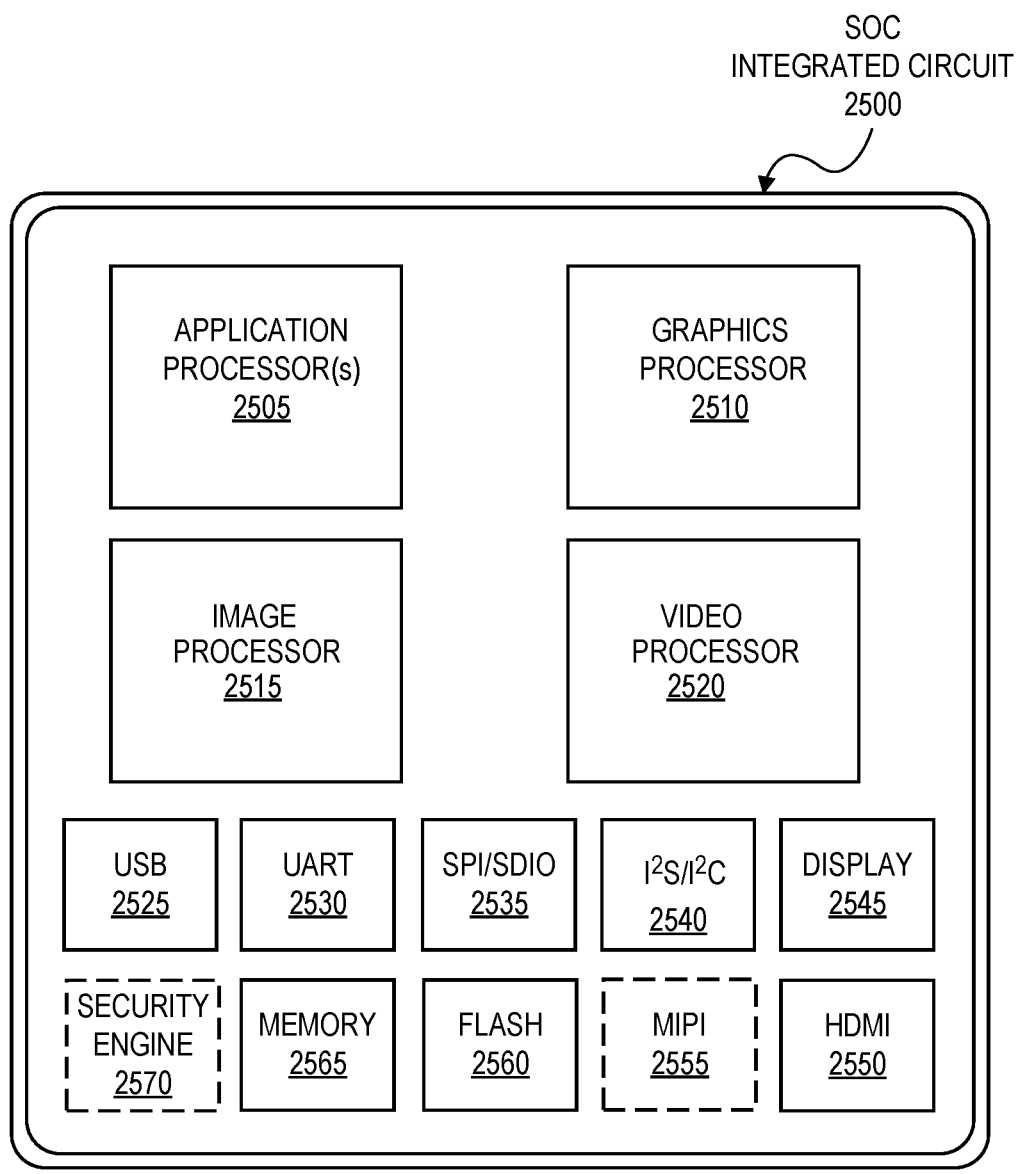
FIG. 21 is a block diagram illustrating an example of a system on a chip integrated circuit according to an embodiment.
Figure 22A:
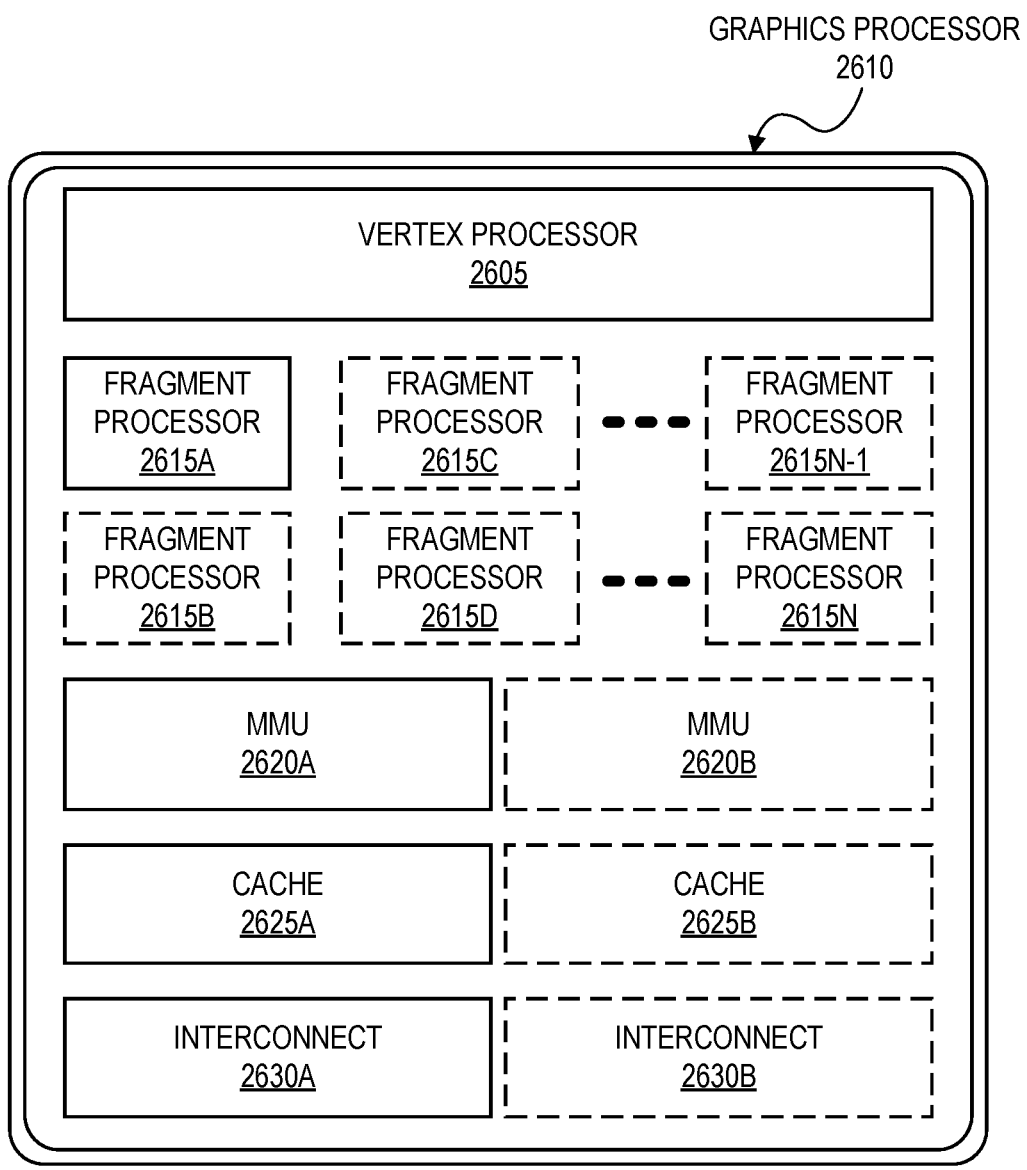
FIGS. 22A-22B are block diagrams illustrating exemplary graphics processors for use within an SoC, according to embodiments.
Figure 22B:
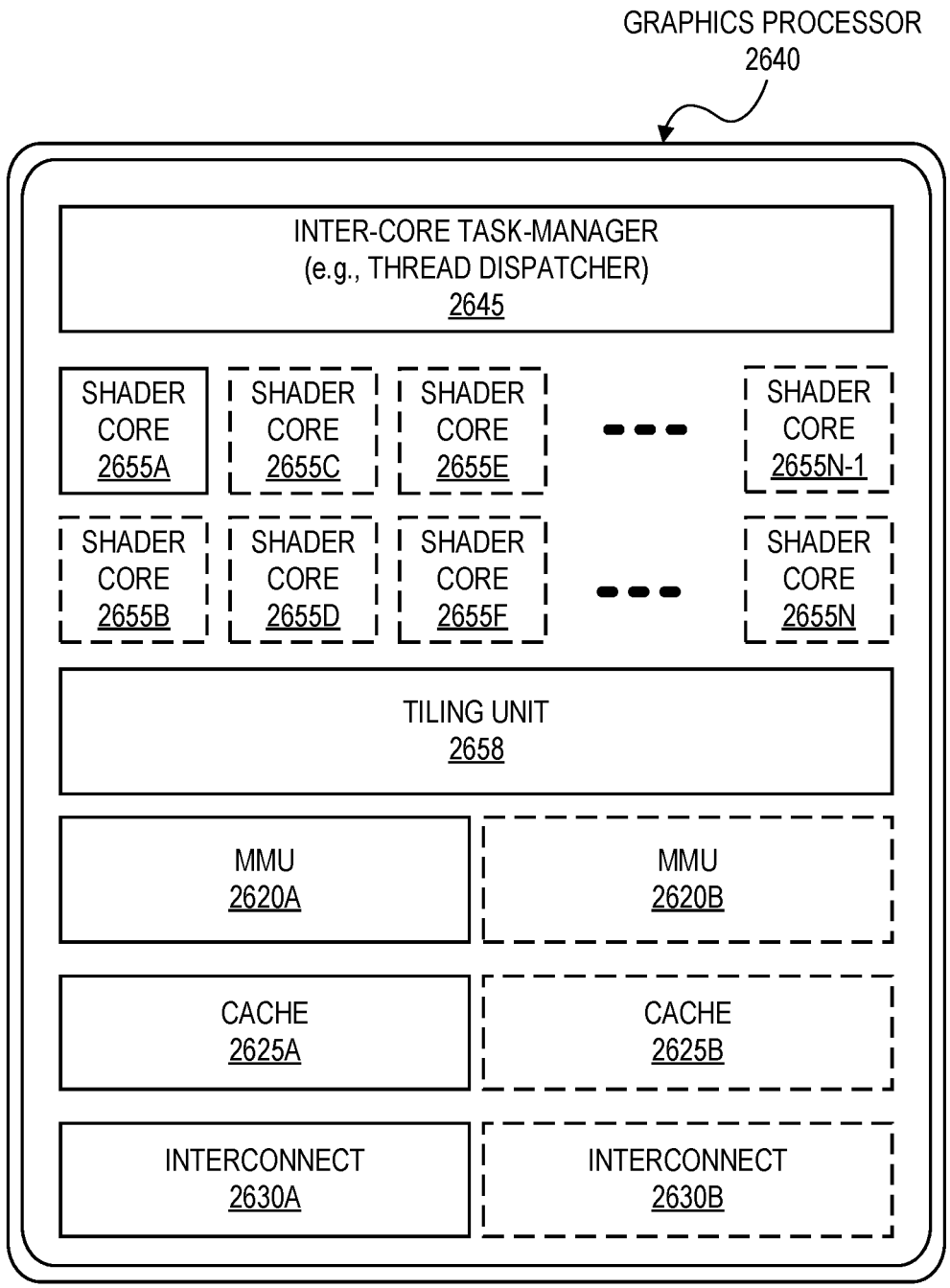

FIGS. 21-22B illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 21 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I2S/I2C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIGS. 22A-22B are block diagrams illustrating exemplary graphics processors for use within an SoC, according to embodiments described herein. FIG. 22A illustrates an exemplary graphics processor 2610 of a system on a chip integrated circuit that may be fabricated using one or more IP cores, according to an embodiment. FIG. 22B illustrates an additional exemplary graphics processor 2640 of a system on a chip integrated circuit that may be fabricated using one or more IP cores, according to an embodiment. Graphics processor 2610 of FIG. 22A is an example of a low power graphics processor core. Graphics processor 2640 of FIG. 22B is an example of a higher performance graphics processor core. Each of the graphics processors 2610, 2640 can be variants of the graphics processor 2510 of FIG. 21.

As shown in FIG. 22A, graphics processor 2610 includes a vertex processor 2605 and one or more fragment processor(s) 2615A-2615N (e.g., 2615A, 2615B, 2615C, 2615D, through 2615N-1, and 2615N). Graphics processor 2610 can execute different shader programs via separate logic, such that the vertex processor 2605 is optimized to execute operations for vertex shader programs, while the one or more fragment processor(s) 2615A-2615N execute fragment (e.g., pixel) shading operations for fragment or pixel shader programs. The vertex processor 2605 performs the vertex processing stage of the 3D graphics pipeline and generates primitives and vertex data. The fragment processor(s) 2615A-2615N use the primitive and vertex data generated by the vertex processor 2605 to produce a framebuffer that is displayed on a display device. In one embodiment, the fragment processor(s) 2615A-2615N are optimized to execute fragment shader programs as provided for in the OpenGL API, which may be used to perform similar operations as a pixel shader program as provided for in the Direct 3D API.

Graphics processor 2610 additionally includes one or more memory management units (MMUs) 2620A-2620B, cache(s) 2625A-2625B, and circuit interconnect(s) 2630A-2630B. The one or more MMU(s) 2620A-2620B provide for virtual to physical address mapping for the graphics processor 2610, including for the vertex processor 2605 and/or fragment processor(s) 2615A-2615N, which may reference vertex or image/texture data stored in memory, in addition to vertex or image/texture data stored in the one or more cache(s) 2625A-2625B. In one embodiment the one or more MMU(s) 2620A-2620B may be synchronized with other MMUs within the system, including one or more MMUs associated with the one or more application processor(s) 2505, image processor 2515, and/or video processor 2520 of FIG. 21, such that each processor 2505-2520 can participate in a shared or unified virtual memory system. The one or more circuit interconnect(s) 2630A-2630B enable graphics processor 2610 to interface with other IP cores within the SoC, either via an internal bus of the SoC or via a direct connection, according to embodiments.

As shown FIG. 22B, graphics processor 2640 includes the one or more MMU(s) 2620A-2620B, cache(s) 2625A-2625B, and circuit interconnect(s) 2630A-2630B of the graphics processor 2610 of FIG. 22A. Graphics processor 2640 includes one or more shader core(s) 2655A-2655N (e.g., 2655A, 2655B, 2655C, 2655D, 2655E, 2655F, through 2655N-1, and 2655N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 2640 includes an inter-core task manager 2645, which acts as a thread dispatcher to dispatch execution threads to one or more shader cores 2655A-2655N and a tiling unit 2658 to accelerate tiling operations for tile-based rendering, in which rendering operations for a scene are subdivided in image space, for example to exploit local spatial coherence within a scene or to optimize use of internal caches.

In one example, the SoC interface 1532 (FIG. 11B) and/or the command streamer 1703 (FIG. 13) implements one or more aspects of the method 660 (FIG. 6E), the method 670 (FIG. 6F), the method 683 (FIG. 6G) and/or the method 688 (FIG. 6H), already discussed. Additionally, the logic 2472 and/or the logic 2474 (FIG. 20B-20C) may implement one or more aspects of the method 660 (FIG. 6E), the method 670 (FIG. 6F), the method 683 (FIG. 6G) and/or the method 688 (FIG. 6H), already discussed.

In one example, the platform controller hub 1430 (FIG. 10) includes a resource manager such as, for example, the resource manager 712 (FIG. 7A) that implements one or more aspects of the method 730 (FIG. 7B), the method 740 (FIG. 7C), and/or the method 750 (FIG. 7D), already discussed. Additionally, the logic 2472 and/or the logic 2474 (FIG. 20B-20C) may implement one or more aspects of the method 730 (FIG. 7B), the method 740 (FIG. 7C), and/or the method 750 (FIG. 7D), already discussed.

In one example, the graphics processor(s) 1408 (FIG. 10) include a graphics processor such as, for example, the graphics processor 826 (FIG. 8A) that implements one or more aspects of the method 830 (FIG. 8B) and/or the method 840 (FIG. 8C), already discussed. Additionally, the logic 2472 and/or the logic 2474 (FIG. 20B-20C) may implement one or more aspects of the method 830 (FIG. 8B) and/or the method 840 (FIG. 8C), already discussed.

In one example, the platform controller hub 1430 (FIG. 10) includes a GPU resource manager, resource director technology, workload scheduler service and/or orchestrator that implements one or more aspects of the method 862 (FIG. 8E) and/or the method 870 (FIG. 8F), already discussed. Additionally, the logic 2472 and/or the logic 2474 (FIG. 20B-20C) may implement one or more aspects of the method 862 (FIG. 8E) and/or the method 870 (FIG. 8F), already discussed.

In one example, the graphics processor(s) 1408 (FIG. 10) include a graphics processor such as, for example, the GPU 902 (FIG. 9A) that implements one or more aspects of the method 924 (FIG. 9B) and/or the method 934 (FIG. 9C), already discussed. Additionally, the logic 2472 and/or the logic 2474 (FIG. 20B-20C) may implement one or more aspects of the method 924 (FIG. 9B) and/or the method 934 (FIG. 9C), already discussed.

In one example, the platform controller hub 1430 (FIG. 10) implements one or more aspects of the method 950 (FIG. 9E) and/or the method 860 (FIG. 9F), already discussed. Additionally, the logic 2472 and/or the logic 2474 (FIG. 20B-20C) may implement one or more aspects of the method 950 (FIG. 9E) and/or the method 860 (FIG. 9F), already discussed.

In one example, the graphics processor(s) 1408 (FIG. 10) include a graphics processor such as, for example, the GPU 913 (FIG. 9I) that implements one or more aspects of the method 953 (FIG. 9J), already discussed. Additionally, the logic 2472 and/or the logic 2474 (FIG. 20B-20C) may implement one or more aspects of the method 953 (FIG. 9J), already discussed.

Additional Notes and Examples

Example A1 includes a performance-enhanced computing system comprising a host processor, a graphics processor coupled to the host processor, and a memory device coupled to the graphics processor, the memory device including a set of instructions, which when executed by the graphics processor, cause the graphics processor to interleave a plurality of verification commands with a plurality of copy commands in a command buffer, wherein each copy command includes a message authentication code (MAC) derived from a master session key, wherein one or more of the plurality of verification commands corresponds to a copy command in the plurality of copy commands, and wherein a verification command at an end of the command buffer corresponds to contents of the command buffer, and add a MAC generation command to the command buffer, wherein the MAC generation command references an address of a compute result.

Example A2 includes the computing system of Example A1, wherein the instructions, when executed, further cause the graphics processor to sequentially execute, by a command streamer, commands in the command buffer, maintain a running digest of the commands executed by the command buffer, copy the one or more modifiable addresses to a protected memory in the memory device, conducting inline verifications of the one or more modifiable addresses based on the verification commands, and conducting a buffer verification of the contents of the command buffer based on the running digest, wherein the buffer verification is conducted in response to the verification command at the end of the command buffer.

Example A3 includes the computing system of Example A2, wherein the instructions, when executed, further cause the graphics processor to track the one or more modifiable addresses and corresponding modified addresses in a relocation dictionary, and wherein the buffer verification is conducted further based on the relocation dictionary.

Example A4 includes the computing system of Example A1, wherein the instructions, when executed, further cause the graphics processor to determine a first sequence number from a first set of sequence numbers associated with host-to-graphics processor transfers, and compute a reference MAC for a buffer graph node corresponding to the command buffer based on the first sequence number.

Example A5 includes the computing system of Example A1, wherein the instructions, when executed, further cause the graphics processor to determine a second sequence number from a second set of sequence numbers associated with graphics processor-to-host transfers, and compute a reference MAC for a buffer graph node corresponding to the compute result based on the second sequence number.

Example A6 includes the computing system of any one of Examples A1 to A5, wherein the instructions, when executed, further cause the graphics processor to generate the master session key during an authentication key exchange between the graphics processor and a client application.

Example A7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to interleave a plurality of verification commands with a plurality of copy commands in a command buffer, wherein each copy command includes a message authentication code (MAC) derived from a master session key, wherein one or more of the plurality of verification commands corresponds to a copy command in the plurality of copy commands, and wherein a verification command at an end of the command buffer corresponds to contents of the command buffer, and add a MAC generation command to the command buffer, wherein the MAC generation command references an address of a compute result.

Example A8 includes the semiconductor apparatus of Example A7, wherein the logic coupled to the one or more substrates is to sequentially execute, by a command streamer, commands in the command buffer, maintain a running digest of the commands executed by the command buffer, copy the one or more modifiable addresses to a protected memory, conducting inline verifications of the one or more modifiable addresses based on the verification commands, conducting a buffer verification of the contents of the command buffer based on the running digest, wherein the buffer verification is conducted in response to the verification command at the end of the command buffer.

Example A9 includes the semiconductor apparatus of Example A8, wherein the logic coupled to the one or more substrates is to track the one or more modifiable addresses and corresponding modified addresses in a relocation dictionary, and wherein the buffer verification is conducted further based on the relocation dictionary.

Example A10 includes the semiconductor apparatus of Example A7, wherein the logic coupled to the one or more substrates is to determine a first sequence number from a first set of sequence numbers associated with host-to-graphics processor transfers, and compute a reference MAC for a buffer graph node corresponding to the command buffer based on the first sequence number.

Example A11 includes the semiconductor apparatus of Example A7, wherein the logic coupled to the one or more substrates is to determine a second sequence number from a second set of sequence numbers associated with graphics processor-to-host transfers, and compute a reference MAC for a buffer graph node corresponding to the compute result based on the second sequence number.

Example A12 includes the semiconductor apparatus of any one of Examples A7 to 11, wherein the logic coupled to the one or more substrates is to generate the master session key during an authentication key exchange between a graphics processor and a client application.

Example A13 includes at least one computer readable storage medium comprising a set of instructions, which when executed by a computing system, cause the computing system to interleave a plurality of verification commands with a plurality of copy commands in a command buffer, wherein each copy command includes a message authentication code (MAC) derived from a master session key, wherein one or more of the plurality of verification commands corresponds to a copy command in the plurality of copy commands, and wherein a verification command at an end of the command buffer corresponds to contents of the command buffer, and add a MAC generation command to the command buffer, wherein the MAC generation command references an address of a compute result.

Example A14 includes the at least one computer readable storage medium of Example A13, wherein the instructions, when executed, further cause the computing system to sequentially execute, by a command streamer, commands in the command buffer, maintain a running digest of the commands executed by the command buffer, copy the one or more modifiable addresses to a protected memory, conducting inline verifications of the one or more modifiable addresses based on the verification commands, and conducting a buffer verification of the contents of the command buffer based on the running digest, wherein the buffer verification is conducted in response to the verification command at the end of the command buffer.

Example A15 includes the at least one computer readable storage medium of Example A14, wherein the instructions, when executed, further cause the computing system to track the one or more modifiable addresses and corresponding modified addresses in a relocation dictionary, and wherein the buffer verification is conducted further based on the relocation dictionary.

Example A16 includes the at least one computer readable storage medium of Example A13, wherein the instructions, when executed, further cause the computing system to determine a first sequence number from a first set of sequence numbers associated with host-to-graphics processor transfers, and compute a reference MAC for a buffer graph node corresponding to the command buffer based on the first sequence number.

Example A17 includes the at least one computer readable storage medium of Example A13, wherein the instructions, when executed, further cause the computing system to determine a second sequence number from a second set of sequence numbers associated with graphics processor-to-host transfers, and compute a reference MAC for a buffer graph node corresponding to the compute result based on the second sequence number.

Example A18 includes the at least one computer readable storage medium of any one of Examples A13 to A17, wherein the instructions, when executed, further cause the computing system to generate the master session key during an authentication key exchange between a graphics processor and a client application.

Example A19 includes a method of operating a performance-enhanced computing system, the method comprising interleaving a plurality of verification commands with a plurality of copy commands in a command buffer, wherein each copy command references one or more modifiable addresses, wherein each verification command includes a message authentication code (MAC) derived from a master session key, wherein one or more of the plurality of verification commands corresponds to a copy command in the plurality of copy commands, and wherein a verification command at an end of the command buffer corresponds to contents of the command buffer, and adding a MAC generation command to the command buffer, wherein the MAC generation command references an address of a compute result.

Example A20 includes the method of Example A19, further including sequentially executing, by a command streamer, commands in the command buffer, maintaining a running digest of the commands executed by the command streamer, copying the one or more modifiable addresses to a protected memory, conducting inline verifications of the one or more modifiable addresses based on the verification commands, and conducting a buffer verification of the contents of the command buffer based on the running digest, wherein the buffer verification is conducted in response to the verification command at the end of the command buffer.

Example A21 includes the method of Example A20, further including tracking the one or more modifiable addresses and corresponding modified addresses in a relocation dictionary, wherein the buffer verification is conducted further based on the relocation dictionary.

Example A22 includes the method of Example A19, further including determining a first sequence number from a first set of sequence numbers associated with host-to-graphics processor transfers, and computing a reference MAC for a buffer graph node corresponding to the command buffer based on the first sequence number.

Example A23 includes the method of Example A19, further including determining a second sequence number from a second set of sequence numbers associated with graphics processor-to-host transfers, and computing a reference MAC for a buffer graph node corresponding to the compute result based on the second sequence number.

Example A24 includes the method of any one of Examples A19 to A23, further including generating the master session key during an authentication key exchange between a graphics processor and a client application.

Example A25 includes an apparatus comprising means for performing the method of any one of Examples A19 to A24.

Examples B1 includes a computing system comprising different sets of resources, a controller coupled to the different sets of resources, and a memory coupled to the controller, the memory including a set of instructions, which when executed by the controller, cause the controller to partition a neural network inference model into a plurality of slices, allocate the different sets of resources to the plurality of slices based on one or more of a performance condition or a security condition, and coordinate, via a shared key, an execution of the plurality of slices by the different sets of resources.

Examples B2 includes the computing system of Examples B1, wherein the different sets of resources include a first set of resources and a second set of resources, and wherein to coordinate the execution of the plurality of slices, the instructions, when executed, cause the controller to provision the shared key to the first set of resources and the second set of resources, notify the first set of resources and the second set of resources of one another and the shared key, and conduct a mutual attestation between the first set of resources and the second set of resources.

Examples B3 includes the computing system of Examples B2, further including a shared memory, wherein the plurality of slices are to include a first slice and a second slice, and wherein to coordinate the execution of the plurality of slices, the instructions, when executed, cause the controller to protect the shared memory with the shared key, instruct the first set of resources to execute the first slice based on an inference input, instruct the first set of resources to store temporary values to the shared memory, instruct the second set of resources to execute the second slice based on the temporary values to obtain an inference result, and output the inference result.

Examples B4 includes the computing system of Examples B3, wherein the first slice is to include a first set of neural network layers and the second slice is to include a second set of neural network layers.

Examples B5 includes the computing system of Examples B1, wherein to allocate the different sets of resources to the plurality of slices, the instructions, when executed, cause the controller to allocate a first set of resources to a first slice, wherein the first set of resources is to include one or more of a graphics processor compute engine, an accelerator or a smart network interface card, and allocate a second set of resources to a second slice, wherein the second set of resources is to include one or more host processor cores.

Examples B6 includes the computing system of any one of Examples B1 to B5, wherein the neural network inference model is to be partitioned based on one or more of the performance condition or the security condition.

Examples B7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to partition a neural network inference model into a plurality of slices, allocate different sets of resources to the plurality of slices based on one or more of a performance condition or a security condition, and coordinate, via a shared key, an execution of the plurality of slices by the different sets of resources.

Examples B8 includes the apparatus of Examples B7, wherein the different sets of resources are to include a first set of resources and a second set of resources, and wherein to coordinate the execution of the plurality of slices, the logic coupled to the one or more substrates is to provision the shared key to the first set of resources and the second set of resources, notify the first set of resources and the second set of resources of one another and the shared key, and conduct a mutual attestation between the first set of resources and the second set of resources.

Examples B9 includes the apparatus of Examples B8, wherein the plurality of slices are to include a first slice and a second slice, and wherein to coordinate the execution of the plurality of slices, the logic coupled to the one or more substrates is to protect a shared memory with the shared key, instruct the first set of resources to execute the first slice based on an inference input, instruct the first set of resources to store temporary values to the shared memory, instruct the second set of resources to execute the second slice based on the temporary values to obtain an inference result, and output the inference result.

Examples B10 includes the apparatus of Examples B9, wherein the first slice is to include a first set of neural network layers and the second slice is to include a second set of neural network layers.

Examples B11 includes the apparatus of Examples B7, wherein to allocate the different sets of resources to the plurality of slices, the logic coupled to the one or more substrates is to allocate a first set of resources to a first slice, wherein the first set of resources is to include one or more of a graphics processor compute engine, an accelerator or a smart network interface card, and allocate a second set of resources to a second slice, wherein the second set of resources is to include one or more host processor cores.

Examples B12 includes the apparatus of any one of Examples B7 to B11, wherein the neural network inference model is to be partitioned based on one or more of the performance condition or the security condition.

Examples B13 includes at least one computer readable storage medium comprising a set of instructions, which when executed by a computing system, cause the computing system to partition a neural network inference model into a plurality of slices, allocate different sets of resources to the plurality of slices based on one or more of a performance condition or a security condition, and coordinate, via a shared key, an execution of the plurality of slices by the different sets of resources.

Examples B14 includes the at least one computer readable storage medium of Examples B13, wherein the different sets of resources are to include a first set of resources and a second set of resources, and wherein to coordinate the execution of the plurality of slices, the instructions, when executed, cause the computing system to provision the shared key to the first set of resources and the second set of resources, notify the first set of resources and the second set of resources of one another and the shared key, and conduct a mutual attestation between the first set of resources and the second set of resources.

Examples B15 includes the at least one computer readable storage medium of Examples B14, wherein the plurality of slices are to include a first slice and a second slice, and wherein to coordinate the execution of the plurality of slices, the instructions, when executed, cause the computing system to protect a shared memory with the shared key, instruct the first set of resources to execute the first slice based on an inference input, instruct the first set of resources to store temporary values to the shared memory, instruct the second set of resources to execute the second slice based on the temporary values to obtain an inference result, and output the inference result.

Examples B16 includes the at least one computer readable storage medium of Examples B15, wherein the first slice is to include a first set of neural network layers and the second slice is to include a second set of neural network layers.

Examples B17 includes the at least one computer readable storage medium of Examples B13, wherein to allocate the different sets of resources to the plurality of slices, the instructions, when executed, cause the computing system to allocate a first set of resources to a first slice, wherein the first set of resources is to include one or more of a graphics processor compute engine, an accelerator or a smart network interface card, and allocate a second set of resources to a second slice, wherein the second set of resources is to include one or more host processor cores.

Examples B18 includes the at least one computer readable storage medium of any one of Examples B13 to B17, wherein the neural network inference model is to be partitioned based on one or more of the performance condition or the security condition.

Examples B19 includes a method of operating a performance-enhanced computing system, the method comprising partitioning a neural network inference model into a plurality of slices, allocating different sets of resources to the plurality of slices based on one or more of a performance condition or a security condition, and coordinating, via a shared key, an execution of the of the plurality of slices by the different sets of resources.

Examples B20 includes the method of Examples B19, wherein the different sets of resources include a first set of resources and a second set of resources, and wherein coordinating the execution of the plurality of slices includes provisioning the shared key to the first set of resources and the second set of resources, notifying the first set of resources and the second set of resources of one another and the shared key, and conducting a mutual attestation between the first set of resources and the second set of resources.

Examples B21 includes the method of Examples B20, wherein the plurality of slices includes a first slice and a second slice, and wherein coordinating the execution of the plurality of slices further includes protecting a shared memory with the shared key, instructing the first set of resources to execute the first slice based on an inference input, instructing the first set of resources to store temporary values to the shared memory, instructing the second set of resources to execute the second slice based on the temporary values to obtain an inference result, and outputting the inference result.

Examples B22 includes the method of Examples B21, wherein the first slice includes a first set of neural network layers and the second slice includes a second set of neural network layers.

Examples B23 includes the method of Examples B19, wherein allocating the different sets of resources to the plurality of slices includes allocating a first set of resources to a first slice, wherein the first set of resources includes one or more of a graphics processor compute engine, an accelerator or a smart network interface card, and allocating a second set of resources to a second slice, wherein the second set of resources includes one or more host processor cores.

Examples B24 includes the method of any one of Examples B19 to B23, wherein the neural network inference model is partitioned based on one or more of the performance condition or the security condition.

Examples B25 includes an apparatus comprising means for performing the method of any one of Examples B19 to B24.

Example C1 includes a computing system comprising a network controller, a graphics processor coupled to the network controller, wherein the graphics processor includes an update manager and a compute engine, and a memory device including a set of instructions, which when executed by the graphics processor, cause the graphics processor to obtain, by the update manager, current state information from a state log in response to a request to perform a firmware update in a compute engine, wherein the compute engine is to have an established trust context with a tenant application, and automatically pre-rotate, by the update manager, keys for a new trust context.

Example C2 includes the computing system of Example C1, wherein the instructions, when executed, further cause the graphics processor to increment, by the compute engine a state change counter, conduct, by the compute engine, the firmware update, migrate, by an engine manager containing the update manager, the established trust context to the new trust context based on the pre-rotated keys, and update, by the compute engine, the state log based on the new trust context.

Example C3 includes the computing system of Example C2, wherein the state change counter is to be located in a root of trust.

Example C4 includes the computing system of Example C2, further including a non-volatile memory, wherein the firmware update is to include a write of volatile data and the new trust context to the non-volatile memory and a creation of a new transition entry in the state log.

Example C5 includes the computing system of Example C1, wherein the instructions, when executed, further cause the graphics processor to notify a compliance component of the new trust context.

Example C6 includes the computing system of any one of Examples C1 to C5, wherein the pre-rotated keys are to include a session key, an attestation key and an identity key.

Example C7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to obtain, by an update manager, current state information from a state log in response to a request to perform a firmware update in a compute engine, wherein the compute engine is to have an established trust context with a tenant application, and automatically pre-rotate, by the update manager, keys for a new trust context.

Example C8 includes the semiconductor apparatus of Example C7, wherein the logic coupled to the one or more substrates is to increment, by the compute engine a state change counter, conduct, by the compute engine, the firmware update, migrate, by an engine manager containing the update manager, the established trust context to the new trust context based on the pre-rotated keys, and update, by the compute engine, the state log based on the new trust context.

Example C9 includes the semiconductor apparatus of Example C8, wherein the state change counter is to be located in a root of trust.

Example C10 includes the semiconductor apparatus of Example C8, wherein the firmware update is to include a write of volatile data and the new trust context to a non-volatile memory and a creation of a new transition entry in the state log.

Example C11 includes the semiconductor apparatus of Example C7, wherein the logic coupled to the one or more substrates is to notify a compliance component of the new trust context.

Example C12 includes the semiconductor apparatus of any one of Examples C7 to C11, wherein the pre-rotated keys are to include a session key, an attestation key and an identity key.

Example C13 includes at least one computer readable storage medium comprising a set of instructions, which when executed by a computing system, cause the computing system to obtain, by an update manager, current state information from a state log in response to a request to perform a firmware update in a compute engine, wherein the compute engine is to have an established trust context with a tenant application, and automatically pre-rotate, by the update manager, keys for a new trust context.

Example C14 includes the at least one computer readable storage medium of Example C13, wherein the instructions, when executed, further cause the computing system to increment, by the compute engine a state change counter, conduct, by the compute engine, the firmware update, migrate, by an engine manager containing the update manager, the established trust context to the new trust context based on the pre-rotated keys, and update, by the compute engine, the state log based on the new trust context.

Example C15 includes the at least one computer readable storage medium of Example C14, wherein the state change counter is to be located in a root of trust.

Example C16 includes the at least one computer readable storage medium of Example C14, wherein the firmware update is to include a write of volatile data and the new trust context to a non-volatile memory and a creation of a new transition entry in the state log.

Example C17 includes the at least one computer readable storage medium of Example C13, wherein the instructions, when executed, further cause the computing system to notify a compliance component of the new trust context.

Example C18 includes the at least one computer readable storage medium of any one of Examples C13 to C17, wherein the pre-rotated keys are to include a session key, an attestation key and an identity key.

Example C19 includes a method of operating a performance-enhanced computing system, the method comprising obtaining, by an update manager, current state information from a state log in response to a request to perform a firmware update in a compute engine, wherein the compute engine has an established trust context with a tenant application, and automatically pre-rotating, by the update manager, keys for a new trust context.

Example C20 includes the method of Example C19, further including incrementing, by the compute engine, a state change counter, conducting, by the compute engine, the firmware update, migrating, by an engine manager containing the update manager, the established trust context to the new trust context based on the pre-rotated keys, and updating, by the compute engine, the state log based on the new trust context.

Example C21 includes the method of Example C20, wherein the state change counter is located in a root of trust.

Example C22 includes the method of Example C20, wherein the firmware update includes a write of volatile data and the new trust context to a non-volatile memory and a creation of a new transition entry in the state log.

Example C23 includes the method of Example C19, further including notifying a compliance component of the new trust context.

Example C24 includes the method of any one of Examples C19 to C23, wherein the pre-rotated keys include a session key, an attestation key and an identity key.

Example C25 includes an apparatus comprising means for performing the method of any one of Examples C19 to C23.

Example D1 includes a computing system comprising a latch resource, one or more additional resources, and a memory coupled to the one or more additional resources, wherein the memory includes a set of instructions, which when executed by at least one of the one or more resources, cause the at least one of the one or more resources to allocate the latch resource to a tenant workload, allocate the one or more additional resources to the tenant workload, wherein the one or more additional resources are selected from a group consisting of a graphics processor, a host processor, a field-programmable gate array, a memory location, and a storage location, and control an execution of the tenant workload by the one or more additional resources in accordance with the latch resource.

Example D2 includes the computing system of Example D1, wherein the instructions, when executed, further cause the at least one of the one or more resources to determine a resource requirement for the tenant workload based on a service level agreement (SLA) query a workload scheduling service (WSS) for available resources, initiate, by the WSS, a resource allocation based on the resource requirement and the available resources, and select the latch resource.

Example D3 includes the computing system of Example D2, wherein the resource allocation is to be initiated via resource director technology (RDT).

Example D4 includes the computing system of Example D2, further including a hierarchical set of latch resources, wherein the latch resource is to be selected from the hierarchical set of latch resources.

Example D5 includes the computing system of any one of Examples D1 to D4, wherein to control the execution of the tenant workload, the instructions, when executed, cause the at least one of the one or more resources to set a latch state associated with the latch resource as being allocated to the tenant workload, attest to the one or more additional resources in accordance with a security policy, provision the tenant workload with context information, settings and data, attest to the one or more additional resources with respect to the tenant workload in accordance with the security policy, and conduct the execution of the tenant workload via the one or more additional resources.

Example D6 includes the computing system of any one of Examples D1 to D4, wherein the instructions, when executed, further cause the at least one of the one or more resources to return, upon confirmation that the execution has completed, results of the execution of the tenant workload to one or more of an orchestrator or a scheduler, deallocate the one or more additional resources from the tenant workload, attest to an unallocated state with respect to the one or more additional resources, deallocate the latch resource from the tenant workload, and set a latch state associated with the latch resource as being unallocated from the tenant.

Example D7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to allocate a latch resource to a tenant workload, allocate one or more additional resources to the tenant workload, wherein the one or more additional resources are selected from a group consisting of a graphics processor, a host processor, a field-programmable gate array, a memory location, and a storage location, and control an execution of the tenant workload by the one or more additional resources in accordance with the latch resource.

Example D8 includes the apparatus of Example D7, wherein the logic coupled to the one or more substrates is to determine a resource requirement for the tenant workload based on a service level agreement (SLA) query a workload scheduling service (WSS) for available resources, initiate, by the WSS, a resource allocation based on the resource requirement and the available resources, and select the latch resource.

Example D9 includes the apparatus of Example D8, wherein the resource allocation is to be initiated via resource director technology (RDT).

Example D10 includes the apparatus of Example D8, wherein the latch resource is to be selected from a hierarchical set of latch resources.

Example D11 includes the apparatus of any one of Examples D7 to D10, wherein to control the execution of the tenant workload, the logic coupled to the one or more substrates is to set a latch state associated with the latch resource as being allocated to the tenant workload, attest to the one or more additional resources in accordance with a security policy, provision the tenant workload with context information, settings and data, attest to the one or more additional resources with respect to the tenant workload in accordance with the security policy, and conduct the execution of the tenant workload via the one or more additional resources.

Example D12 includes the apparatus of Example Dany one of Examples D7 to D10, wherein the logic coupled to the one or more substrates is to return, upon confirmation that the execution has completed, results of the execution of the tenant workload to one or more of an orchestrator or a scheduler, deallocate the one or more additional resources from the tenant workload, attest to an unallocated state with respect to the one or more additional resources, deallocate the latch resource from the tenant workload, and set a latch state associated with the latch resource as being unallocated from the tenant.

Example D13 includes at least one computer readable storage medium comprising a set of instructions, which when executed by a computing system, cause the computing system to allocate a latch resource to a tenant workload, allocate one or more additional resources to the tenant workload, wherein the one or more additional resources are selected from a group consisting of a graphics processor, a host processor, a field-programmable gate array, a memory location, and a storage location, and control an execution of the tenant workload by the one or more additional resources in accordance with the latch resource.

Example D14 includes the at least one computer readable storage medium of Example D13, wherein the instructions, when executed, further cause the computing system to determine a resource requirement for the tenant workload based on a service level agreement (SLA) query a workload scheduling service (WSS) for available resources, initiate, by the WSS, a resource allocation based on the resource requirement and the available resources, and select the latch resource.

Example D15 includes the at least one computer readable storage medium of Example D14, wherein the resource allocation is to be initiated via resource director technology (RDT).

Example D16 includes the at least one computer readable storage medium of Example D14, wherein the latch resource is to be selected from a hierarchical set of latch resources.

Example D17 includes the at least one computer readable storage medium of any one of Examples D13 to D16, wherein to control the execution of the tenant workload, the instructions, when executed, cause the computing system to set a latch state associated with the latch resource as being allocated to the tenant workload, attest to the one or more additional resources in accordance with a security policy, provision the tenant workload with context information, settings and data, attest to the one or more additional resources with respect to the tenant workload in accordance with the security policy, and conduct the execution of the tenant workload via the one or more additional resources.

Example D18 includes the at least one computer readable storage medium of any one of Examples D13 to D16, wherein the instructions, when executed, further cause the computing system to return, upon confirmation that the execution has completed, results of the execution of the tenant workload to one or more of an orchestrator or a scheduler, deallocate the one or more additional resources from the tenant workload, attest to an unallocated state with respect to the one or more additional resources, deallocate the latch resource from the tenant workload, and set a latch state associated with the latch resource as being unallocated from the tenant.

Example D19 includes a method of operating a performance-enhanced computing system, the method comprising allocating a latch resource to a tenant workload, allocating one or more additional resources to the tenant workload, wherein the one or more additional resources are selected from a group consisting of a graphics processor, a host processor, a field-programmable gate array, a memory location, and a storage location, controlling an execution of the tenant workload by the one or more additional resources in accordance with the latch resource.

Example D20 includes the method of Example D19, further including determining a resource requirement for the tenant workload based on a service level agreement (SLA), querying a workload scheduling service (WSS) for available resources, initiating, by the WSS, a resource allocation based on the resource requirement and the available resources, and selecting the latch resource.

Example D21 includes the method of Example D20, wherein the resource allocation is initiated via resource director technology (RDT).

Example D22 includes the method of Example D20, wherein the latch resource is selected from a hierarchical set of latch resources.

Example D23 includes the method of any one of Examples D19 to D22, wherein controlling the execution of the tenant workload includes setting a latch state associated with the latch resource as being allocated to the tenant workload, attesting to the one or more additional resources in accordance with a security policy, provisioning the tenant workload with context information, settings and data, attesting to the one or more additional resources with respect to the tenant workload in accordance with the security policy, and conducting the execution of the tenant workload via the one or more additional resources.

Example D24 includes the method of any one of Examples D19 to D22, further including returning, upon confirmation that the execution has completed, results of the execution of the tenant workload to one or more of an orchestrator or a scheduler, deallocating the one or more additional resources from the tenant workload, attesting to an unallocated state with respect to the one or more additional resources, deallocating the latch resource from the tenant workload, and setting a latch state associated with the latch resource as being unallocated from the tenant.

Example D25 includes an apparatus comprising means for performing the method of any one of Examples D19 to D22.

Example E1 includes a computing system comprising graphics processor resources, and a memory coupled to the graphics processor resources, the memory including a set of instructions, which when executed by at least one of the graphics processor resources, cause the at least one of the graphics processor resources to asynchronously monitor an operational state and a boot state of the graphics processor resources to determine compute engine attestation and telemetry information, determine additional attestation and telemetry information, and detect one or more of an unexpected state or an unauthorized pattern based on the compute engine attestation and telemetry information and the additional attestation and telemetry information.

Example E2 includes the computing system of Example E1, wherein the compute engine attestation and telemetry information is to be determined independently from one or more tenant workloads.

Example E3 includes the computing system of Example E1, further including a host processor, a memory controller, an accelerator and a storage device, wherein the additional attestation and telemetry information is to be associated with one or more of the host processor, the memory controller, the accelerator, or the storage device.

Example E4 includes the computing system of Example E1, wherein the graphics processor resources include a graphics integrity verification engine, and wherein the instructions, when executed, further cause at least one of the graphics processor resources to report, via the graphics integrity verification engine, the compute engine attestation and telemetry information to a platform root of trust engine.

Example E5 includes the computing system of Example E1, further including a platform root of trust engine, wherein the instructions, when executed, further cause the at least one of the graphics processor resources to report the additional attestation and telemetry information to the platform root of trust engine.

Example E6 includes the computing system of any one of Examples E1 to E5, wherein the instructions, when executed, further cause the at least one of the graphics processor resources to conduct a platform-level compliance assessment based on service level agreement information and one or more of the unexpected state or the unauthorized pattern.

Example E7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to asynchronously monitor an operational state and a boot state of graphics processor resources to determine compute engine attestation and telemetry information, determine additional attestation and telemetry information, and detect one or more of an unexpected state or an unauthorized pattern based on the compute engine attestation and telemetry information and the additional attestation and telemetry information.

Example E8 includes the apparatus of Example E7, wherein the compute engine attestation and telemetry information is to be determined independently from one or more tenant workloads.

Example E9 includes the apparatus of Example E7, wherein the additional attestation and telemetry information is to be associated with one or more of a host processor, a memory controller, an accelerator, or a storage device.

Example E10 includes the apparatus of Example E7, wherein the logic coupled to the one or more substrates is to report, via a graphics integrity verification information, the compute engine attestation and telemetry information to a platform root of trust engine.

Example E11 includes the apparatus of Example E7, wherein the logic coupled to the one or more substrates is to report the additional attestation and telemetry information to a platform root of trust engine.

Example E12 includes the apparatus of any one of Examples E7 to E11, wherein the logic coupled to the one or more substrates is to conduct a platform-level compliance assessment based on service level agreement information and one or more of the unexpected state or the unauthorized pattern.

Example E13 includes at least one computer readable storage medium comprising a set of instructions, which when executed by a computing system, cause the computing system to asynchronously monitor an operational state and a boot state of graphics processor resources to determine compute engine attestation and telemetry information, determine additional attestation and telemetry information, and detect one or more of an unexpected state or an unauthorized pattern based on the compute engine attestation and telemetry information and the additional attestation and telemetry information.

Example E14 includes the at least one computer readable storage medium of Example E13, wherein the compute engine attestation and telemetry information is to be determined independently from one or more tenant workloads.

Example E15 includes the at least one computer readable storage medium of Example E13, wherein the additional attestation and telemetry information is to be associated with one or more of a host processor, a memory controller, an accelerator, or a storage device.

Example E16 includes the at least one computer readable storage medium of Example E13, wherein the instructions, when executed, further cause the computing system to report, via a graphics integrity verification engine, the compute engine attestation and telemetry information to a platform root of trust engine.

Example E17 includes the at least one computer readable storage medium of Example E13, wherein the instructions, when executed, further cause the computing system to report the additional attestation and telemetry information to a platform root of trust engine.

Example E18 includes the at least one computer readable storage medium of any one of Examples E13 to E17, wherein the instructions, when executed, further cause the computing system to conduct a platform-level compliance assessment based on service level agreement information and one or more of the unexpected state or the unauthorized pattern.

Example E19 includes a method of operating a performance-enhanced computing system, the method comprising asynchronously monitoring an operational state and a boot state of graphics processor resources to determine compute engine attestation and telemetry information, determining additional attestation and telemetry information, and detecting one or more of an unexpected state or an unauthorized pattern based on the compute engine attestation and telemetry information and the additional attestation and telemetry information.

Example E20 includes the method of Example E19, wherein the compute engine attestation and telemetry information is determined independently from one or more tenant workloads.

Example E21 includes the method of Example E19, wherein the additional attestation and telemetry information is associated with one or more of a host processor, a memory controller, an accelerator, or a storage device.

Example E22 includes the method of Example E19, further including reporting, via a graphics integrity verification engine, the compute engine attestation and telemetry information to a platform root of trust engine.

Example E22 includes the method of Example E19, further including reporting the additional attestation and telemetry information to a platform root of trust engine.

Example E24 includes the method of any one of Examples E19 to E23, further including conducting a platform-level compliance assessment based on service level agreement information and one or more of the unexpected state or the unauthorized pattern.

Example E25 includes an apparatus comprising means for performing the method of any one of Examples E19 to E24.

Example F1 includes a performance-enhanced computing system comprising a scanner to conduct a wireless credential exchange (WCE) with a first radio frequency identifier (RFID) associated with a first graphics processor component, a host processor, and a memory coupled to the host processor, the memory including a set of instructions, which when executed by the host processor, cause the host processor to detect a first public key, a first component identifier, and a first manufacturer identifier in the WCE, embed a first receipt in a second RFID, wherein the first receipt is to be associated with the first graphics processor component and the second RFID is to be associated with a second graphics processor component, and embed a second public key, a second component identifier, and a second manufacturer identifier in the second RFID.

Example F2 includes the computing system of Example F1, wherein the instructions, when executed, further cause the host processor to conduct an authentication of the first graphics processor component based on a first private key located in a hardware root of trust of the first graphics processor component, and wherein the authentication is successful if the first public key corresponds to the first private key.

Example F3 includes the computing system of Example F2, wherein the hardware root of trust is a device identifier composition engine (DICE), and wherein the first receipt is to be embedded in the second RFID if the authentication is successful.

Example F4 includes the computing system of Example F2, wherein the WCE is to be conducted while the first graphics processor component is powered on.

Example F5 includes the computing system of Example F1, wherein the WCE is to be conducted while the first graphics processor component is powered off.

Example F6 includes the computing system of any one of Examples F1 to F5, wherein the first receipt includes one or more identity keys associated with the second manufacturer.

Example F7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to detect a first public key, a first component identifier, and a first manufacturer identifier in a wireless credential exchange (WCE) with a first radio frequency identifier (RFID) associated with a first graphics processor component, embed a first receipt in a second RFID, wherein the first receipt is to be associated with the first graphics processor component and the second RFID is to be associated with a second graphics processor component, and embed a second public key, a second component identifier, and a second manufacturer identifier in the second RFID.

Example F8 includes the apparatus of Example F7, wherein the logic coupled to the one or more substrates is to conduct an authentication of the first graphics processor component based on a first private key located in a hardware root of trust of the first graphics processor component, and wherein the authentication is successful if the first public key corresponds to the first private key.

Example F9 includes the apparatus of Example F8, wherein the hardware root of trust is a device identifier composition engine (DICE), and wherein the first receipt is to be embedded in the second RFID if the authentication is successful.

Example F10 includes the apparatus of Example F8, wherein the WCE is to be conducted while the first graphics processor component is powered on.

Example F11 includes the apparatus of Example F7, wherein the WCE is to be conducted while the first graphics processor component is powered off.

Example F12 includes the apparatus of any one of Examples F7 to F11, wherein the first receipt includes one or more identity keys associated with the second manufacturer.

Example F13 includes at least one computer readable storage medium comprising a set of instructions, which when executed by a computing system, cause the computing system to detect a first public key, a first component identifier, and a first manufacturer identifier in a wireless credential exchange (WCE) with a first radio frequency identifier (RFID) associated with a first graphics processor component, embed a first receipt in a second RFID, wherein the first receipt is to be associated with the first graphics processor component and the second RFID is to be associated with a second graphics processor component, and embed a second public key, a second component identifier, and a second manufacturer identifier in the second RFID.

Example F14 includes the at least one computer readable storage medium of Example F13, wherein the instructions, when executed, further cause the computing system to conduct an authentication of the first graphics processor component based on a first private key located in a hardware root of trust of the first graphics processor component, and wherein the authentication is successful if the first public key corresponds to the first private key.

Example F15 includes the at least one computer readable storage medium of Example F14, wherein the hardware root of trust is a device identifier composition engine (DICE), and wherein the first receipt is to be embedded in the second RFID if the authentication is successful.

Example F16 includes the at least one computer readable storage medium of Example F14, wherein the WCE is to be conducted while the first graphics processor component is powered on.

Example F17 includes the at least one computer readable storage medium of Example F13, wherein the WCE is to be conducted while the first graphics processor component is powered off.

Example F18 includes the at least one computer readable storage medium of any one of Examples F13 to F17, wherein the first receipt includes one or more identity keys associated with the second manufacturer.

Example F19 includes a method of operating a performance-enhanced computing system, the method comprising detecting a first public key, a first component identifier, and a first manufacturer identifier in a wireless credential exchange (WCE) with a first radio frequency identifier (RFID) associated with a first graphics processor component, embedding a first receipt in a second RFID, wherein the first receipt is associated with the first graphics processor component and the second RFID is associated with a second graphics processor component, and embed a second public key, a second component identifier, and a second manufacturer identifier in the second RFID.

Example F20 includes the method of Example F19, further including conducting an authentication of the first graphics processor component based on a first private key located in a hardware root of trust of the first graphics processor component, wherein the authentication is successful if the first public key corresponds to the first private key.

Example F21 includes the method of Example F20, wherein the hardware root of trust is a device identifier composition engine (DICE), and wherein the first receipt is embedded in the second RFID if the authentication is successful.

Example F22 includes the method of Example F20, wherein the WCE is conducted while the first graphics processor component is powered on.

Example F23 includes the method of Example F19, wherein the WCE is conducted while the first graphics processor component is powered off.

Example F24 includes the method of any one of Examples F19 to F23, wherein the first receipt includes one or more identity keys associated with the second manufacturer.

Example F25 includes an apparatus comprising means for performing the method of any one of Examples 19 to 23.

Example G1 includes a computing system comprising a network controller, a processor coupled to the network controller, and a memory coupled to the processor, wherein the memory includes a set of instructions, which when executed by the processor, cause the processor to elect a tenant slice as a platform resource manager, transfer, by the elected tenant slice, a migration public key from one or more additional tenant slices to an orchestrator, and transfer, by the elected tenant slice, context information from the orchestrator to a slice resource manager associated with the one or more additional tenant slices.

Example G2 includes the computing system of Example G1, wherein the instructions, when executed, further cause the processor to manage, by the elected tenant slice, an attestation and allocation of resources to the one or more additional tenant slices.

Example G3 includes the computing system of Example G1, wherein to transfer the migration key to the orchestrator, the instructions, when executed, further cause the processor to send the migration public key to a compute engine manager.

Example G4 includes the computing system of Example G1, wherein to transfer the context information from the orchestrator, the instructions, when executed, further cause the processor to receive the context information from a compute engine manager.

Example G5 includes the computing system of Example G1, wherein the context information is to include data, code and one or more keys, and wherein the context information is to be wrapped with the migration public key.

Example G6 includes the computing system of any one of Examples G1 to G5, wherein the elected tenant slice is to include tenant-specific graphics resources.

Example G7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to elect a tenant slice as a platform resource manager, transfer, by the elected tenant slice, a migration public key from one or more additional tenant slices to an orchestrator, and transfer, by the elected tenant slice, context information from the orchestrator to a slice resource manager associated with the one or more additional tenant slices.

Example G8 includes the apparatus of Example G7, wherein the logic coupled to the one or more substrates is to manage, by the elected tenant slice, an attestation and allocation of resources to the one or more additional tenant slices.

Example G9 includes the apparatus of Example G7, wherein to transfer the migration key to the orchestrator, the logic coupled to the one or more substrates is to send the migration public key to a compute engine manager.

Example G10 includes the apparatus of Example G7, wherein to transfer the context information from the orchestrator, the logic coupled to the one or more substrates is to receive the context information from a compute engine manager.

Example G11 includes the apparatus of Example G7, wherein the context information is to include data, code and one or more keys, and wherein the context information is to be wrapped with the migration public key.

Example G12 includes the apparatus of any one of Examples G7 to G11, wherein the elected tenant slice is to include tenant-specific graphics resources.

Example G13 includes at least one computer readable storage medium comprising a set of instructions, which when executed by a computing system, cause the computing system to elect a tenant slice as a platform resource manager, transfer, by the elected tenant slice, a migration public key from one or more additional tenant slices to an orchestrator, and transfer, by the elected tenant slice, context information from the orchestrator to a slice resource manager associated with the one or more additional tenant slices.

Example G14 includes the at least one computer readable storage medium of Example G13, wherein the instructions, when executed, further cause the computing system to manage, by the elected tenant slice, an attestation and allocation of resources to the one or more additional tenant slices.

Example G15 includes the at least one computer readable storage medium of Example G13, wherein to transfer the migration key to the orchestrator, the instructions, when executed, further cause the computing system to send the migration public key to a compute engine manager.

Example G16 includes the at least one computer readable storage medium of Example G13, wherein to transfer the context information from the orchestrator, the instructions, when executed, further cause the computing system to receive the context information from a compute engine manager.

Example G17 includes the at least one computer readable storage medium of Example G13, wherein the context information is to include data, code and one or more keys, and wherein the context information is to be wrapped with the migration public key.

Example G18 includes the at least one computer readable storage medium of any one of Examples G13 to G17, wherein the elected tenant slice is to include tenant-specific graphics resources.

Example G19 includes a method of operating a performance-enhanced computing system, the method comprising electing a tenant slice as a platform resource manager, transferring, by the elected tenant slice, a migration public key from one or more additional tenant slices to an orchestrator, and transferring, by the elected tenant slice, context information from the orchestrator to a slice resource manager associated with the one or more additional tenant slices.

Example G20 includes the method of Example G19, further including managing, by the elected tenant slice, an attestation and allocation of resources to the one or more additional tenant slices.

Example G21 includes the method of Example G19, wherein transferring the migration public key to the orchestrator includes sending the migration public key to a compute engine manager.

Example G22 includes the method of Example G19, wherein transferring the context information from the orchestrator includes receiving the context information from a compute engine manager.

Example G23 includes the method of Example G19, wherein the context information includes data, code and one or more keys, and wherein the context information is wrapped with the migration public key.

Example G24 includes the method of any one of Examples G19 to G23, wherein the elected tenant slice includes tenant-specific graphics resources.

Example G25 includes an apparatus comprising means for performing the method of any one of Examples G19 to G24.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc.

may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A semiconductor apparatus comprising:
   one or more substrates; and
   logic coupled to the one or more substrates, wherein the logic is implemented at least partly in one or more of configurable logic or fixed-functionality hardware logic, the logic coupled to the one or more substrates to:
   partition a neural network inference model into a plurality of slices including a first slice and a second slice;
   allocate different sets of resources to the plurality of slices based on one or more of a performance condition or a security condition, wherein the different sets of resources include a first set of resources and a second set of resources; and
   coordinate, via a shared key, an execution of the plurality of slices by the different sets of resources by
      a protection of a shared memory with the shared key;
      an instruction to the first set of resources to store temporary values associated with the first slice to the shared memory; and
      an instruction to the second set of resources to execute the second slice based on the temporary values to obtain an inference result.

2. The apparatus of claim 1, wherein to coordinate the execution of the plurality of slices, the logic coupled to the one or more substrates is to:
   provision the shared key to the first set of resources and the second set of resources;
   notify the first set of resources and the second set of resources of one another and the shared key; and
   conduct a mutual attestation between the first set of resources and the second set of resources.

3. The apparatus of claim 2, wherein to coordinate the execution of the plurality of slices, the logic coupled to the one or more substrates is to:
   instruct the first set of resources to execute the first slice based on an inference input; and
   output the inference result.

4. The apparatus of claim 3, wherein the first slice is to include a first set of neural network layers and the second slice is to include a second set of neural network layers.

5. The apparatus of claim 1, wherein the first set of resources is to include one or more of a graphics processor compute engine, an accelerator or a smart network interface card; and
   wherein the second set of resources is to include one or more host processor cores.

6. The apparatus of claim 1, wherein the neural network inference model is to be partitioned based on one or more of the performance condition or the security condition.

7. At least one non-transitory computer readable storage medium comprising a set of instructions, which when executed by a computing system, cause the computing system to:
   partition a neural network inference model into a plurality of slices including a first slice and a second slice;
   allocate different sets of resources to the plurality of slices based on one or more of a performance condition or a security condition, wherein the different sets of resources include a first set of resources and a second set of resources; and
   coordinate, via a shared key, an execution of the plurality of slices by the different sets of resources by
      a protection of a shared memory with the shared key;
      an instruction to the first set of resources to store temporary values associated with the first slice to the shared memory; and
      an instruction to the second set of resources to execute the second slice based on the temporary values to obtain an inference result.

8. The at least one non-transitory computer readable storage medium of claim 7, wherein to coordinate the execution of the plurality of slices, the instructions, when executed, further cause the computing system to:
   provision the shared key to the first set of resources and the second set of resources;
   notify the first set of resources and the second set of resources of one another and the shared key; and
   conduct a mutual attestation between the first set of resources and the second set of resources.

9. The at least one non-transitory computer readable storage medium of claim 8, wherein to coordinate the execution of the plurality of slices, the instructions, when executed, further cause the computing system to:
   instruct the first set of resources to execute the first slice based on an inference input; and
   output the inference result.

10. The at least one non-transitory computer readable storage medium of claim 9, wherein the first slice is to include a first set of neural network layers and the second slice is to include a second set of neural network layers.

11. The at least one non-transitory computer readable storage medium of claim 7,
    wherein the first set of resources is to include one or more of a graphics processor compute engine, an accelerator or a smart network interface card; and
    wherein the second set of resources is to include one or more host processor cores.

12. The at least one non-transitory computer readable storage medium of claim 7,
    wherein the neural network inference model is to be partitioned based on one or more of the performance condition or the security condition.

13. A computing system comprising:
    a graphics processor; and
    a memory coupled to the graphics processor, the memory including a set of instructions, which when executed by the graphics processor, cause the graphics processor to:
    partition a neural network inference model into a plurality of slices including a first slice and a second slice;
    allocate different sets of resources to the plurality of slices based on one or more of a performance condition or a security condition, wherein the different sets of resources include a first set of resources and a second set of resources; and coordinate, via a shared key, an execution of the plurality of slices by the different sets of resources by
    a protection of a shared memory with the shared key;
    an instruction to the first set of resources to store temporary values associated with the first slice to the shared memory; and
    an instruction to the second set of resources to execute the second slice based on the temporary values to obtain an inference result.

14. The computing system of claim 13, wherein to coordinate the execution of the plurality of slices, the instructions, when executed, further cause the graphics processor to:
    provision the shared key to the first set of resources and the second set of resources;
    notify the first set of resources and the second set of resources of one another and the shared key; and
    conduct a mutual attestation between the first set of resources and the second set of resources.

15. The computing system of claim 14, wherein to coordinate the execution of the plurality of slices, the instructions, when executed, further cause the graphics processor to:
    instruct the first set of resources to execute the first slice based on an inference input; and
    output the inference result.

16. The computing system of claim 15, wherein the first slice is to include a first set of neural network layers and the second slice is to include a second set of neural network layers.

17. The computing system of claim 13,
    wherein the first set of resources is to include one or more of a graphics processor compute engine, an accelerator or a smart network interface card; and
    wherein the second set of resources is to include one or more host processor cores.

18. The computing system of claim 13, wherein the neural network inference model is to be partitioned based on one or more of the performance condition or the security condition.

\* \* \* \* \*